United States Patent
Hanaoka et al.

[11] Patent Number: 5,959,866
[45] Date of Patent: Sep. 28, 1999

[54] LIBRARY APPARATUS WITH A PLURALITY OF CELLS FOR STORING CARTRIDGES ACCOMMODATING MEMORY MEDIA THEREIN

[75] Inventors: Yasuhiko Hanaoka; Tikatu Katou, both of Kawasaki, Japan

[73] Assignee: Fujitsu Limited, Kawasaki, Japan

[21] Appl. No.: 08/821,741

[22] Filed: Mar. 20, 1997

[30] Foreign Application Priority Data

Aug. 28, 1996 [JP] Japan .................................. 8-227188

[51] Int. Cl.⁶ .................................................. G06F 17/00
[52] U.S. Cl. ............................ 364/478.02; 364/478.06; 369/36; 369/69; 369/178; 369/34
[58] Field of Search .................. 364/478.02–478.06; 360/91, 92, 98.01, 98.04, 98.05; 414/273, 274, 277, 280, 282; 369/34–39, 69, 178

[56] References Cited

U.S. PATENT DOCUMENTS

| | | | |
|---|---|---|---|
| 3,831,197 | 8/1974 | Beach et al. ........................... | 360/71 |
| 3,938,190 | 2/1976 | Semmlow et al. ...................... | 360/92 |
| 3,964,577 | 6/1976 | Bengtsson ............................. | 186/37 |
| 4,654,727 | 3/1987 | Blum et al. ............................ | 360/71 |
| 5,532,931 | 7/1996 | Erickson, Jr. et al. ............. | 364/478.06 |
| 5,607,275 | 3/1997 | Woodruff et al. ................. | 414/277 X |
| 5,768,141 | 6/1998 | Hanaoka et al. ................... | 364/478.02 |

FOREIGN PATENT DOCUMENTS

| | | |
|---|---|---|
| 63-98864 | 4/1988 | Japan . |
| 2257462 | 10/1990 | Japan . |
| 3130963 | 6/1991 | Japan . |

*Primary Examiner*—William Grant
*Assistant Examiner*—Ramesh Patel
*Attorney, Agent, or Firm*—Greer, Burns & Crain

[57] ABSTRACT

A library apparatus capable of being manufactured at low cost, in which a cartridge can be moved accurately without high mechanical precision. The library apparatus comprises a plurality of cells each for containing a cartridge, a reference cell unit, an accessor unit, a passage unit, at least a drum unit, at least a drive unit, a guide rail and an accessor. The accessor has a high-accuracy diagnostic cell. The error between the light axis of a photoelectric sensor of the accessor and the operation axis of a hand unit of the accessor is measured by inserting and withdrawing a high-accuracy diagnostic cartridge into and out of the diagnostic cell. Also, a position correction value and a sensor sensitivity correction value for the accessor actually moving to a cell are determined. On the basis of the error and correction values thus obtained, a table showing the relative positions of all the cells is prepared before the operation of the library apparatus. The accessor is moved to an intended cell taking the correction value in the table into account at the time of operation of the library apparatus.

19 Claims, 80 Drawing Sheets

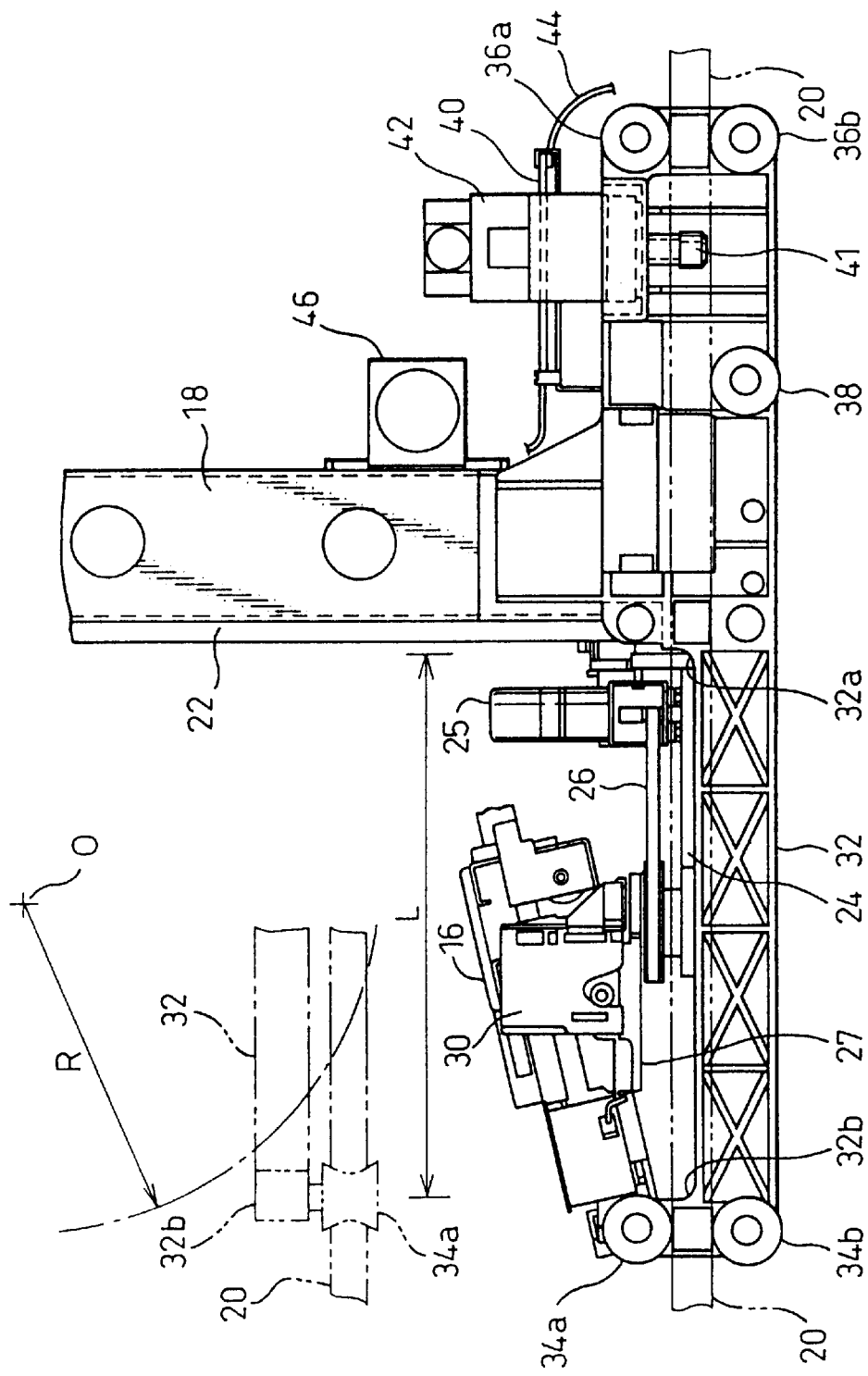

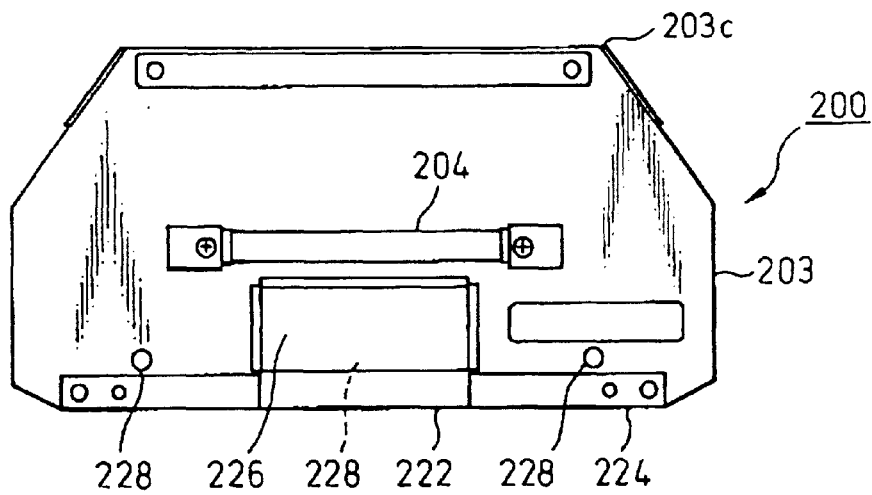
Fig. 32A
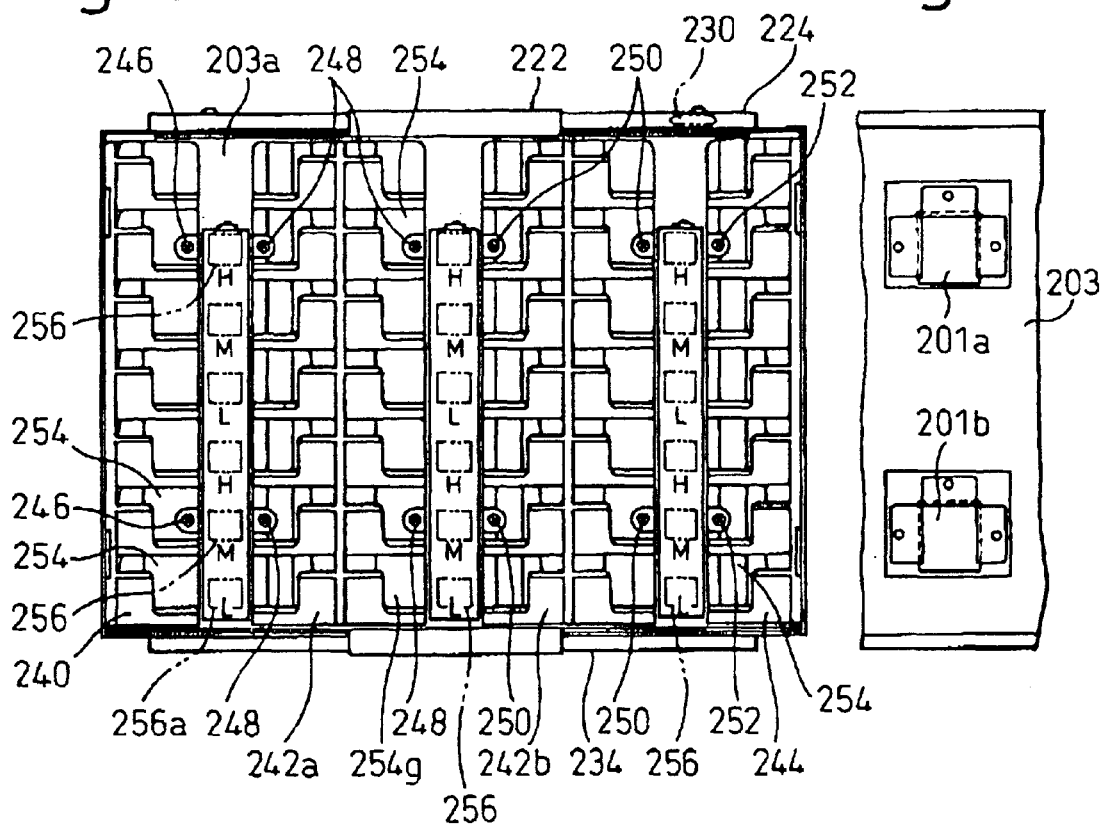
Fig. 32B
Fig. 32C

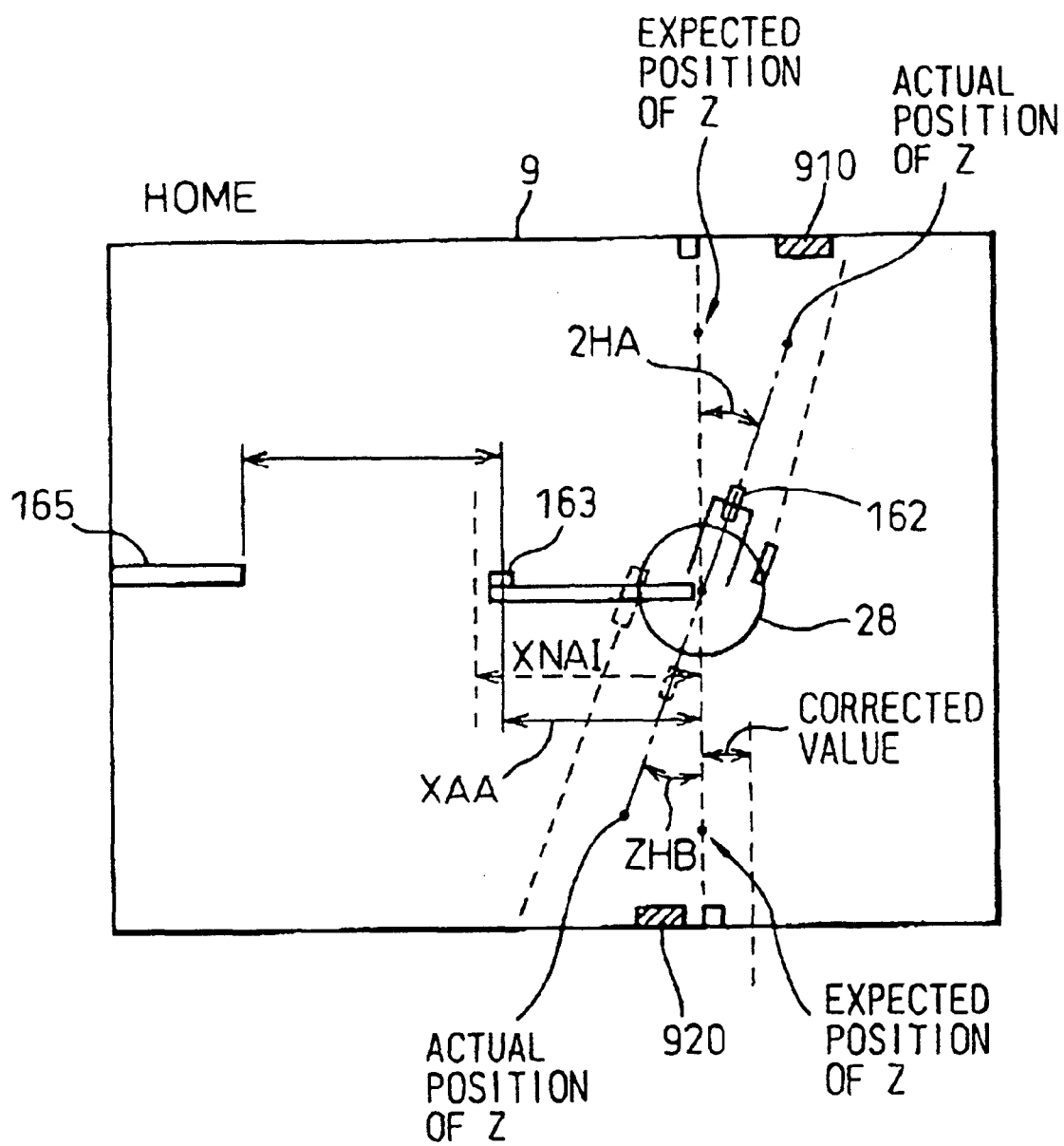

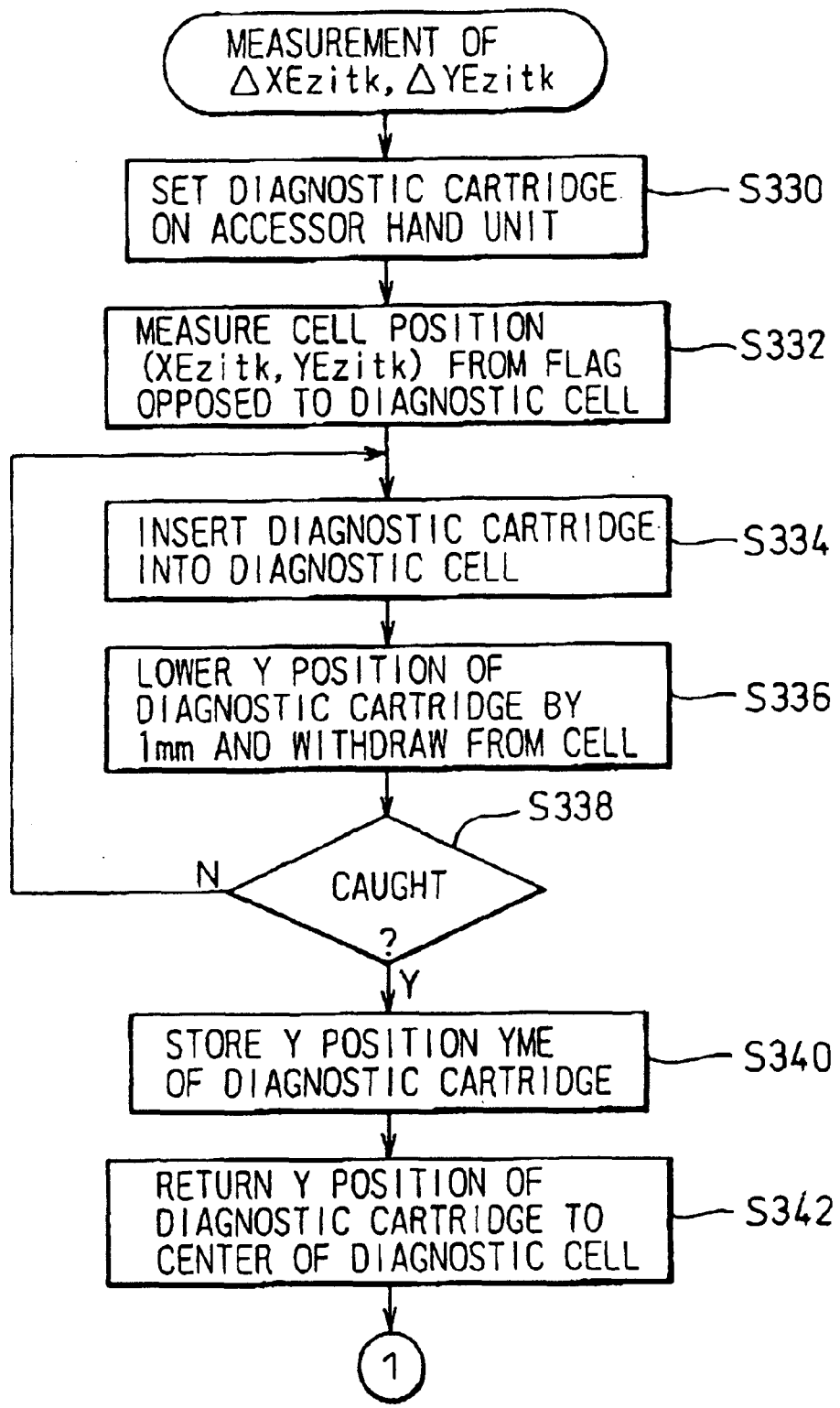

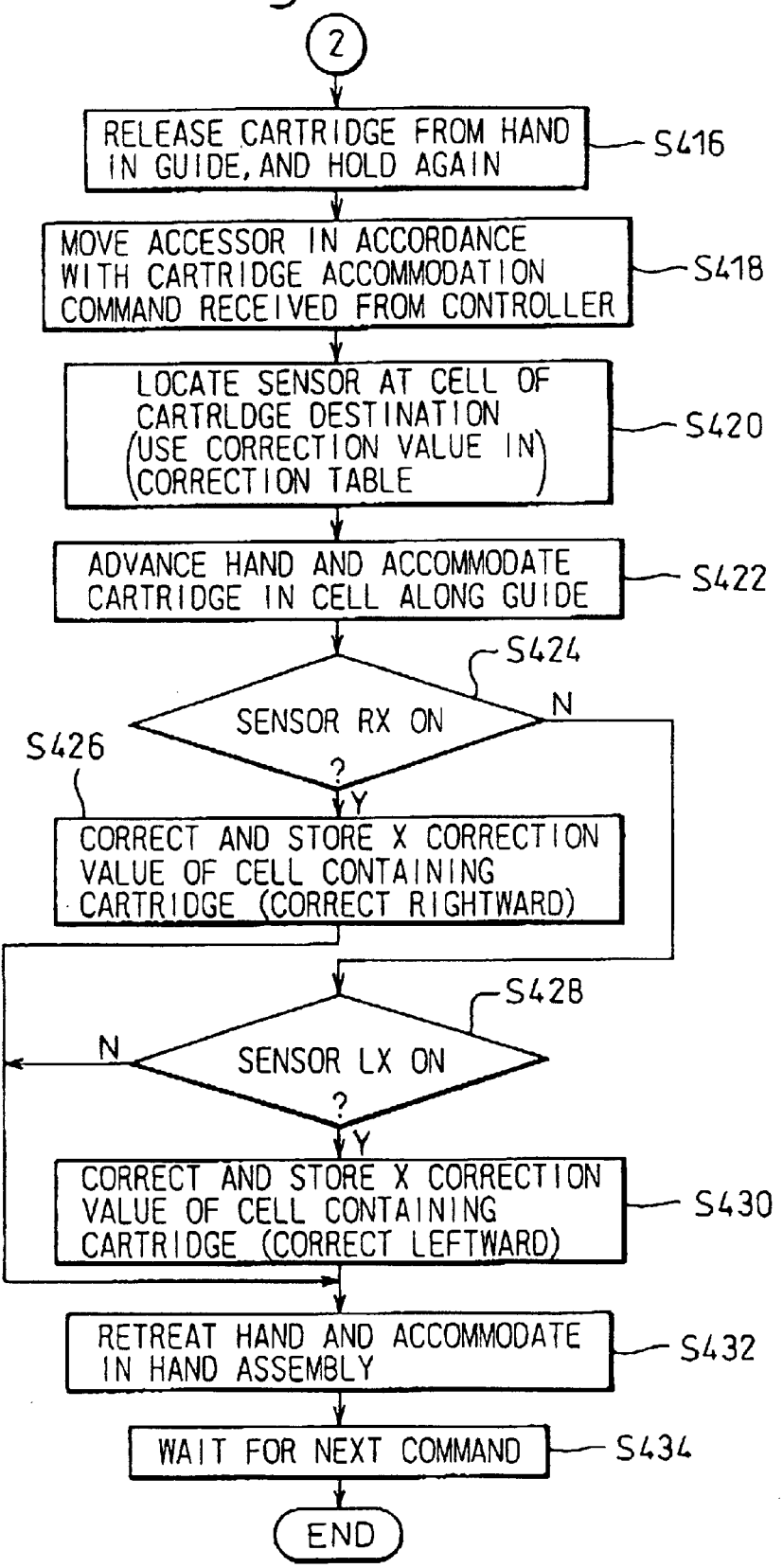

LIBRARY APPARATUS WITH A PLURALITY OF CELLS FOR STORING CARTRIDGES ACCOMMODATING MEMORY MEDIA THEREIN

BACKGROUND OF THE INVENTION

1. Field of the Invention

The present invention relates to a library apparatus comprising a plurality of cells each for storing a cartridge containing a storage medium.

A library apparatus comprises a plurality of cells each for storing a cartridge containing an information storage medium such as a magnetic tape cartridge or an optical disk cartridge. A cartridge selected from one of the cells is loaded in the drive unit in the library unit. Information is recorded or reproduced into or from the medium contained in the cartridge by the drive unit.

Especially in recent years, a demand has been rising for a library apparatus of a large capacity used for searching a large amount of data for multimedia and graphics applications. A library apparatus is required to have a large capacity capable of containing as many cartridges as possible in a small installation space.

2. Description of the Invention

A library apparatus such as a magnetic table library apparatus is used for data search requiring a large capacity and comprises a plurality of cells each for storing a cartridge containing a storage medium. This library apparatus comprises a reference cell unit arranged at the central portion of the library apparatus, an accessor unit arranged at least at a longitudinal end of the library apparatus, a passage unit arranged between the reference cell unit and the accessor unit, a drum unit arranged at least on one side of the passage unit and including a plurality of cells each for housing a cartridge containing the storage medium, a drive unit arranged at least on one side of the reference cell unit for recording and reproducing the information in the storage medium contained in each cartridge, a guide rail arranged through the reference cell unit, the accessor unit and the passage unit, and an accessor arranged in the accessor unit to move along the guide rail for transferring the cartridge between a cell in the drum unit and a cell in the drive unit.

In this library apparatus, the accessor transfers the cartridge between a cell in the drum unit and a cell in the drive unit. The cartridge taken out of a given cell, however, must be accurately inserted into the intended cell by the accessor.

In the library apparatus, a higher mechanical accuracy of each unit makes it possible to insert the cartridge carried by the accessor into an intended cell with a higher accuracy. An increase in mechanical accuracy of each unit, however, requires a correspondingly higher processing accuracy and an increased manufacturing cost, thereby leading to the problem of a higher cost of the library apparatus.

SUMMARY OF THE INVENTION

An object of the present invention is to provide a library apparatus, in which each cartridge can be accurately moved without increasing the mechanical accuracy to a great degree and the manufacturing cost can be reduced.

Another object of the invention is to provide a library apparatus which is capable of conveying the cartridge accurately to an intended cell by automatically correcting a mechanical error which may develop in a unit constituting the library apparatus due to deterioration with age or the like during normal operation.

According to a first aspect of the invention, there is provided a library apparatus comprising a plurality of cells each for housing a cartridge containing a storage medium, an accessor unit, a drive unit, a guide rail and an accessor, the apparatus further comprising:

an origin flag arranged on a predetermined wall surface of the accessor unit for specifying the origin of the accessor, a position correcting flag arranged on at least a different wall surface opposed to the first wall surface for correcting the position of the accessor, a photoelectric sensor arranged on a hand assembly mounted on the accessor for holding the cartridge to read the information of the origin flag and the position correcting flag, and a diagnostic cell formed with a high accuracy including a flag arranged on the same wall surface as the position correcting flag and having the same information as the position correcting flag, a diagnostic cartridge produced with a high accuracy adapted to be inserted into and withdrawn from the diagnostic cell, a controller arranged in the accessor unit and adapted to move to the front of a predetermined cell by producing a driving signal to the accessor and inserting a cartridge into and withdrawing it from the cell by producing an insertion or a withdrawal signal to the hand unit of the hand assembly, a position error detection means for calculating the difference between the driving position due to the drive signal of the accessor and the actual position from the signal read by the photoelectric sensor from the origin flag and the position correcting flag, and a light axis-hand axis error calculation means for locating the accessor correctly in front of a diagnostic cell according to the drive signal and the signal read from the flag by the photoelectric sensor, inserting the diagnostic cartridge into the diagnostic cell, determining an insertion-withdrawal limit by inserting and withdrawing the diagnostic cartridge a plurality of times by a predetermined distance in four directions, and determining the difference between the first insertion position and the regular insertion position of the diagnostic cartridge thereby to calculate the difference between the light axis of the photoelectric sensor and the operation axis of the hand, characterized in that:

the calculation value of the position error detection means is stored in a first position correction value storage means as a first correction value of the accessor drive signal, the calculation value of the light axis-hand axis error calculation means is stored in a second position correction value storage means as a second correction value of the accessor drive signal, and the drive signal is corrected by the correction values stored in the first and second position correction value storage means when the drive signal is applied to the accessor by the controller; or the controller further includes a sensor sensitivity measuring means for measuring the sensitivity of the photoelectric sensor according to the signal read by the photoelectric sensor from the origin flag and the position correcting flag, and a relative position table storage means for causing the photoelectric sensor to read the flags of all the cells in the library apparatus taking into consideration the sensitivity of the photoelectric sensor, the positional error due to the accessor drive signal and the difference between the light axis of the photoelectric sensor and the hand operation axis, determining a correction value for locating the accessor correctly with respect to each by the drive signal and storing the resulting correction value in the form of a relative position table for all the cells, the drive signal being corrected by the correction value stored in the relative position table storage means when the controller produces the drive signal to the accessor during the operation of the library apparatus.

In the process, each diagnostic cell is configured as a diagnostic cell unit including a first diagnostic cell for receiving the diagnostic cartridge with a tilt angle of 0°, a second diagnostic cell for receiving the cartridge with a tilt angle of 12°, a flag for indicating the position correction information of each diagnostic cell and a master label having the position information of the particular diagnostic cell written therein.

According to a second aspect of the invention, there is provided a library apparatus similar to the library apparatus according to the first aspect, characterized in that the hand assembly further includes a guide for locating the cartridge retrieved by the hand unit at the central portion of the hand assembly, the hand unit includes a base which in turn includes a drive mechanism for moving the hand unit in lateral directions perpendicular to the direction of movement of the cartridge, a spring for locating the hand unit at the central portion of the base under normal conditions and a lateral displacement detection sensor for detecting the lateral displacement of the hand unit.

In the apparatus according to the second aspect of the invention with a hand assembly configured as described above, assume that an output is produced from the lateral displacement detection sensor when a cartridge is retrieved from a predetermined cell during the operation of the library apparatus. The output of the lateral displacement detection sensor is used to correct the correction value stored in the first position correction value storage means or the correction value in the X direction of a predetermined cell in the relative position table.

Also, in the case where an output is produced from the lateral displacement detection sensor, the controller releases the cartridge from the hand unit and, when the hand unit is urged by the spring and returned to the central portion of the base, holds the cartridge again thereby to align the center lines of the cartridge and the hand unit.

Further, in the case where an output is produced from the lateral displacement detection sensor when a cartridge is inserted in a specific cell during the operation of the library apparatus, the output of the lateral displacement detection sensor is used to correct the correction value stored in the first position correction storage means or the X-direction correction value of the specific cell in the relative position table.

In the library apparatus according to the first aspect of the invention, the accessor is driven taking into consideration the correction of the difference between the accessor drive signal and the actual drive position and the error between the light axis of the photoelectric sensor for measuring the accessor position and the operation axis of the hand for inserting and withdrawing the cartridge into or from the cell, and therefore a cartridge can always be moved accurately to an intended cell without improving the mechanical accuracy of the library apparatus to a considerable degree.

In the library apparatus according to the second aspect of the invention, on the other hand, even in the case where a specific cell develops a mechanical error due to deterioration with age of a unit constituting the library apparatus, the error is detected at the time of inserting a cartridge into or withdrawing it from the particular cell, and the correction value of the difference between the accessor drive signal and the actual position to which the accessor is driven in front of the cell is updated by the particular error. A cartridge can therefore always be conveyed accurately to an intended cell during the operation of the library apparatus.

BRIEF DESCRIPTION OF THE DRAWINGS

FIG. 4A is a diagram for explaining an X-direction drive mechanism for the accessor;

FIG. 4B is a partial plan view for explaining an X-direction drive mechanism for the accessor;

FIG. 32A is a plan view showing a detailed configuration of the magazine;

FIG. 32B is a front view showing a detailed configuration of the magazine;

FIG. 32C is a partial rear view showing a detailed configuration of the magazine;

FIGS. 38A and 38B are diagrams for explaining a method of installing a reference cell unit, in which FIG. 38A is a bottom view of the reference cell unit and FIG. 38B is a side view of the reference cell unit;

FIG. 52 is a plan view for explaining the operation of correcting the position of the accessor;

FIGS. 79A and 79B are flowcharts for explaining in detail the steps of a part of the flowchart shown in FIG. 78.

FIGS. 82A and 82B are flowcharts for explaining the correction control process performed during the operation of the library apparatus.

DESCRIPTION OF THE PREFERRED EMBODIMENTS

Embodiments of the invention will be described in detail below with reference to the accompanying drawings.

Figure 1:
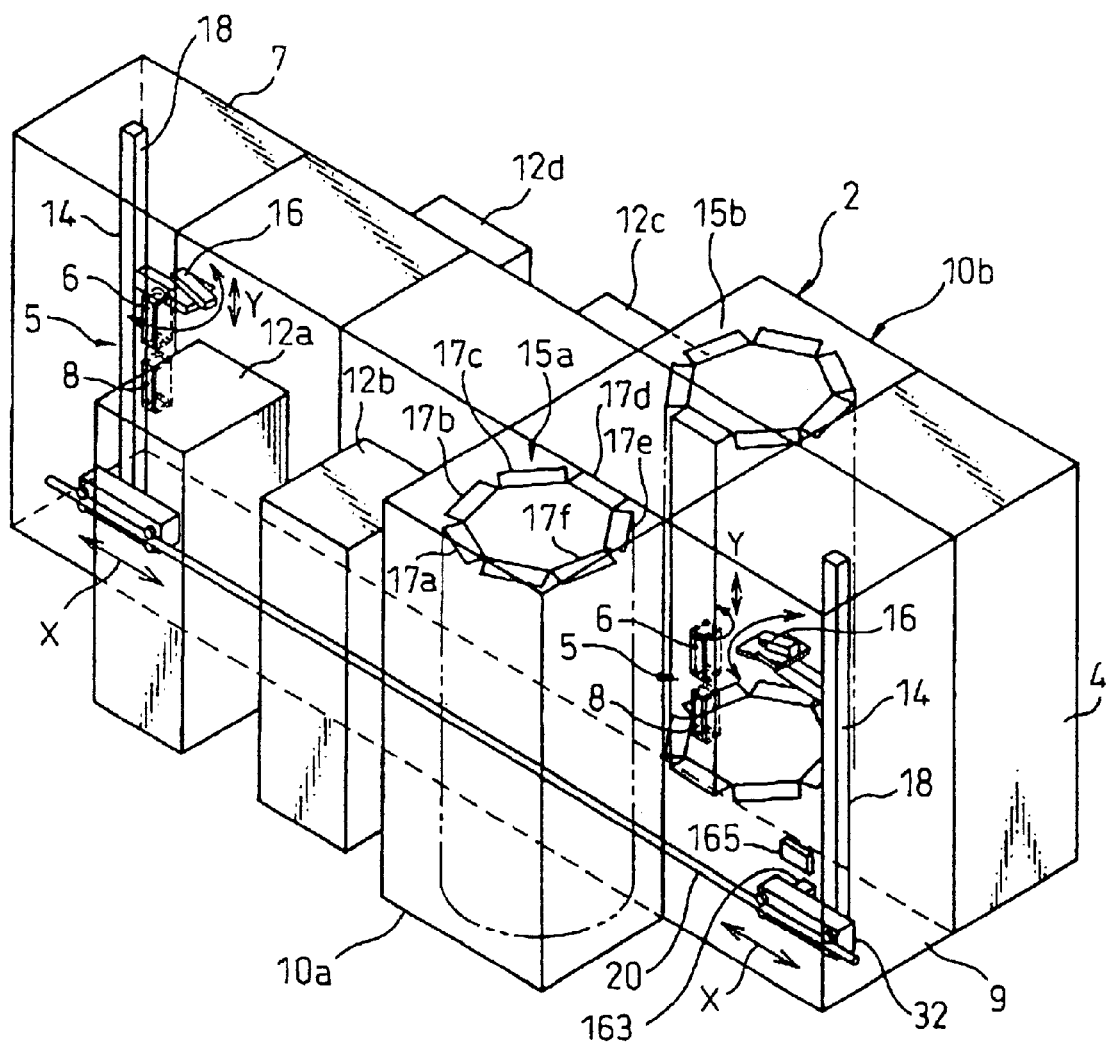
FIG. 1 is a perspective view schematically showing a general configuration of a library apparatus according to the present invention.

FIG. 1 is a perspective view of a library apparatus 2.

In FIG. 1, two cartridge access stations (CAS) 5 are arranged on the front of a left accessor unit 7 and on the front of a right accessor unit 9, respectively, of the library apparatus 2.

Each cartridge access station 5 includes a cartridge loading port 6 and a cartridge delivery port 8. The cartridge loading port 6 and the cartridge delivery port 8 are rotatable by 180° about the vertical axis.

Drum units 10a, 10b include cell drums 15a, 15b, respectively, each having a plurality of cells. The cell drums 15a, 15b are each configured of seven cell segments 17a to 17f. Each of the cell segments 17a to 17f of the cell drums 15a, 15b has cells in three rows of n stages. Each cell holds a cartridge containing a magnetic tape. The cartridge is the I3480 magnetic cartridge. Four drive units 12a, 12b, 12c, 12d are for recording/reproducing information into and from the magnetic tape constituting the storage medium contained in each cartridge. Each of the drive units 12a, 12b, 12c, 12d of the library apparatus 2 includes a plurality of tape drive units. Four tape drive units, for example, are installed in each of the drive units 12a, 12b, 12c, 12d. These tape drive units have a cartridge load/withdrawal port. A cartridge charge/delivery port is inclined by 5.5 degrees with respect to the plane containing the X axis perpendicular to the Y axis.

A housing 4 contains a printed control board for controlling the cartridge access station 5, drum units 10a, 10b and the drive units 12a, 12b, 12c, 12d and the two accessors 14.

The accessors 14 each includes a hand assembly 16 movable in vertical directions (along the arrow Y in the drawing) along a vertical column 18. The accessors 14 are movable in lateral directions (along the direction of arrow X) along a guide rail (X rail) 20. In this way, the accessors 14 constitute an X-Y drive mechanism.

Figure 2:
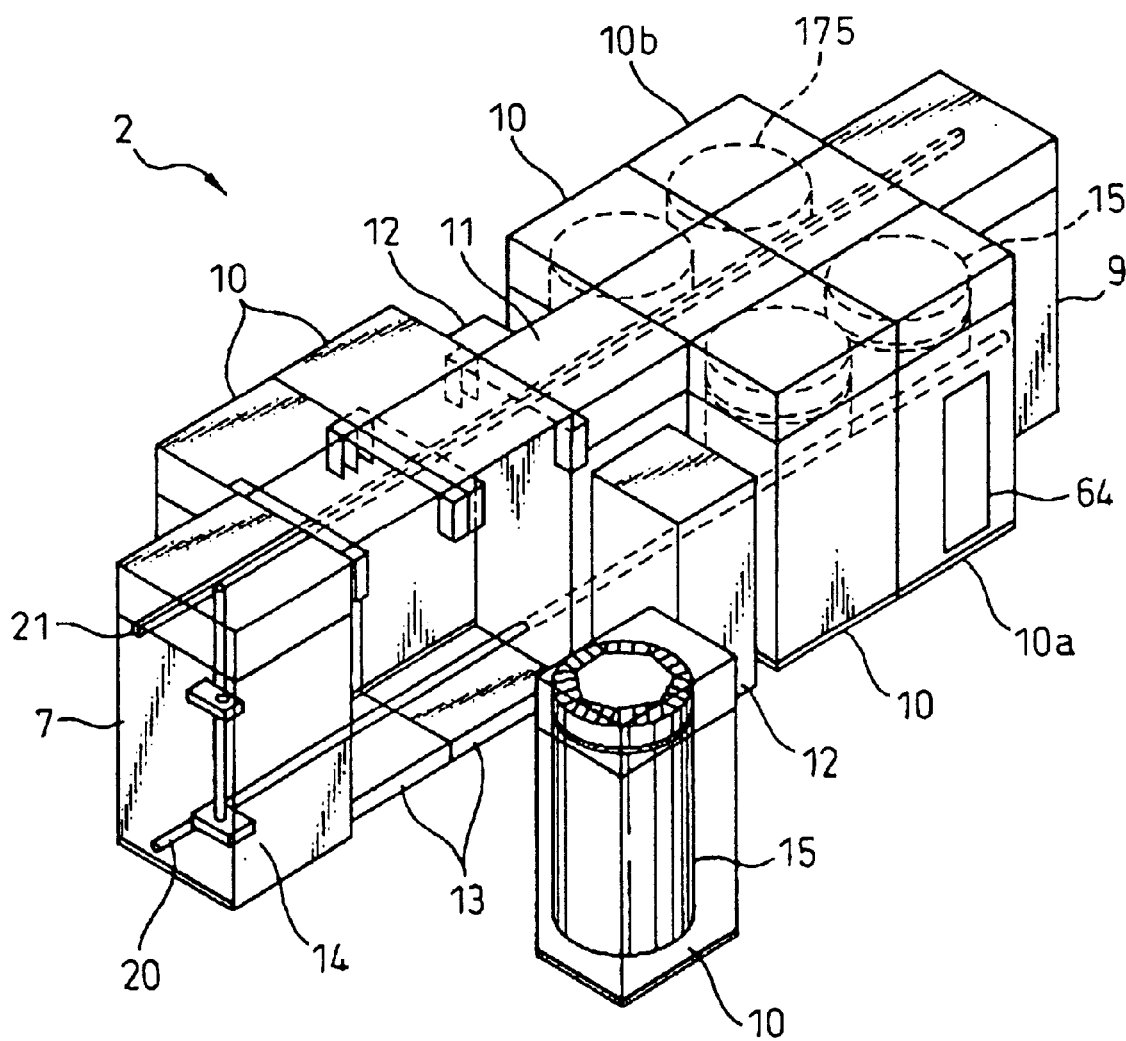
FIG. 2 is a perspective view showing a system configuration of a library apparatus according to the invention.

FIG. 2 is a perspective view showing a system configuration of the library apparatus 2.

In FIG. 2, each unit of the library apparatus 2 is arranged on the apparatus 2 with reference to a reference cell unit 11. The reference cell unit 11 is arranged at the center of the library apparatus 2. An accessor unit 9 is arranged at the right end, and an accessor unit 7 is arranged at the left end of the apparatus. A plurality of passage units 13 are interposed between the reference cell unit 11 and the accessor unit 7. The number of the passage units 13 corresponds to that of the drum units 10 interposed between the reference cell unit 11 and the accessor unit 7. The library apparatus shown in FIG. 2 includes four drum units 10, and therefore two passage units 13 are included. Also, since four drum units 10 are interposed between the reference cell unit 11 and the accessor unit 9, two passage units 13 are arranged between the reference cell unit 11 and the accessor unit 9. The drum unit 10a includes a DEE door 64 allowing the operator to load and deliver the cartridge directly into and from the cells of the cell drum 15. The drum unit 10b, on the other hand, has a DEE door (not shown) for load and withdrawal the magazine onto and from the magazine rack of a magazine drum 175. The passage units 13 each constitute a reference unit for coupling the units to each other. The passage units 13 hold the X rail 20. An upper rail 21 guides the accessor 14 and is fixed on the drum units 10.

Figure 3:
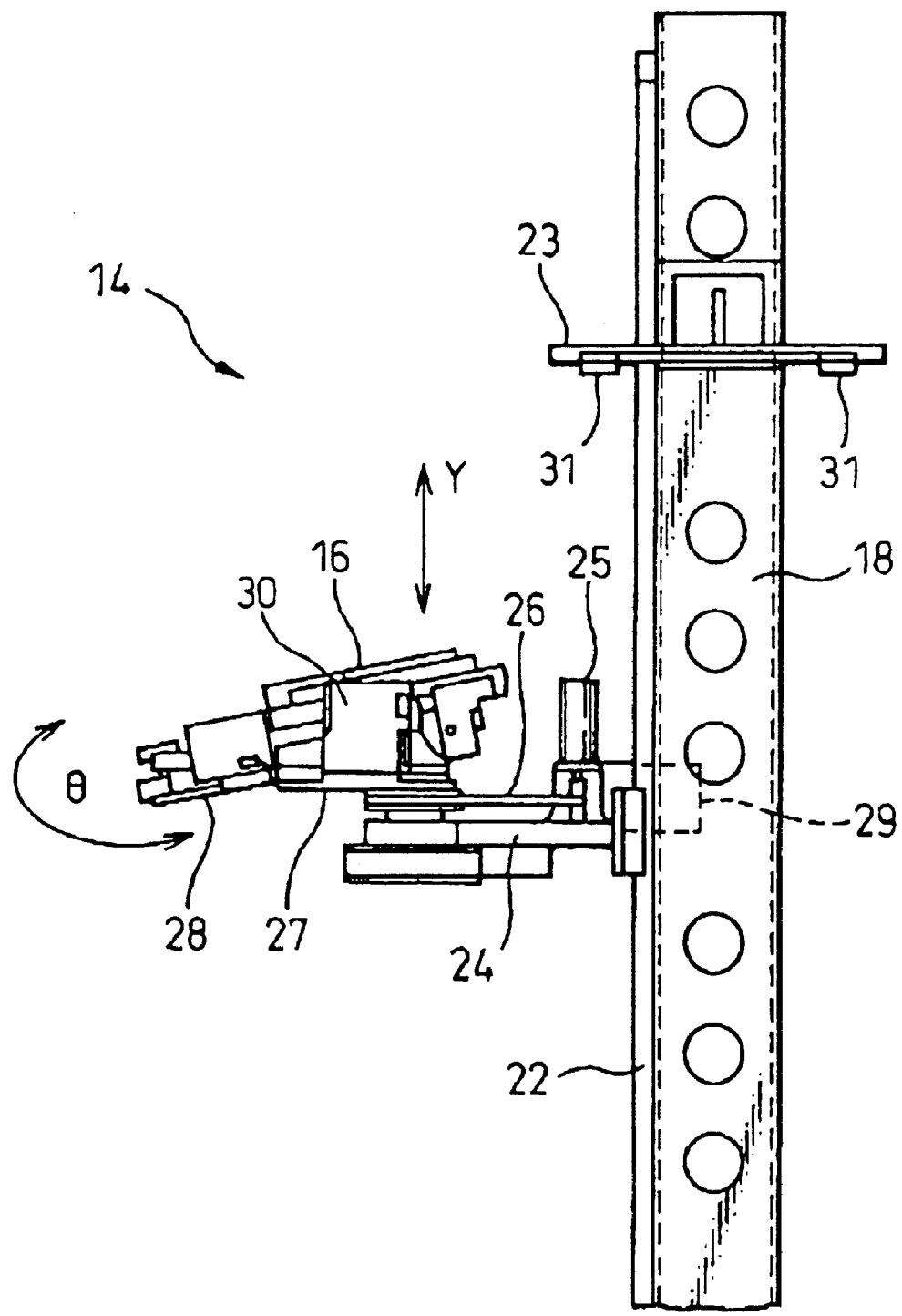
FIG. 3 is a side view showing an accessor used for the library apparatus according to the invention.

FIG. 3 is a side view of the accessor.

In FIG. 3, a hand assembly 16 is mounted on a support base 24 movable vertically along a guide rail 22 formed on the vertical column 18 of the accessor 14. The support base 24 has mounted thereon a motor 25. Further, the support base 24 has mounted thereon a printed board 29 for carrying a control circuit for controlling the motor 25. The support base 24 is adapted to move by being guided along the guide rail 22 in the direction of the Y axis together with the motor 25 and the printed board 29.

As the motor 25 is driven, the mount base 27 of the hand assembly 16 is swivelled about the vertical axis (parallel to the Y axis) by a timing belt 26 coupled to the output shaft of the motor 25. In other words, the motor 25, the hand assembly 16 and the mount base 27 make up a θ-direction drive mechanism for moving the cartridge.

Also, the mount base 27 is moved together with the hand assembly 16 and the printed board having mounted thereon the control circuit for controlling the motor and the sensor built in the hand assembly. The printed board has mounted thereon the control circuit for controlling the motor for rotating the hand assembly 16 about an axis of the base 27.

The vertical column 18 holds a support plate 23 for supporting rollers 31 guided by the upper rail.

FIGS. 4A and 4B are diagrams for explaining the X-direction drive mechanism.

In FIG. 4A, the vertical column 18 supports a Y-axis motor 46 for reciprocating the support base 24 along the guide rail 22. The vertical column 18 is supported on a rail base 32. The rail base 32 rotatably supports rollers 34a, 34b and rollers 36a, 36b. The rollers 34a, 34b hold the X rail 20 therebetween at an end of the rail base 32. The rollers 36a, 36b holds the X rail 20 therebetween at the other end of the rail base 32. The roller 38 is supported on the rail base 32 in such a manner as to be in contact with the X rail 20. The roller 38 constitutes a frictional force adjusting mechanism.

The X-axis motor 42 is for moving the rail base 32 along the X rail 20. The X-axis motor 42 is fixed on the rail base 32. The output shaft of the X-axis motor 42 has fixed thereon a pinion 41. The pinion 41 is in mesh with a rack not shown mounted on the housing fixedly carrying the X rail 20.

The printed board 40 is fixed on the rail base 32. The printed board 40 is connected to a control unit not shown arranged in the housing 4 through an X cable 44. The printed board 40 has mounted thereon a control circuit for controlling the X-axis motor 42 and the Y-axis motor 46.

The forward end 32b of the rail base 32 for supporting the rollers 34a, 34b is located at a distance L from the central portion 32a of the base. In other words, as shown in FIG. 4B, the forward end 32b of the base is located outside of the radius R of rotation of the hand assembly 16 about the rotational center O. The base forward end 32b and the roller 34a are located at a position out of the way of the movement of the hand assembly 16. The rail base 32 provides a long wheel base. The range of movement along Y axis of the hand assembly 16 is larger than if the base forward end 32b is arranged within the range of movement of the hand assembly 16. Consequently, the number of stages of the cell in the cell segment of the cell drums 10a, 10b can be increased, with the result that the library apparatus 2 can contain an increased number of cartridges.

Figure 5A:
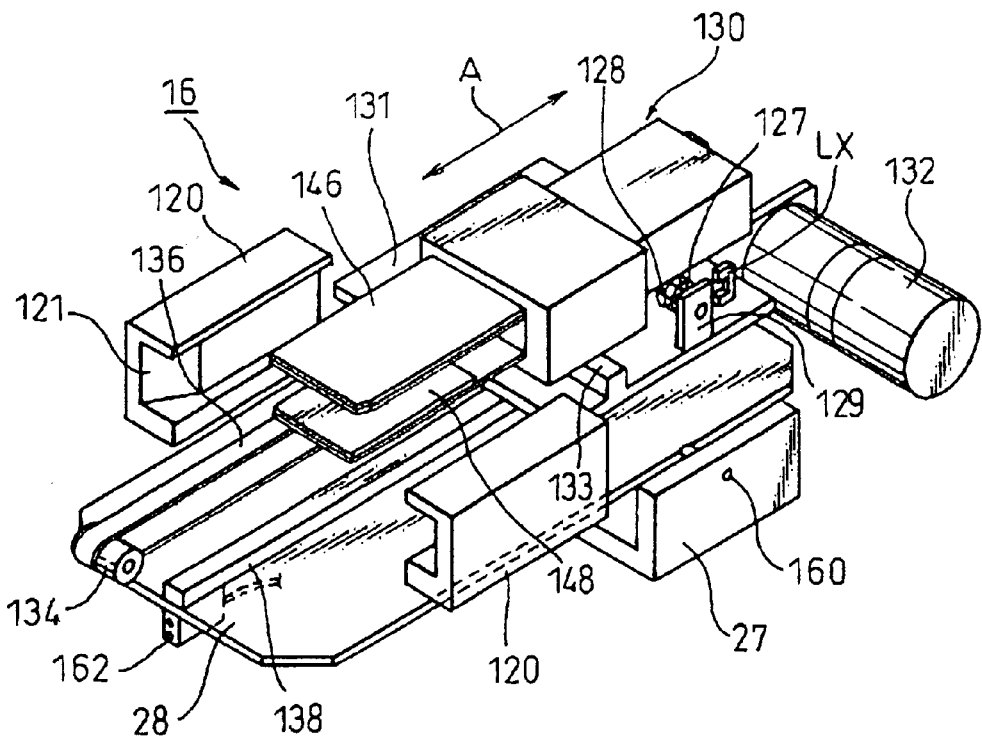
FIG. 5A is a perspective schematically showing a configuration of a hand assembly mounted on the accessor.
Figure 5B:
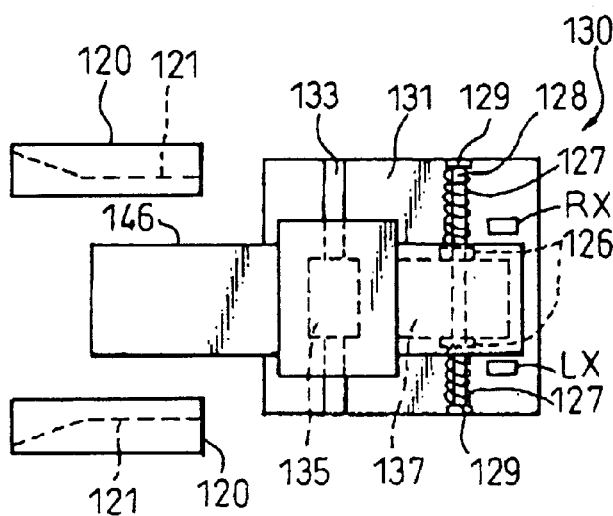
FIG. 5B is a plan view of the hand unit included in FIG. 5A.
Figure 5C:
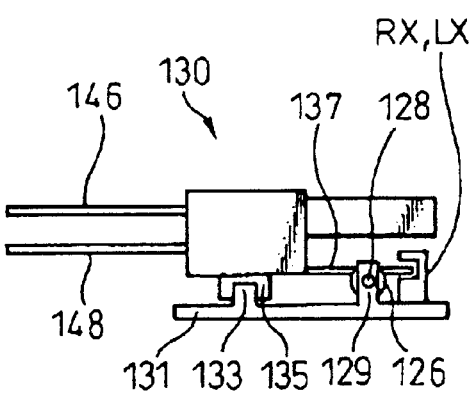
FIG. 5C is a side view of FIG. 5B.

FIG. 5A is a perspective view schematically showing the hand assembly 16, FIG. 5B is a plan view of the hand unit 130, and FIG. 5C is a side view of the hand unit 130.

In FIG. 5A, the hand assembly 16 includes a base 28. The base 28 is mounted in such a manner that the hand unit 130 having the upper hand 146 and the lower hand 148 are movable between the advanced position and the retreated position thereof.

The base 28 is arranged rotatably about the rotational axis 160 supported on the base 27. The base 27 carries thereon a motor not shown for driving the base 28 about the rotational axis 160. In other words, the base 28 having the hand unit 130 mounted thereon is rotated about the axis 160 at angles between a first tilt position inclined at 5.5 degrees and a second tilt position inclined at 12 degrees with respect to the base 27.

The rear end of the base 26 has mounted thereon a motor 132 for driving the hand unit 130. The output shaft of the motor 132 has fixed thereon a pulley not shown. The forward end of the base 28 has rotatably mounted thereon a pulley 134. A timing belt 136 is suspended between the pulley fixed on the output shaft of the motor 132 and the pulley 134. The timing belt 136 is coupled to the hand unit 130.

With the rotation of the motor 132, the driving force of the motor is transmitted to the hand unit 130 via the timing belt 136 thereby to drive the hand unit 130. The hand unit 130 is adapted for sliding between the advanced position and the retreated position thereof along a guide rail 138 formed on the base 28.

Since the timing belt 136 is coupled to the hand unit 130, the rotation of the motor 132 causes the hand unit 130 to move while being guided along the guide rail 138 between the advanced position and the retreated position as indicated by arrow A.

The lower surface of the central portion at the forward end of the base 28 of the hand assembly 16 is provided with a sensor 162. The sensor 162 is used for detecting the presence or absence of the cartridge in the cell. Also, as shown in FIG. 1, the rail base 32 of the accessor 14 has a sensor 163. The sensor 163 detects the position flag 165 arranged on the accessor unit 9.

The hand unit 130, as shown in FIGS. 5B and 5C, are mounted on the guide rail 133 on the base 131 through a direct-acting bearing 135, and is adapted to move along the direction of the guide rail 133. The ends on the rear side of the base 131 each have a bracket 129 protruded therefrom.

A rod 128 is suspended between the two brackets 129. A flag plate 137 is arranged in such a position as to cross a rod 128 at the rear lower part of the hand unit 130. The flag plate 137 is held at the ends thereof by the flange 126 urged by a spring 127 inserted in the rod 128. As a result, under normal conditions, the hand unit 130 is located at the central portion of the base 131 by the force of the two springs 127 having the same spring force.

Two sensors RX, LX for detecting the displacement of the hand unit 130 are arranged on the two sides of the flag plate 137 at the rearmost portion of the base. The two sensors RX, LX are located equidistantly from the ends of the flag plate 137 under normal conditions, and when the hand unit 130 moves more than a predetermined distance laterally, are masked by the flag plate 137.

Further, a guide 120 is formed on each of the two sides slightly forward of the central portion of the base 28 of the hand assembly 16. The cartridge held and withdrawn by the upper hand 146 and the lower hand 148 of the hand unit 130 is located at the central portion of the base 28 by the guides 120. The guides 120 have a tapered portion 121 at the front part thereof. In the case where the upper hand 146 and the lower hand 148 of the hand unit 130 correctly holds the cartridge by the central portion thereof and pull it onto the base 28, then the cartridge is not positioned by the guides 120. In the case where the upper hand 146 and the lower hand 148 holds and pulls the cartridge in unbalanced way onto the base 28, on the other hand, the cartridge is guided by the tapered portion 121, and slides in the guide 120 to be located at the central portion of the base 28. In the process, the hand unit 130 moves on the guide rail 133 while compressing the spring 127 located far from the guide 120 which has positioned the cartridge. This operation will be described later.

Figure 6:
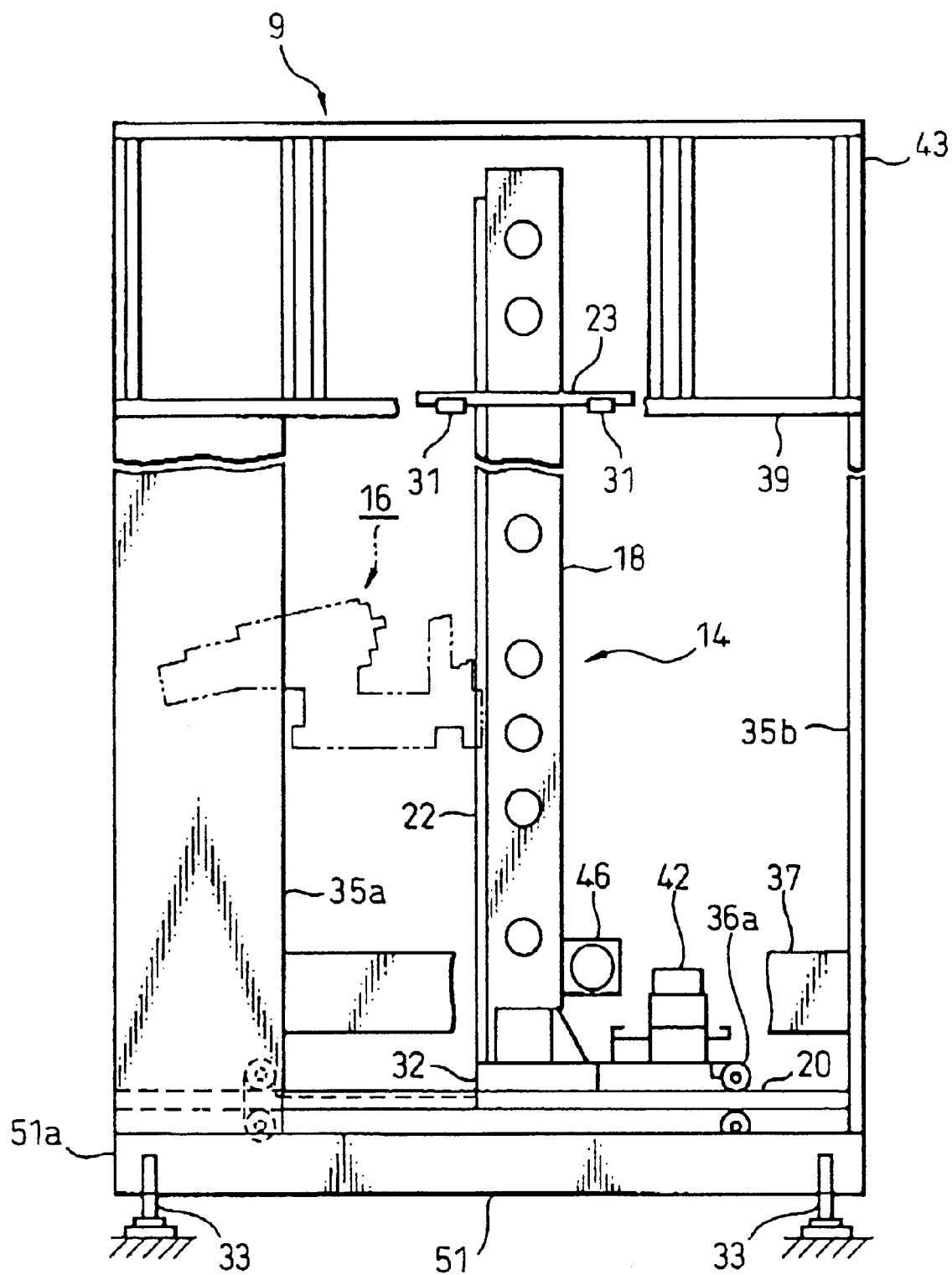
FIG. 6 is a side view showing an accessor unit.

FIG. 6 is a side view of the accessor unit 9.

The accessor unit 7 has the same configuration as the accessor unit 9 except that the accessor unit 7 has accessors 14 mounted in laterally reversed relation to each other.

Therefore, the configuration of only the accessor unit 9 will be explained below with reference to FIG. 6. In FIG. 6, an X rail 20 is fixed on a base 51. The base 51 is supported on the floor surface by pedestals 33. The base 51 supports poles 35a, 35b. The poles 35a, 35b are coupled by a reinforcing bar 37 to each other, and have the upper ends thereof coupled to each other by a ceiling plate 39. A cover 43 is mounted above the ceiling plate 39. The end surface 51a of the base 51 constitutes a reference plane for coupling the passage unit 13 shown in FIG. 2.

Figure 7:
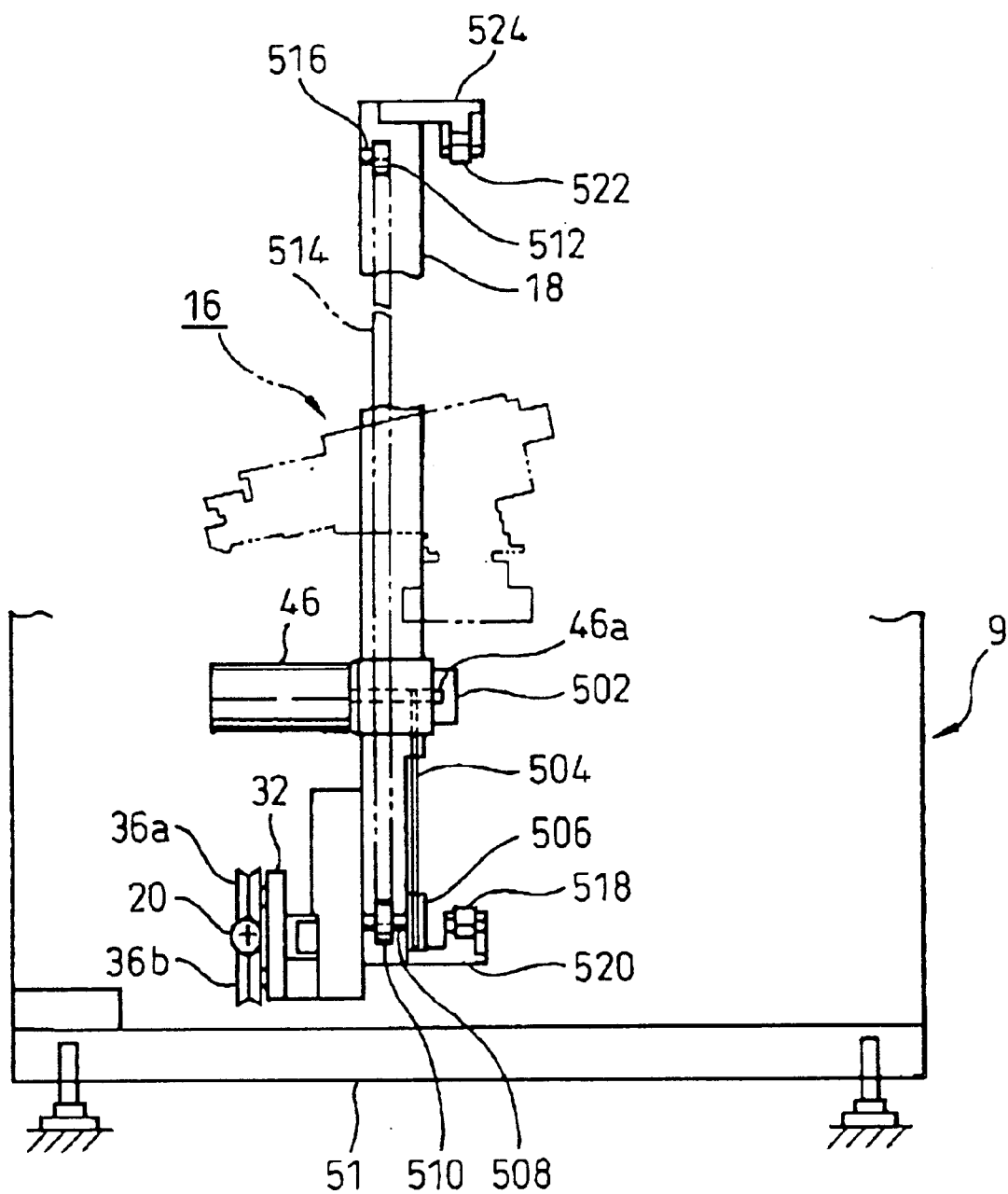
FIG. 7 is a view showing a partial configuration of the rear side of the accessor unit.

FIG. 7 shows a rear view of the accessor unit.

In FIG. 7, the X rail supported on the base 51 of the accessor unit 9 is held between the rollers 36a, 36b supported on the rail base 32. The rail base 32 has mounted thereon a vertical column 18. The vertical column 18 has fixed thereto a unit including a motor 46 for vertically driving the hand assembly 16 along the guide rail 22 (FIG. 6) of the vertical column 18. The output shaft 46a of the motor 46 has fixed at an end thereof an electromagnetic brake (electromagnetic brake TB.TBK of a dry negative drive type made by Minebea Co., Ltd.) 502. The electromagnetic brake 502 sets the output shaft 46a of the motor 46 in a rotatable mode when a power supply is switched on for supplying power to the motor 46. As long as the power supply for supplying power to the motor 46 remains off, on the other hand, the electromagnetic brake 502 keeps stationary the output shaft 46a of the motor 46. The output shaft 46a of the motor 46 is coupled a pulley 506 through a belt 504. The turning effort of the pulley 506 is transmitted to the pulley 510 supported on the same shaft 508 as the pulley 506. The turning effort of the pulley 510 is transmitted to the hand assembly 16 through the belt 514 suspended between the pulley 510 and the pulley 512. The pulley 512 is rotatably supported about the shaft 516 supported on the vertical column 18. The belt 514 is fixed on the base 24 (FIG. 4a) of the hand assembly 16.

An arm 520 for supporting an elastic stopper 518 made of a material such as neoprene rubber is mounted on the lower end of the vertical column 18. Also, an arm 524 for supporting the elastic stopper 522 made of a material like neoprene is mounted on the lower end of the vertical column 18. The elastic stoppers 518, 522 function as a means of stopping the handle assembly 16 in case the motor 46 cannot be turned off or the brakes fail.

Further, the hand assembly 16 is kept stationary on the vertical column 18 due to the braking operation of the electromagnetic brake 502 even in the case where the power supply of the library apparatus 2 fails. In the absence of the electromagnetic brake 502, the hand assembly 16 falls due to gravity, to such a level that the electromagnetic brake 502 comes to strike the elastic stopper 518. Provision of the electromagnetic brake 502, however, can avoid the collision between the hand assembly 16 and the elastic stopper 518 in case of power failure, thereby preventing the cartridge from coming off from the hand assembly 16 when power is disconnected.

Figure 8:
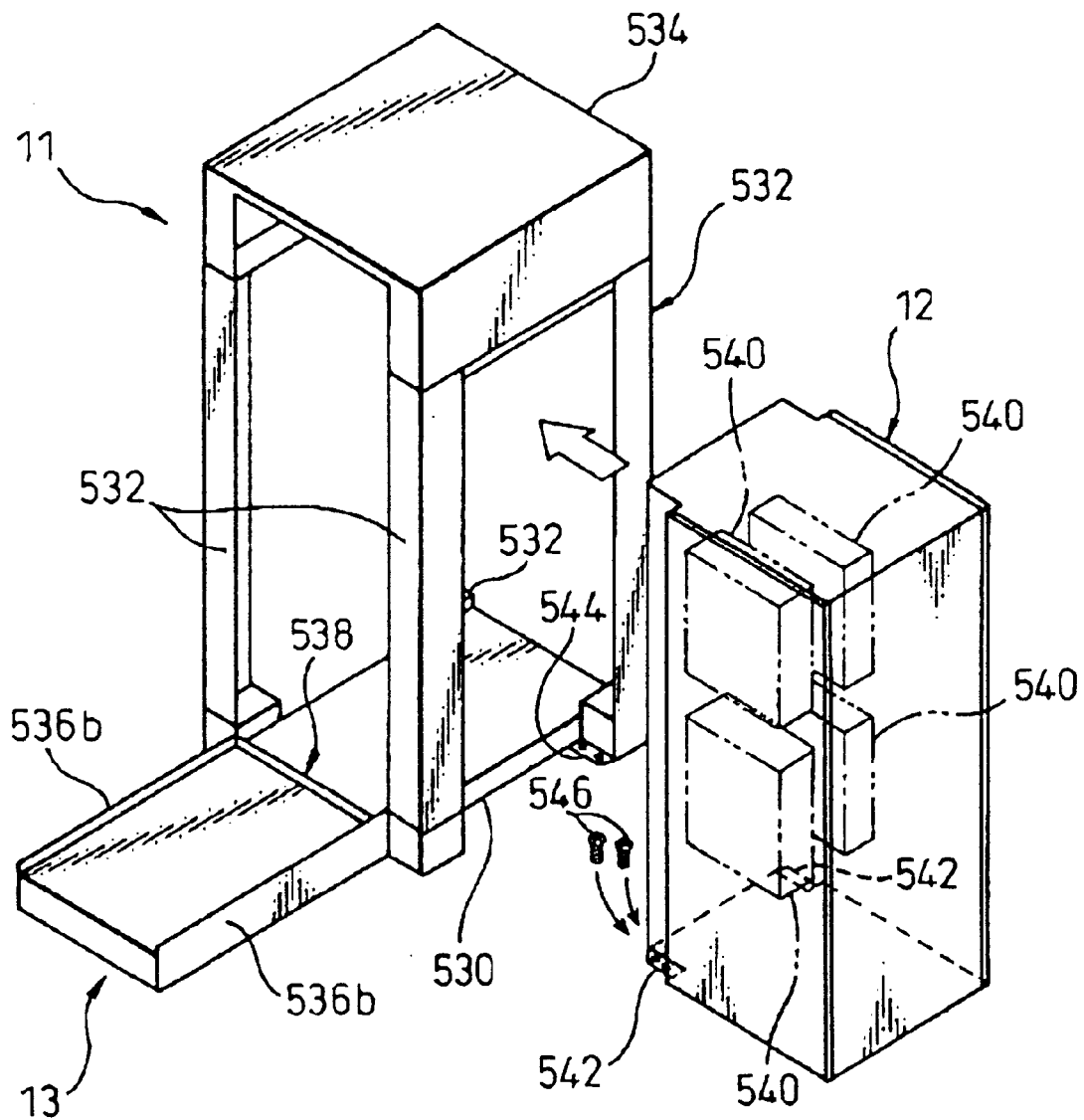
FIG. 8 is a diagram for explaining a method of coupling a reference cell unit with a drive unit.

FIG. 8 is a diagram for explaining the method of coupling the reference cell unit 11 and the drive unit. In FIG. 8, the reference cell unit 11 is configured of a base 530 and four poles 532. The poles 532 are coupled to each other at the upper ends thereof by a ceiling plate 534. The reference cell unit 11 constitutes a reference unit for the library apparatus 2. The base 530 of the reference cell unit 11 has mounted thereon the passage unit 13. The passage unit 13 includes side plates 536a, 536b making up a reference plane connected to the reference plane of the drum unit 10 described with reference to FIG. 2. Also, the end surface 538 of the passage unit 13 constitutes a reference surface for junction with another passage unit 13 or a reference junction plane of the reference cell unit 11.

Also, the reference cell unit 11 is connected to the drive unit 12. The drive unit 12 includes four tape drive units 540. The drive unit 12 includes fitting metal plates 542. The reference cell unit, on the other hand, has metal fittings 544 on the two sides thereof. The mounting fitting metal plates 542 of the drive unit 12 are coupled to the fitting metal plates 544 of the reference cell unit 11 by screws 546, respectively. A second drive unit 12 is coupled on the side of the reference cell unit 11 far from the drive unit 2. For coupling the reference cell unit 11 and the second drive unit 12, the fitting metal plates 544 of the reference cell unit 11 and the fitting metal plates 542 of the second drive unit 12 are coupled to each other by screws 546, respectively.

Figure 9:
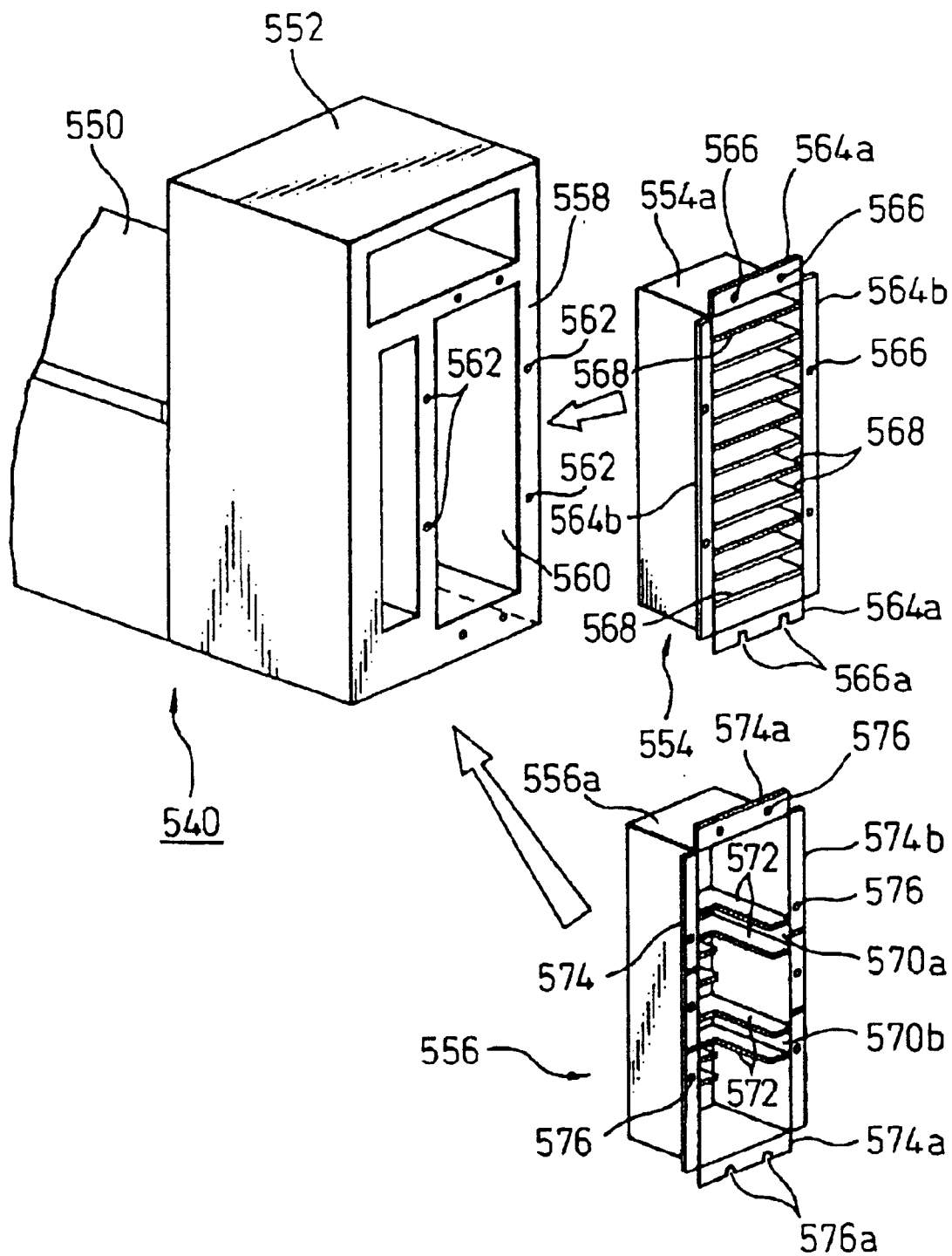
FIG. 9 is a diagram for explaining a cartridge mount cell of a tape drive unit in the drive unit.

FIG. 9 is a diagram for explaining the cartridge mount cell of the tape drive units in the drive unit.

A configuration of a tape drive unit 540 in the drive unit 12 of FIG. 8 is shown in FIG. 9. The other tape drive units 540 have also a similar configuration.

In FIG. 9, the tape drive unit 540 includes a tape drive 550 for performing the recording/reproduction processing on the magnetic tape encased in the cartridge, and a cartridge feeder unit 552 for loading and delivering the cartridge into and from the tape drive 550. The cartridge feeder unit 552 has either a manual mount cell 554 or an accessor mount cell 556 thereof mounted on the housing 558. The manual mount cell 554 or the accessor mount cell 556 is inserted by way of an opening 560 in the housing 558. The housing 558 located in the vicinity of the opening 560 is formed with threaded holes 562 for fixing the mount cell 554 or 556.

The manual mount cell 554 includes fittings 564a, 564b. The fittings 564a, 564b have threaded holes 566, 566a for fixing the manual mount cell 554 on the housing 558 of the cartridge feeder unit 552. Each threaded hole 566a has a notch at an end thereof. The manual mount cell 554 is fixedly screwed to the housing 558 after being inserted into the opening 560 of the housing 558.

The manual mount cell 554 has 12 stages of cells 568 for encasing the cartridges in the housing 554a. The tape cartridge is inserted into each cell 568 by the operator. The 12-stage cells 568 of the manual mount cell 554, therefore, can be arranged with short intervals.

The accessor mount cell 556, on the other hand, includes two stages of cells 570a, 570b for encasing the cartridges. The cells 570a, 570b are formed on the accessor mount cell 556 by rack plates 572 arranged in the housing 556a of the accessor mount cell 556. The cell 570a is an entry cell by way of which the accessor 14 described with reference to FIG. 1 loads a cartridge. The cell 570b is an exit cell for holding the cartridge to be discharged from the cartridge feeder unit 552. The cartridge held in the exit cell 570 is recovered by means of the accessor 14.

The accessor mount cell 556 includes fitting plates 574a, 574b. The fitting plates 574a, 574b are formed with threaded holes 576, 576a formed at positions in registry with the threaded holes 562 of the housing 558 of the cartridge feeder unit 552. Each threaded hole 576a has an end thereof notched. The accessor mount cell 556 is screwed to the cartridge feeder unit 552 through the fittings 574a, 574b.

In this way, the drive unit 12 explained with reference to FIG. 8 includes a tape drive unit 540 having mounted therein the manual mount cell 554 or the accessor mount cell 556 described with reference to FIG. 9. The manual mount cell 554 and the accessor mount cell 556 are interchangeable. Therefore, the version of the library apparatus 2 for a system already installed with the drive unit 12 is upgraded by replacing the manual mount cell 554 of the tape drive unit 540 with the accessor mount cell 556. Also, the drive unit 12 may have a common structure except for the manual mount cell 554 and the accessor mount cell 556, and therefore the production cost of the drive unit 12 can be reduced.

Figure 10:
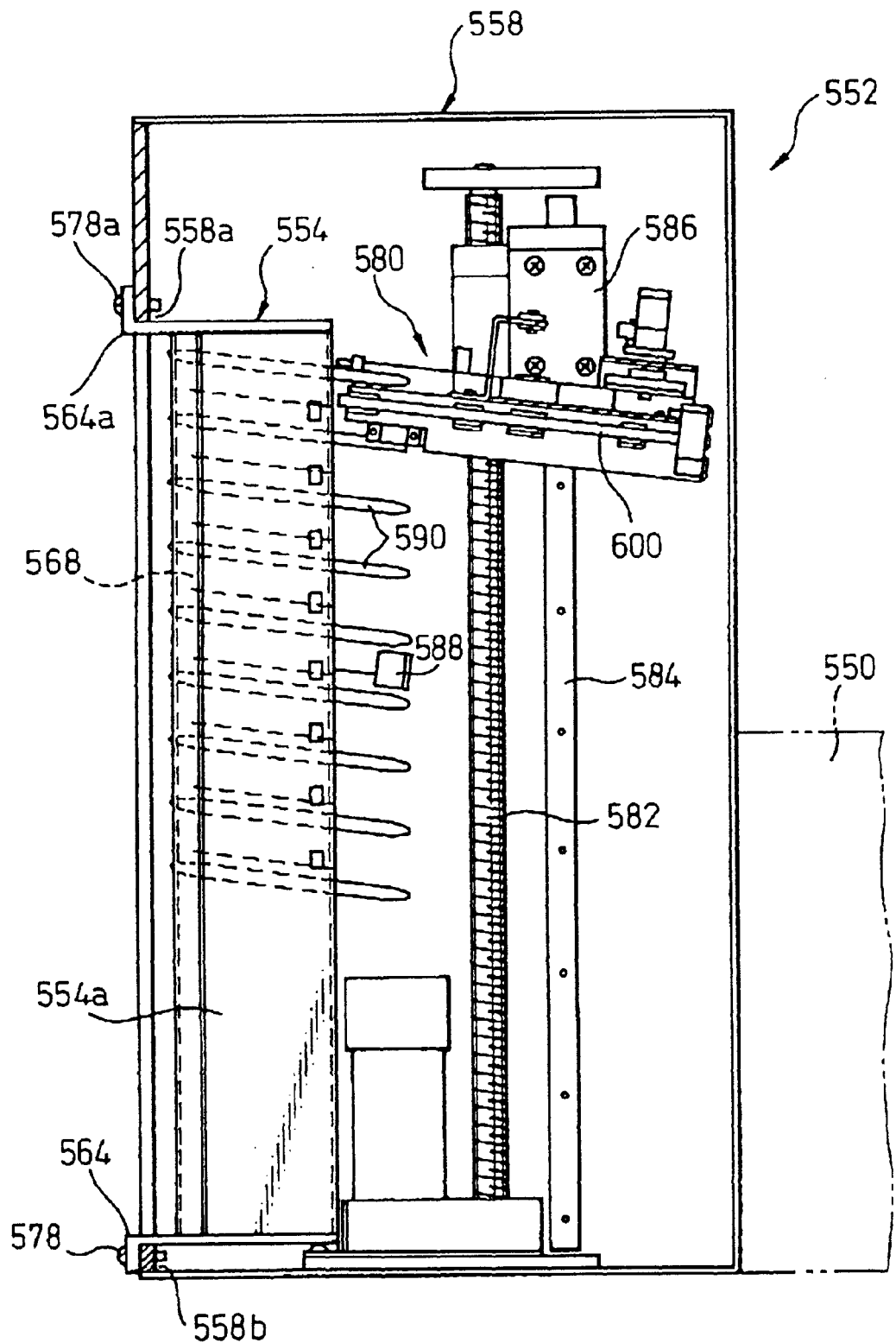
FIG. 10 is a diagram for explaining an automatic cartridge changing mechanism in the tape drive unit.

FIG. 10 is a diagram for explaining an automatic cartridge changing mechanism in the tape drive unit.

In FIG. 10, the automatic cartridge changing mechanism is arranged in the cartridge feeder unit 552. The cartridge feeder 552 has mounted thereon the manual mount cell 554. The manual mount cell 554 has fitting plates 564 fixed on the flanges 558a, 558b of the housing 558 of the cartridge feeder 552 by screws 578. The housing 558 supports a screw 582 for applying the transport force for conveying the cartridge feeder 580 and a guide rail 584 for guiding the cartridge feeder 580. The screw 582 is driven by the motor 586 to cause the reciprocal motion of the cartridge feeder 580 vertically along the guide rail 584.

The cartridge feeder 580 is for conveying the cartridge 588 to the cartridge charge/delivery port of the table drive 550 from the cells 568.

Each cell 568 of the manual mount cell 554 is formed on the housing 554a of the manual mount cell 554 by the rack plates 590 inclined at an angle of 5.5 degrees with respect to the horizontal surface. The cartridge feeder 580 is similarly formed at an angle of 5.5 degrees to the horizontal plane.

Figure 11:
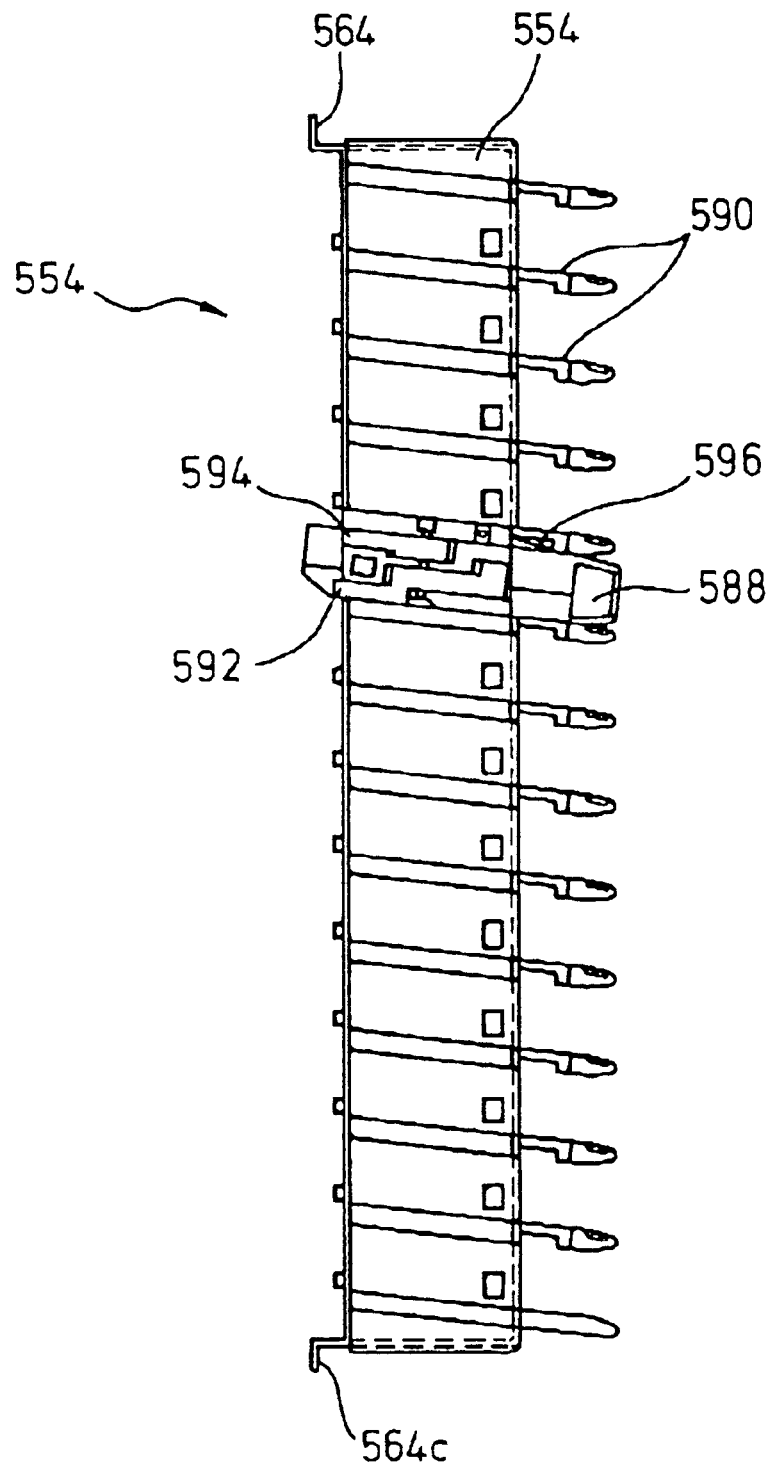
FIG. 11 is a side view of a manual mount cell making up a cartridge casing.

FIG. 11 is a side view showing the manual mount cell 554 making up a cartridge container.

The manual mount cell 554 includes a latch mechanism 592 for setting the cartridge 588 in position, a mechanism 594 for preventing an insertion error of the cartridge 588, and a door 596 adapted to rotate at the time of load/withdrawal of the cartridge 588. A latch mechanism 592, an insertion error prevention mechanism 594 and a door 596 are urged inside the cell by a coil spring not shown.

Figure 12:
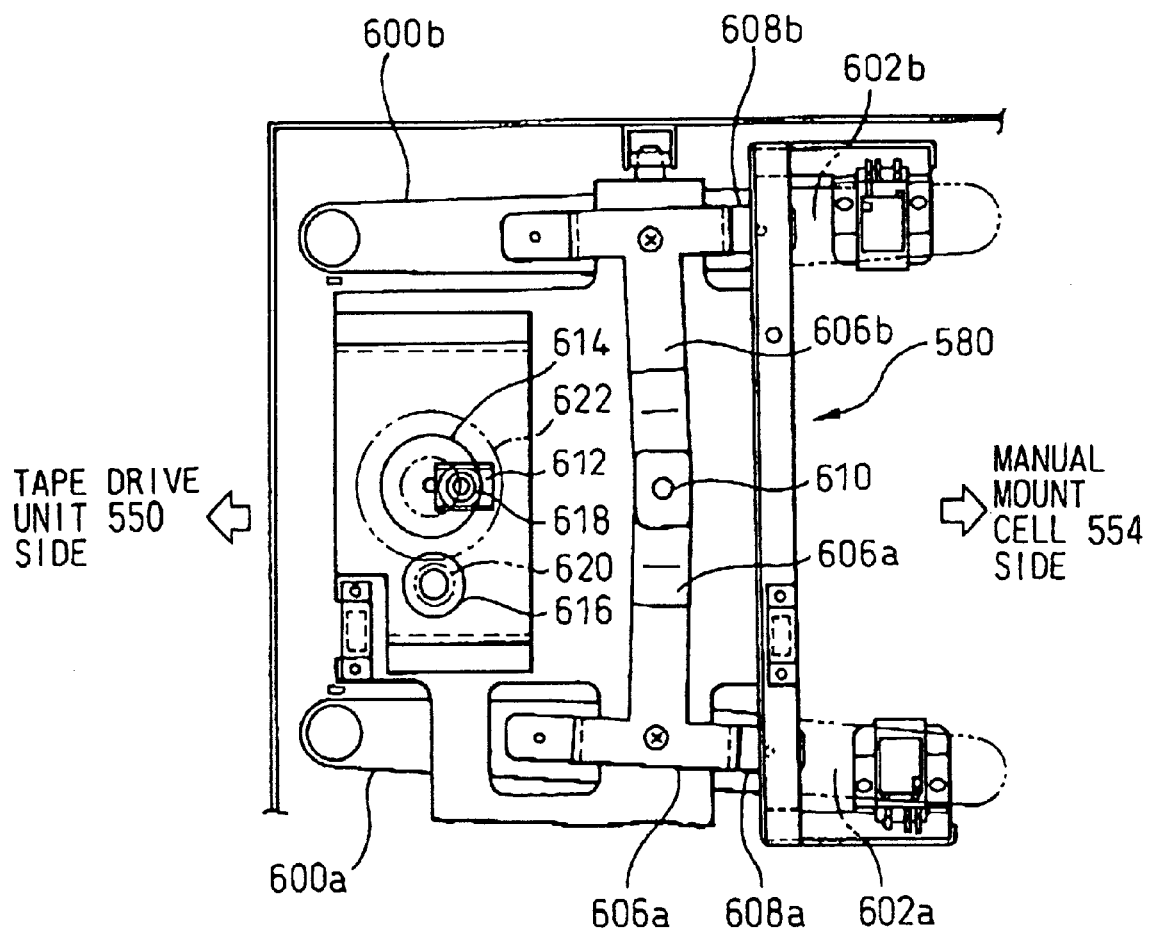
FIG. 12 is a plan view of a cartridge feeder.
Figure 13:
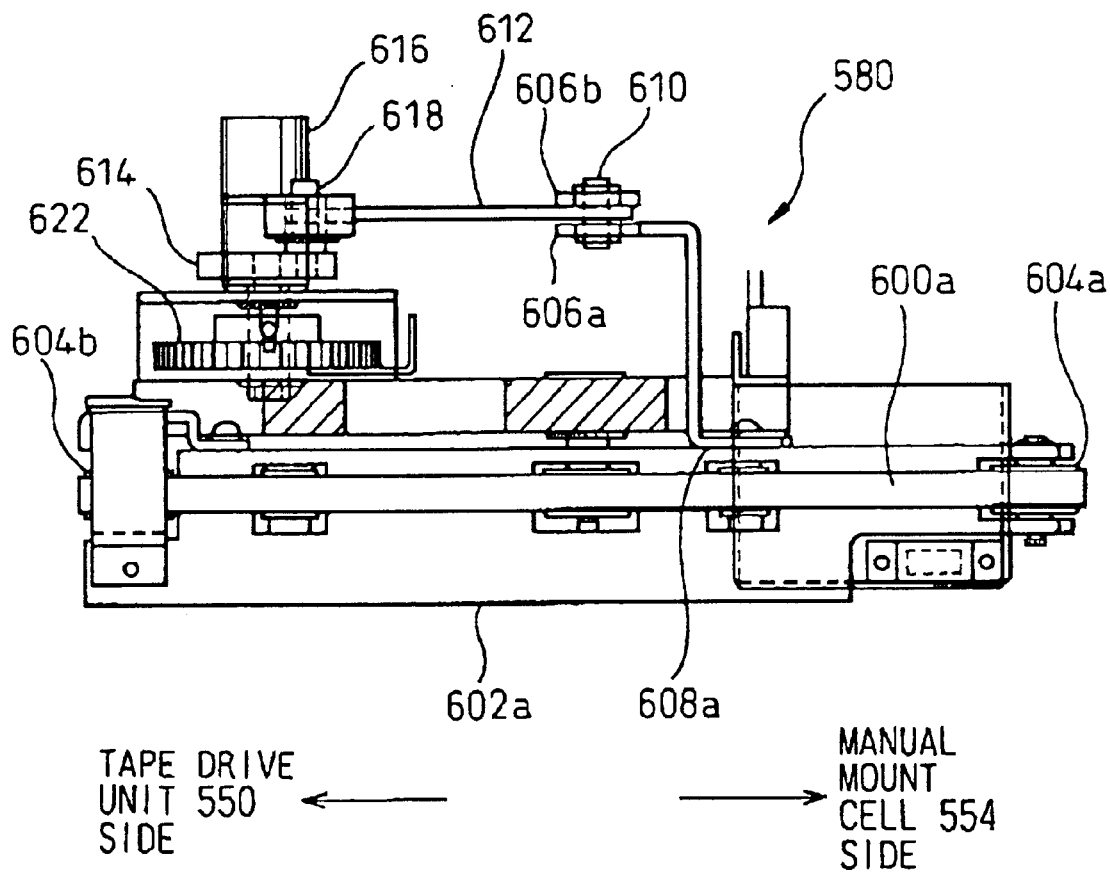
FIG. 13 is a side view of a cartridge feeder.

FIG. 12 is a plan view showing a cartridge feeder 580 built in the cartridge feeder unit 552 shown in FIG. 10. FIG. 13 is a side view of the cartridge feeder 580.

The cartridge feeder 580 includes endless belts 600a, 600b rotatively driven by the motor. The endless belts 600a, 600b are suspended between pulleys 604a, 604b rotatably supported on the arms 602a, 602b, respectively. The arm 602a is fixedly screwed on the mounting portion 608a of the plate 606a. The arm 602b is fixedly screwed on the mounting portion 608b of the plate 606a. The plate 606a and the plate 606b are coupled to each other rotatably about the shaft 610.

The shaft 610 is arranged to pass through the hole formed at an end of the plate 612. The hole formed in the other end of the plate 612 has passed therethrough the shaft 618 formed on the disk 614. The turning effort of the motor 616 is transmitted to the disk 614 through the gears 620 and 622 fixed on the output shaft of the motor 616. When the disk 614 is located in the position indicated in FIG. 12, the sides of the endless belts 600a, 600b nearer to the manual mount cell 554 are closed, and therefore the cartridge 588 mounted on the cell of the manual mount cell 554 is transported to the tape drive 550. In the case where the disk 614 is displaced by 180 degrees from the position shown in FIG. 12, on the other hand, the plate 612 is pulled leftward. With the leftward movement of the plate 612, the plates 606a, 606b rotate about the shaft 610. As a result, the sides of endless belts 600a, 600b nearer to the tape drive 550 are closed, so that the cartridge 558 is conveyed from the tape drive 550 to the manual mount cell 554.

Figure 14A:
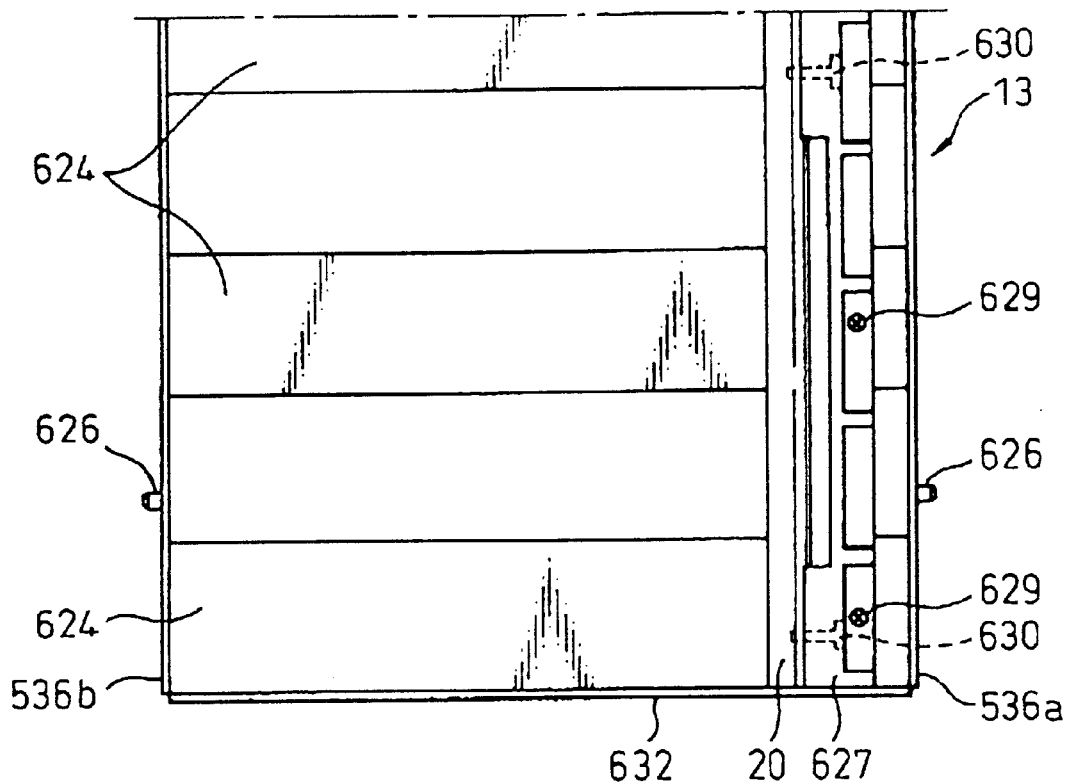
FIG. 14A is a plan view showing a configuration of a passage unit.
Figure 14B:
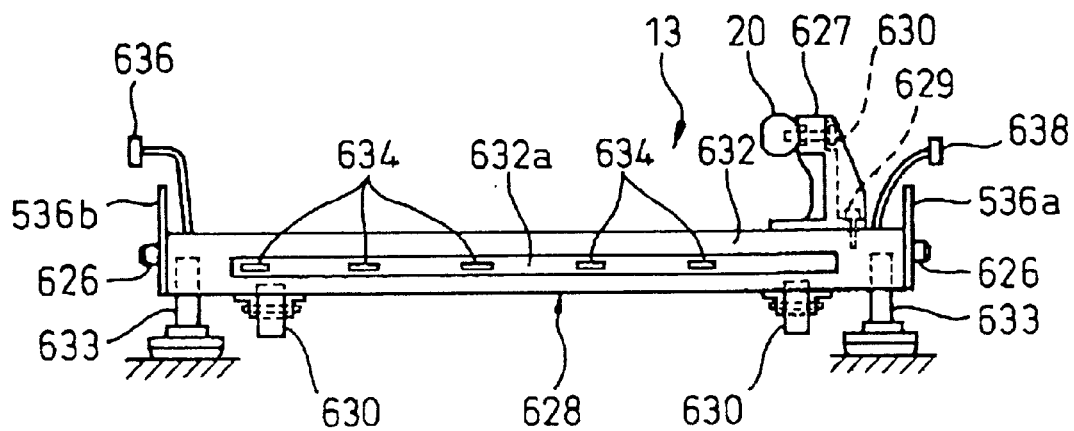
FIG. 14B is a side view showing a configuration of a passage unit.
Figure 15:
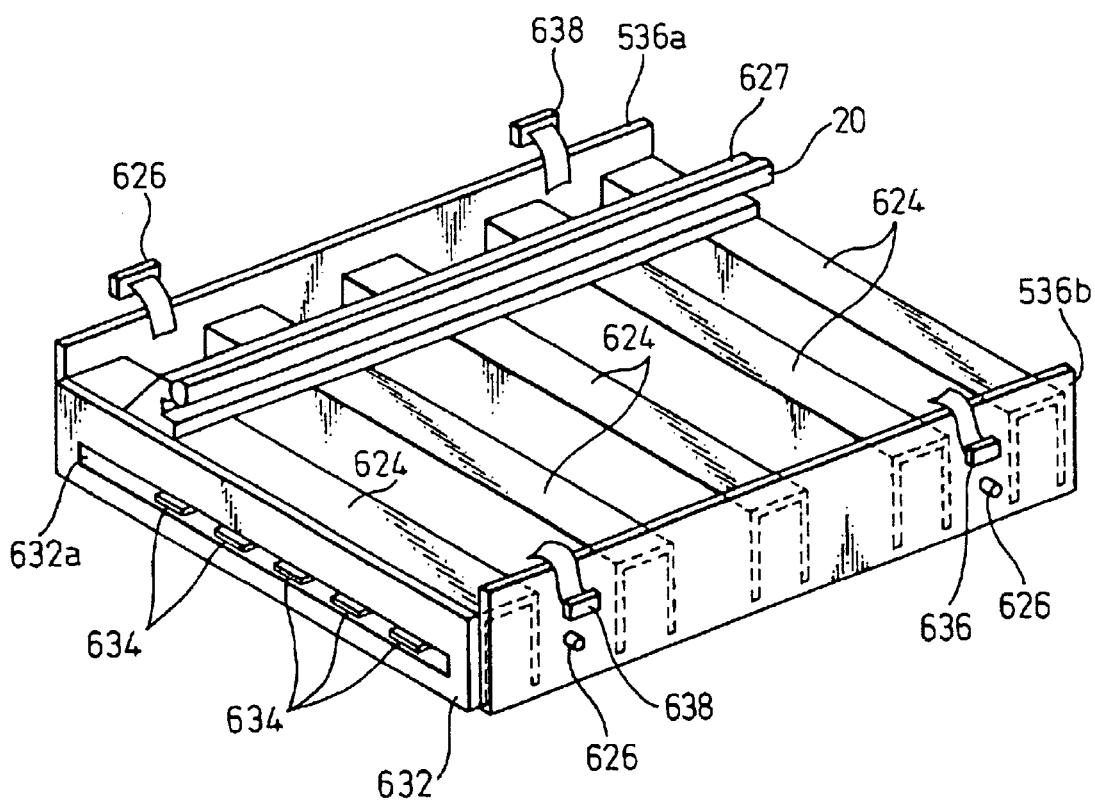
FIG. 15 is a perspective view showing a configuration of the passage unit.

FIGS. 14A and 14B are diagrams for explaining the passage unit 13. FIG. 14A is a plan view and FIG. 14B a side view. FIG. 15 is a perspective view showing the passage unit 13.

The passage unit 13 includes side plates 536a, 536b making up reference surfaces coupled with the drum unit 10 shown in FIG. 2. The side plates 536a, 536b are coupled to each other through a plurality of coupling plates 624. The side plates 536a, 536b include a plurality of positioning protrusions 626 for determining the position of coupling with the drum unit 10. The bottom plate 628 of the passage unit 13 has fixed thereon four castors 630 and four pedestals 633. A rail support member 627 for supporting the X rail 20 is fixed by screws 629 above the coupling plates 624 of the passage unit 13. The X rail 20 is fixed on the rail support member 627 by screws 630.

Each of the front surface part and the rear surface part of the passage unit 13 has mounted thereon a face plate 632 constituting a coupling surface with the reference cell unit 11 or a coupling surface with another passage unit 13. Each face plate 632 makes up a reference surface 538. Connectors 634 for signal cables wired through the face plates 632 and the coupling plates 624 are arranged on the openings 632a of the front and rear face plates 632.

Also, those signal cables wired in the passage unit 13, which are associated with the power connector 636 for supplying power to the drum unit 10 and the connector 638 for transmitting a control signal to the drum unit 10, are led out from between the coupling plates 624.

Figure 16:
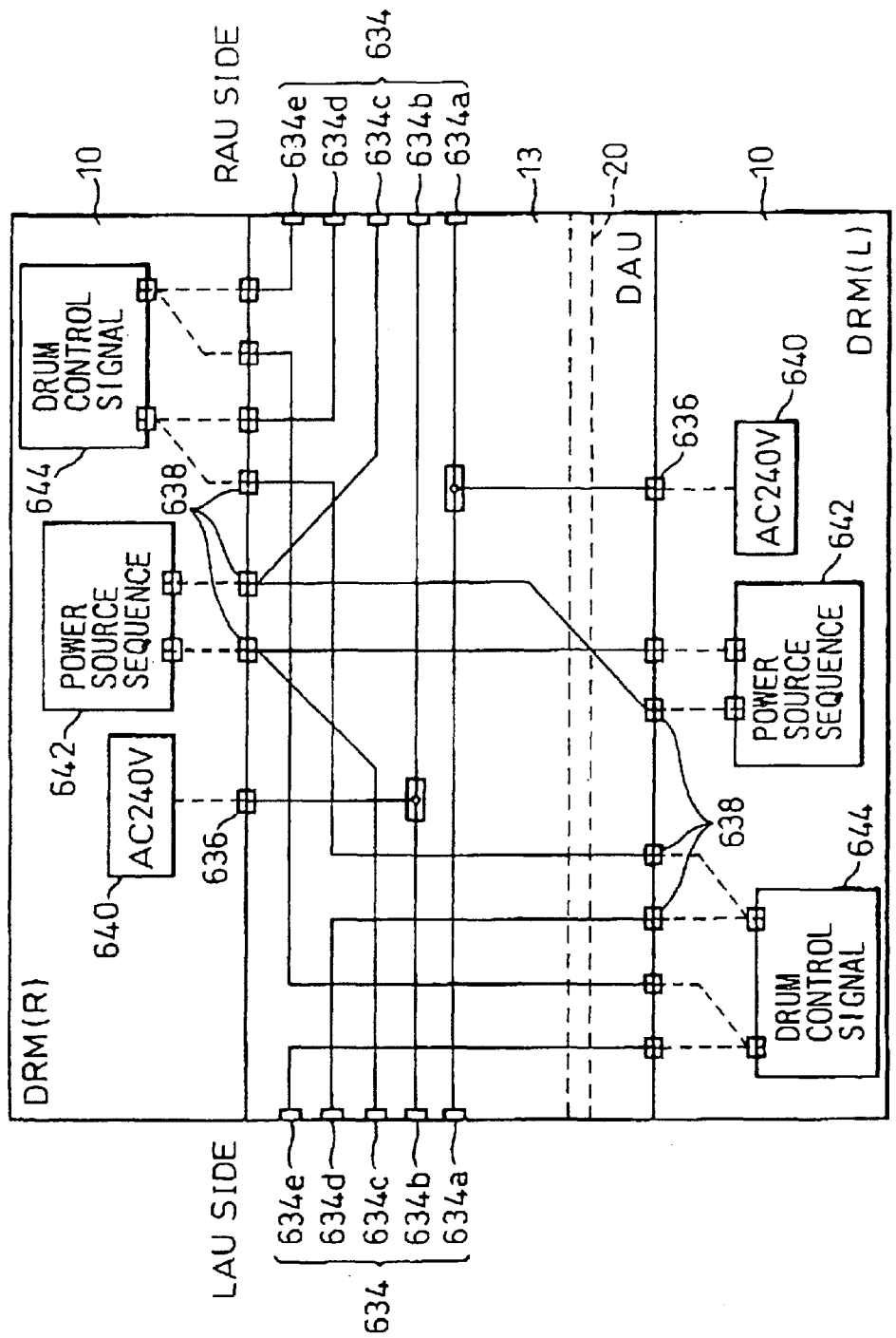
FIG. 16 is a diagram for explaining the wiring of signal cables in the passage unit and the wiring with the drum unit.

FIG. 16 is a diagram for explaining the wiring of the signal cables in the passage unit 13 and the wiring of the drum unit 10.

In FIG. 16, the passage unit 13 assumes a state coupled with the drum units 10 on the two sides thereof.

The drum units 10 each includes an AC power supply 640, a power sequence control circuit 642 and a drum control circuit 644. Of all the connectors 634 of the passage unit 13, the connectors 634a, 634b supplies power from the power supply arranged in the housing 4 of the library apparatus 2 to the AC power supply 640 through the connector 636. The connector 634c, on the other hand, transmits a power control signal from a power controller arranged in the housing 4 of the library apparatus 2 to the power sequence control circuit 642. The connector 634d is for transmitting a control signal from the controller for controlling the accessor 14 arranged on the accessor unit 9 to the drum control circuit 644. The connector 634e transmits a control signal from the controller for controlling the accessor 14 arranged on the accessor unit 7 to the drum control circuit 644. The connectors 638 are for connecting the signal cables coupled to the connectors 634c to 634e to the power sequence control circuit 642 and the drum control circuit 644.

Figure 17:
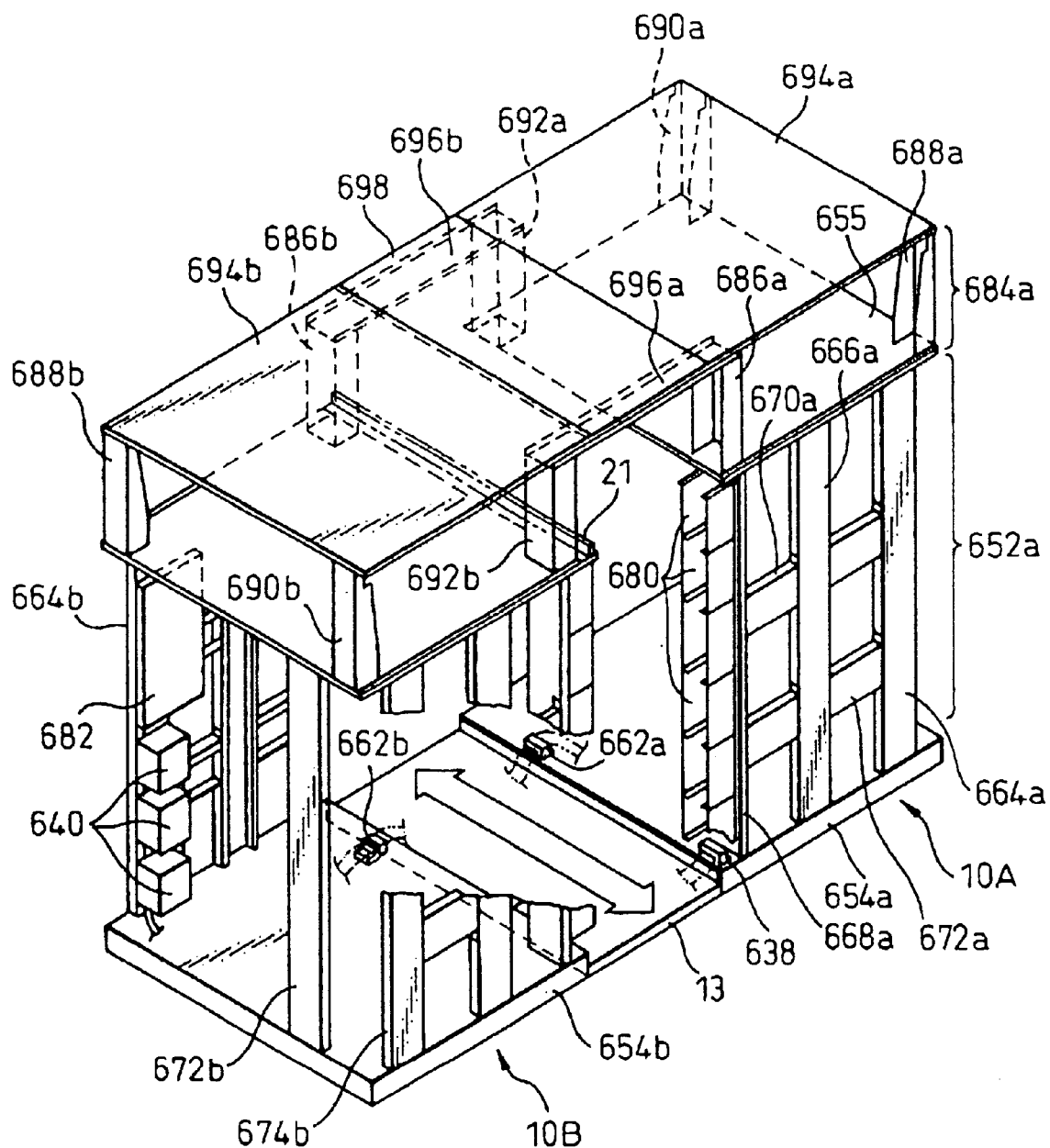
FIG. 17 is a diagram showing the coupling between the drum unit and the passage unit.
Figure 18:
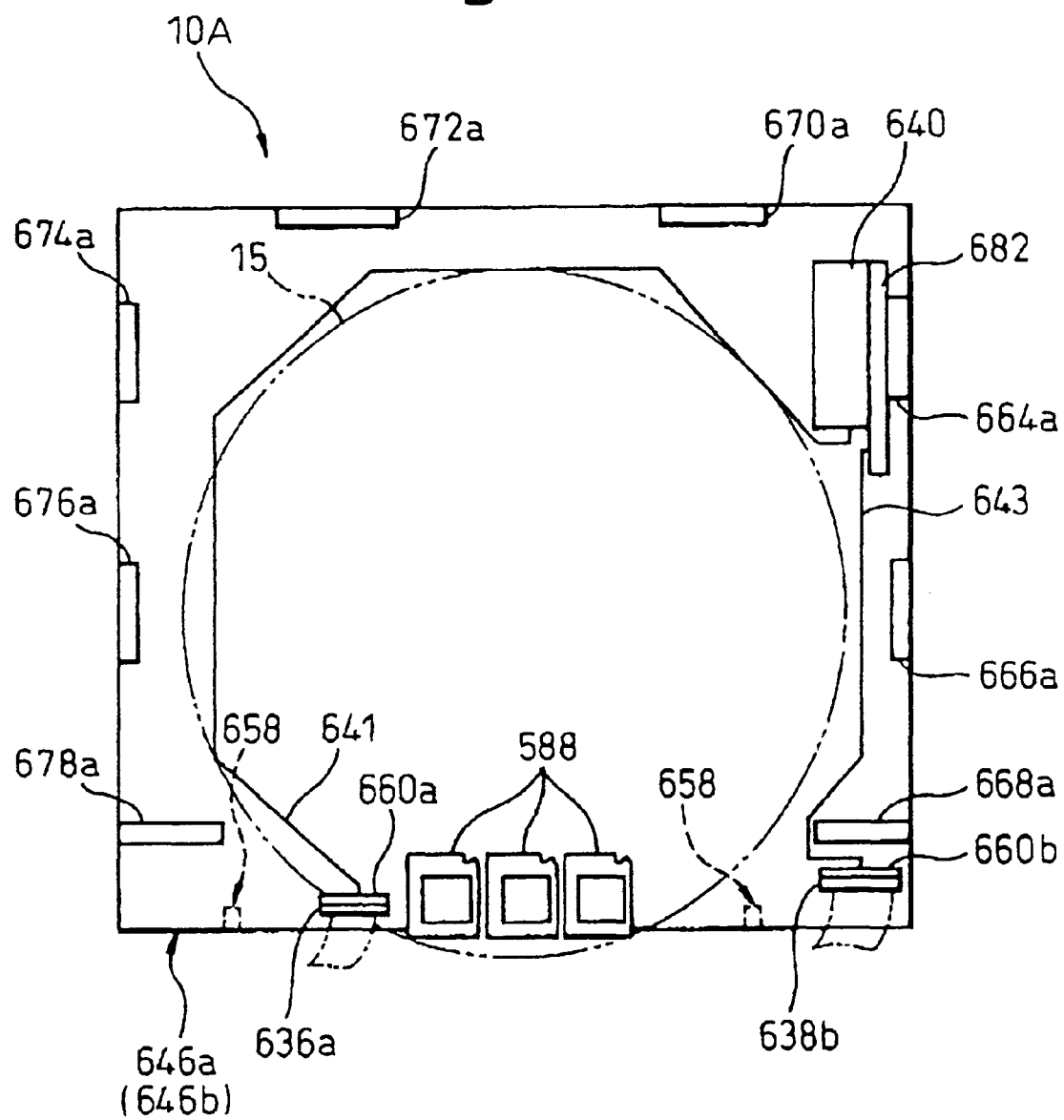
FIG. 18 is a plan view showing a configuration of the drum unit.
Figure 19:
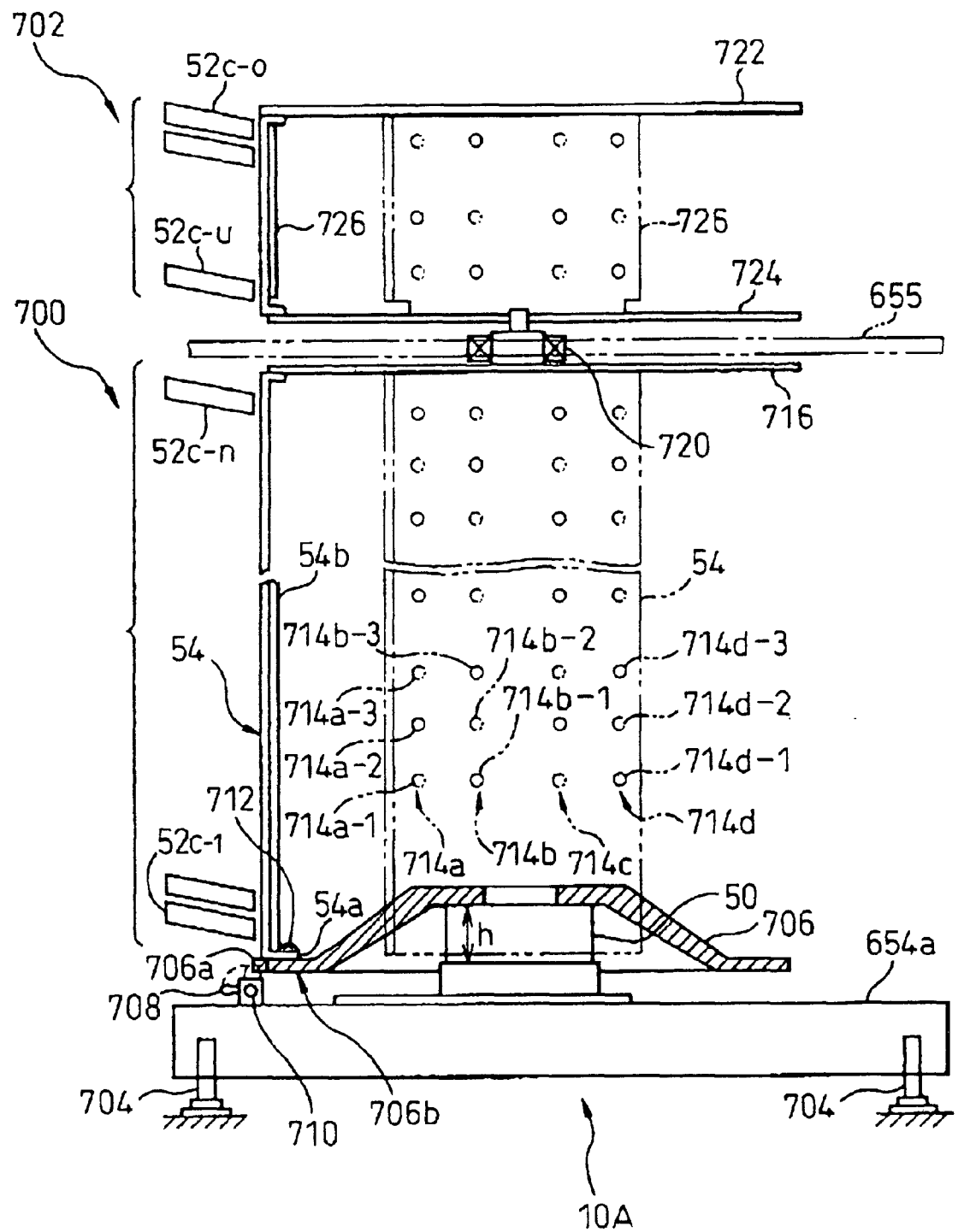
FIG. 19 is a side sectional view of the drum unit.
Figure 20:
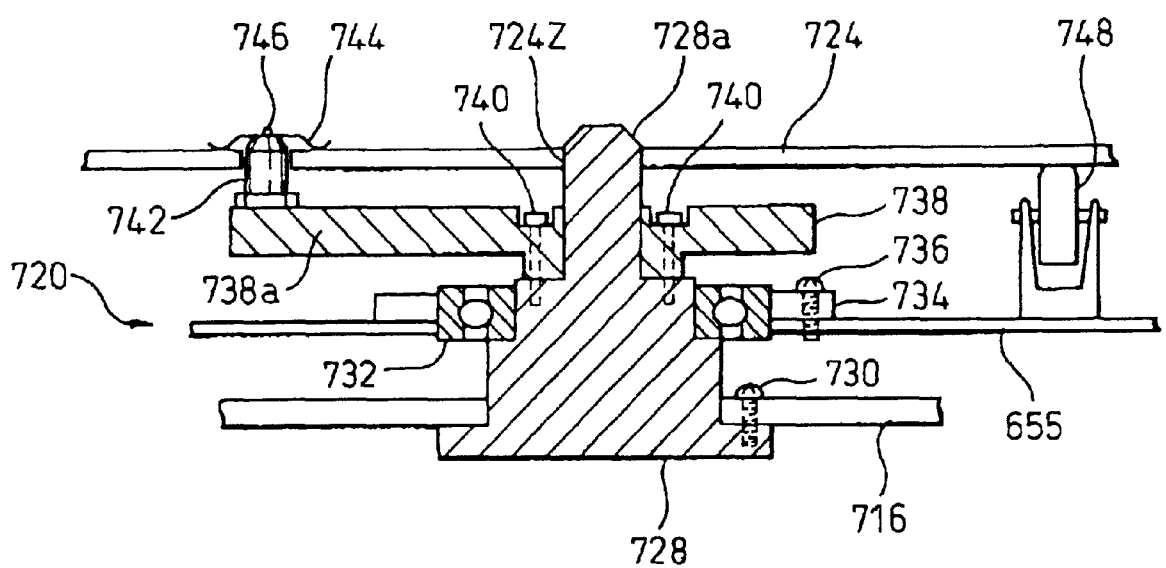
FIG. 20 is a partly enlarged sectional view showing a mechanism for coupling the upper unit and the lower unit of the drum unit.
Figure 21:
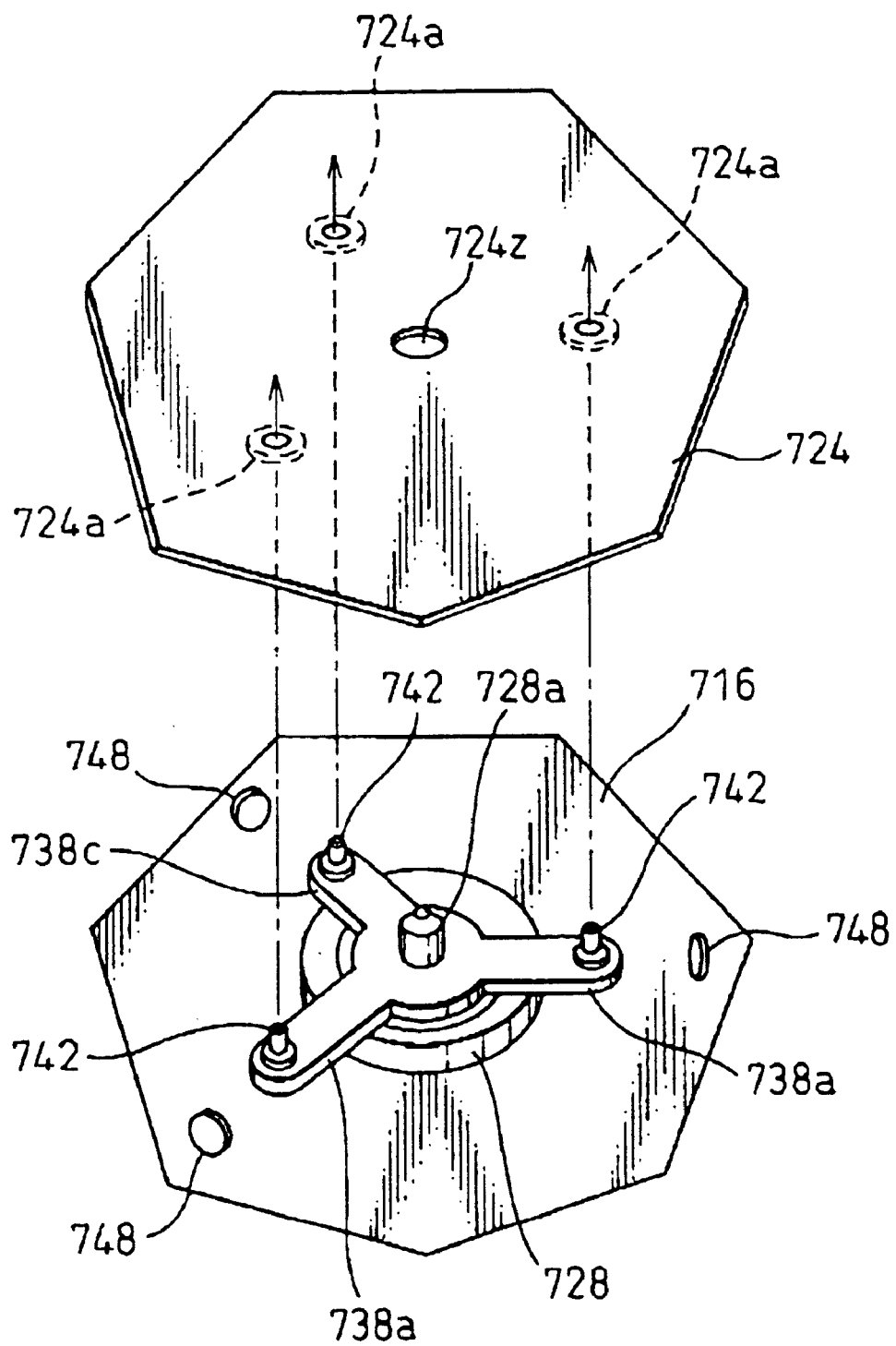
FIG. 21 is a diagram for explaining a method of synchronizing the coupling mechanism shown in FIG. 20.
Figure 22:
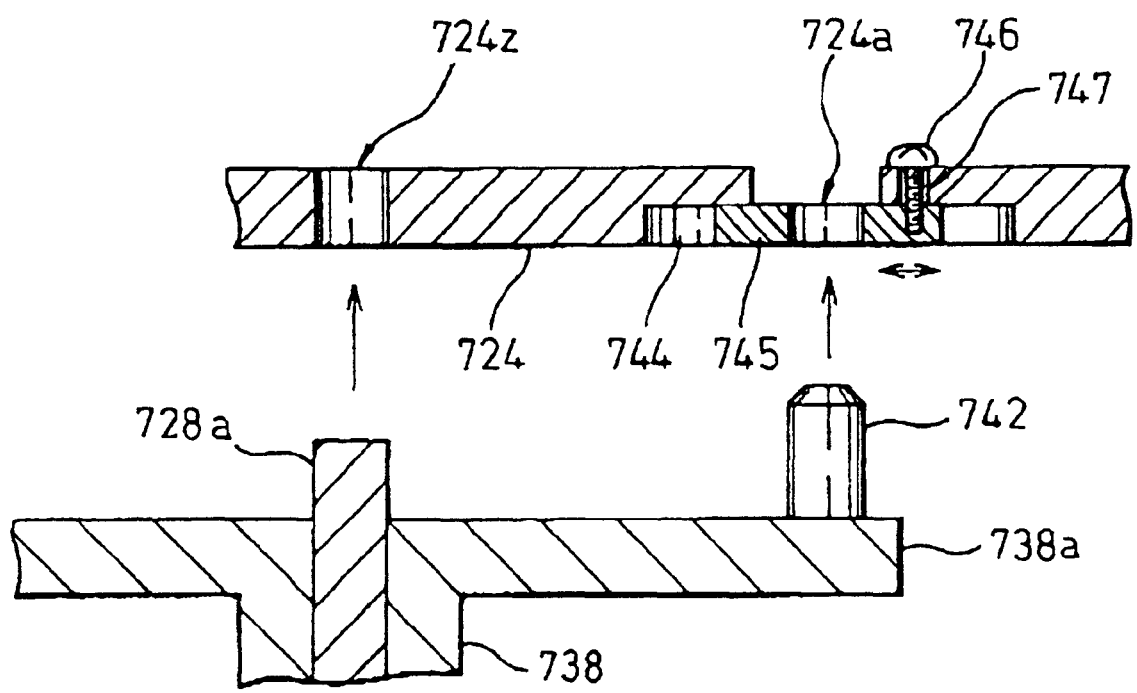
FIG. 22 is a diagram for explaining the coupling section of the coupling mechanism shown in FIG. 20.

FIG. 17 is a diagram showing the coupled relation between the drum units 10 and the passage unit 13. FIG. 18 is a plan view of the drum unit 10, FIG. 19 is a side sectional view of the drum unit 10, FIG. 20 is a diagram for explaining the coupling mechanism between the upper unit and the lower unit of the drum unit, FIG. 21 is a diagram for explaining a method of phase-matching of the coupling mechanism of FIG. 20, and FIG. 22 is a diagram for explaining the coupler of the coupling mechanism.

The drum units 10A, 10B are coupled to the two sides of the passage unit 13 after the passage unit 13 is coupled to the reference cell unit 11. The drum units 10A, 10B have the same configuration, and therefore the drum unit 10A will be described as a representative case. The description of the drum unit 10B will also be made as required.

In FIG. 17, the passage unit 13 is arranged in the central portion. The drum units 10A, 10B are arranged on the two sides of the passage unit 13. The front end surface 636a (646b) of the base 654a of the lower unit 652a of the drum unit 10A is coupled with the side plate 536b of the passage unit 13. The front end surface 656b of the base 654b of the lower unit 652b of the drum unit 10B, on the other hand, is coupled with the side plate 536a of the passage unit 13. The passage unit 13 and the drum unit 10A are set in position by inserting the positioning protrusions 626 of the passage unit 13 into the positioning holes 658 of the drum unit 10A. Also, the connectors 660a, 660b arranged on the drum unit 10A are coupled to the connectors 636, 638, respectively, of the passage unit 13. The connector 660a is supported on the base 654a of the drum unit 10A through the connector support plate 662a.

Relative positions between the drum unit 10B and the passage unit 13 are determined and the passage unit 13 is connected to the connectors in the same way as in the case of the drum unit 10A. Also, the connectors of the drum unit 10B are supported on the base 654b of the drum unit 10B through the connector support plate 662b.

The lower unit 652a of the drum unit 10A has a plurality of poles 664a, 666a, 668a, 670a, 672a, 674a, 676a, 678a supported on the base 654a. The poles 664a, 666a, 668a are coupled to each other by beams 670a, 672a. Also, a ceiling plate 655 is arranged at the upper part of the lower unit 652a of the drum unit 10A. The drum unit 10A includes a rotary drum 15. The rotary drum 15, as described with reference to FIG. 1, is a seven-sided polyhedron, each side of which has three rows of cells. Each cell contains a magnetic tape cartridge 588 of the I3480 type having a magnetic tape therein. The drum unit 10A also includes fixed cells 680a in addition to the rotary drum 15. The poles 668a, 678a are for supporting a plurality of cells 680 prepared from a right cell rack and a left cell rack described later.

The drum unit 10A includes a power supply 640 and a printed board 682 having a power sequence control circuit 642 and a drum controller 644. The power supply 640 and the printed board 682 are fixed on the pole 664a. The power supply 640 is connected to the connector 660a through a power line 641. The printed board 682 is connected to the connector 660b through a signal line 643.

The upper unit 684a of the drum unit 10A contains the poles 686a, 688a, 690a, 692a and an upper cover 694a. The drum units 10A, 10B are coupled to each other by a coupling bar 696a having the pole 686a of the drum unit 10A and the pole 692b of the drum unit 10B integrally mounted thereon on the one hand and by a coupling bar 696b having the pole 692a of the drum unit 10A and the pole 686b of the drum unit 10B integrally mounted thereon on the other hand. After the drum units 10A, 10B are coupled by the coupling bars 696a, 696b, an upper plate 698 is screwed to the coupling bars 696a, 696b. After that, the upper cover 694a is screwed to the poles 686a and 692a.

The drum unit 10B supports the upper rail 21 for guiding the vertical column 18 of the accessor 14.

The lower unit 652a of the drum unit 10A supports a rotary drum 700 as shown in FIG. 19. Also, the upper unit 684a of the drum unit 10A includes an upper rotary drum 702 adapted to rotate integrally with the rotary drum 700.

The base 654a of the lower unit 652a of the drum unit 10A has four pedestals 704. The base 654a includes a drum motor 50 mounted thereon. The output shaft of the drum motor 50 is coupled to a drum base 706. The drum base 706 is in the shape of cup, and is coupled to the drum motor 50 in inverted form. As a result, the drum base 706 can contain the drum motor 50 within the height h of the drum base 706. The low height h contributes to an increased number of cells.

The drum base 706 includes a notch 706a in a part thereof. The base 654a rotatably supports a lock lever 708 around a shaft 710. During the transportation of the drum unit 10a, the lock lever 708 is located at a position engaging the notch 706a of the drum base 706. While the drum unit 10A is in use, the lock lever 708 and the notch 706a are disengaged from each other.

Seven flat plates are screwed to the flange 706b of the drum base 706. The flat plates 54 each include a flange section 54a in the lower part thereof. The flange section 54a is fixed by a screw 712 to the flange section 706b of the drum base 706. The flat plate 54 has a flange section 54b on one side thereof. The flange section 54b is superposed on the end surface of at least a second flat plate and screwed to the second flat plate. The flat plate 54b has mounted thereon a left cell rack 240, two central cell racks 242a, 242b and a right cell rack 244 for forming cells. A positioning protrusion formed on the rear surface of each of these cells is inserted into a group of holes 714a, 714c, 714d, respectively, of the flat plates 54. The cartridges 52c-1 to 52c-n are encased in the cells of the central one of the three rows of cells supported on the flat plates 54.

The seven flat plates 54 are coupled to the flange section 706b of the drum base 706, respectively, on the one hand and are fixed to the upper plate 716 on the other. In this way, the rotary drum 700 is assembled. This assembly work is carried out in a work shop.

The rotary drum 702 of the upper unit 684a of the drum unit 10A is coupled to the rotary drum 700 of the lower unit 652a through the coupling mechanism 720. The rotary drum 702 includes an upper plate 722 and a lower plate 724. The upper plate 722 and the lower plate 724 are coupled to each other by the seven flat plates 726. The rotary drum 702 is a seven-sided polyhedron as is the rotary drum 700. Each of the flat plates 726 of the rotary drum 702, like the rotary drum 700, has mounted thereon a left cell rack 240, two central racks 242a, 242b and a right cell rack 244. The cartridges 52c-0 to 52c-u are encased in the cells in the central one of the three cell rows supported on the flat plates 726.

The rotary drum 700 and the rotary drum 702 are coupled to each other through the coupling mechanism 720 and are integrally rotated. The upper plate 716 of the rotary drum 700 has fixed thereon a shaft 728 by a screw 730, as shown in FIG. 20. The shaft 728 is integrally formed with a forward end 728a thereof, which is inserted into the hole 724z of the lower plate 724 of the rotary drum 702. A bearing 732 is fixed on the ceiling plate 655 by a screw 736 through a bearing holder 734. The shaft 728 is rotatable by the bearing 732. The forward end 728a of the shaft 728 has mounted thereon a coupling arm 738 by a screw 740. As shown in FIG. 21, the coupling arm 738 has three arms 738a. The forward end of each arm 738a has a shaft 742 protruded therefrom. The shafts 742 are inserted into the holes 724a of the lower plate 724. The forward end of the shaft 742 has mounted thereon a spring plate 744 fixed by a screw 746, as shown in FIG. 20. The spring plate 744 is provided for preventing the upper plate 724 from coming off from the shaft 728 in case it is subjected to vibrations such as an earthquake. Further, as shown in FIGS. 20 and 21, three wheels 748 are mounted on the ceiling plate 655. These wheels 748 support the weight of the rotary drum 702. The weight of the rotary drum 702 is supported by the ceiling plate 655, and therefore the weight load exerted on the drum motor 50 is reduced.

The forward end 728a of the shaft 728 is inserted into the hole 724z of the lower plate 724. The shaft 742 at the forward end of each arm 738a is inserted into each corresponding hole 724a of the lower plate 724 of the rotary drum 702. The angle between each adjacent arms 738a is set differently. Consequently, as long as the shaft 742 protruded from the forward end of each arm 738a and the hole 724a of the lower plate 724 are not in the currect relative positions, all the shafts 742 cannot successfully be inserted into the holes 724a.

As shown in FIG. 22, each hole 724a has a slide plate 745. The slide plate 745 is movably inserted in a groove 743 formed in the lower plate 724. After the shafts 742 protruded from the forward end of the arms 738a are inserted into the holes 724a, each slide plate 745 is fixed by a screw 746, which is movably fitted in a slot 747.

The rotary drum 700 and the rotary drum 702 are synchronized with each other and fixedly mounted by use of a jig in such a manner that the surface of the flat plates 54 of the rotary drum 700 and the surface of the flat plates 726 of the rotary drum 702 are flush with each other.

Now, explanation will be made about the configuration of the drum units 10a, 10b making possible direct entry-exit, i.e., load/withdrawal (DEE) operation of the cartridge by the operator. The drum units 10a, 10b have a DEE door 64.

Figure 23:
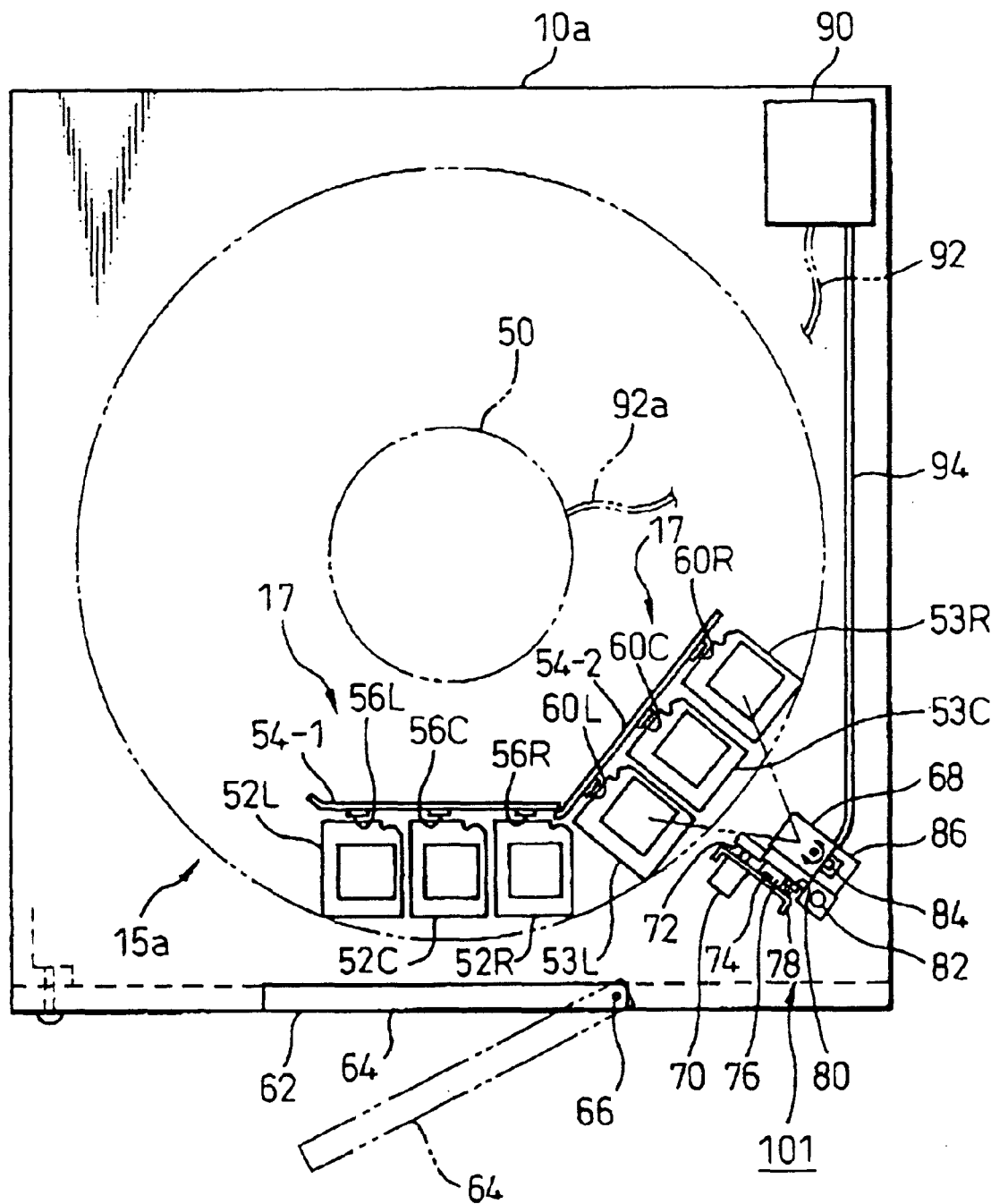
FIG. 23 is a top plan view of a drum unit having a DEE door.
Figure 24:
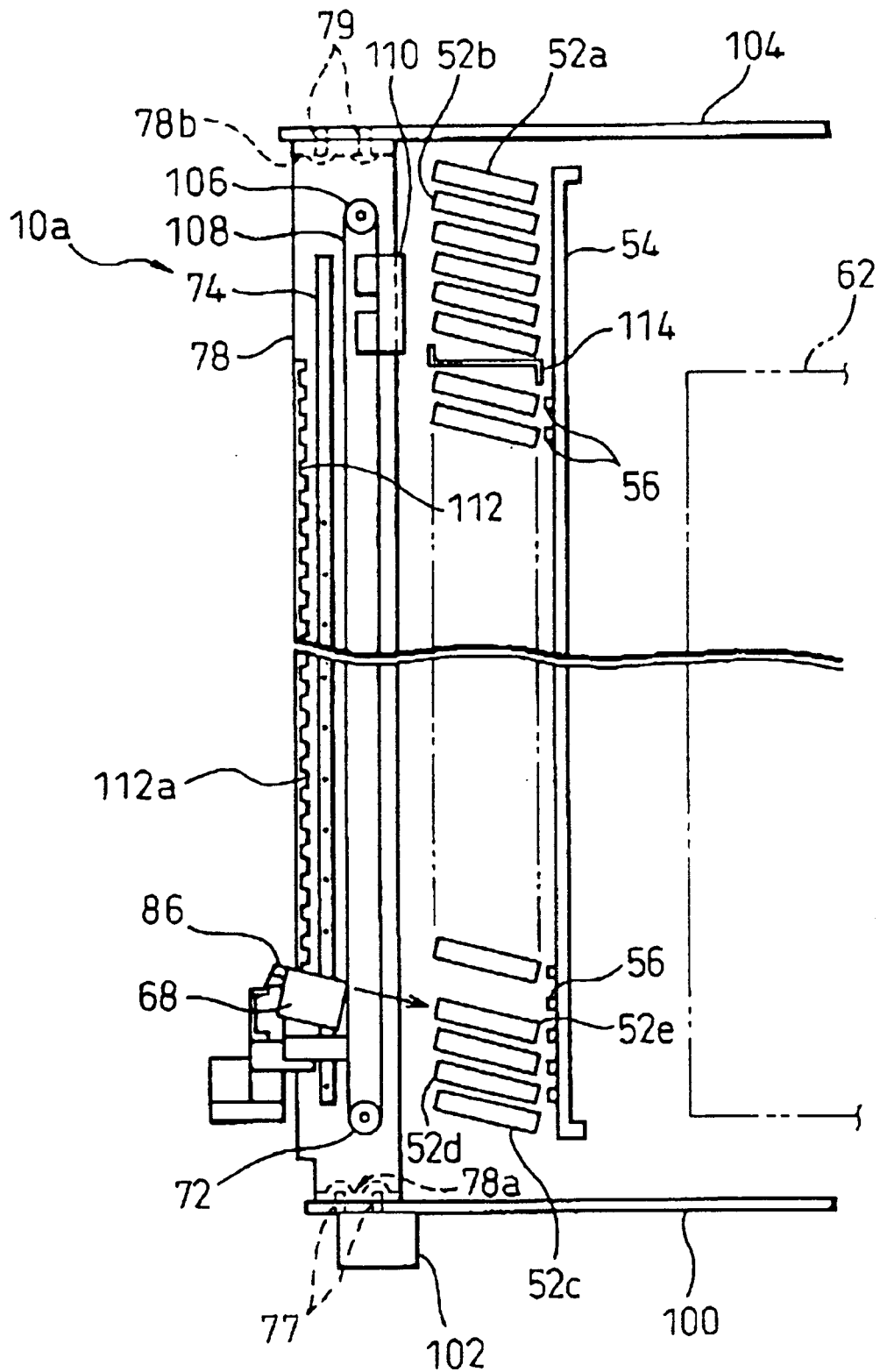
FIG. 24 is a side sectional view of a drum unit having a DEE door.

FIG. 23 is a top plan view of the drum unit 10a having a DEE door. FIG. 24 is a side sectional view of the drum unit 10a having a DEE door.

In FIG. 23, the drum unit 10a has on the front thereof a DEE door 64 rotatable about a rotational shaft 66. The solid line designates the state in which the door 64 is closed to the drum unit 10a, and the dashed line represents the state in which the door 64 is open to the drum unit 10a. The door 64 is mounted on a DEE window 62 arranged on the front decoration panel of the drum unit 10a.

A cell drum 15a is rotated by a motor 50. The cell drum 15a, which is coupled with seven flat plates, is a seven-sided polyhedron. In FIG. 23, two flat plates 54-1 and 54-2 among the seven flat plates 54 are shown. FIG. 24 illustrates two of the seven sides of the cell drum 15a of the drum unit 10a. Each side of the cell drum 15a corresponds to one cell segment. The flat plates 54-1, 54-2 include cells in three rows of n stages. The cells on the flat plate 54-1 have encased therein cartridges 52L, 52C, 52R. Each cell provided on the flat plate 54-2 encases the cartridges 53L, 53C, 53R. The right cell rack 244, the central racks 242a, 242b and the left cell rack 240 shown in FIG. 32 are combined in a multiplicity of ways, and the cells of the cell drum 15a are mounted on the respective flat plates of the cell drum 15a. Thus the cells of the cell drum 15a are configured in three rows of n stages Also, each cell of the cell drum 15a is mounted on the flat plate in a form inclined 12 degrees upward from the horizontal surface. The inclination angle is set with the intention of preventing the cartridge from jumping out of the cell in the case where vibrations such as earthquakes are exerted on the library apparatus 2.

When the operator loads a cell in the cartridge, the DEE door 64 of the drum unit 10a is opened. The cartridges are loaded one by one into each cell of the cell drum 15a.

The cartridges 52a, 52b arranged at a higher position than the DEE window 62 opened by the DEE door 64 are the ones loaded by way of the cartridge loading ports 6 of the cartridge access stations 5 described with reference to FIG. 1. The cartridges cannot be loaded by the operator into the cells arranged at a position higher than the DEE window 62.

As a consequence, the number of stages of cells for which the operator is capable of direct loading and delivery (direct entry and exit) of the cartridge is only m out of n stages in the cell.

The cartridges 52a, 52b are held in the remaining cells as the accessor 14 is moved to the cells on the cell drum 15a of the drum unit 10a from the cartridge loading port 6.

Also, the drum unit 10a, like the drum units 10A, 10B, includes the upper unit 684a, and the rotary drum 702 is coupled to the rotary drum 15a.

The cartridges 52L, 52C, 52R, 53L, 53C and 53R encased in the cells on the cell drum 15a have a bar code label mounted on the front thereof. Also, the seven flat plates 54 each have a bar code 56 attached at a position corresponding to the position of the cartridge in which the cell is in an opposed relation to the DEE window 62. The bar code 56 is attached to the flat plates 54 before the cell racks 240, 242a, 242b, 244 are mounted on the flat plates 54. The number system of the bar codes 56 attached on the flat plates of the cell segments 17 of the cell drum 15a is different from the number system of the bar codes attached on the cartridges 52L, 52C, 52R, 53L, 53C, 53R.

The bar codes on the cartridges and the bar codes on the flat plates are read by a bar code reader 68. The bar code reader 68 is coupled to and moves with a slide guide 76. The slide guide 76 is reciprocated along the slide rail 74. The slide rail 74 is mounted on a vertical column base 78. The vertical column base 78 supports the bar code reader 68, a lower pulley 72, an upper pulley 106, a pulse motor 70, a position flag bar 112 and a slide rail 74. A timing belt 108 is suspended between the lower pulley 72 and the upper pulley 106. The timing belt 108 is fixed on the slide guide 76 of the bar code reader 68. The timing belt 108 has mounted thereon a balancer weight 110 providing a counterbalance of the weight of the bar code reader 68. The bar code reader 68 is rotatable about the shaft of the slide guide 76. A motor 82 mounted on the slide guide 76 is adapted to rotate the bar code reader 68. A sensor flag 84 is arranged at the rear end of the bar code reader 68. A sensor 86 for detecting the sensor flag 84 is arranged on the slide guide 76. The sensor 86 includes a first bar code reader position sensor for detecting that the bar code reader 68 is inclined to the right and a second bar code reader position sensor for detecting that the bar code reader 68 is inclined to the left.

A pulse motor 70 rotationally drives the lower pulley 72. The turning effort of the lower pulley 72 is transmitted to the timing belt 108, so that the slide guide 76 having the bar code reader 68 mounted thereon is reciprocated along the slide rail 74. The position on the vertical column base 78 of the slide guide 76 is determined in such a manner that the sensor 80 fixed on the slide guide 76 detects the flag of the position flag bar 112 and the number of flags detected by the sensor 80 is counted. The sensor 80 and the position flag bar 12 make up a position detection mechanism of the bar code reader 68.

The bar code reader and the motor 70, the lower pulley 72, the upper pulley 106, the slide guide 76, the slide rail 74 and the timing belt 108 constituting a mechanism for reciprocating the bar code reader 68 are mounted on the vertical column base 78.

The vertical column base 78, the bar code reader 68, the position detection mechanism and the reciprocation mechanism are integrally configured thereby to make up a bar code reader unit 101.

The flange section 78a at the lower end of the vertical column base 78 is fixed on the base 100 of the drum unit 10a by screws 77, while the flange section 78b at the upper end of the vertical column base 78 is fixed on the ceiling plate 104 of the drum unit 10a by screws 79. The base 100 has a pedestal 102.

As a result, the bar code reader unit 101 can be removed from the drum unit 10a by taking off the screws 77 and 79. The flange sections 78a, 78b, the screws 77, 79 of the vertical column base 78 are for mounting and demounting the bar code reader unit 101 on and from the drum unit 10a. Also, the base 100 of the drum unit 10a includes nuts adapted to be fitted on the screws 77. Further, the ceiling plate 104 has nuts adapted to be fitted on the screws 79. Furthermore, the base 100 and the ceiling plate 104 include a positioning plate or a slit for setting the flange sections 78a, 78b, respectively, of the bar code reader unit 101 in position.

A control signal for controlling the bar code reader unit 101 is sent out from a control circuit 90 mounted on a control printed board arranged at a corner of the drum unit 10a. The control signal for the bar code reader unit 101 is transmitted to the bar code reader unit 101 from the control circuit 90 through a signal cable 94. The bar code reader unit 101 and the signal cable 94 are coupled to and decoupled from each other by a connector not shown. The control circuit 90 applies a drive signal for rotating the drum motor 50 to the drum motor 50 of the cell drum 15a through the signal cable 92. In the case where the drum motor 50 makes up a drum unit together with the cell drum 15a, the signal cable 92 is capable of being coupled to or decoupled from the drum motor 50 by a connector not shown.

The bar code reader unit 101 is arranged at the front right corner of the housing of the drum unit 10a constituting a square pole. Since the drum unit 10a uses a rotating cell drum 15a, a bar code reader unit 101 can be mounted at a corner of the housing. The cells on the cell drum 15a are accessed by the accessor 14 through an opening formed in the rear surface of the drum unit 10a.

Consequently, the bar code reader unit 101 can read the bar code label attached on the cartridge loaded at a point before the cell segment into or from which the cartridge is loaded or delivered by the operator reaches the back of the drum unit 10a.

The bar code reader unit 101 having this function can be mounted later on the drum unit 10a by screws and therefore can be supplied as an optional unit. In similar fashion, the decoration panel having the DEE door 64 on the front of the drum unit 10a can be replaced with a decoration panel lacking the DEE door 64. This replacement can be easily carried out by use of a fastening means such as screws.

The drum unit 10b shown in FIG. 1, on the other hand, lacks the DEE function and has only a cell drum unit and a control circuit in it. In other words, the drum unit 10b corresponds to the drum units 10A, 10B described with reference to FIGS. 18 to 22.

The drum unit 10b can be modified to have the DEE function by replacing the decoration panel thereof with a decoration panel with the DEE door 64 and mounting the bar code reader unit 101 thereon.

Figure 25:
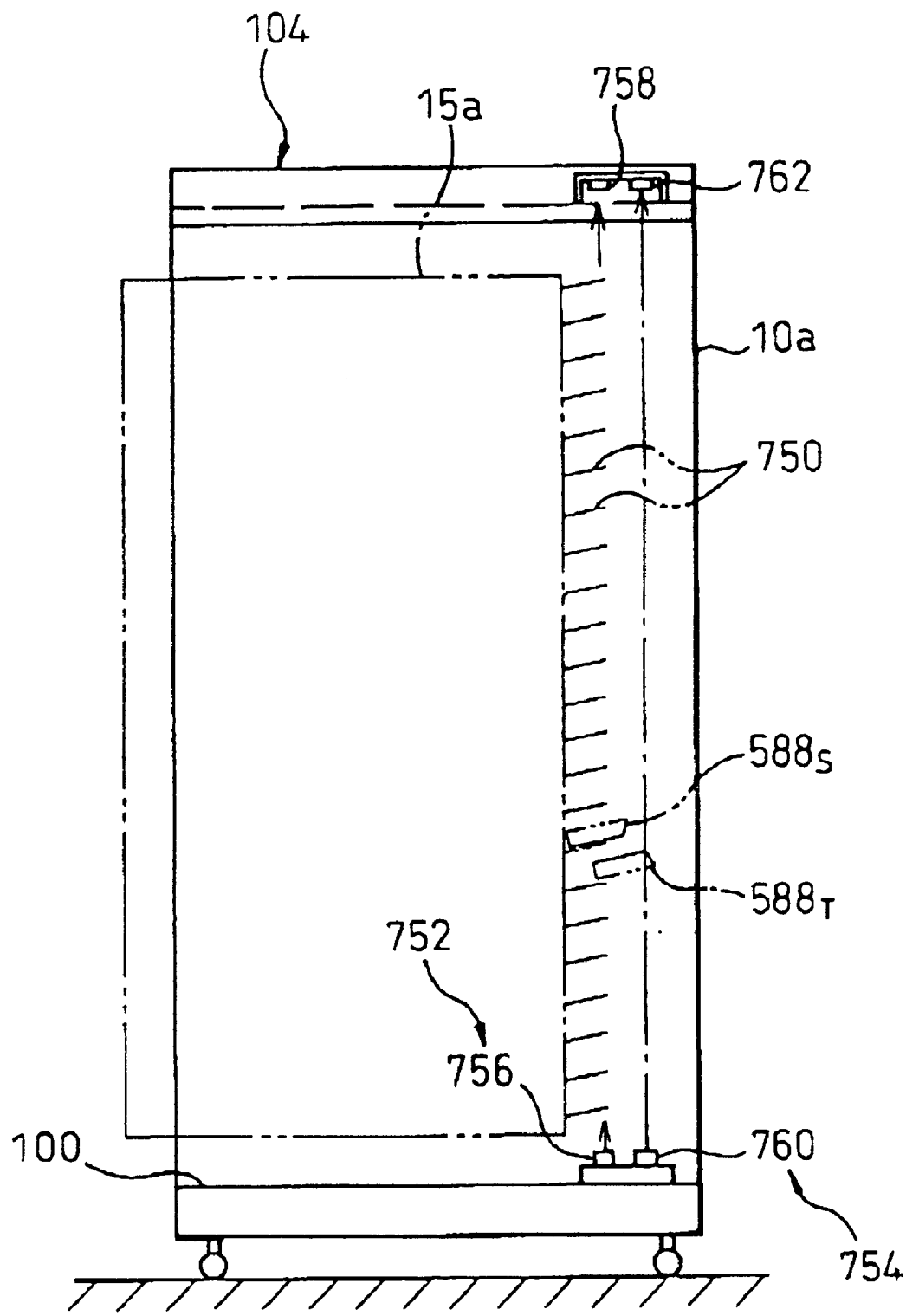
FIG. 25 is a side view showing a cartridge detection mechanism arranged on the drum unit having the DEE door.
Figure 26:
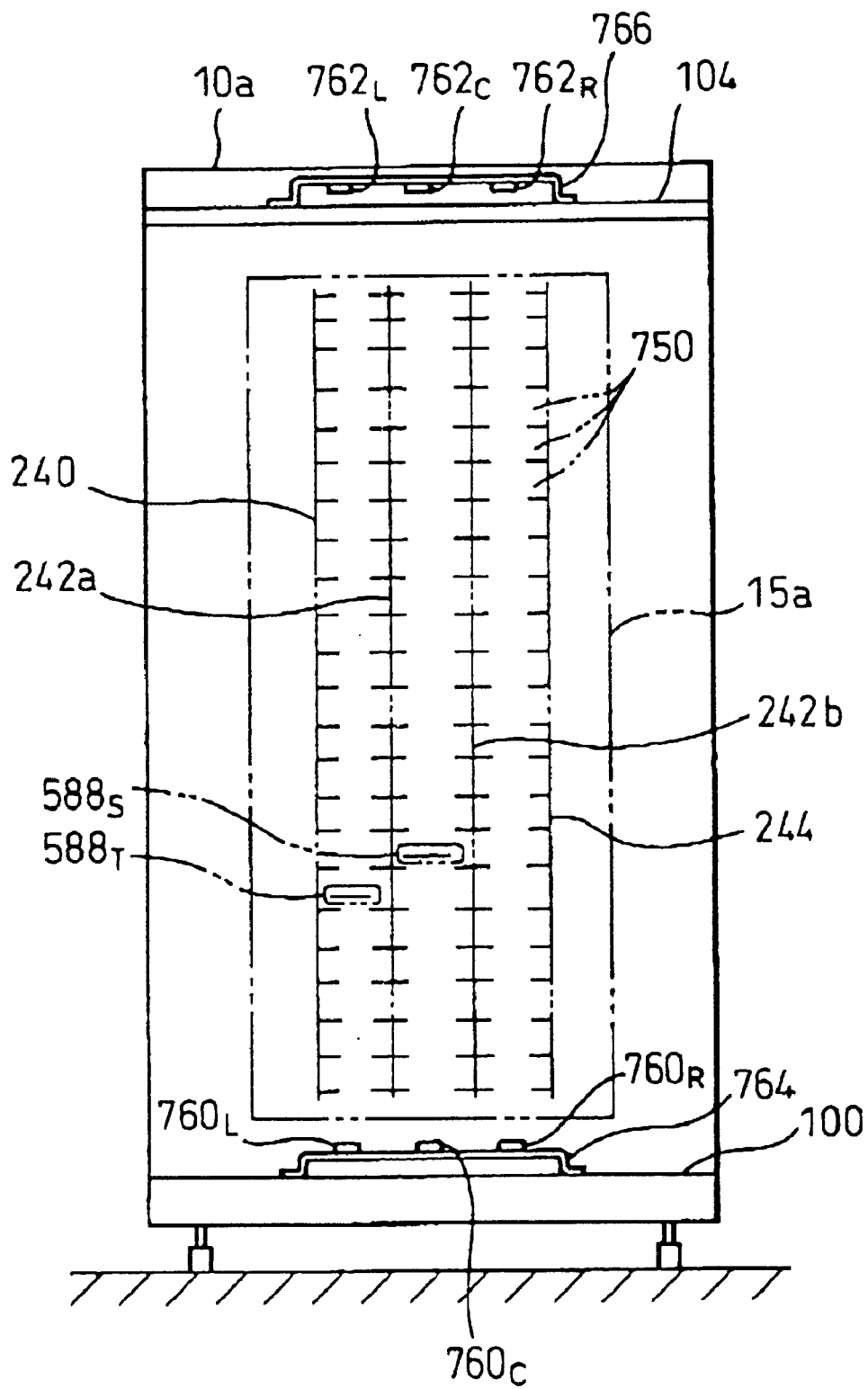
FIG. 26 is a front view showing a cartridge detection mechanism arranged on the drum unit having the DEE door.

FIG. 25 is a side view showing a cartridge detection mechanism installed on the drum unit 10a or 10b having a DEE door. FIG. 26 is a front view of the cartridge detection mechanism included in the drum unit 10a or 10b having a DEE door.

In FIG. 25, the cell drum 15a includes a plurality of cells 750. The cells 750 are arranged in three rows of n stages. An optical sensor 752 is provided for detecting whether or not the cartridges 588 are loaded in the cells 750, and an optical sensor 754 for detecting whether or not any cartridge 588 is in a state partly out of the cell 750.

The optical sensor 752 is configured to include a light-emitting diode 756 mounted on the base 100 of the drum unit 10a and a photo-detector 758 mounted on the ceiling plate 104. The light-emitting diode 756 and the photo-detector 758 are fixed on the base 100 and the ceiling plate 104 in such a manner that the light axis between the light-emitting diode 756 and the photo-detector 758 is interrupted by the cartridge 588S normally contained in the cell 750.

The optical sensor 754 is configured to include a light-emitting diode 760 mounted on the base 100 of the drum unit 10a and a photo-detector 762 mounted on the ceiling plate 104. The light-emitting diode 760 and the photo-detector 762, as shown in FIG. 25, are fixed on the base 100 and the ceiling plate 104 in such a manner that the optical axis between the light-emitting diode 760 and the photo-detector 762 is not interrupted by the cartridge 588S normally contained in the cell 750 and is interpreted by the cartridge 588T in a state partly out of the cell 750.

The optical sensor 752 and the optical sensor 754 each have three pairs of light-emitting diodes and photo-detectors. Three light-emitting diodes 760L, 760C, 760R are mounted on the base 100 through a metal fitting 764. The three photo-detectors 762L, 762C, 760R, on the other hand, are mounted on the ceiling plate 104 through a metal fitting 766.

Figure 27:
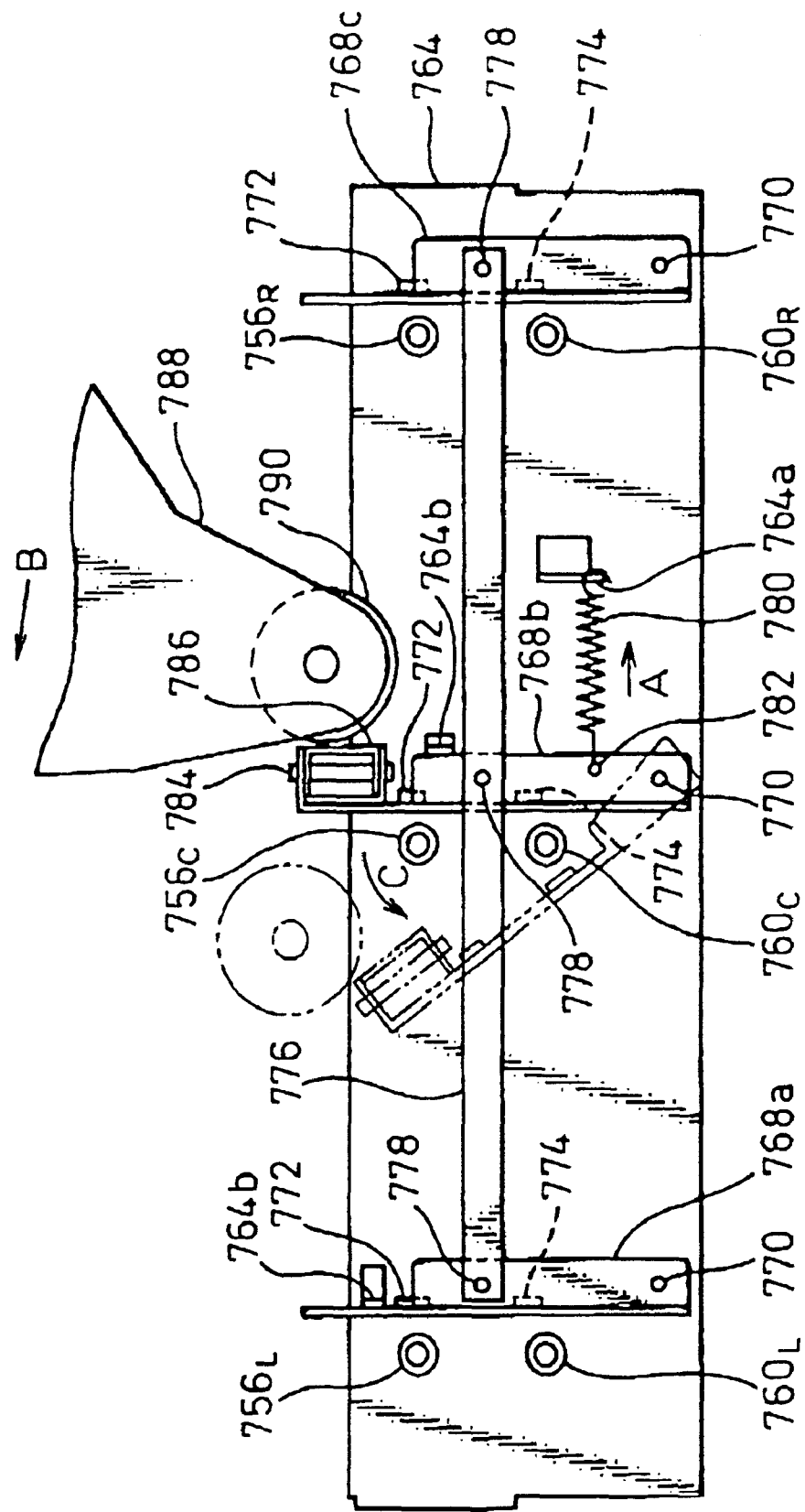
FIG. 27 is a diagram for explaining a mechanism for cleaning the cartridge detection mechanism.
Figure 28:
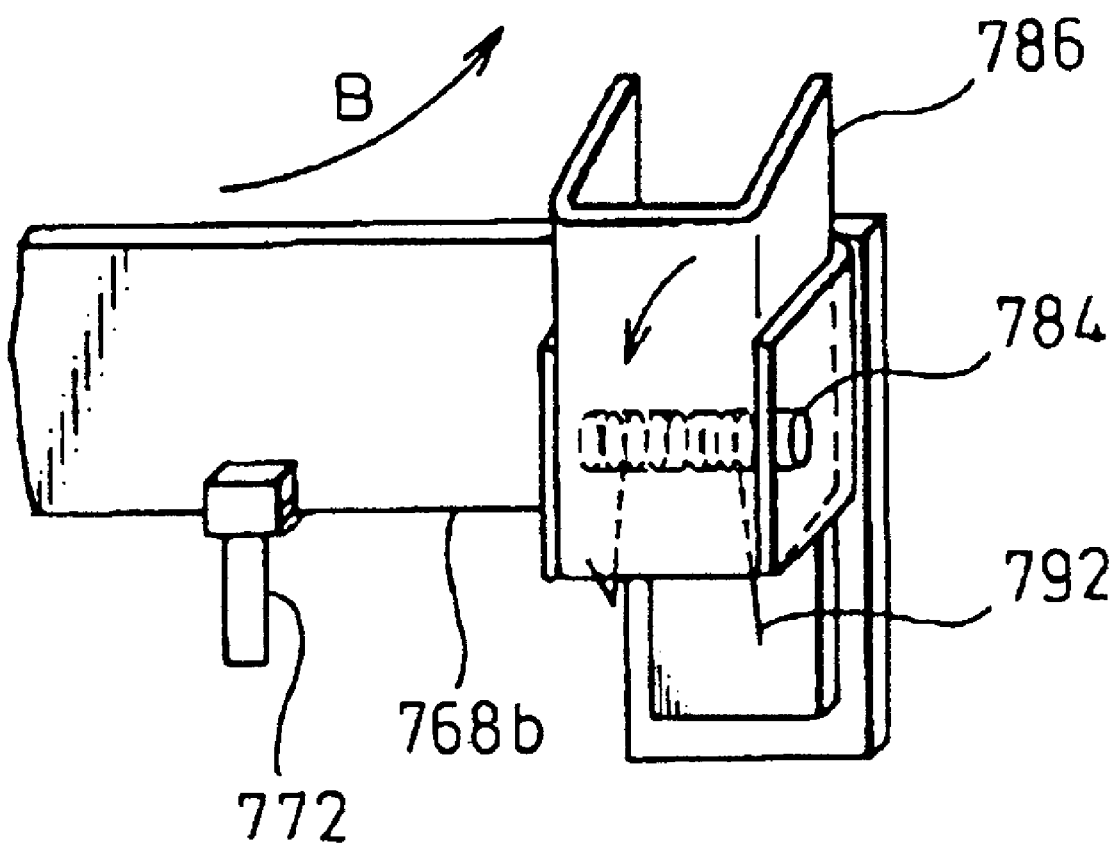
FIG. 28 is a partial perspective view of the cleaning Mechanism shown in FIG. 27.

FIG. 27 is a diagram for explaining a mechanism for cleaning the cartridge detection mechanism. FIG. 28 is a perspective view showing a part of the cleaning mechanism shown in FIG. 27.

In FIG. 27, the light-emitting diodes 756L, 756C, 756R of the optical sensor 752 and the light-emitting diodes 760L, 760C, 760R of the optical sensor 754 are fixed on the metal fitting 764. The fitting 764 has three levers 768a, 768b, 768c supported each rotatably on the shaft 770. The levers 768a to 768c each holds brushes 772, 774. The levers 768a to 768c are coupled to each other by a coupling bar 776 through the respective shafts 778. The lever 768a is rotatable at an end of the coupling bar 776, the lever 768b is rotatable at the center of the coupling bar 776, and the lever 768c is rotatable at the other end of the coupling bar 776. The lever 768b is urged in the direction of arrow A by a spring 780. The spring 780 has an end thereof engaging a hole 782 of the lever 768b, and the other end thereof engaging a plate 764a raised from the fitting 764. The motion of the lever 768a is restricted by a stopper configured of a plate 764b raised from the fitting 764.

The lever 768b has mounted thereon a contact plate 786 rotatable about the shaft 784. The contact plate 786 is located in contact with a roller 790 rotatably mounted at the forward end of a lever member 788 which in turn is mounted on the flange section 706b of the drum base 706 of the drum unit 10a. With the movement of the roller 790 along the direction of arrow B as a result of rotation of the rotary drum 15a, the roller 790 rotates the contact plate 786 in the direction of arrow C. The lever 768b rotates around the shaft 770 together with the contact plate 786. The rotation of the lever 786b causes brushes 772 and brushes 774 mounted on the levers 768a to 768c to slide on the surface of the light-emitting diodes 756L, 756C, 756R and the light-emitting diodes 760L, 760C, 760R. Consequently, the surfaces of the light-emitting diodes 756L, 756C, 756R and the light-emitting diodes 760L, 760C, 760R are always cleaned with the rotation of the rotary drum 15a.

In the case where the rotary drum 15a rotates in the direction opposite to the arrow B, on the other hand, the contact member 786 rotates around the shaft 784, while the lever 768b is restricted in motion by a stopper 764b and held at a position indicated by solid line in FIG. 27. Also, upon disengagement between the roller 790 and the contact member 786, the contact member 786 returns to the position indicated in FIG. 27 by the force of the spring 792.

Figure 29:
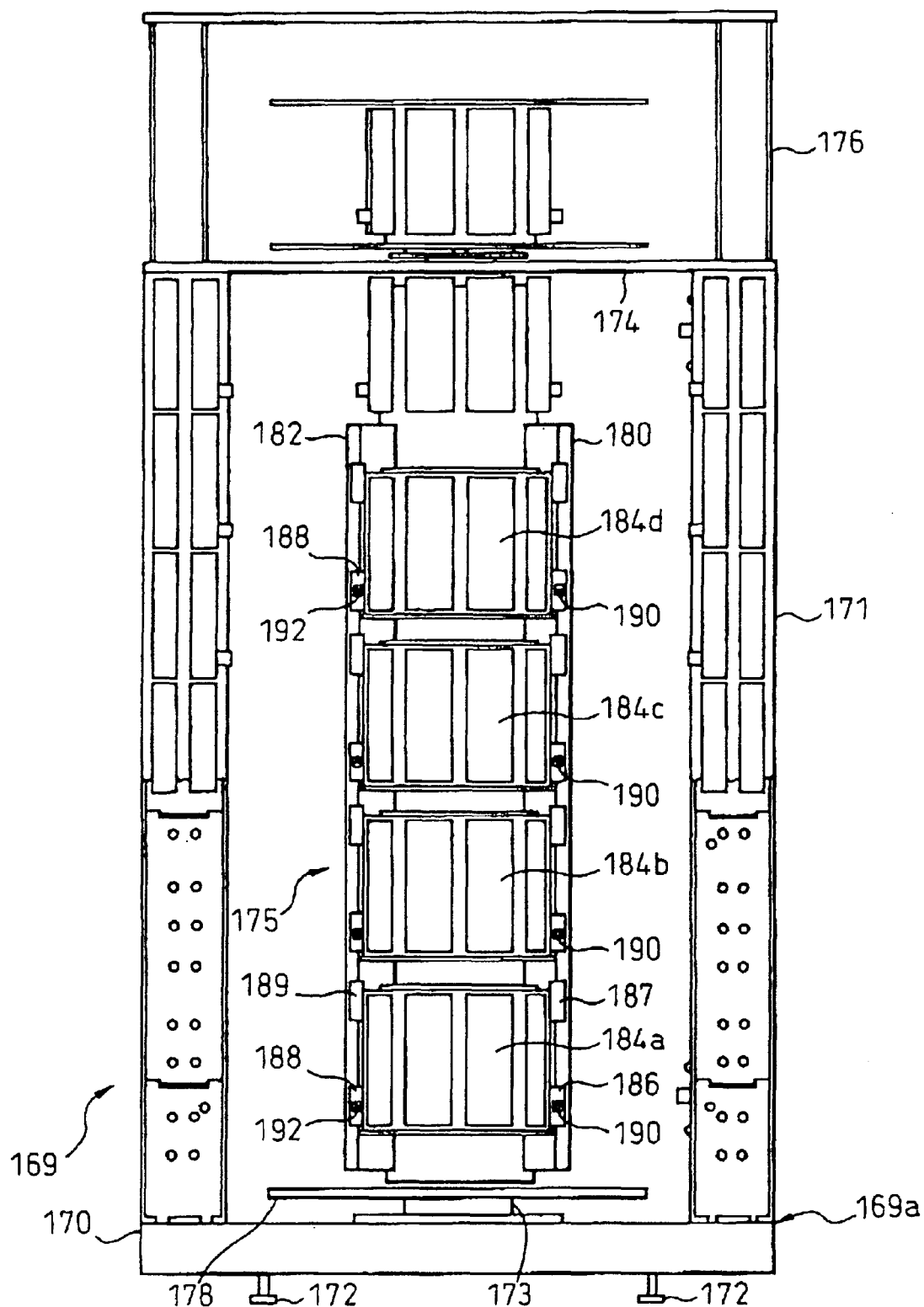
FIG. 29 is a diagram for explaining a configuration of the drum unit using a DEE magazine.

FIG. 29 is a diagram for explaining a configuration of the drum unit used with the DEE magazine. In FIG. 29, the drum unit 169 includes a lower unit 171 and an upper unit 176. The lower unit 171 has a magazine drum 175 rotatably arranged between a ceiling plate 174 and a base 170 supported on pedestals 172. The upper unit 176, on the other hand, has a cell rack rotatable integrally with the magazine drum 175.

The magazine drum 175 has a flange 178. With the rotation of the flange 178 by the drum motor 173, the magazine drum 175 is rotated. The magazine drum 175, like the cell drum 15a described with reference to FIGS. 23 and 24, is formed in a seven-sided polyhedron configured of seven flat plates. FIG. 29 is a front view of the drum unit 169, in which the magazine drum 175 is shown by only one side thereof.

Each flat plate of the magazine drum 175 has mounted thereon frame plates 180, 182. Four-stage magazine racks 184a to 184d are formed between the frame plates 180, 182. The magazine racks 184a to 184d have guide plates 186, 187, 188, 189, respectively, each constituting a magazine loading guide. The guide plates 186, 188 are formed with position-correcting marks 190, 192, respectively.

A decoration plate having a DEE door 64 is arranged on the front of the drum unit 169 in the same manner as the drum unit 10a shown in FIG. 23. With the DEE door 64 open, the magazine 200 is mounted by the operator on the magazine racks 184a to 184d.

Figure 30:
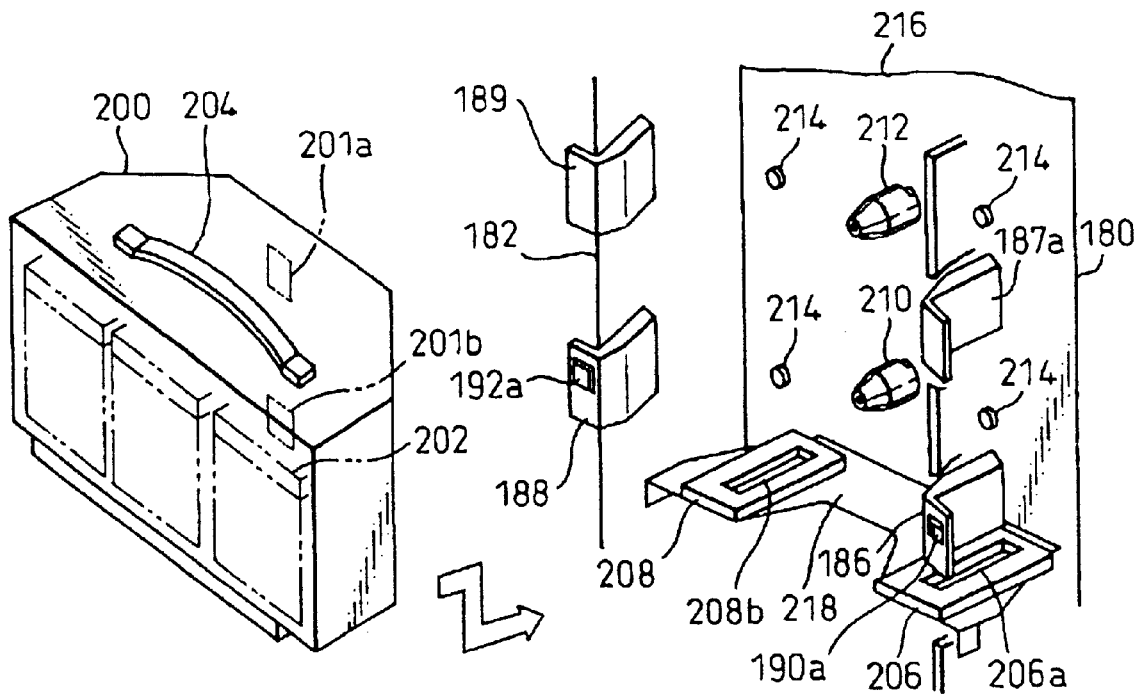
FIG. 30 is a perspective view schematically showing a configuration of a magazine and a magazine rack.
Figure 31A:
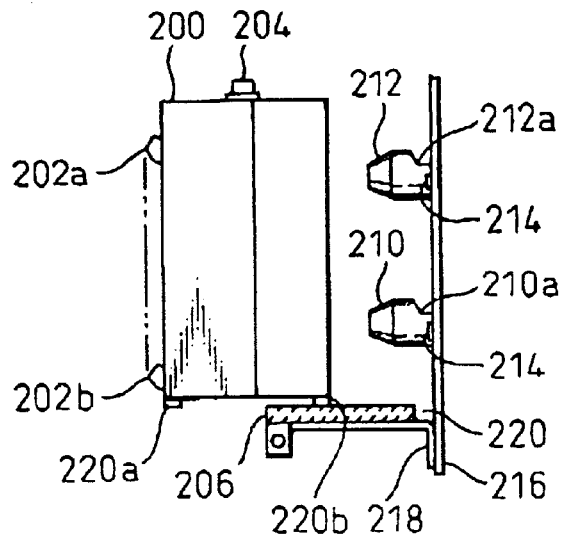
FIG. 31A is a diagram for explaining the operation of mounting a magazine on the magazine rack of the drum unit.
Figure 31B:
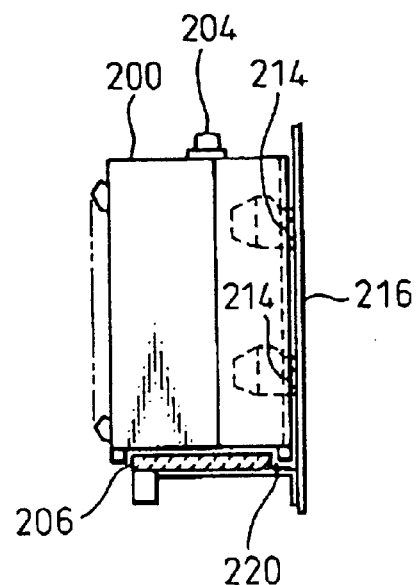
FIG. 31B is a diagram showing the state in which a magazine is mounted on the magazine rack of the drum unit.

FIG. 30 is a perspective view schematically showing a configuration of the magazine and the magazine racks. FIGS. 31A, 31B are diagrams for explaining the operation of mounting a magazine on a magazine rack of the drum unit.

In FIGS. 30, 31A, 31B, the magazine 200 has cells in three rows of six stages. The magazine 200 is capable of loading a total of 18 cartridges 202 at a time into the drum unit 169. The magazine 200 has a handle 204 on the upper surface thereof. Also, the magazine 200 has positioning holes 201a, 201b in the rear surface thereof.

The magazine 200 is loaded on the magazine rack 184a arranged on the frame plates 180, 182 along the guide plates 186, 187, 188, 189. The guide plates 186 to 189 are mounted accurately on the frame plates 180, 182 in such a manner as to assure a predetermined lateral (X) positional relation with respect to a positioning reference point 169a (FIG. 29) of the drum unit 169.

The magazine 200 is placed on magazine mounting plates 206, 208 on the rack plate 218 of the magazine rack 184a. A space 220 is formed as shown in FIG. 31A between the rear end of the plates 206, 208 and the rear plate 216. When the magazine 200 is inserted, the guide protrusion 220b formed in the lower part of the magazine 200 engages the guide grooves 206a, 208a of the magazine mounting plates 206, 208. The magazine 200 is inserted along the guide grooves 206a, 208a. Once the magazine 200 is inserted to the extreme depth of the magazine rack 184a, the guide protrusion 220b in the lower part of the magazine 200 disengages from the guide grooves 206a, 208a, so that the guide protrusion 220b is located in the space 220 into a state as shown in FIG. 31B.

In other words, the positioning holes 201a, 201b of the magazine 200 engage the protrusions 212, 210, respectively, formed on the rear plate 216 constituting the magazine drum 175. The recesses 210a, 212a of the protrusions 210, 212 are mounted on the rear plate 216 in such predetermined relative vertical positions with the reference position 169a at the lower right end of the drum unit 169 shown in FIG. 29.

Further, the magazine 200 is set in position in the depth thereof as the rear surface of the magazine comes into contact with the positioning protrusion 214 formed on the rear plate 216 of the magazine drum 175. The protrusions 214 are mounted on the rear plate 216 in such a manner as to secure predetermined relative positions of the lower right end portion of the drum unit 169 with respect to the reference position 169a along the depth (Z direction).

In this way, the magazine 200 is set in position accurately at a predetermined point of the magazine rack 184a of the magazine drum 175. The point where the magazine 200 is set in position on the magazine rack 184a is coincident with the position where the rotational traces of the cartridge 202 encased in the cell of the magazine 200 is coincident with the rotational traces of the cartridges 52, 53 encased in the cell of the drum unit 10a shown in FIG. 23. In other words, the cells in the magazine 200 form the magazine 200 with reference to the positioning holes 201a, 201b on the rear side of the magazine 200.

As a result, when the magazine 175 is rotated by the drum motor 173 and is set in position in opposed relation to the accessor 14, the cartridges 202a, 202b in the cells of the magazine 200, like the cartridges 52, 53 stored in the cells of the drum unit 10a, can be grasped by the accessor 14.

FIG. 32A is a plan view showing a detailed configuration of the magazine, FIG. 32B a front view and FIG. 32C is a rear view.

In FIGS. 32A to 32C, the magazine 200 includes a carriage handle 204 in the upper part of a metal housing 203. Handles 222, 232 held when inserting the magazine 200 into the magazine rack 184a are arranged in the upper part and the lower part of the front of the housing 203. The handles 222, 232 are fixed on the housing 203 through metal plates 224, 234 such as stainless steel. The housing 203 has an opening 226 for holding the handle 222. Also, the housing 203 is provided with a pair of holes 228 allowing light to pass from a cartridge presence-absence detection light sensor. The holes 228 for detecting the presence or absence of the cartridge in the central line are not required since the holding opening 226 is formed in the housing 203. The surface of the metal plate 224 is used as a magazine presence/absence detecting position 230.

The magazine 200 has a plurality of cells in three rows of six stages for encasing the cartridges. The cells 254 are formed on a left cell rack, two central cell racks 242a, 242b and a right cell rack 244 configured of mold parts made of ABS resin. The cell racks 240, 242a, 242b, 244 are screwed to a metal plate 203a mounted at a position different from the rear plate 203c of the housing 203.

The left cell rack 240 is fixed on the metal plate 203a by a screw 246. The central cell rack 242a is fixed on the metal plate 203a by a screw 248. The central unit 242b is fixed on the metal plate 203a by screws 250. The right unit 244 is fixed on the metal plate 203a by a screw 252.

The metal plate 203a has attached thereto a plurality of bar code labels 256. The bar code labels 256 correspond to the cells 254, respectively.

As a consequence, the magazine 200 having the bar code labels guarantee the operation of detecting the presence or absence of the cartridge even in the case where the bar code reader unit 101 described with reference to FIGS. 23 and 24 is mounted on the drum unit 169.

Also, the use of the magazine 200 permits a great number of cartridges to be loaded collectively in the library apparatus 2. Further, the drum unit 169 using the DEE magazine 200 can be handled in a similar manner to other drum units after the DEE magazine 200 is mounted on the magazine rack 184. Therefore, the cartridge 202 in the DEE magazine 200 mounted on the magazine rack 184 is not always required to be transferred to the cell in other drum units. Furthermore, after cartridges are completely loaded into the cells in another drum unit, the drum unit having the magazine rack 184 carrying the DEE magazine 200 can be handled the same way as other drum units, thereby allowing to an increased number of cartridges to be accommodated therein.

The drum unit 169 may replace the drum unit 10b of the library apparatus 2 shown in FIG. 1. Further, the library apparatus 2 shown in FIG. 1 may be configured of four drum units 10b having only the cell drum 15b, one drum unit 10a shown in FIG. 23, and one drum unit 169. The drum unit configuration can be expanded in various ways as shown in FIG. 2.

Figure 33:
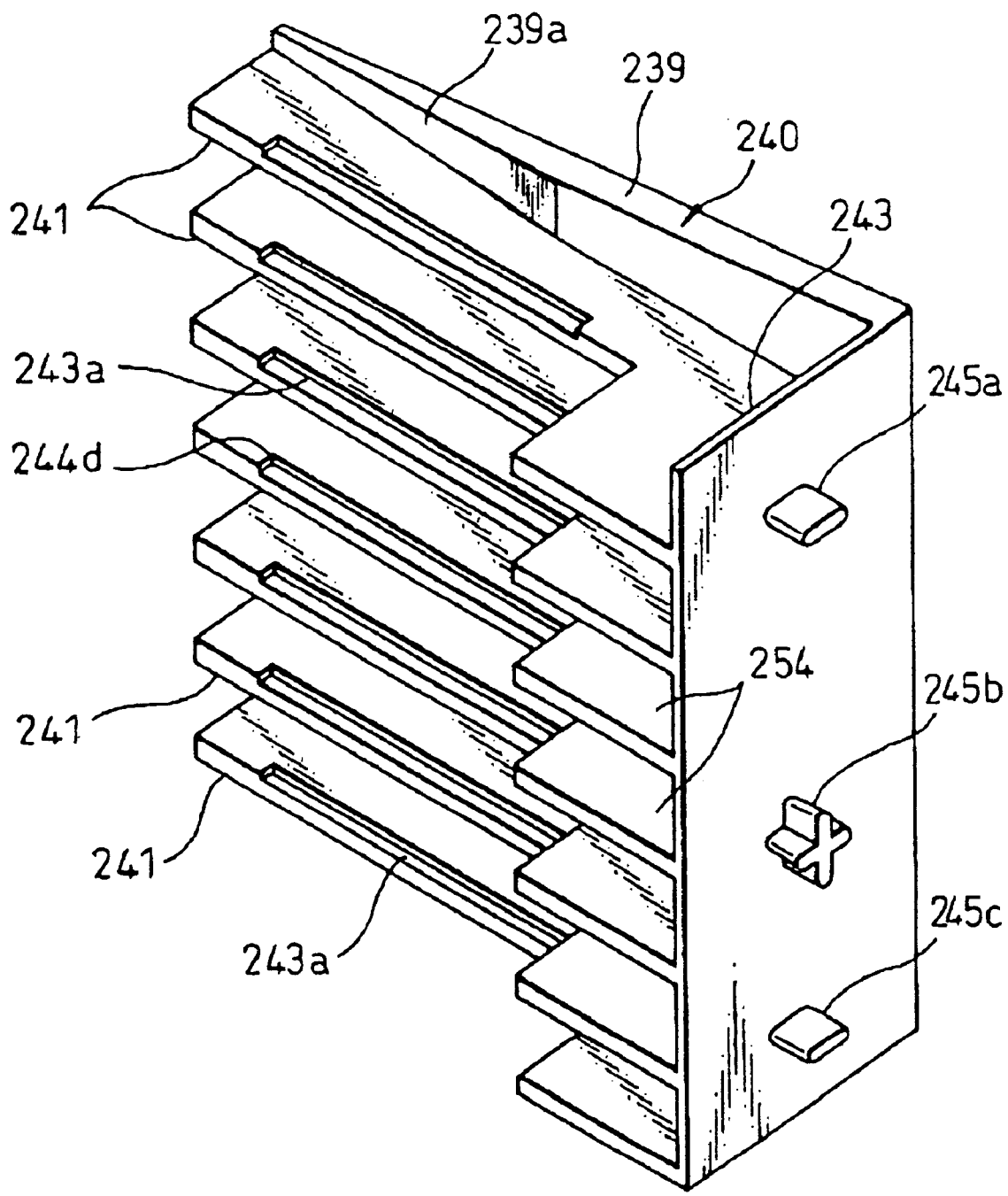
FIG. 33 is a diagram for explaining a left cell unit contained in the magazine.
Figure 34:
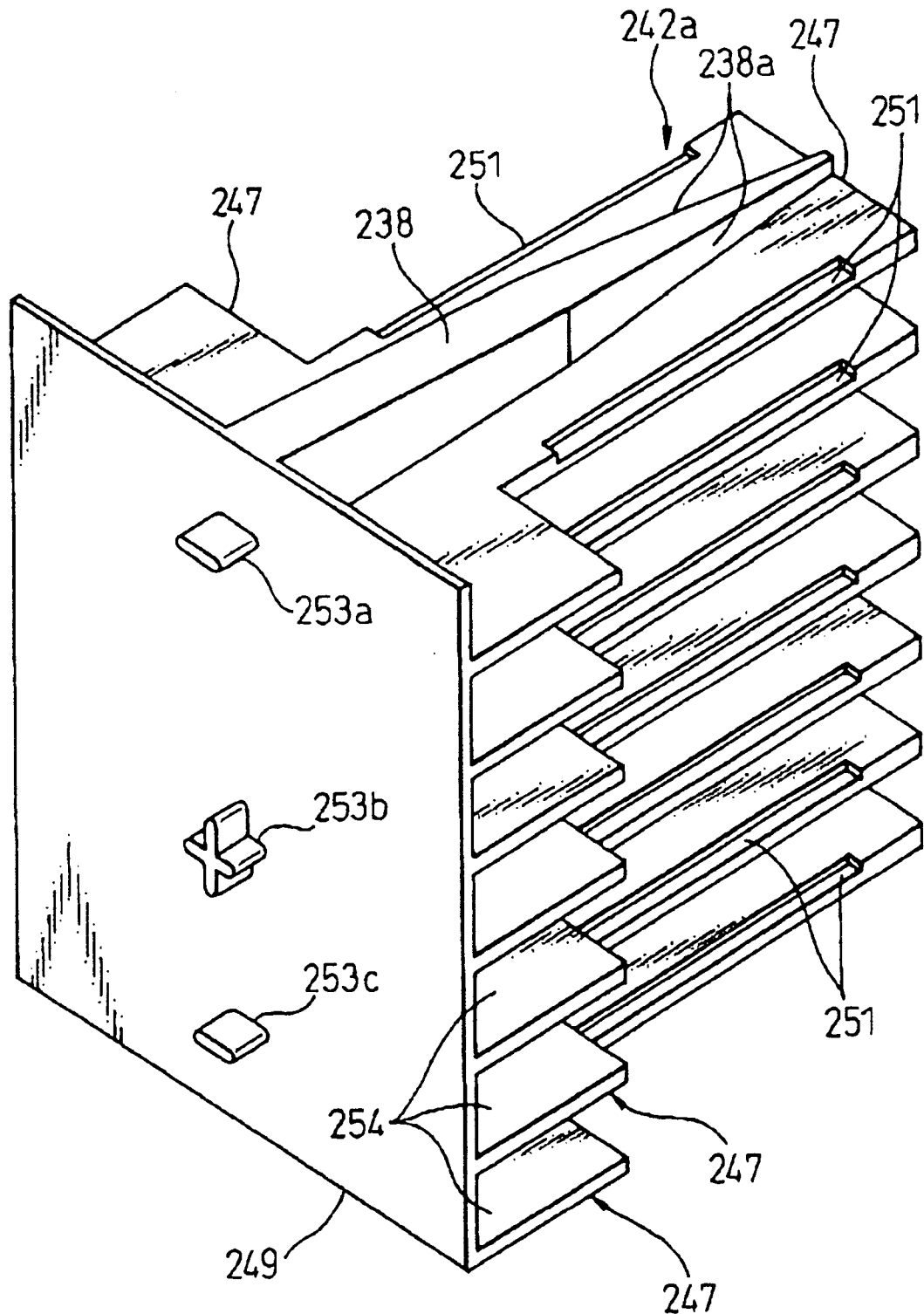
FIG. 34 is a diagram for explaining a central cell unit contained in the magazine.
Figure 35:
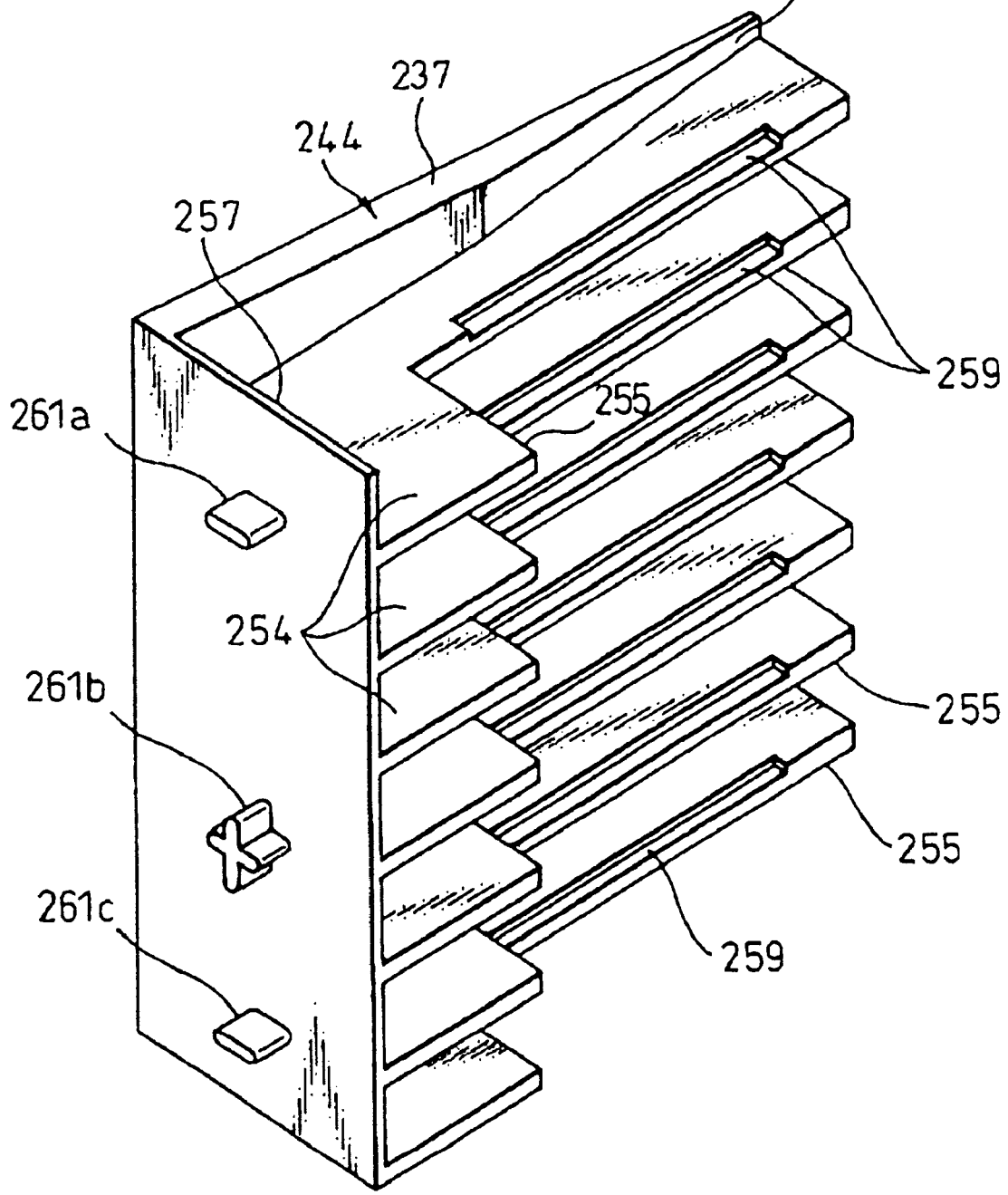
FIG. 35 is a diagram for explaining a right cell unit contained in the magazine.

FIG. 33 is a diagram for explaining the left cell rack 240, FIG. 34 is a diagram for explaining the central cell rack 242, and FIG. 35 is a diagram for explaining the right cell rack 244.

Figure 36:
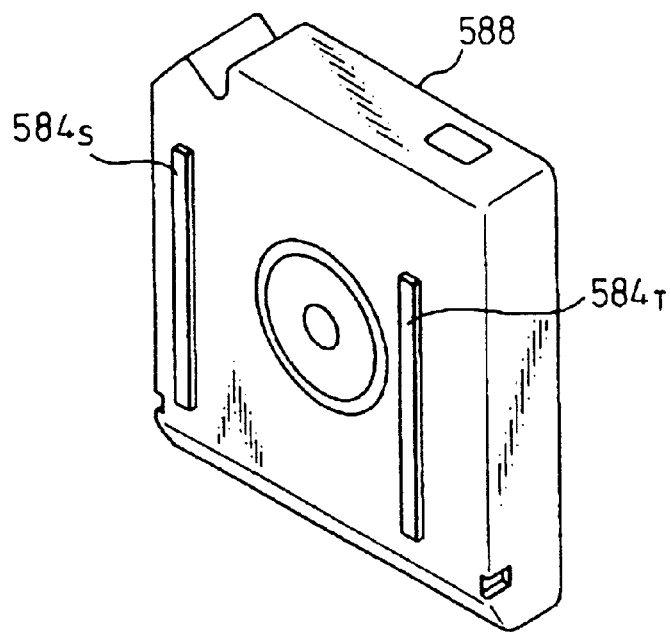
FIG. 36 is a perspective view of a magnetic tape cartridge used with the library apparatus.

In FIG. 33, the left cell rack 240 is molded using ABS resin. The left cell rack 240 includes rack plates 241 for forming the cell 254. Each rack plate 241 is formed to extend diagonally upward from the rear plate 243. The angle at which each rack plate 241 is tilted with respect to the rear plate 243 is 12 degrees. In other words, the tilt angle of the rack plate 241 is 78 degrees. Also, each rack plate 241 includes a step 243a adapted to engage the protrusion 584S formed on the bottom surface of the magnetic tape cartridge 588 of I3480 type shown in FIG. 36. The tilt angle of the rack plate 241 and the step 243a make up a mechanism for preventing the cartridge 588 from jumping out.

The rear plate 243 includes protrusions 245a, 245b, 245c formed on the surface thereof far from the surface thereof formed with the rack plates 241. The protrusion 245a is inserted into the hole 714a-1 of the hole group 714a of the flat plates 54 shown in FIG. 19. Also, the protrusions 245b, 245c are inserted into the holes 714a-2, 714a-3, respectively. In this way, the warping of the left cell rack 240 due to the molding process can be corrected by the fact that the three protrusions 245a to 245c are inserted into the holes 714a-1 to 714a-3 of the rear plate 243 and fixed by screws (not shown) on the flat plates 54. The points where threaded holes are formed in the left cell rack 240 were explained with reference to FIG. 32.

The guide plate 239 arranged on the side of the left cell rack 240 has a predetermined thickness and has the forward end thereof formed with a tapered portion 239a. The tapered portion 239a makes up a guide for inserting the cartridge.

In FIG. 34, the central cell rack 242a (the configuration of which is identical to that of the central central rack 242a and therefore will not be described), like the left cell rack 240, is molded using ABS resin. The central cell rack 242a has a rack plate 247 for forming the cell 254. Each rack plate 247 is formed to extend diagonally upward from the rear plate 249. Each rack plate 247 is tilted at an angle of 12 degrees to the rear plate 249 with respect to the horizontal plane. In other words, the tilt angle of the rack plate 247 from the rear plate 249 is 78 degrees. Also, each rack plate 247 has a step 251 adapted to engage the protrusions 584T, 584T formed on the bottom surface of the magnetic tape cartridge 588 of I3480 type shown in FIG. 36. The tilt angle of each rack plate 247 and the step 251 constitute a mechanism for preventing the cartridge 588 from jumping out.

The rear plate 249 of the central cell rack 242a has protrusion 253a, 253b, 253c on the surface thereof far from the surface thereof formed with the rack plate 241. The protrusions 253a to 253c are inserted into the holes 714b-1 to 714b-3, respectively, of the hole group 714b of the flat plates 54 shown in FIG. 19. The warping of the central cell rack 242a having this configuration due to the molding can be corrected as the three protrusions 253a to 253c are inserted into the holes 714b-1 to 714b-3 and fixed on the flat plates 54 by screws (not shown). The points where the threaded holes of the central cell rack 242 are formed were described with reference to FIG. 32.

The guide plate 238 arranged in the central portion of the central cell rack 242a has a predetermined thickness, and has a forward end thereof having a tapered portion 238a formed on the two sides thereof. The tapered portion 238a constitutes a guide for inserting the cartridge.

In FIG. 35, the right cell rack 244 is molded using the ABS resin. The right cell rack 244 has a plurality of rack plates 255 for forming cells 254 with the central cell rack 242b. Each rack plate 255 is formed to extend diagonally upward from the rear plate 257. Each rack plate 255 is tilted with respect to the rear plate 257 at an angle of 12 degrees to the horizontal plane. In other words, the tilt angle of the rack plates 255 from the rear plate 257 is 78 degrees. Also, each rack plate 255 has a step 259 adapted to engage the protrusion 584T formed on the bottom surface of the magnetic tape cartridge 588 of I3480 type shown in FIG. 36. The tilt angle and the step 259 of the rack plate 255 make up a mechanism for preventing the cartridge 588 from jumping out.

The rear plate 257 includes protrusions 261a, 261b, 261c on the surface thereof far from the side thereof formed with the rack plates 255. The protrusions 261a to 261c are inserted into the holes 714d-1 to 714d-3, respectively, of the hole group 714d of the flat plates 54 shown in FIG. 19. In this way, the warping of the right cell rack 244 due to the molding can be corrected by the three protrusions 261a to 261c of the rear plate 257 inserted into the holes 714d-1 to 714d-3 and by being secured to the flat plates 54 by screws (not shown). The positions of the threaded holes of the right cell rack 244 were already described with reference to FIG. 32.

The guide plate 237 arranged on the side of the right cell rack 244 has a predetermined thickness and has the forward end thereof formed with a tapered portion 237a. The tapered portion 237a provides a guide for inserting the cartridge.

In this way, the left cell rack 240 and the two central cell racks 24a, 242b combined with the right cell rack 244 form cells in three rows of six stages.

The left cell rack 240, the two central cell racks 242a, 242b and the right cell rack 244 are arranged in a plurality of stages along the height of the flat plates 54 and mounted on the flat plates 54. The cell racks 240, 242a, 242b, 244 are each formed with an additional cell for containing the cartridge 588 between them and the cell rack 240, 242a, 242b, 244 arranged above them. The DEE magazine 200 shown in FIG. 32 has mounted a handle 222 thereon, and therefore a cell cannot be formed at the uppermost part. Cells thus are formed in three rows of six stages.

Also, cells can be formed in one row of six stages depending on the combination of the left cell rack 240 and the right cell rack 244. Such a combination is the one used when preparing the fixed cell 680a of the pole 668a of the drum unit 10A.

Further, cells can be formed in two rows of six stages by appropriately combining the left cell rack 240, the right cell rack 244 and one central cell rack 242a.

As described above, in accordance with the number of the central cell racks 242a, 242b arranged between the left cell rack 240 and the right cell rack 244, a multiplicity of cell combinations are realizable. Further, the left cell rack, the right cell rack and the central cell racks can be used for forming cells for the DEE magazine.

Since the left cell rack, the right cell rack and the central cell racks can be shared for forming the DEE magazine, the fixed cell and the cells of the cell drum as described above, parts can be used in multiple ways. Consequently, the parts can be mass-produced for a reduced cell production cost.

FIGS. 37 to 43 are diagrams for explaining a method of coupling the units of the library apparatus 2 according to the present invention.

Figure 37:
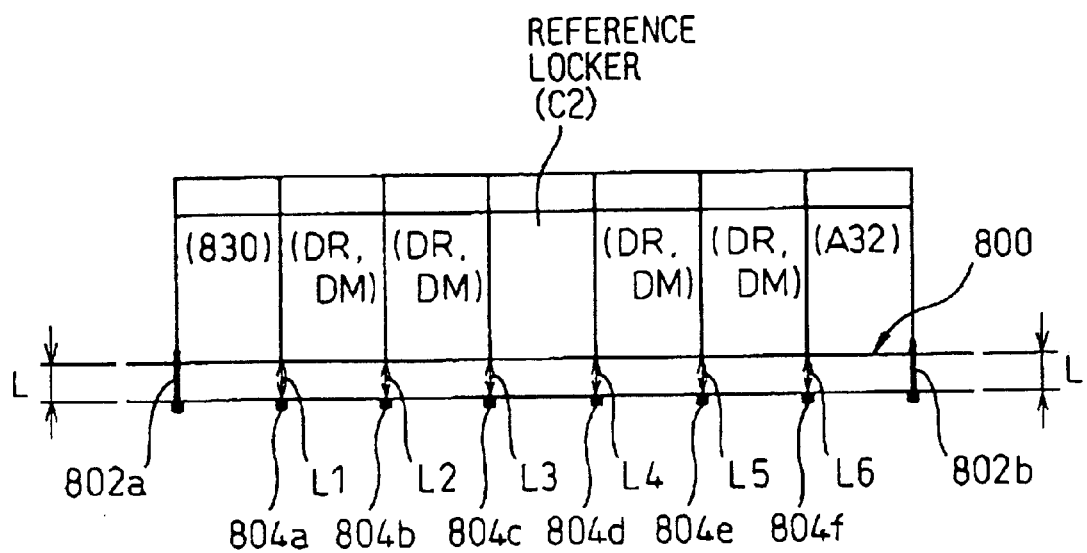
FIG. 37 is a diagram for explaining a method of assembling a library apparatus with reference to the library shown in FIG. 2.

FIG. 37 is a diagram for explaining a method of assembling the library apparatus with reference to the example shown in FIG. 2.

(a) Installation of reference cell unit

In FIG. 37, first, a thread 800 is suspended between a pole 802a and a pole 802b about a place where a reference cell unit 11 providing a reference locker is to be installed on the floor of the room where the library apparatus is to be installed. In FIG. 37, when the thread 800 is suspended over the floor surface, each unit is not yet placed where the library apparatus is to be installed. Instead, each unit is located in a part of the room to contain the library apparatus. Therefore, the layout of the units illustrated in FIG. 37 is still in a virtual stage.

The pole 802a and the pole 802b for supporting the thread 800 are arranged to maintain the thread 800 at a height of L, say, 60 mm, above the floor surface.

Marks 804a to 804f are attached at points where each unit is to be installed on the floor surface. These marks are attached at six points. The distances L1 to L6 between the thread 800 and the floor surface at the marked points 804a to 804f are all measured. The marked point 804d where the reference cell unit 11 is to be installed is selected as a reference point. A correction value is calculated from the measurements. The calculation is made from the formula, "correction value=distance L—(minimum value of distances L1 to L6)". The height under the floor at the marked point 804d of the reference cell unit 11 is calculated according to the formula, "distance L3+correction value".

Figures 38A, 38B:
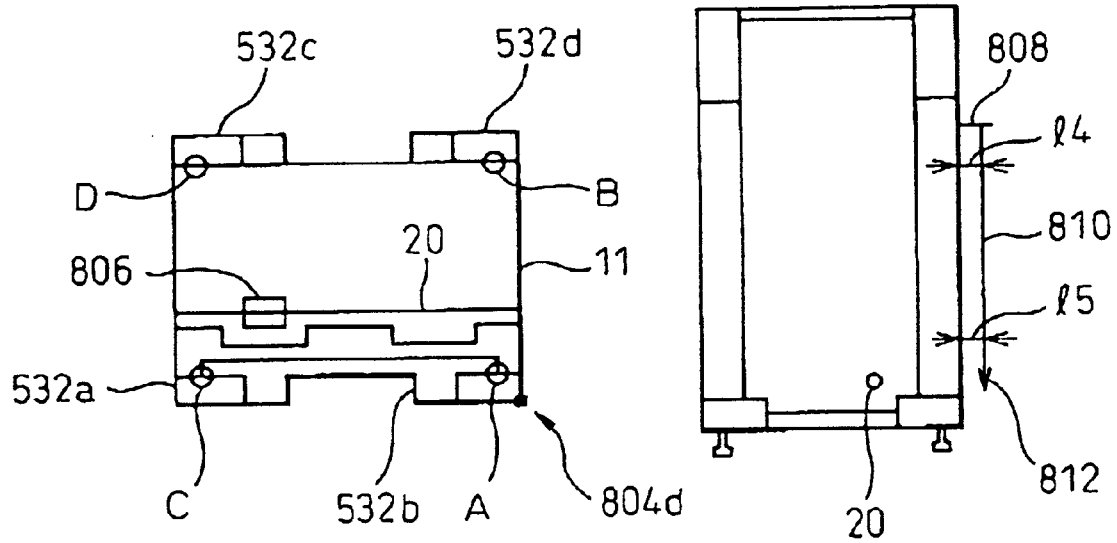

The reference cell unit 11 which is a reference locker is installed in such a manner that the height under the floor at the marked point 804d provides the calculated value. The marked point 804d represents a corner of the reference cell unit 11 where a pedestal A shown in FIG. 38a is installed. The marked point 804d represents a reference point 11a.

After the reference point 11 of the reference cell unit 11 is matched with the mark 804d, the height of the pedestals B to D are adjusted with the pedestal A fixed. The height of the pedestals B to D are adjusted using a level 806 arranged on an X rail 20 and a verticality measuring instrument including a thread 810 and a weight 812 suspended from a fitting 808 of the reference cell unit 11 shown in FIG. 38b.

(b) Coupling passage unit to reference cell unit

Figure 39:
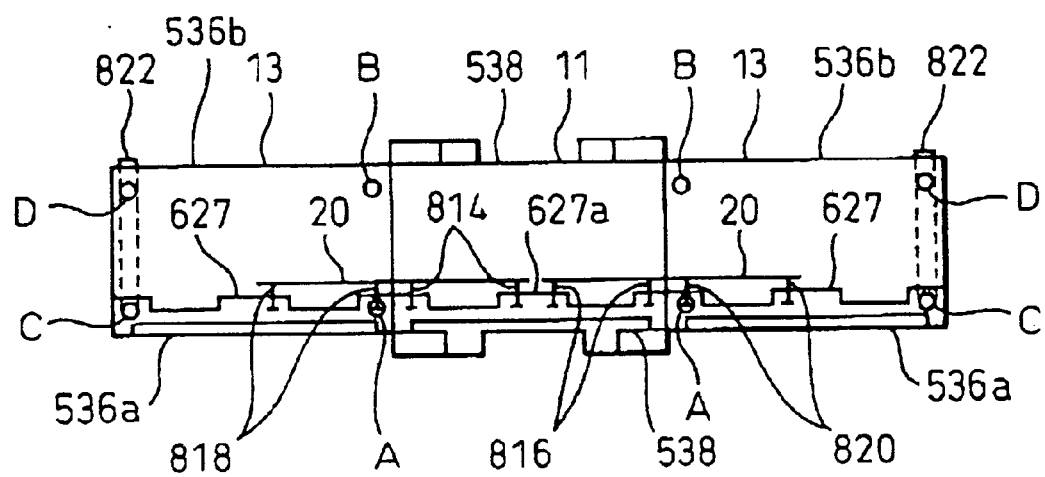
FIG. 39 is a diagram for explaining a method of coupling the passage unit to the reference cell unit.

First, the reference cell unit 11 is configured in the same way as the passage unit 13, and has built therein signal cables and connectors for transmitting power, a power sequence control signal and a drum control signal. As shown in FIG. 39, the connector of the reference cell unit 11 is coupled to the connector of the passage unit 13.

After that, with the reference cell unit 11 as a base, the passage units 13 are coupled on the two sides thereof. The height of the pedestals A and C of the passage unit 12 are adjusted in such a manner that the upper end surfaces of the side plates 536a, 536b of the passage unit 13 are flush with the upper end surface of the face plate 538 of the reference cell unit 11. Next, the height of the pedestals C and D are adjusted in such a manner that the horizontality of the level (not shown) placed on the X rail 20 is within tolerance. Further, the pedestals B and D are adjusted.

Further, jigs 822 are suspended between a rail support member 627 arranged on the passage unit 13 and the upper end surface of the side plate 536b. The jigs 822 are prepared in such a manner that the upper surface of each jig 822 becomes horizontal when the rail support member 627 of the passage unit 13 and the upper end surface of the side plate 536b are both horizontal. The height of the pedestals B, C and D are adjusted with the height of the pedestal A fixed in such a manner that the horizontality of the levels placed on the jigs 822 are within tolerance.

After coupling the X rail 20 of the passage unit 13 to the rail support member of the X rail 20 arranged on the reference cell unit 11, the X rail 20 is fixed on the rail support member by screws. The structure of the rail support member 627a of the reference cell unit 11 is identical to that of the rail support member 627 of the passage unit 13. The X rail 20 is fixed by screws 814 to the rail support member 627a of the reference cell unit 11. The X rail 20 is also fixed by screws 816. The X rail 20 is fixed by screws 818 to the rail support member 627 of the passage unit 13b. The X rail 20 is fixed by screws 820 to the rail support member 627 of the passage unit 13b.

The reference cell unit 11 and the passage unit 13 are set to the same height using the side plate 536a of the passage unit 13. The invention is not limited, however, to such a method. The upper surfaces of the rail support members, for example, may be set to the same height. Further, the upper surface of the rack support member for supporting the rack coupled with the pinion of the X motor 42 can be set to the same height with equal effect.

Furthermore, the passage unit 13 is coupled by repeating processes similar to those mentioned above in accordance with the number of the drum units coupled to the library apparatus 2. In the library apparatus 2 shown in FIGS. 2 and 37, eight drum units are coupled, and therefore two passage units 13 are connected on each side of the reference cell unit 11.

(c) Coupling accessor unit to passage unit

Figure 40A:
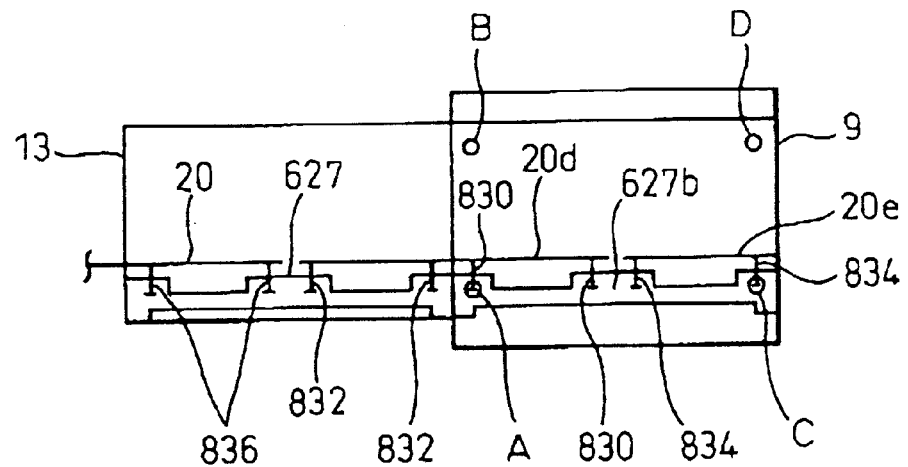
FIG. 40A is a diagram for explaining a method of coupling an accessor unit to the passage unit.

First, as shown in FIG. 40A, the accessor unit 9 is arranged adjacently to the passage unit 13. The pedestals A and C of the accessor unit 9 are adjusted in height in such a way that the upper surface of the rail support member 627b of the accessor unit 9 is flush with the rail support member 627 of the passage unit 13. With the level placed on the X rail 20, the pedestals C and D are adjusted in height in such a manner that the horizontality of the level is within the tolerance. Further, the height of the pedestals B, C and D are adjusted in such a manner that the verticality is within the tolerance with the pedestal A fixed while watching the verticality measuring instrument including a thread and a weight mounted on the pole 35a (FIG. 6) of the accessor unit 9.

After complete adjustment of the height of the pedestals A to D, the X rail 20d of the accessor unit 9 is displaced. The X rail 20d is fixed by screws 832 to the rail support member 627 of the passage unit 20d. Then, the X rail 20d is fixed by screws 834 to the rail support member 627b of the accessor unit 9. After that, the X rail 20e half as long is fixed by screws 834 to the rail support member 627b of the accessor unit 9. The X rail 20 is already fixed by screws 836 to the passage unit 13.

The accessor unit 7 is mounted on the passage unit 13 in the same way as described above.

(d) Coupling drum units to passage unit

The drum units 10A, 10B described with reference to FIG. 17 are delivered from the factory with the lower unit 652a and the upper unit 684a separated from each other. The lower unit 652a and the upper unit 684a are coupled to each other in the room where the library apparatus 2 is installed. In this coupling work, the forward end 728a of the shaft 728 arranged above the rotary drum 700 of the lower unit 652a is inserted into the hole 724z of the lower plate 724 of the rotary drum 702 of the upper unit 684a shown in FIGS. 19 and 21, and the shaft 742 arranged at the forward end of the arm 738a of the coupling arm 738 fixed on the shaft 728 is inserted into the hole 724a.

Figure 40B:
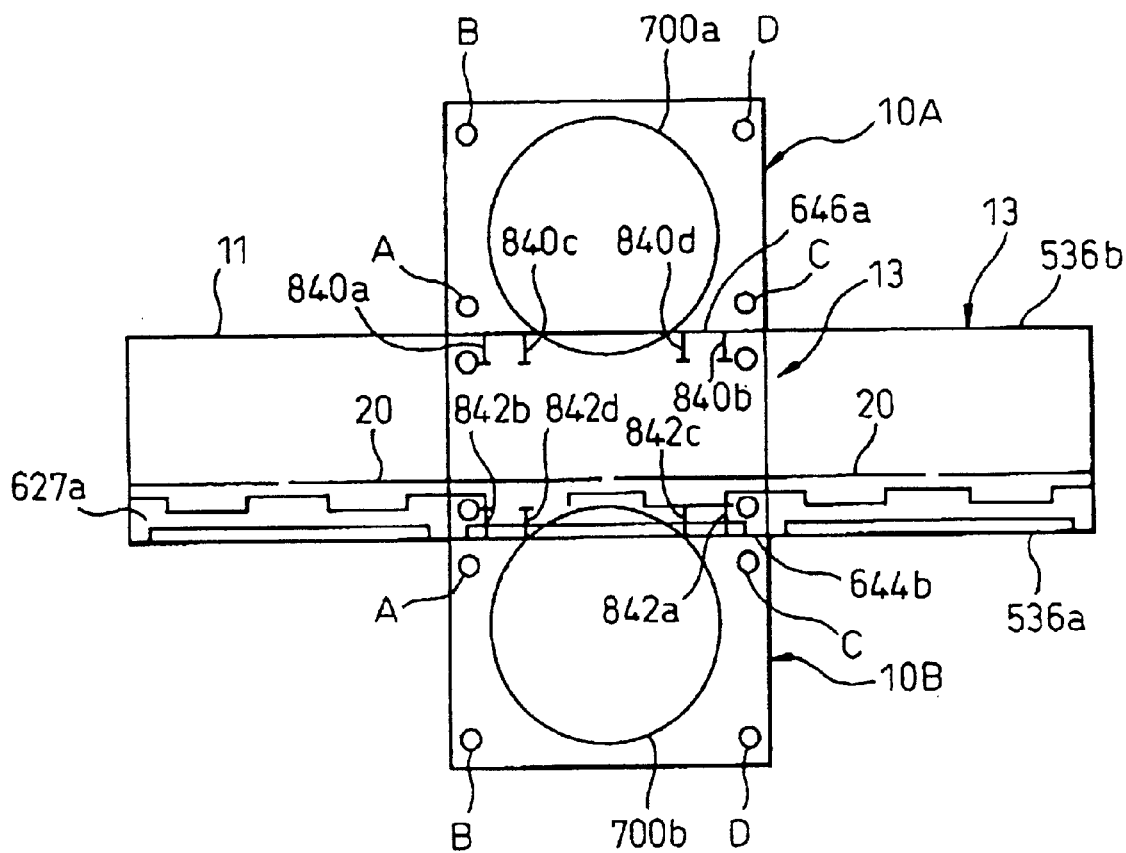
FIG. 40B is a diagram for explaining a method of coupling the drum unit to the passage unit.

After that, as shown in FIG. 40B, the drum units 10A, 10B are arranged adjacently to the side plates 536a, 536b of the passage unit 13. The reference surfaces 646a, 646b for the entire surface of the drum units 10A, 10B are coupled to the side plates 536a, 536b. Further, the upper surfaces of the reference surfaces 646a, 646b are set to the height of the upper end of the side plates 536a, 536b. This height adjustment is performed by use of the pedestals A and C. The drum units 10A, 10B are fixed on the passage unit 13 by bolts 840a, 840bb and bolts 842a, 842b. The longitudinal tilt is adjusted by use of the pedestals B and D and the verticality measuring instrument including a thread and a weight suspended from the ceiling plate 655a of the drum units 10A, 10B. Then, using the pedestals C, D or the pedestals A, B, the lateral tilt of the drum units 10A, 10B is adjusted. After complete adjustment, the drum units 10A, 10B are fixed on the passage unit 13 by the bolts 840a to 840d and bolts 842a to 842d.

The drum units 10A, 10B are coupled to the passage unit 13 one by one.

(e) Coupling upper unit of drum unit

Figure 41:
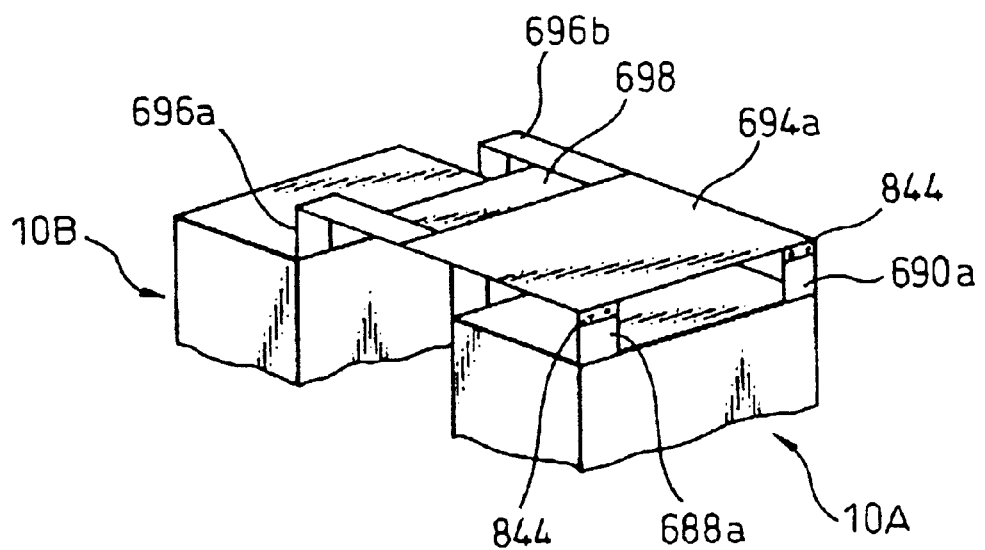
FIG. 41 is a diagram for explaining a method of coupling two drum units.

As shown in FIG. 41, the drum units 10A, 10B are are coupled to each other by the coupling bars 696a, 696b, and then the upper plate 698 is fixedly screwed. After that, the cover 694a is fixed on the poles 688a, 690a by screws 844.

(f) Mounting upper rail

Figure 42:
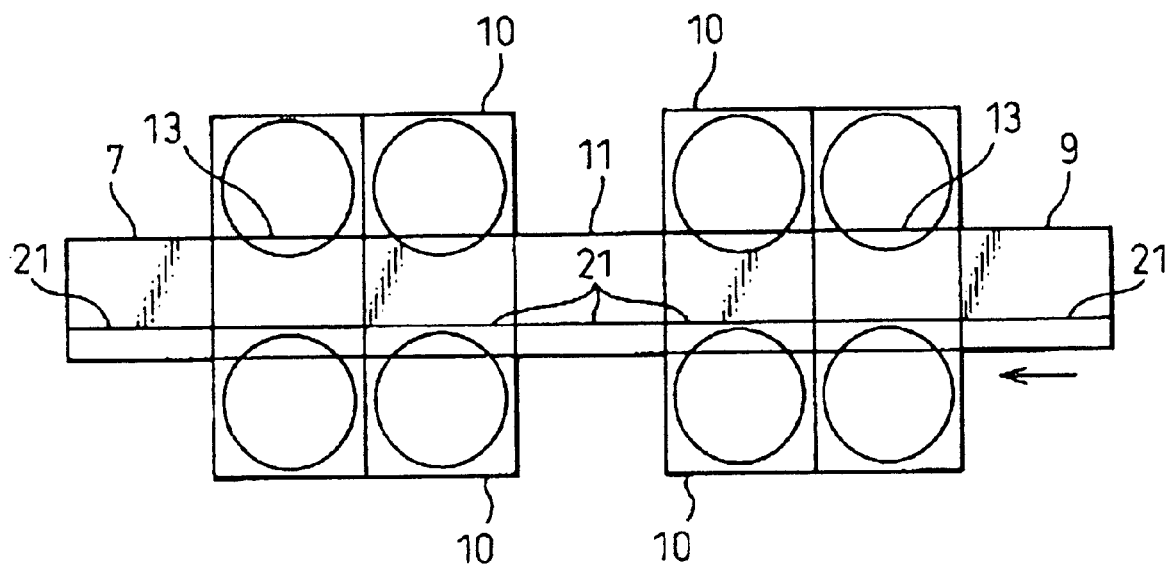
FIG. 42 is a diagram for explaining a method of mounting a top rail.

As shown in FIG. 42, the upper rail 21 is mounted on each unit sequentially starting with the accessor unit 9. (g) Coupling drive unit.

As described with reference to FIGS. 8 and 9 above, the manual mount cell 554 of the tape drive unit 540 of the drive unit 12 is replaced by the accessor mount cell 556. The drive unit 12 then is fixed on the reference cell unit 11 by screws 546.

(h) Coupling connector

Finally, as described above with reference to FIGS. 14 to 18, the connectors 636, 638 of the passage unit 13 are coupled to the connectors 660a, 660b of the drum unit 10.

The assembly work described above completes the assembly of the library apparatus 2.

In this way, the library apparatus 2 is assembled in units, and therefore, can be assembled within a short time after being delivered to the installation site. Also, as the parts are transported in units, a library apparatus for containing a large number of cartridges can be easily delivered into the installation room.

Furthermore, the fact that the upper unit is coupled makes it possible to increase the number of cartridges to be accomodated in the height direction.

Also, selective arrangement of a drum unit or the like having a DEE magazine is possible, thereby greatly improving the freedom with which a system of the library apparatus 2 can be configured.

Figure 43:
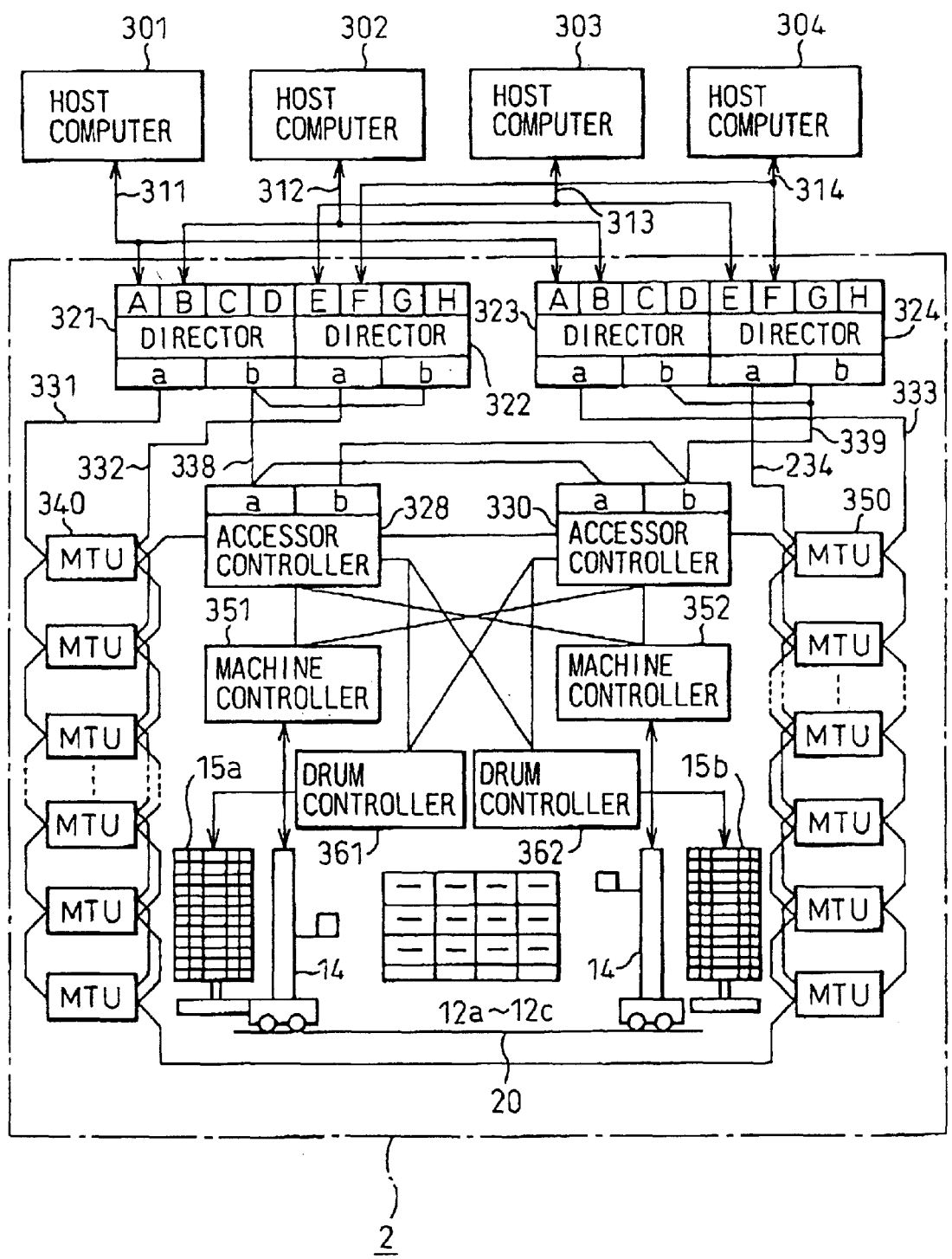
FIG. 43 is a diagram showing an example hardware configuration of the library apparatus.

FIG. 43 is a diagram showing an example of a hardware configuration of the library apparatus 2. In the example shown in FIG. 43, the library apparatus 2 is connected with four host computers 301 to 304. The host computers 301 to 304 are connected to the library apparatus 2 through channel interfaces 311 to 314, respectively.

The channel interfaces 311 to 314 are, for example, block multiplexer channel interfaces or SCSI interfaces. The library apparatus 2 comprises, for example, four directors 321 to 324. The directors 321, 323 have channels A, B, C, D. The directors, 322, 324, on the other hand, have channels E, F, G, H.

The channel A of the directors 321, 323 is connected to the channel interface bus 311 from the host computer 301, while the channel B is connected with the channel interface bus 312 from the host computer 302. Also, the channel E of the directors 322, 324 is connected with the channel interface bus 313 from the host computer 303, while the channel F is connected with the channel interface bus 314 from the host computer 304. The channels C, D of the directors 321, 323 and the channels G, H of the directors 322, 324 are not used.

The terminals of the directors 321 to 324 have two channels a, b. The channel a is for recording/reproduction units, and the channel b is for accessor control. The directors 321, 322 share eight recording/reproduction units 340 connected in common through the device buses 331, 332 from the channel a. Consequently, the directors 321, 322 can make write or read access to the recording/reproduction units 340 through the channel a. The eight recording/reproduction units 340 are arranged in the drive units 12a, 12c.

The directors 323, 324 share the eight recording/reproduction units 350 connected in common through the device buses 333, 334 from channel a. As a result, the directors 323, 324 can make write or read address to the recording/reproduction units 350 through channel a. The eight recording/reproduction units 350 are arranged in the drive units 12b, 12d.

The device interface bus 238-1 connected to the channel b of the directors 321, 322 is connected to the channel a of the accessor controller 328. Also, the deice interface bus 338 led out from the channel b of the directors 323, 324 is connected to the channel b of the accessor controller 328.

The accessor controller 330 is a spare unit. The device interface bus 338 connected to the channel b of the directors 321, 322 is connected to the channel a, and the device interface bus 339 connected to the channel b of the directors 323, 324 is connected to the channel b.

The accessor controllers 328, 330 receive and execute an instruction from any one of the directors 321 to 324. The accessor controller 328 includes, as underlying units thereof, machine controllers 351, 352 for controlling the accessor 14 of the accessor unit 7 and the accessor 14 of the accessor unit 9. Further, the underlying units of the accessor controller 328 include drum controllers 361, 352 for controlling the cell drums 15a, 15b of the drum units 10a, 169 or the like. The accessor controllers 328, 330, the machine controllers 351, 352 and the drum controllers 361, 362 are arranged in the accessor units 7, 9.

In FIG. 43, the cell drums are represented by the two cell drums 15a, 15b for facilitating understanding.

The machine controllers 351, 352 and the drum controllers 361, 362 are connected in common also to the accessor controller 330.

The host computers 301 to 304 each designate a logic serial number address in response to a request generated by an input/output unit to the library apparatus 2 for the execution of a job, and issues a move command functioning as an input/output start instruction from the locally assigned channel to the directors 321, 322. Upon receipt of a normal response to the move command from the directors, the host computer transfers data bytes (command parameter) as medium-transportation information.

The data bytes include a source address and a destination address of the cartridge, and are stored in the queuing table of the accessor controller 328. The accessor controller 328, upon recognition of the vacant state of the accessor 14 of the accessor units 7, 9, retrieves the source address and the destination address of the move command from the queuing table, and instructs the machine controllers 351, 352 to move the accessor 14 appropriately. Also, the drum controllers 361, 362 are instructed to rotate the cell drums 15a, 15b as required.

In this case, the accessor controller 328 refers to a conversion table using the cell addresses of the source and destination retrieved from the queuing table, converts them into the cell drum rotation angle θ and the access coordinate position (X, Y), instructs the cell drum to rotate by the rotational angle of θ and instructs the accessor to move to the coordinate position (X, Y).

Figure 44:
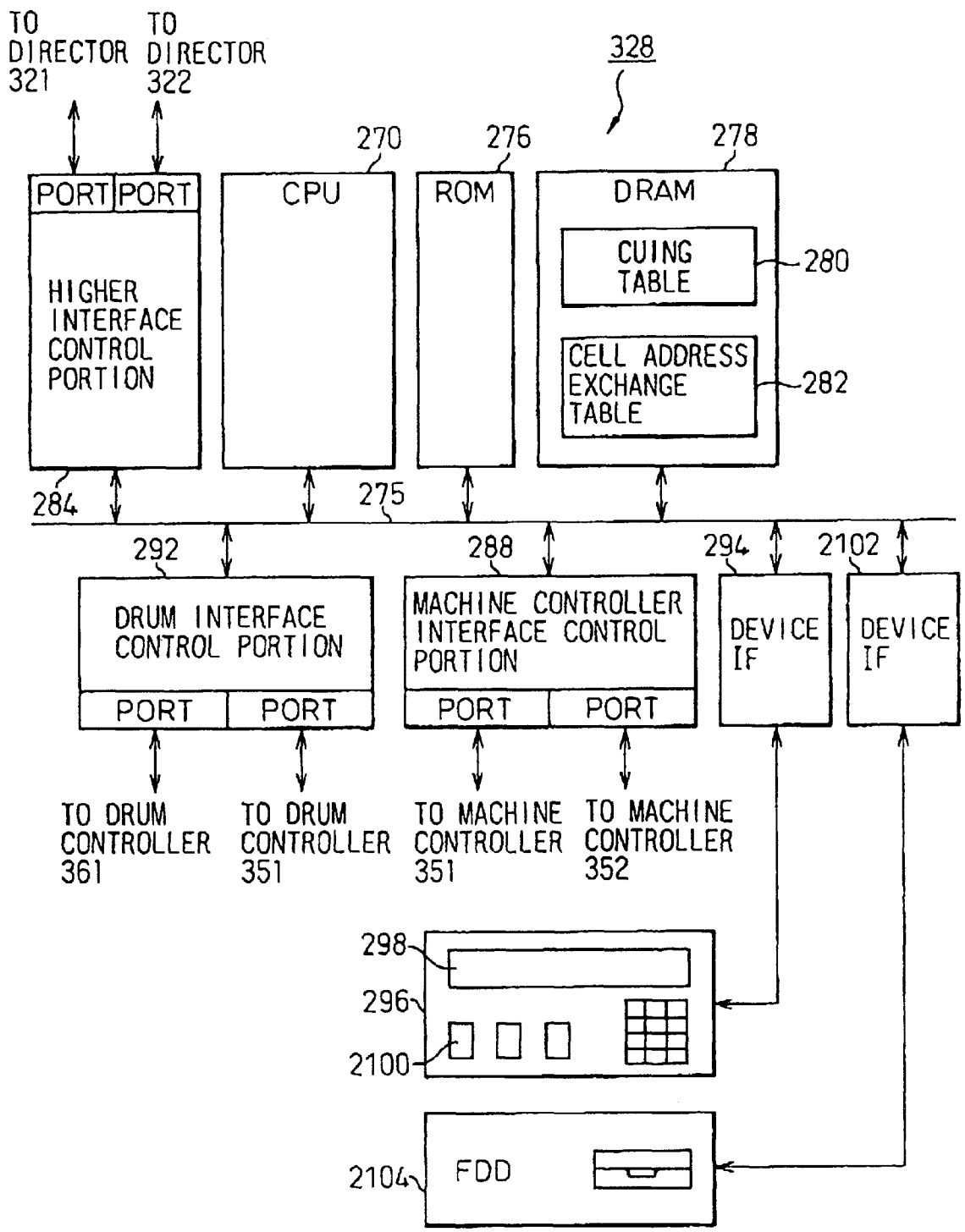
FIG. 44 is a diagram showing an example hardware configuration of an accessor controller.

FIG. 44 is a diagram showing an example of a hardware configuration of the accessor controller 328.

In FIG. 44, a CPU 270 is connected through a bus 275 to a ROM 276, a DRAM 278, a host interface controller 284, a machine controller interface control unit 288, a drum interface control unit 292 and device interface control units 294, 2102. The CPU 270 executes the control operation on the basis of the program stored in the ROM 276. The DRAM 278 includes a queuing table 280 and a cell address conversion table 282. The queuing table 280 stores the move command received from the host computer through the directors. The cell address conversion table 282 stores the coordinate (X, Y) of the accessor destination and the drum rotational angle θ with the cell address as an entry.

Also, a CE panel 296 having a display unit 298 and a floppy disk select switch 2100 and a floppy disk unit 2104 are connected to the CPU 270 through the interface control units 294 and 2102.

Figure 45:
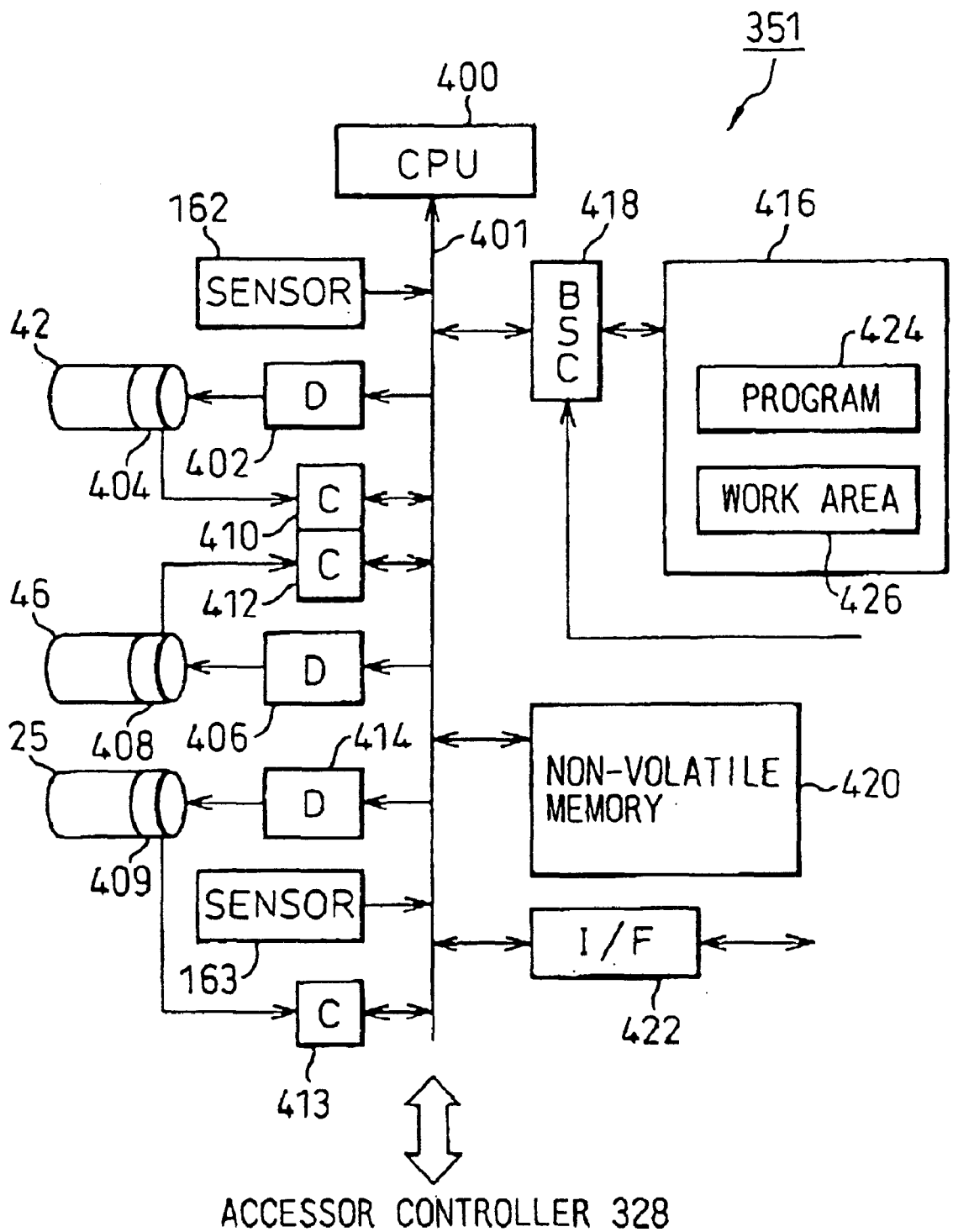
FIG. 45 is a diagram showing an example hardware configuration of a machine controller.

FIG. 45 is a diagram showing an example of a hardware configuration of the machine controller 351.

In FIG. 45, the CPU 400 is connected through a common bus 401 to a RAM 416 having a program storage area 424 and a work area 426, and a nonvolatile memory 420. The RAM 416 is connected in common to the accessor controller 328 through a bus switching circuit 418. The program storage area 424 of the RAM 416 is installed with an operation control program from a floppy disk unit 2104 of the accessor controller 328 through the bus switching circuit 418. The accessor controller 328 is connected to the bus switching circuit 418 by a signal line for outputting a bus switching signal and by a signal line for outputting data and addresses.

The CPU 400 is connected through an interface section 422 to the interface section 156 of the drum controller. The CPU 400 exchanges information with the CPU 150 through the interface section 422 and the interface section 156. Also, the interface section 422 is connected to the port 288A of the machine controller interface control unit 288 of the accessor controller 328.

The CPU 400 is supplied with a detection output of a reflection-type photoelectric sensor 162 arranged at the forward end of the hand assembly 16. The CPU 400 is connected to drivers 402, 406, 414 for driving an X-axis motor 42, a Y-axis motor 46 and a θ rotational motor 25, respectively, of the accessor 14. The CPU 400 can read the value from a counter 410 for counting the output of an encoder 404 mounted on the X-axis motor 42, a counter 12 for counting the output of an encoder 408 mounted on the Y-axis motor 46, and a counter 413 for counting the output of an encoder 409 mounted on the θ rotational motor 25. The CPU 400 are also connected to the counters 410, 412, 413 in resettable manner.

Now, an explanation will be given about the operation for correcting the position of the accessor 14 providing a carriage.

Figure 46A:
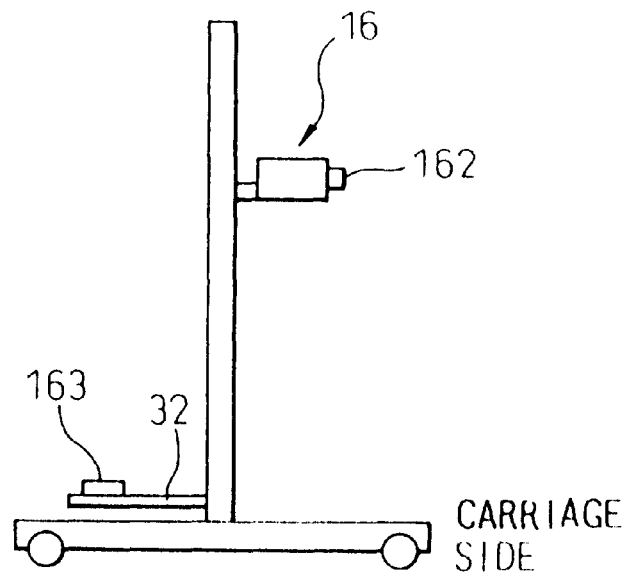
FIG. 46A is a diagram for explaining a sensor arranged in the accessor.
Figure 46B:
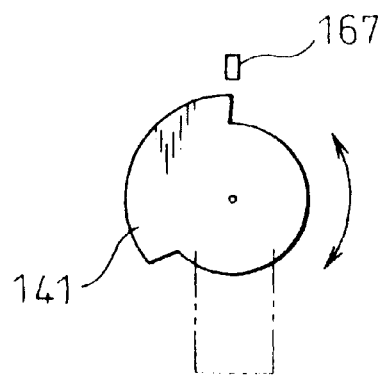
FIG. 46B is a partly enlarged view for explaining a sensor and a sensor flag arranged in the accessor.

FIGS. 46A, 46B are diagrams for explaining the sensors arranged on the accessor 14. FIG. 46A shows a sensor 162 mounted on the hand assembly 16 and a sensor 163 mounted on the rail base 32 for detecting the position along the X direction. FIG. 46B, on the other hand, illustrates a sensor 167 for detecting the position of the base 27 with respect to the base 24 of the hand assembly 16.

The accessor 14 is set in position along the X direction with reference to a position flag 165 arranged in the accessor unit 9 for indicating the origin. The origin flag 165 is detected by the sensor 163. There is a case, however, in which the distance between the mounting position of the sensor 163 on the rail base 32 and the center holding position of the hand of the hand assembly 16 fails to conform with a specification. As a result, even when the X-axis motor 42 is driven with reference to the output of the sensor 163, the holding center of the hand may be displaced along X direction. Also, the hand assembly 16 reciprocates in Y direction along the vertical column 18. In the case where the vertical column 18 is mounted at an angle to the rail base 32, however, not only the lower portion and the upper portion of the vertical column 18 are displaced from each other along Y direction, but the positions thereof are displaced in X direction. Further, in the event that the position of the sensor 167 is displaced from the detection point of the sensor flag 141 in rotational direction, the hand unit 130 undesirably holds the cartridge in a diagonal manner. This displacement would make it impossible to hold the cartridge accurately in the cell or to force the cartridge into the cell or the accessor mount cell. For this reason, in the case where the accessor 14 is used without correcting these displacements, the cell pitches cannot be reduced thereby making it difficult to increase the cartridge-holding capacity of the library apparatus 2.

Figure 47:
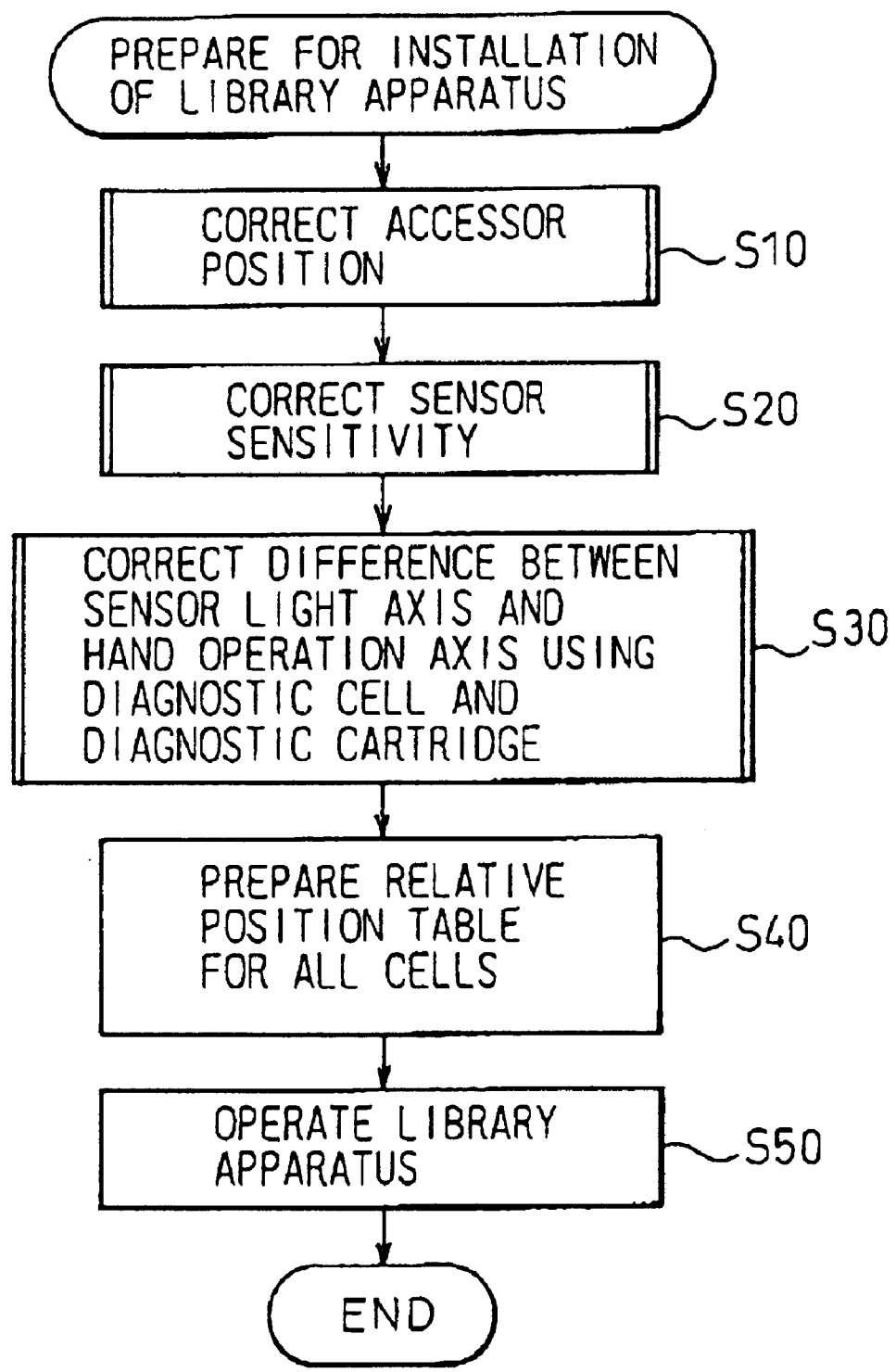
FIG. 47 is a flowchart showing the preparation steps required for installation of the library apparatus according to the invention.
Figure 48:
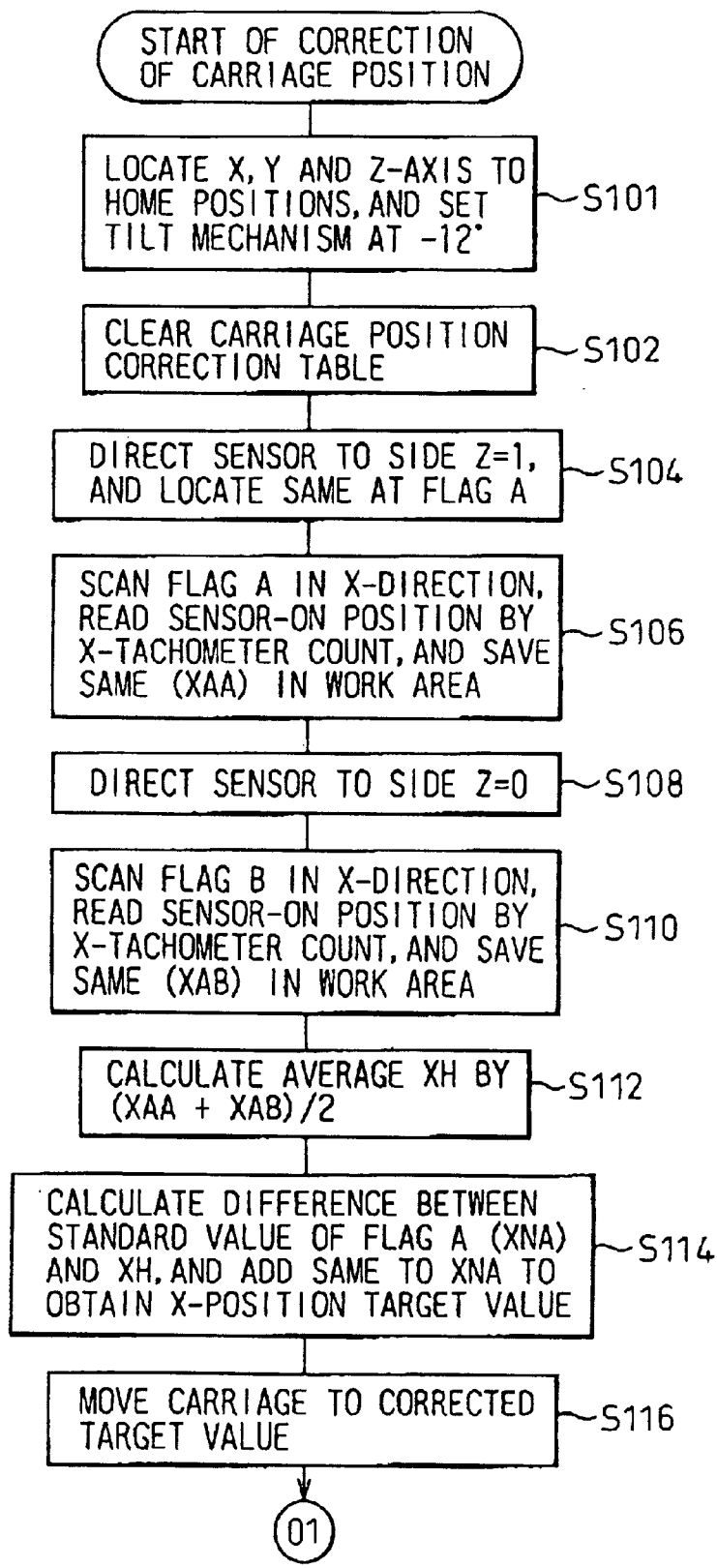
FIG. 48 is a part of a flowchart for explaining the operation of correcting the position of the accessor.
Figure 49:
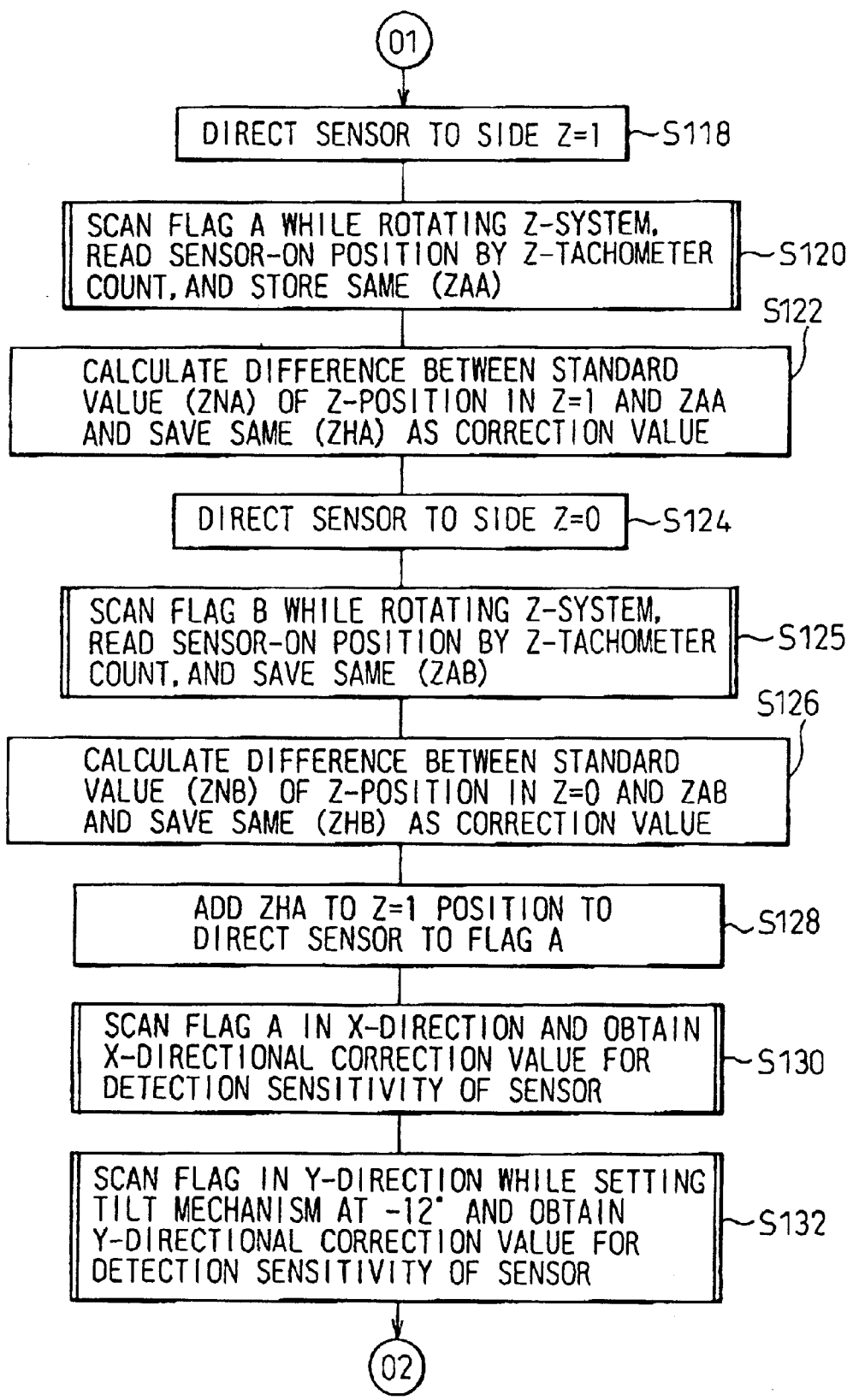
FIG. 49 is a part of a flowchart for explaining the operation of correcting the position of the accessor.
Figure 50:
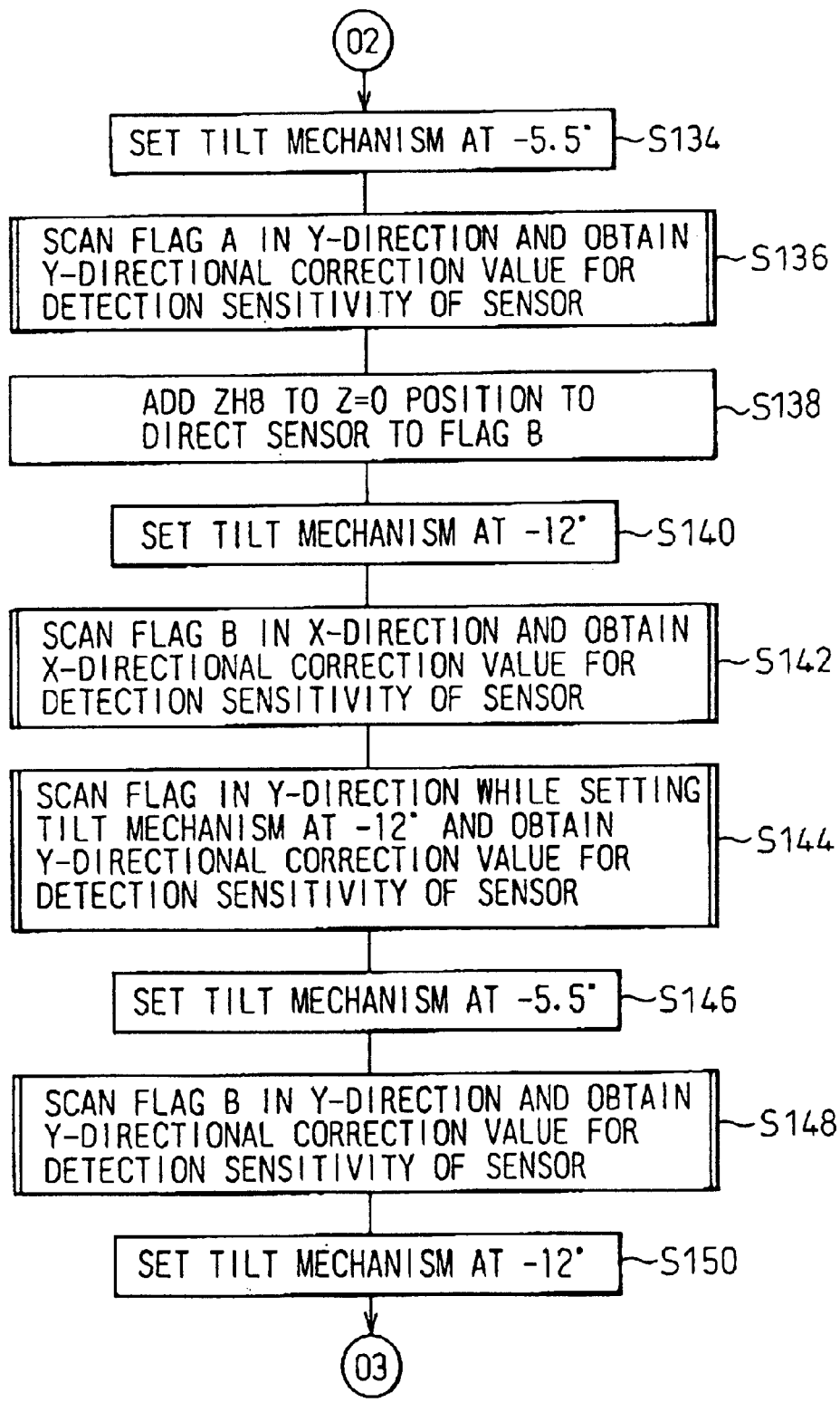
FIG. 50 is a part of a flowchart for explaining the operation of correcting the position of the accessor.
Figure 51:
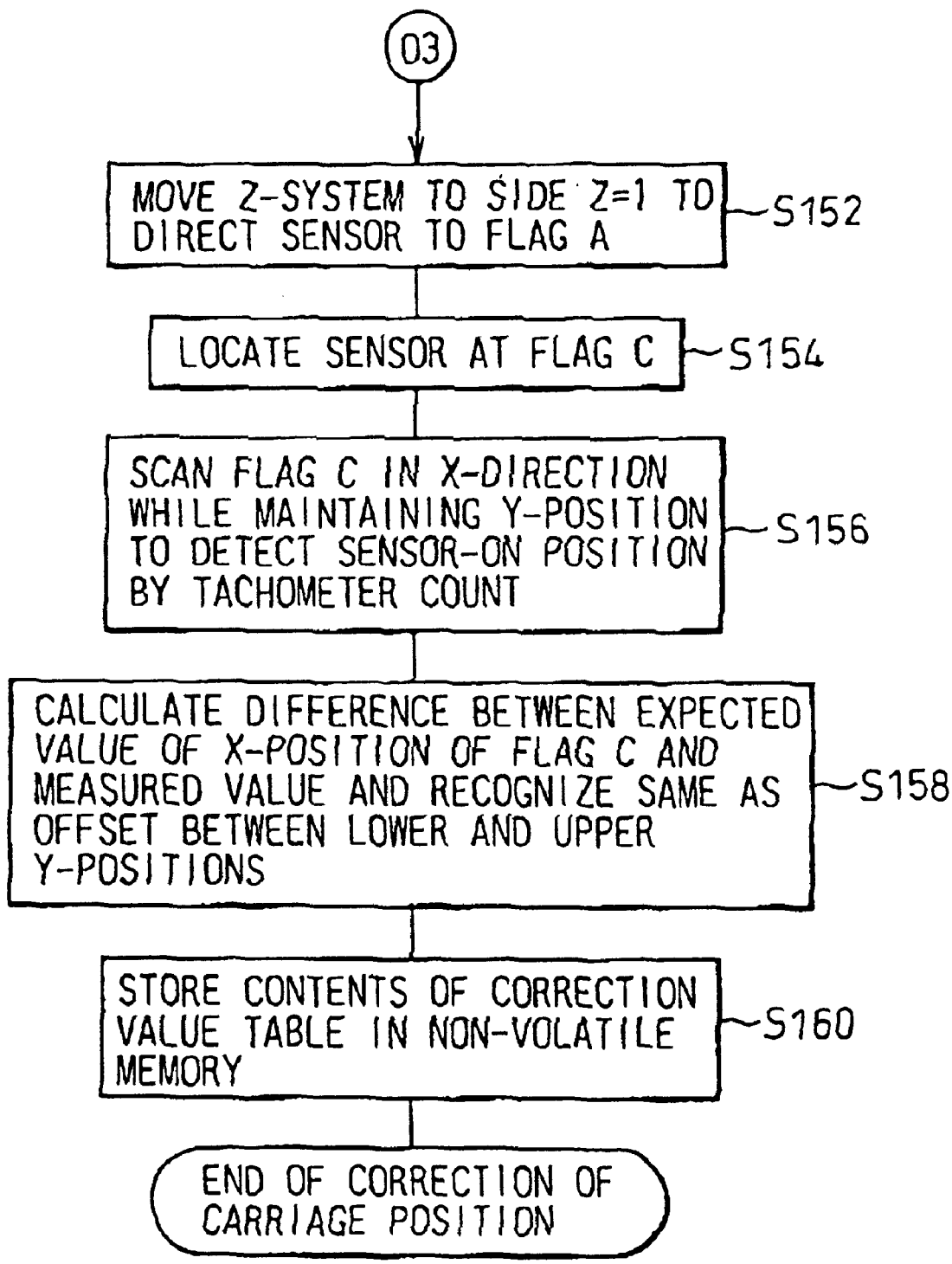
FIG. 51 is a part of a flowchart for explaining the operation of correcting the position of the accessor.
Figure 53A:
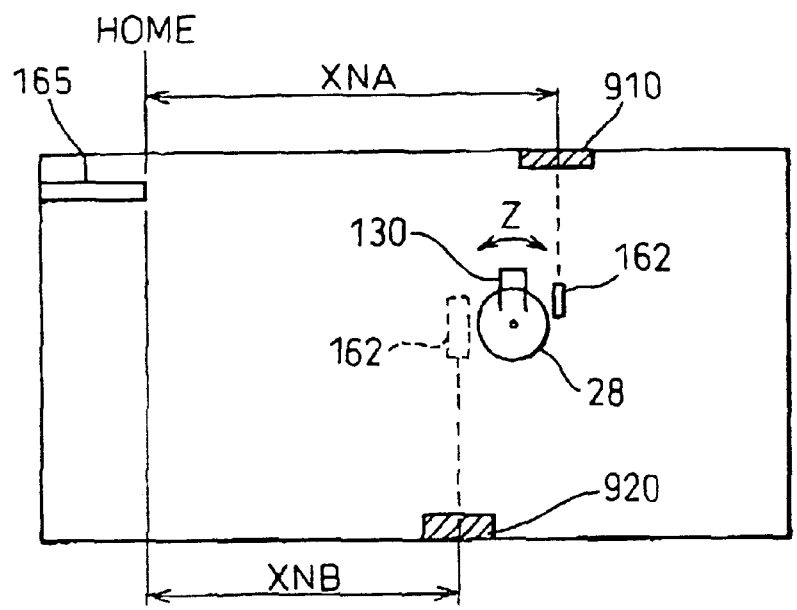
FIG. 53A is a plan view for explaining the operation of correcting the position of the accessor.
Figure 53B:
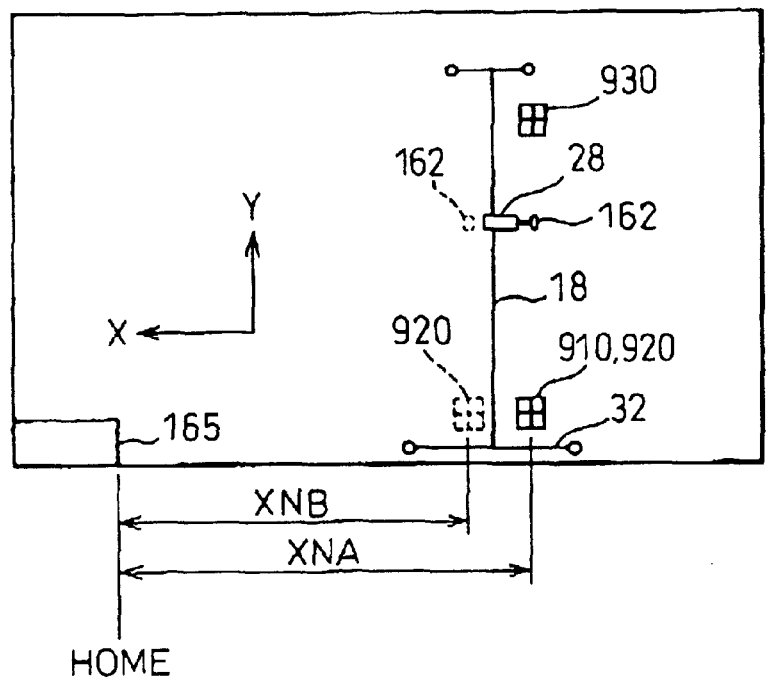
FIG. 53B is a side view or explaining the operation of correcting the position of the accessor.
Figure 54:
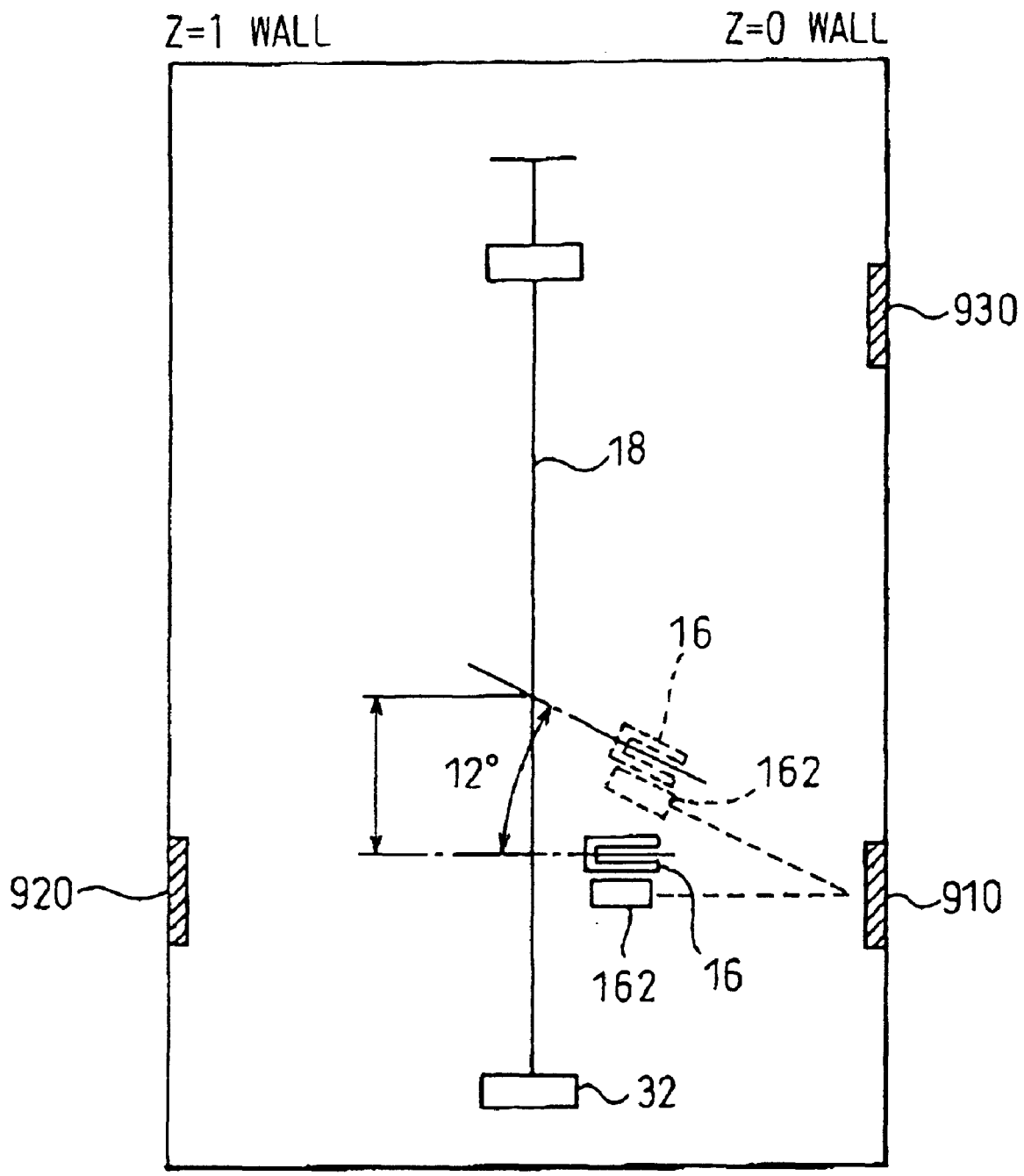
FIG. 54 is side view for explaining the operation of correcting the position of the accessor.

FIG. 47 is a flowchart indicating the process for making preparations for installation of the library apparatus 2 configured as described above.

The library apparatus 2, after being assembled, has the accessor 14 thereof corrected in position as shown in step S10. Then, as shown in step S20, the sensitivity of the photoelectric sensor 162 in the accessor 14 is corrected. Further, as shown in step S30, the light axis of the sensor 162 and the operation axis of the hand are corrected using a diagnostic cell and a diagnostic cartridge (shown later in the drawings).

After execution of this correction, as shown in step S40, a relative position table is prepared showing the correction value of the accessor 14 for all the cells, followed by starting the operation of the library apparatus 2 as shown in step S50.

Now, an explanation will be given about the operation of correcting the position of the accessor 14, the operation of sensitivity correction and the correction of the light axis of the sensor 162 and the axis of the hand operation.

FIGS. 48 to 51 are operation flowcharts for explaining the operation of correcting the position of the accessor 14 providing a carriage. The operation flowcharts are explained together with the diagrams of FIG. 46 and FIGS. 52 to 54 for explaining the operation of correcting the position of the accessor.

In FIG. 52, the origin flag 165 is accurately mounted on the accessor unit 9. The rail base 32 of the accessor unit 9 includes a photoelectric sensor 163 for detecting the origin flag 165. Further, a photoelectric sensor 162 is shown mounted on the base 28 of the accessor 14. Also, the accessor unit 9 includes position correcting flags 910, 920, 930 fixed accurately to assure the same detected position of a specific cell in the drum unit.

(1) Steps S101 to S102: The CPU 400 moves the X axis, Y axis and Z axis to the home positions, respectively, in step S101. Specifically, the CPU 400 drives the X-axis motor 42 through the motor driver 402 and moves it to a position where the photoelectric sensor 163 can detect the edge of the origin flag 165. Further, the CPU 400 drives the Y-axis motor 46 through the motor driver 406 and moves the hand assembly 16 to a height where the photoelectric sensor 162 can detect the position correcting flags 910, 920. The CPU 400 drives the motor 25 in order for the photoelectric sensor 167 to be located at a position where it can detect the origin of the sensor flag 141. The origin of the sensor flag 141 is set at a position different from the position where the position correcting flag 910 or 920 is in a squarely opposed relation to the sensor 162. The base 28 of the hand assembly 16 is rotated with respect to the base 27, and the tilt angle of the hand assembly 16 is set to −12 degrees. The CPU 400 clears the contents of the carriage position correction table in step S102. Also, the values in the counters 410, 412, 413 are reset.

(2) Steps S104 to S106: The CPU 400 first drives the motor 25 in order for the sensor 162 to be in opposed relation to the position correcting flag 910 (flag A). The base 27 then is located at such an angle that the sensor 162 is estimated to be in opposed relation to the position correcting flag 910. Also, the CPU 400 drives the X-axis motor 42. In other words, the CPU 400 drives the X-axis motor 42 only by a standard value XNA. This standard value is given as a distance from the origin flag 165. The rail base 32 then is located at a X-direction position where the sensor 162 is estimated to be in opposed relation to the position correcting flag 910. Under this condition, the CPU 400 reciprocates the motor 42 alone. The light axis of the sensor 162 is thus reciprocally scanned along the X direction over the position correcting flag 910. When the detection output of the sensor 162 turns on during the reciprocal scanning of the light axis of the sensor 162, the CPU 400 reads the value of the counter 410. The CPU 400 then stores the value in the work area 426 of the memory 416. The value stored in the work area 426 by the CPU 400 is an actual measurement XAA shown in FIG. 52.

(3) Steps S108 to S110: The CPU 400 drives the motor 25 in order for the sensor 162 to be in an opposed relation to the position correcting flag 920 (flag B). The base 27 is then located at a tilt angle where the sensor 162 is estimated to be in an opposed relation to the position correcting flag 920. Under this condition, the CPU 400 reciprocally drives only the motor 42. The light axis of the sensor 162 is reciprocally scanned along the X direction over the position correcting flag 920. When the detection output of the sensor 162 turns on during the reciprocal scanning of the light axis of the sensor 162, the CPU 400 reads the value of the counter 410. The CPU 400 then stores the value in the work area 426 of the memory 416. The value stored in the work area 426 by the CPU 400 is an actual measurement XNB shown in FIG. 53a.

(4) Steps S112 to S116: The CPU 400 determines an average value XH of the actual measurement XNA and the actual measurement XNB. Then, the difference between the standard value XNA and the average value XH is determined. The difference value is added to the standard value XNA. The result of addition is set as a new X target value. The CPU 400 drives the X-axis motor 42 and locates it at the new X target value. In this way, the position corrected value along the X direction is determined. The position corrected value along the X direction is stored in the correction value table in the work area 426.

(5) Steps S118 to S122: The CPU 400 drives the motor 25 in order for the sensor 162 to be in opposed relation to the position correcting flag 910. The base 27 is located at a tilt angle at which the sensor 162 is estimated to be in opposed relation to the position correcting flag 910. In other words, the CPU 400 drives the motor 25 by the standard value ZNA. This standard value ZNA is given as the angle rotated from the time when the sensor 167 detects the sensor flag 141. After that, the CPU 400 reciprocates the motor 25 alone. The light axis of the sensor 162 reciprocally scans the position correcting flag 910 in X direction. When the detection output of the sensor 162 turns on during the reciprocal scanning of the light axis of the sensor 162, the CPU 400 reads the value of the counter 413. The CPU 400 then stores the actual measurement ZAA in the work area 426 of the memory 416. Further, the CPU 400 determines the difference between the standard value ZNA and the actual measurement ZAA, and stores it as a correction value ZHA in the work area 426. In this way, the correction value for the Z position in the plane carrying the position correction flag 910 is determined. The first correction value in Z direction is stored in the correction value table in the work area.

(6) Steps S124 to S126: The CPU 400 drives the motor 25 in order for the sensor 162 to be in opposed relation to the position correcting flag 920. The base 27 is located at a title angle where the sensor 162 is estimated to be in opposed relation to the position correcting flag 920. In other words, the CPU 400 drives the motor 25 by the standard value ZNB. After that, the CPU 400 reciprocates the motor 25 alone. The light axis of the sensor 162 reciprocally scans the position correction flag 920 in X direction. At the time point when the detection output of the sensor 162 turns on during the reciprocal scanning of the light axis of the sensor 162, the CPU 400 reads the value of the counter 413. The CPU 400 then stores the actual measurement ZAB in the work area 426 of the memory 416. Further, the CPU 400 determines the difference between the standard value ZNB and the actual measurement ZAB, and stores it as a correction value ZHB in the work area 426. In this way, the correction value of Z position in the plane carrying the position correcting flag 930 is determined. This second correction value for Z direction is stored in the correction value table in the work area.

(7) Step S128: The CPU 400 adds the standard value ZNA and the correction value ZHA and calculates a new target value. The CPU 400 then locates the sensor 162 to the position correcting flag 910 on the basis of the new target value.

(8) Steps S130 to S136: Next the CPU 400 determines the correction value of the detection sensitivity of the X- and Y-direction sensors 162 with the tilt angle of the hand assembly 16 at −12 degrees. Further, the CPU 400 determines the correction value of the detection sensitivity of the Y-direction sensor 162 with the tilt angle of the hand assembly 16 at −5.5 degrees. A method for determining the correction of the detection sensitivities is described later. The sensor 162 has the light axis thereof coincident with the horizontal surface when the hand assembly 16 is in opposed relation to the position correcting flag 910 at a tilt angle of −12 degrees. Consequently, in the case where the tilt angle of the hand assembly is −5.5 degrees, the light axis of the sensor 162 is displaced from the horizontal surface and therefore the detection sensitivity must be corrected.

(9) Step S138: The CPU 400 adds the correction value ZHB to the standard value ZNB and calculates a new target value. The CPU 400 then locates the sensor 162 to the position correcting flag 920 on the basis of the new target value.

(10) Steps S140 to S150: Next, the CPU 400 returns the tilt angle of the hand assembly 16 to −12 degrees. The CPU

400 then determines the correction value of the detection sensitivity of the X-direction sensor 162. Further, the CPU 400 sets the tilt angle of the hand assembly 16 to –5.5 degrees. The CPU 400 then determines the correction value of the detection sensitivity of the Y-direction sensor 162 at this tilt angle. A method for determining the correction of these sensitivities will be described later. After determining the correction value of the detection sensitivity, the CPU 400 returns the tilt angle to –12 degrees.

(11) Steps S152 to S158: The CPU 400 detects the tilt angle of the vertical column 18 and determines a correction value. First, the CPU 400 locates the sensor 162 at a position in opposed relation to the position correcting flag 910. Then, the CPU 400 locates the sensor 162 to the position correcting flag 930. The CPU 400 causes the sensor 162 to reciprocally scan the position correcting flag 930 along X direction while holding the Y position. At a time point when the detection output of the sensor 162 turns on during the reciprocal scanning of the light axis of the sensor 162, the CPU 400 reads the value of the counter 410. The CPU 400 then determines the difference between an expected value and an actual measurement of the X-direction position of the position correcting flag 930, and recognizes the difference as a displacement between the upper position and the lower position in the Y direction. This difference is stored in the correction value table in the work area 426.

(12) Step S160: The CPU 400 stores the value from the correction table in the nonvolatile memory 420, thereby completing the position measuring operation.

Now, the operation of correcting the sensor sensitivity will be explained.

Figure 55:
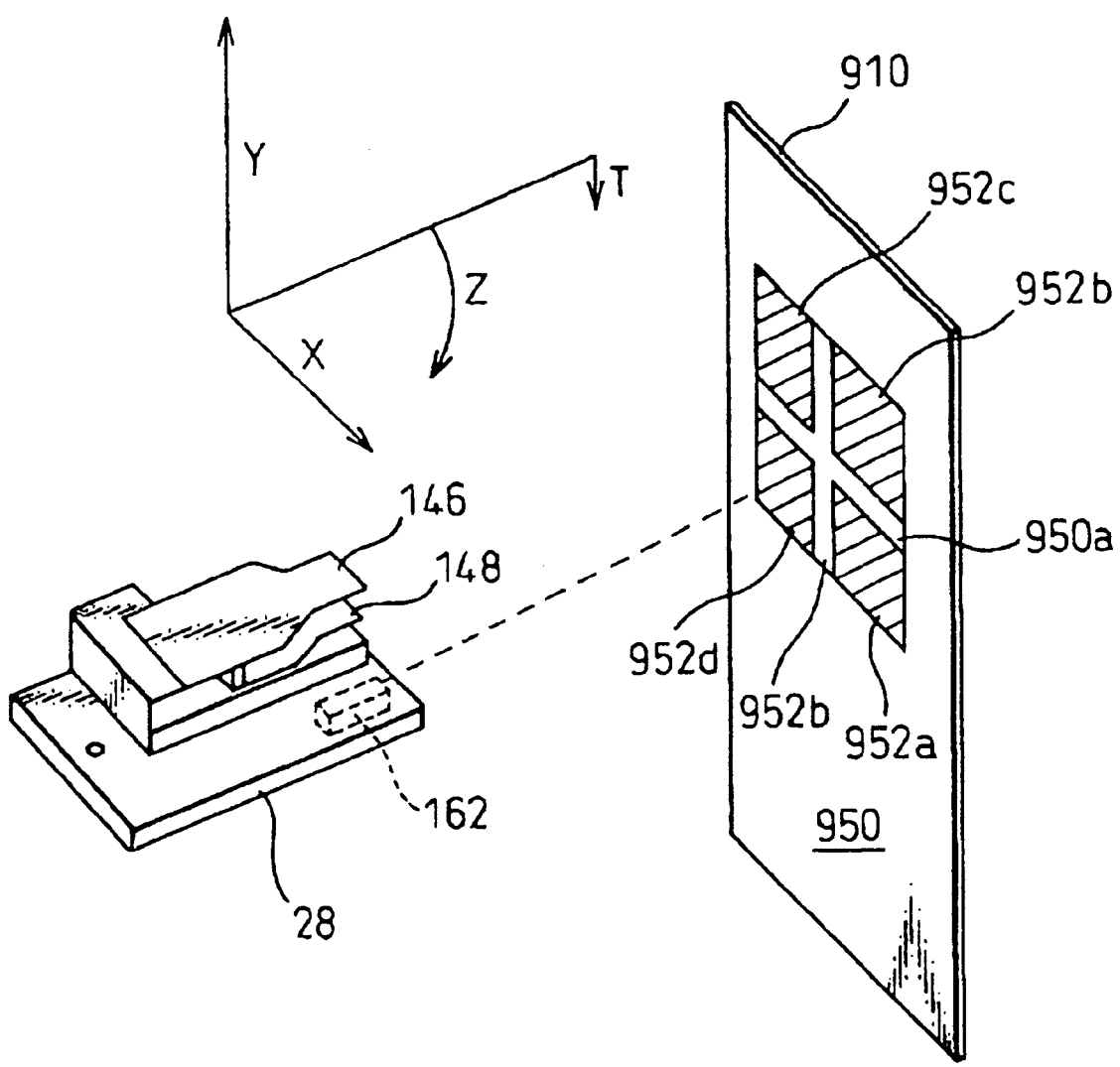
FIG. 55 is a perspective view for explaining the position correcting flag.
Figure 56:
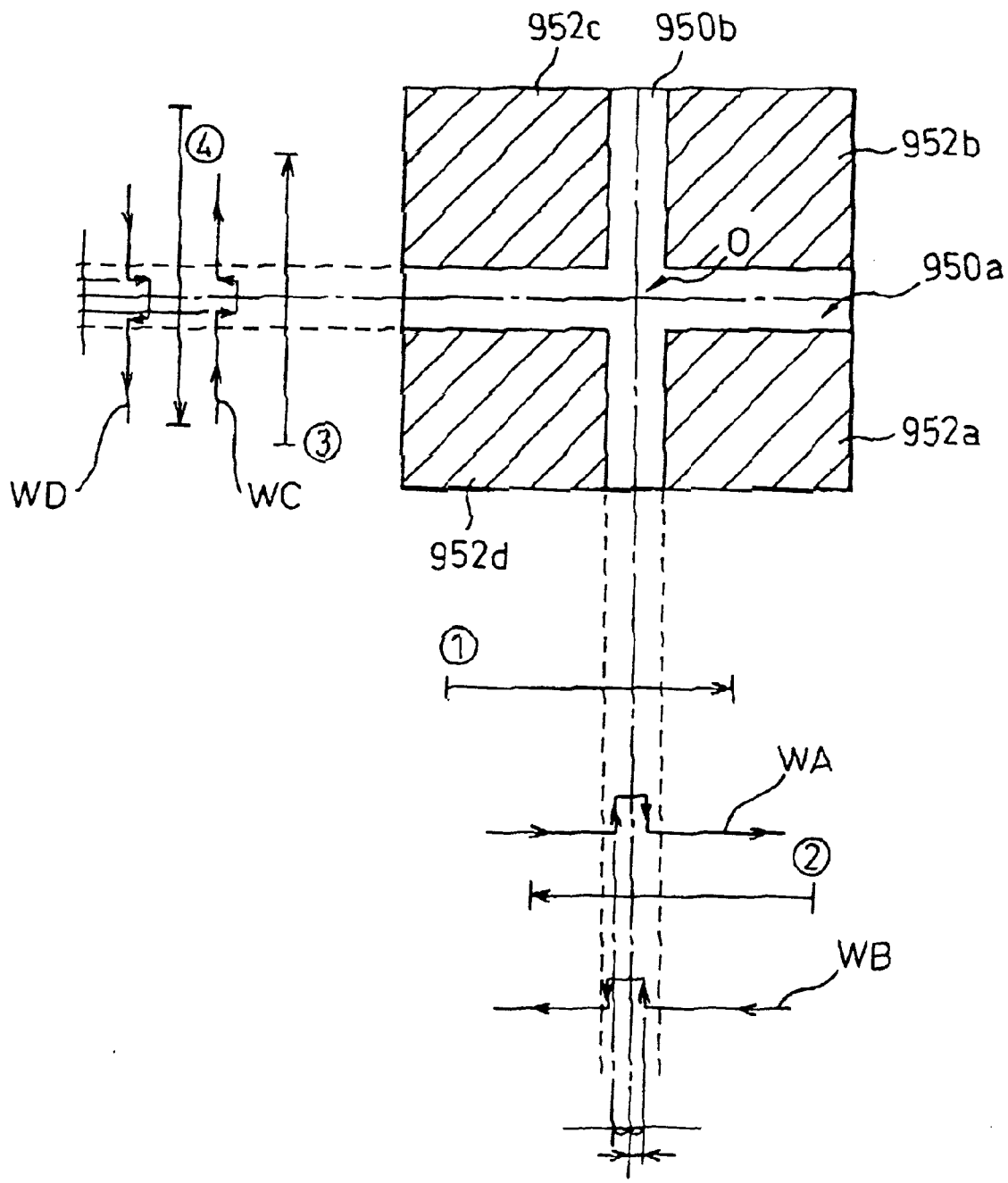
FIG. 56 is a diagram for explaining the position measuring operation using the position correcting flag.

FIG. 55 is a diagram showing the relation between the position correcting flags 910, 920, 930 and the sensor 162. FIG. 56 is a diagram for explaining the operation of correcting the sensor sensitivity.

In these drawings, the position correcting flags 910, 920, 930 are each configured of a cross-shaped white section 950 and black sections 952*a* to 952*d*. The cross-shaped white section 950 includes a white section 950*a* extending along the X direction and a white section 950*b* extending along the Y direction.

Figure 57:
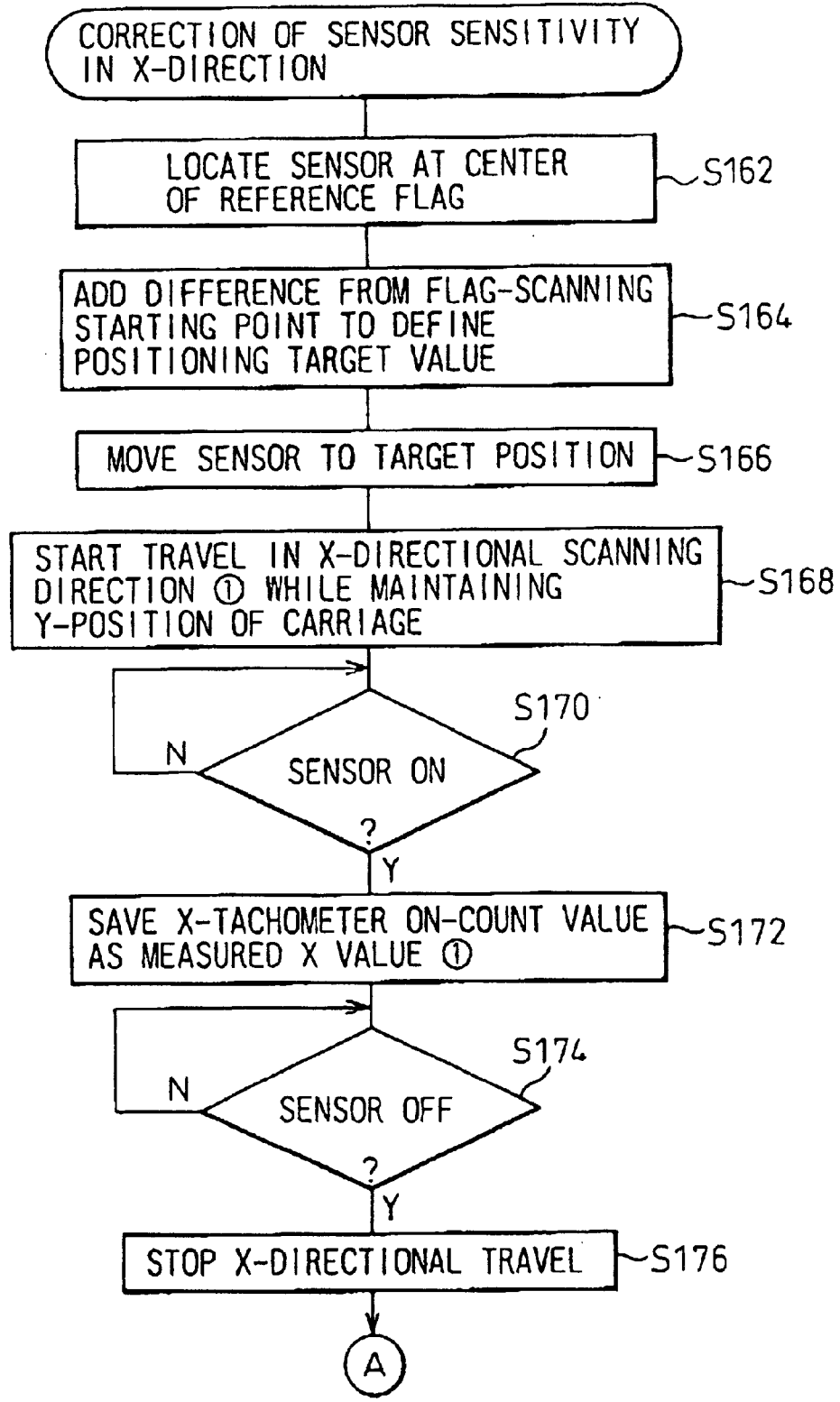
FIG. 57 is a diagram showing the first half portion of the flowchart for the operation of correcting the sensitivity of an X-direction sensor.
Figure 58:
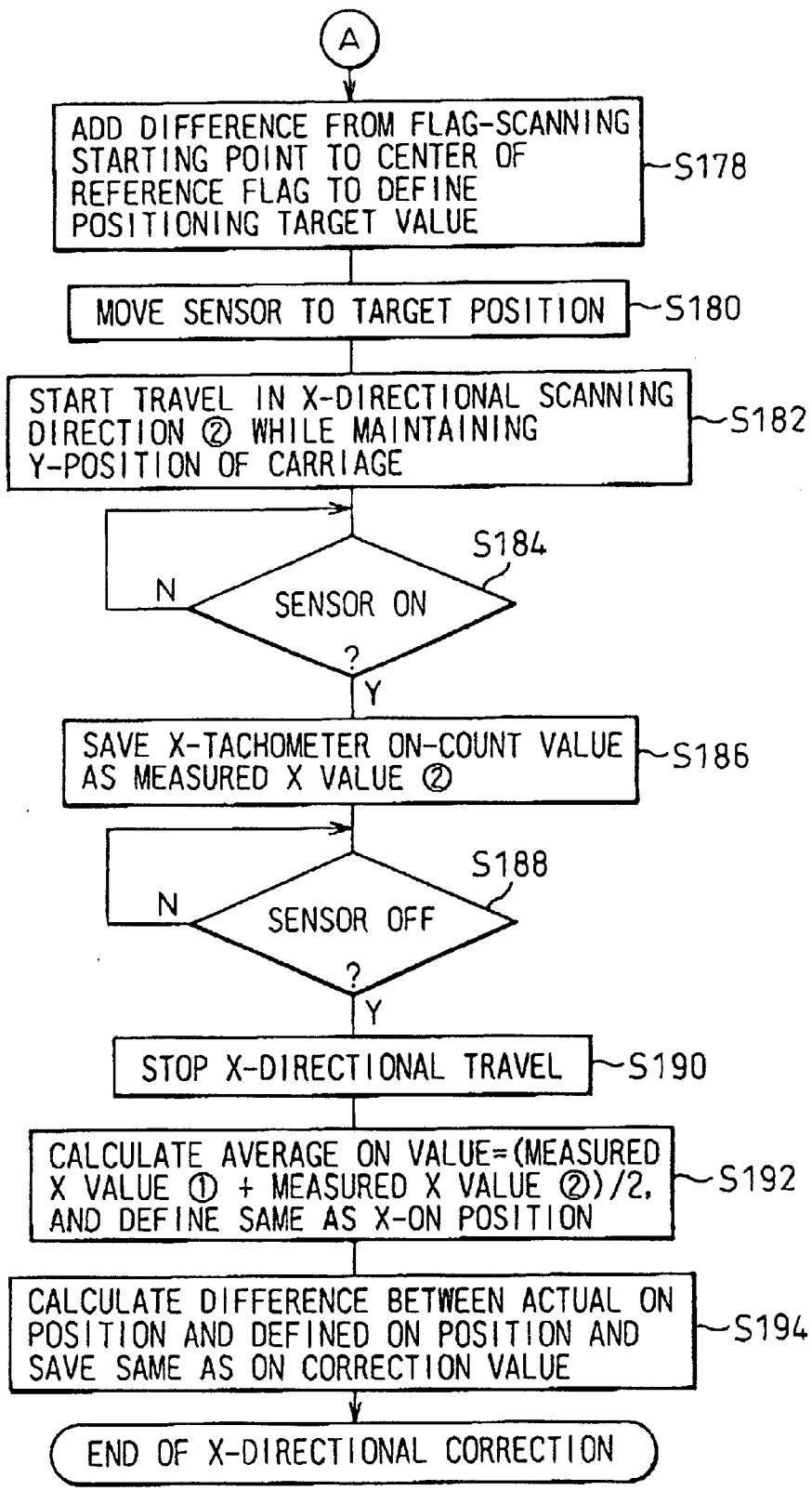
FIG. 58 is a diagram showing the last half portion of the flowchart for the operation of correcting the sensitivity of the X-direction sensor.

FIGS. 57 and 58 are flowcharts showing the sensor sensitivity correction operation along the X-direction.

(1) Steps S162 to S166: The CPU 400 sets the central position O of the reference flag 910 as a provisional target position of the light axis. Then, the CPU 400 adds the difference between the provisional target position and the scan starting point of the position correcting flag 910 to the provisional target position thereby to determine a target position. This target position is located in the area of the black section 952*d*. The CPU 400 moves the sensor 162 to the target position.

(2) Steps S168 to S176: The CPU 400 moves the sensor 162 in the scanning direction ① (FIG. 56) along the X axis while holding the Y-axis position, and checks to see whether the output of the sensor 162 has turned on. The value of the counter 410 at a time when the output of the sensor 162 turns on is stored as an actual X measurement Xa in the work area 426. The CPU 400 then continues to move the sensor 162 along the X direction. The CPU 400 stops the travel of the sensor 162 along the X direction when the output of the sensor 162 turns off. The sensor output change in the process is represented by the waveform WA in FIG. 56.

(3) Steps S178 to S180: The CPU 400 adds the difference between the provisional target position and the next scanning start point of the position correcting flag 910 to the central position of the reference flag 910 thereby to determine a target position. This target position is set in the area of the black section 952*a*. The CPU 400 then moves the sensor 162 to the target position.

(4) Steps S182 to S190: The CPU 400 moves the sensor 162 in the scanning direction ② (FIG. 56) along the X axis while holding the Y-axis position, and checks to see whether the output of the sensor 162 has turned on. The value of the counter 410 at a time point when the output of the sensor 162 turns on is stored as an actual X measurement Xb in the work area 426. The CPU 400 then continues to move the sensor 162 along the X direction. The CPU 400 stops the travel of the sensor 162 along the X direction when the output of the sensor 162 turns off. The sensor output change in the process is represented by the waveform WB in FIG. 56.

(5) Steps S192 to S194: The CPU 400 determines the average value of the actual X measurement Xa and the actual X measurement Xb. The CPU 400 then defines the result of calculation as the turn-on position of the sensor 162 along X direction. Finally, the CPU 400 stores the difference between the turn-on position of the sensor signal and the defined sensor turn-on position as a turn-on correction value in the correction value table and thereby completes the sensitivity correcting operation along the X direction.

Now the operation of correcting the sensor sensitivity along the Y direction will be explained.

Figure 59:
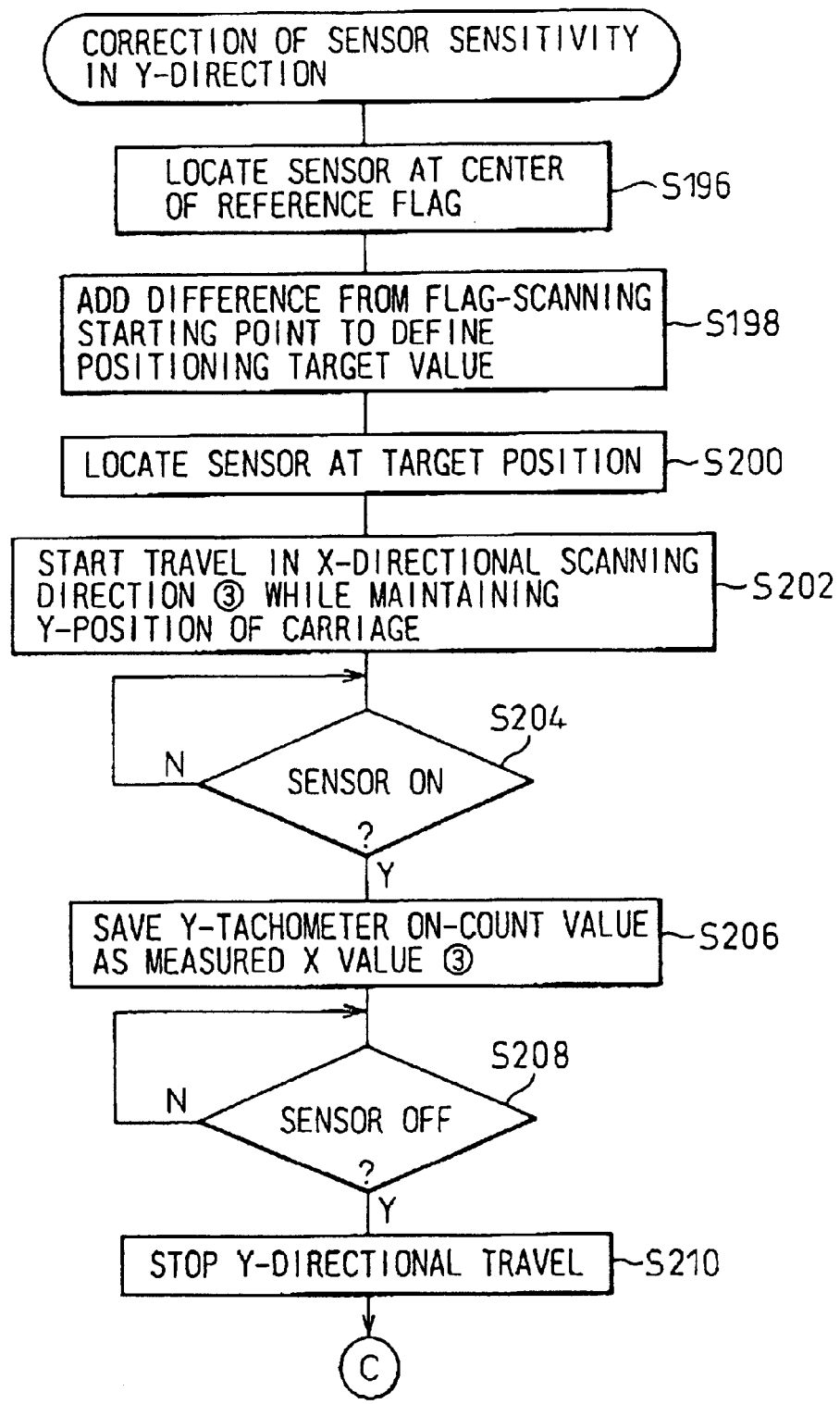
FIG. 59 is a diagram showing the first half portion of the flowchart for the operation of correcting the sensitivity of a Y-direction sensor.
Figure 60:
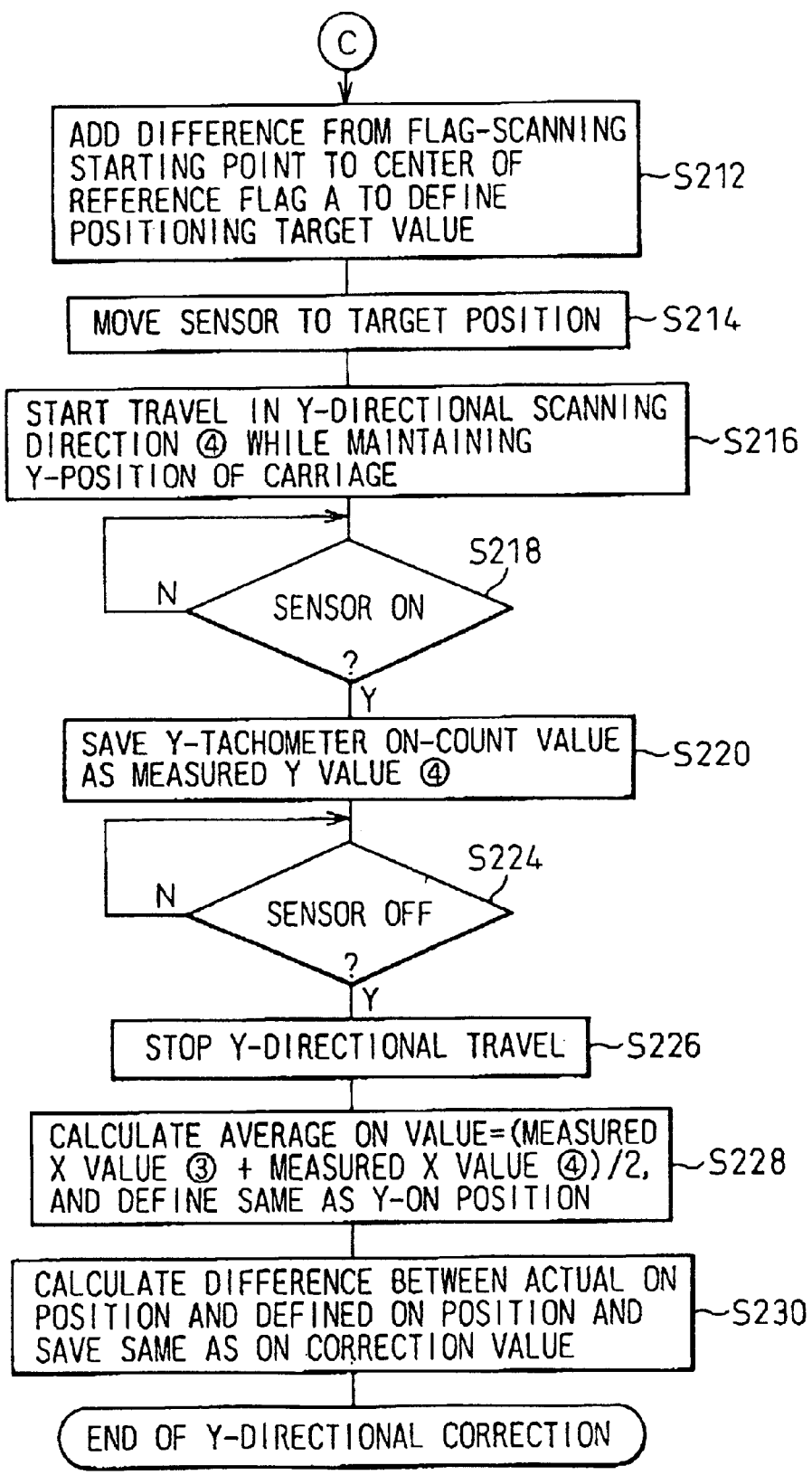
FIG. 60 is a diagram showing the last half portion of the flowchart for the operation of correcting the sensitivity of the Y-direction sensor.

FIGS. 59 and 60 are flowcharts showing the sensor sensitivity correction operation along the Y direction.

(1) Steps S196 to S200: The CPU 400 sets the central position O of the reference flag 910 as a provisional target position of the light axis. Then, the CPU 400 adds the difference between the provisional target position and the scan starting point of the position correcting flag 910 to the provisional target position thereby to determine a target position. This target position is located in the area of the black section 952*d*. The CPU 400 moves the sensor 162 to the target position.

(2) Steps S202 to S210: The CPU 400 moves the sensor 162 in the scanning direction ③ (FIG. 56) along the Y axis while holding the X-axis position, and checks to see whether the output of the sensor 162 has turned on. The value of the counter 412 at a time point when the output of the sensor 162 turns on is stored as an actual Y measurement Ya in the work area 426. The CPU 400 then continues to move the sensor 162 along the Y direction. The CPU 400 stops the travel of the sensor 162 along the Y direction when the output of the sensor 162 turns off. The sensor output change in the process is represented by the waveform WC in FIG. 56.

(3) Steps S212 to S214: The CPU 400 adds the difference between the provisional target position and the next scanning start point of the position correcting flag 910 to the central position of the reference flag 910 thereby to determine a target position. This target position is set in the area of the black section 952*c*. The CPU 400 then moves the sensor 162 to the target position.

(4) Steps S2162 to S226: The CPU 400 moves the sensor 162 in the scanning direction ④ (FIG. 56) along the Y axis while holding the X-axis position, and checks to see whether the output of the sensor 162 has turned on. The value of the counter 412 at a time when the output of the sensor 162 turns on is stored as an actual Y measurement Yb in the work area 426. The CPU 400 then continues to move the sensor 162 along the Y direction. The CPU 400 stops the travel of the sensor 162 along the Y direction when the output of the sensor 162 turns off. The sensor output change in the process is represented by the waveform WD in FIG. 56.

(5) Steps S228 to S230: The CPU 400 determines the average value of the actual Y measurement Ya and the actual Y measurement Yb. The CPU 400 then defines the result of calculation as the turn-on position of the sensor 162 along Y direction. Finally, the CPU 400 stores the difference between the turn-on position of the sensor signal and the defined sensor turn-on position as a turn-on correction value in the correction value table and thereby completes the sensitivity correcting operation along the Y direction.

Now, explanation will be made about the operation of correcting the sensor sensitivity along the Z direction.

Figure 61:
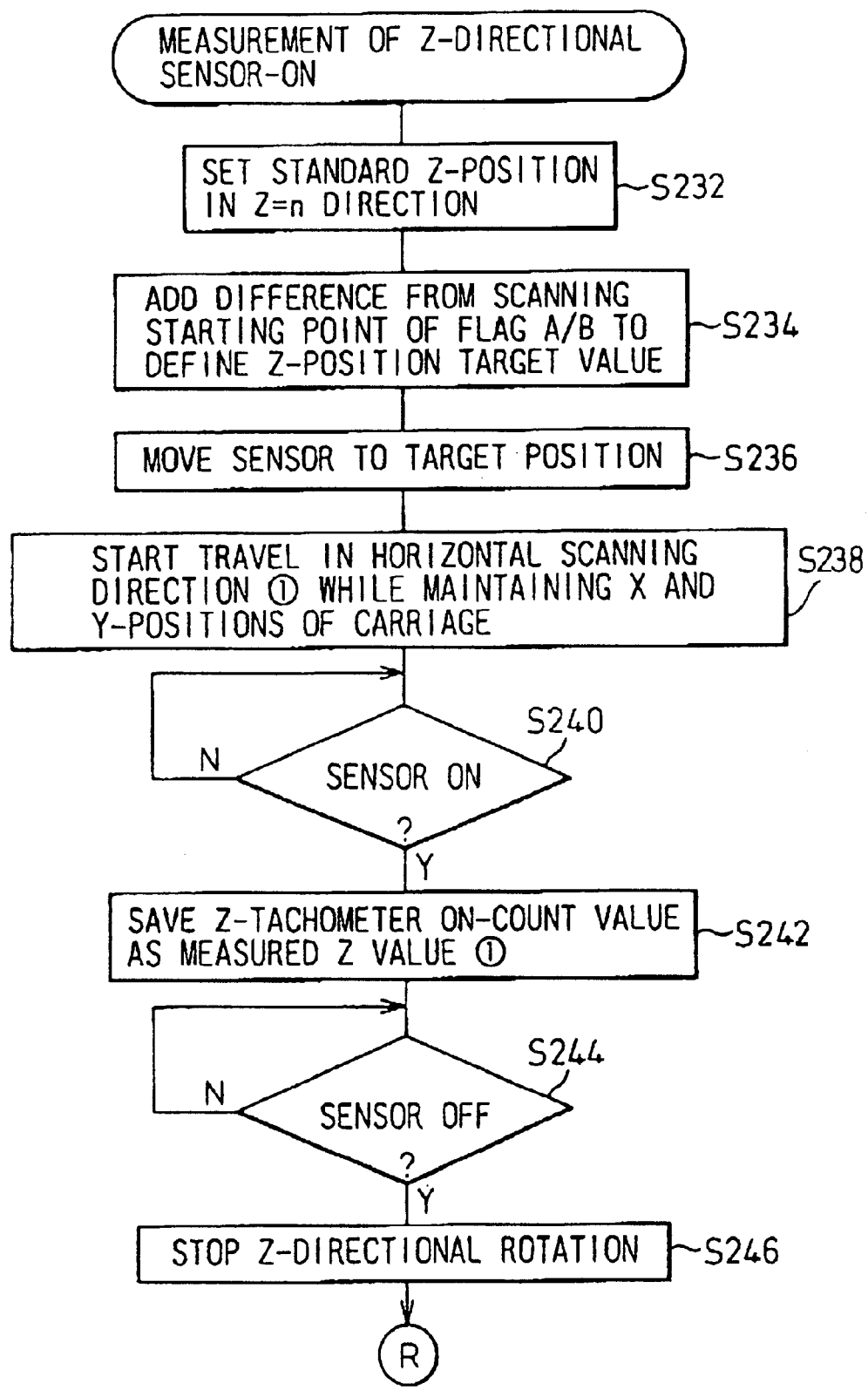
FIG. 61 is a diagram showing the first half portion of the flowchart for the operation of correcting the sensitivity of a Z-direction sensor.
Figure 62:
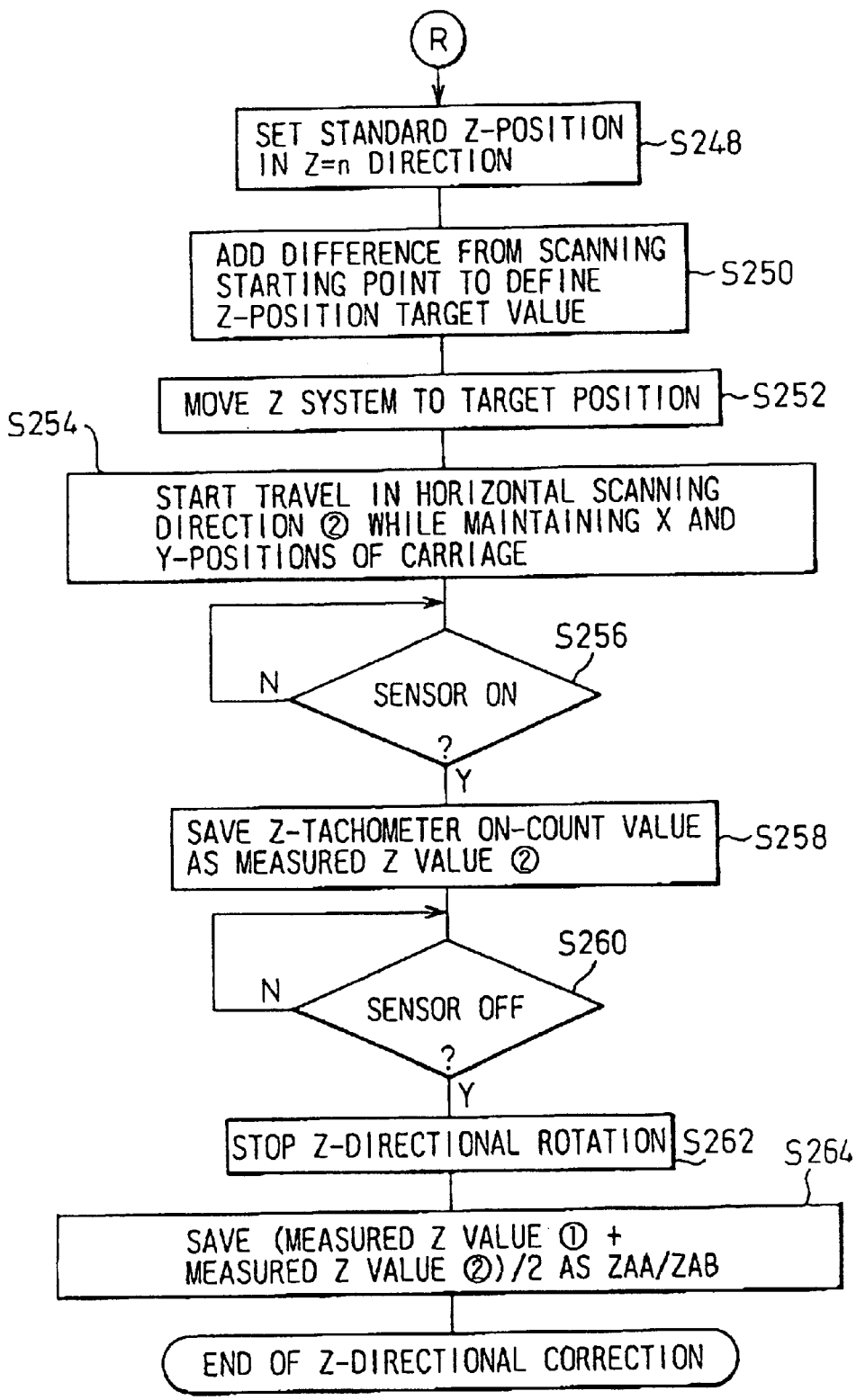
FIG. 62 is a diagram showing the last half portion of the flowchart for the operation of correcting the sensitivity of the Z-direction sensor.

FIGS. 61 and 62 are flowcharts showing the operation of correcting the Z-direction sensor sensitivity.

(1) Steps S232 to S236: The CPU 400 sets the Z standard position in Z (=n) direction, where n is "1" or "0". The numeral "1" designates the clockwise direction in which the sensor 162 is rotated, and "0" the counterclockwise direction in which the sensor 162 is rotated. The CPU 400 first sets the value of n to 1. The CPU 400 then adds the difference between the Z standard position and the scanning start point of the position correcting flag 910 thereby to determine a target position. The CPU 400 sets the sensor 162 to this target position.

(2) Steps S238 to S246: The CPU 400 rotates the Z system and moves the sensor 162 in scanning direction 1 (FIG. 56) while holding the X and Y positions, and checks to see whether the output of the sensor 162 has turned on. The value of the counter 413 at a time point when the output of the sensor 162 turns on is stored as an actual Z measurement Za in the work area 426. The CPU 400 then continues to move the sensor 162. The CPU 400 stops the rotation of the sensor 162 along the Z direction when the output of the sensor 162 turns off. The sensor output change in the process is similar to that represented by the waveform WA in FIG. 56.

(3) Steps S248 to S252: The CPU 400 sets the Z standard position along the Z (=n) direction. The CPU 400 sets n to 0. Then, the CPU 400 adds the difference between the Z standard position and the scanning start point of the position correcting flag 910 thereby to determine a target position. The CPU 400 locates the sensor 162 to this target position.

(4) Steps S254 to S262: The CPU 400 rotates the Z system and moves the sensor 162 in scanning direction 2 (FIG. 56) while holding the X and Y positions, and checks to see whether the output of the sensor 162 has turned on. The value of the counter 413 at a time point when the output of the sensor 162 turns on is stored as an actual Z measurement Zb in the work area 426. The CPU 400 then continues to move the sensor 162 in Z direction. The CPU 400 stops the travel of the sensor 162 along the Z direction when the output of the sensor 162 turns off. The sensor output change in the process is similar to that represented by the waveform WB in FIG. 56.

(5) Steps S264 to S230: The CPU 400 determines the average value of the actual Z measurement Za and the actual Z measurement Zb. The CPU 400 then stores the result of calculation as a turn-on position of the sensor 162 along the Z direction in the correction value table, thereby completing the sensitivity correcting operation in the Z direction.

Now, explanation will be made about another operation of the position correction of the accessor.

Figure 63:
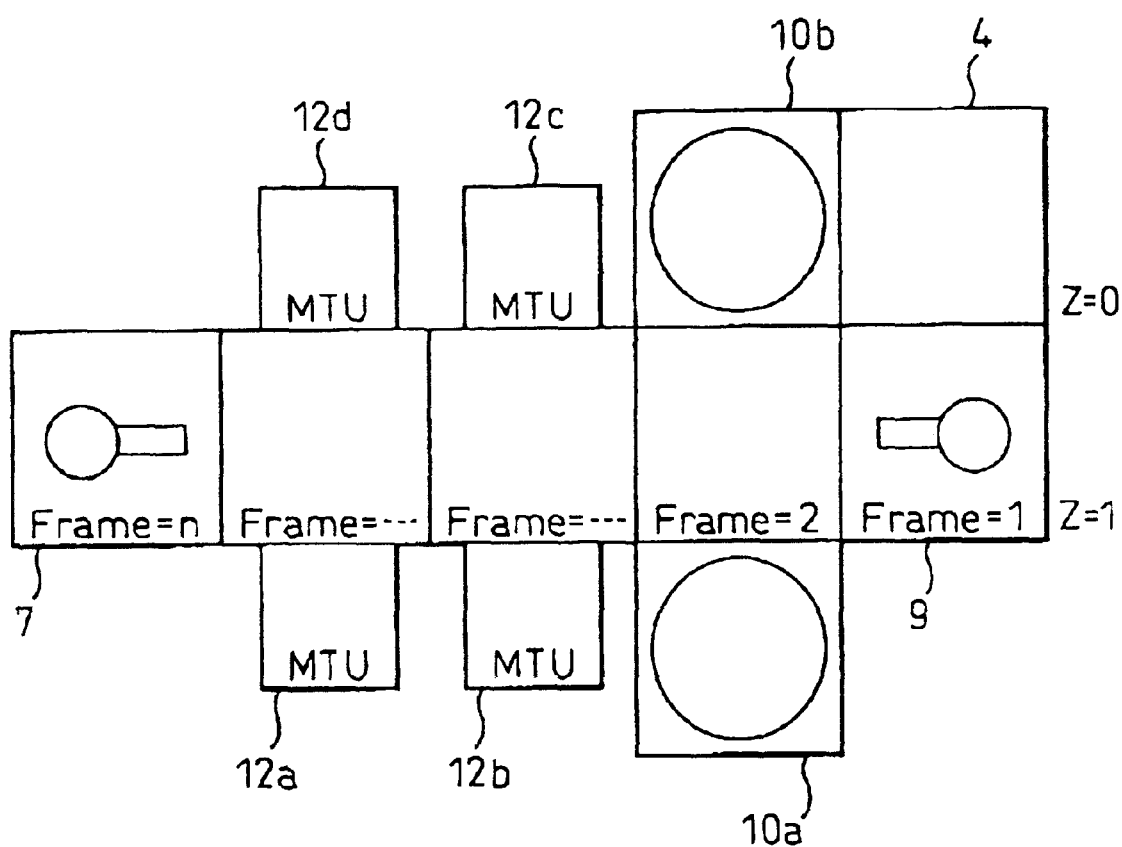
FIG. 63 is a diagram for explaining the arrangement of logical addresses assigned to each unit of the library apparatus of FIG. 1.

FIG. 63 is a diagram for explaining an arrangement of the logical address assigned to each unit of the library apparatus 2 shown in FIG. 1. The units arranged along the direction of movement of the accessor 14 are assigned frame numbers (1, 2, . . . , n), respectively. Also, the units are divided crosswise perpendicular to the direction of the movement of the accessor 14, and each of the subdivided unit groups is assigned a face number Z (=0, 1).

As described above, addresses are assigned in the following-described manner in the case where the library apparatus 2 shown in FIG. 1 comprises four drum units 10b having only a cell drum 15b, one drum unit 10a shown in FIG. 4 and one drum unit 169. In this case, the drum unit 10b shown in FIG. 1 represents the drum unit 169 having a DEE magazine. The accessor unit 9 is assigned a frame number 1, and is assigned no face number. The drum unit 10a is assigned a frame number 2 and a face number 1. The drum unit 169 (10b) is assigned a frame number 2 and a face number 0. The drive unit 12b is assigned a frame number 3 and a face number 1. The drive unit 12c is assigned a frame number 3 and a face number 0. The drive unit 12a is assigned a frame number 4 and a face number 1. The drive unit 12b is assigned a frame number 4 and a face number 0. The four drive units are assigned a frame number 5 with a face number 1, a frame number 5 with a face number 0, a frame number 6 with a face number 1, and a frame number 6 with a face number 0, respectively. Finally, the accessor unit 7 is assigned a frame number 7 and is not assigned a face number.

Figure 64:
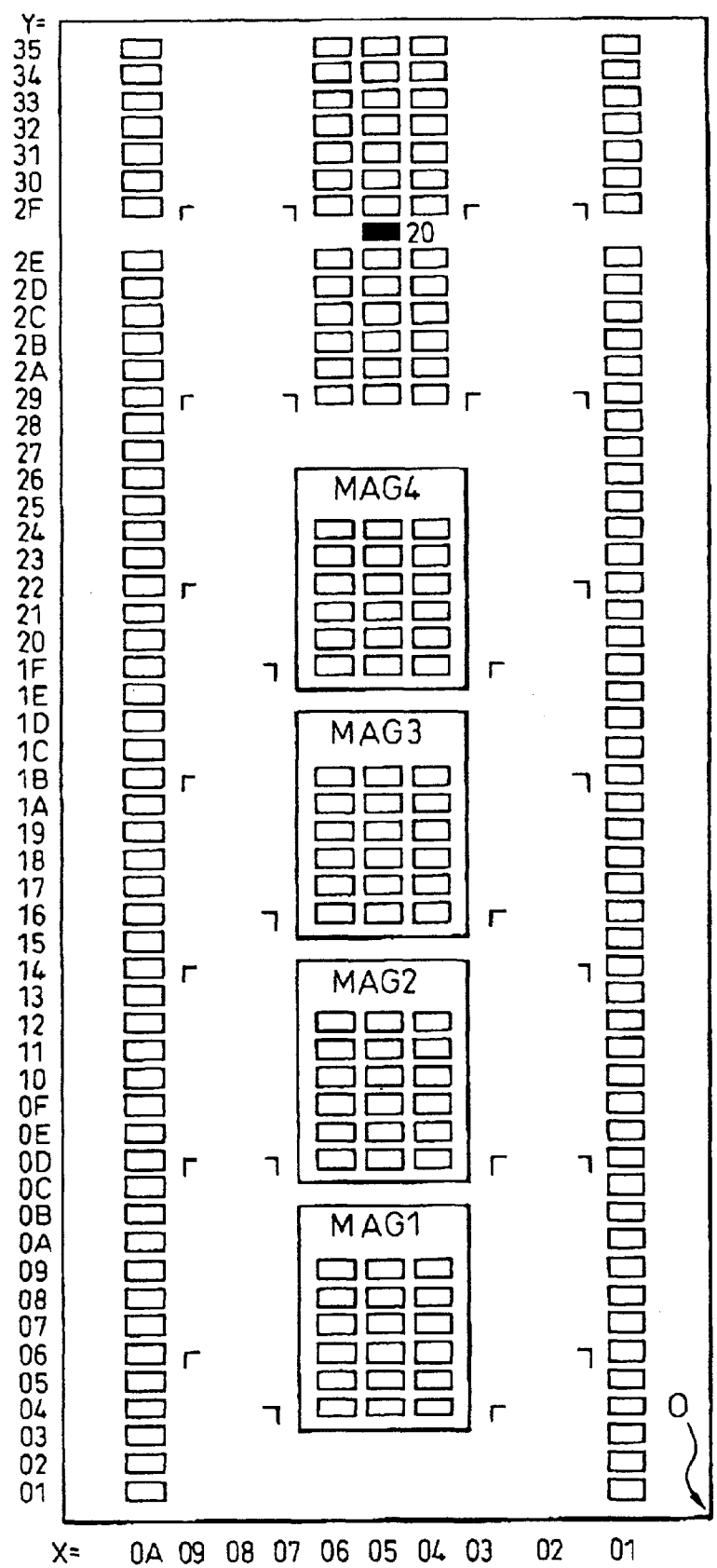
FIG. 64 is a diagram for explaining the addresses assigned to the drum unit.

FIG. 64 is a diagram showing the addresses assigned to the drum units. Addresses 01 to 0A are assigned in the X direction, and addresses 01 to 35 assigned in the Y direction.

Figure 65:
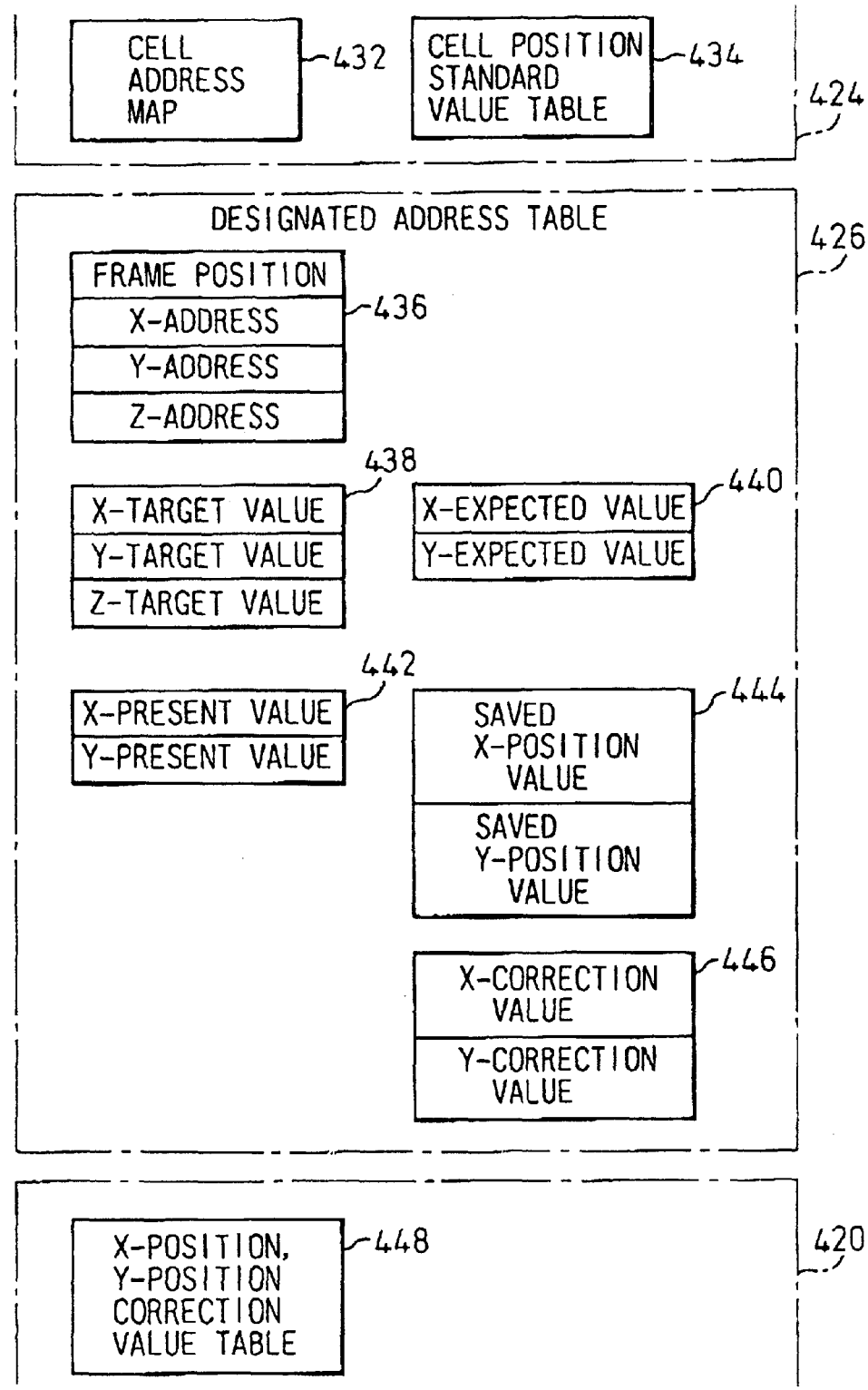
FIG. 65 is a diagram for explaining the control value for the machine controller.

FIG. 65 is a diagram for explaining the control values of the machine controller.

A cell address map 432 is for storing the address map shown in FIG. 64 and the coordinate values of the addresses designated by the address map. Each address coordinate value is represented by the distance (X coordinate value, Y coordinate value) from a reference point 0 (reference origin Fso) of the drum unit. A cell position reference value table 434 stores the coordinate value (X, Y) of the measurement starting point shown in FIG. 67. This coordinate value (X, Y) represents the distance from the coordinate value (X, Y) of the origin (position flag 165) where the accessor 14 starts moving. The coordinate value of this measurement starting point is stored as a difference with an expected value described later. The coordinate value of the origin where the accessor 14 of the accessor unit 7 starts moving is set by the origin flag 165 fixed in the accessor unit 7. The cell address map 432 and the cell position reference value table 434 are stored in the program storage area 424 of the RAM 416 at the time of program installation. Also, the correspondence between the units of the library apparatus 2 and the frame number and the face number of each unit is stored in a part of the cell address map 432. Further, the units are set to the same spatial intervals along X direction, and the values of the intervals are stored in a part of the cell address map 432 in similar fashion.

A designation address table 436 is for storing the values used for locating the center of the open/close operation of the upper hand 146 and the lower hand 148 of the hand unit 130 of the accessor 14. The frame position is the frame number described above with reference to FIG. 63. The X address and the Y address are the coordinate values of the cells in the drum unit explained with reference to FIG. 52. The Z address is the face number described with reference to FIG. 63. A target value table 438 is for storing the target values of locating the center of the open/close operation of the hand unit 130 on the accessor 14. The X target value, the Y target value and the Z target value are determined from the values in the cell address map 432, the cell position reference value table 434 and the designation address table 436. The X target value, the Y target value and the Z target value are calculated as the number of rotation pulses of the motors 42, 46 and 25, respectively. An expected value table 440 stores the expected values in X direction and the expected values in Y direction, and is used for executing the position measuring operation of the accessor. A present value table 442 is for storing the current position of the accessor 14 along X and Y directions. The X current position and the Y current position are given by counters 410 and 412, respectively. A position holding table 444 is for holding the X current position and the Y current position at a specified time point. The X position and the Y position held in the position holding table 444 are used for executing the operation of measuring the accessor position. A correction value table 446 is for storing the difference between the stored value of the current value table 442 and the stored value of the position holding table 444 as a correction value. The tables 436, 438, 440, 442, 444, 446 are stored in the work area 426 of the RAM 416.

An X-Y position correction value table 448 is for storing the X-position correction values, the Y-position correction values, and the correction values of the operation axis of the hand and the light axis of the sensor 162 for all the flags. The values stored in the table 448 are held in a nonvolatile memory 420.

Figure 66:
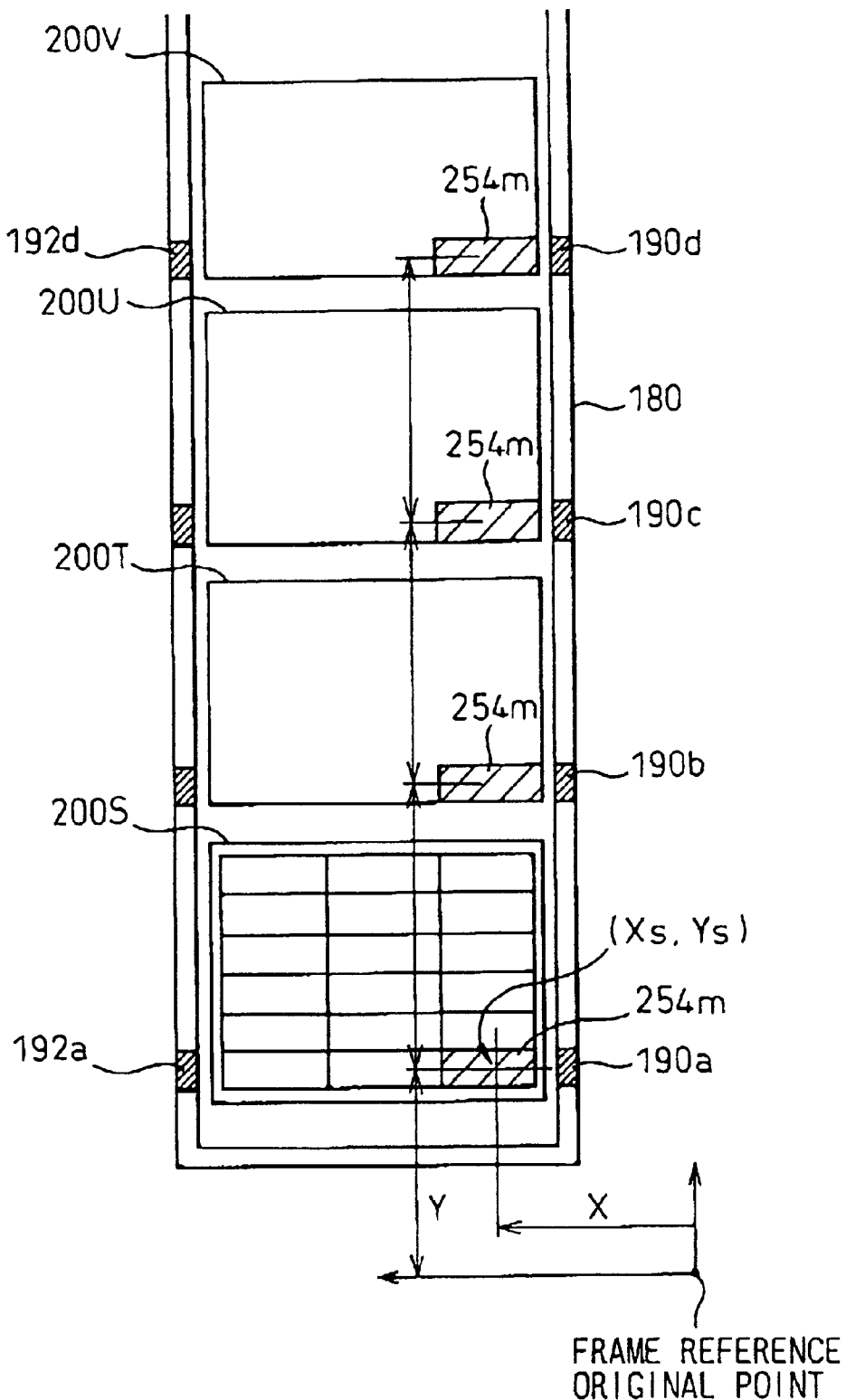
FIG. 66 is a diagram for explaining the coordinate system of a reference cell of the drum unit having a DEE magazine mounted thereon.
Figure 67:
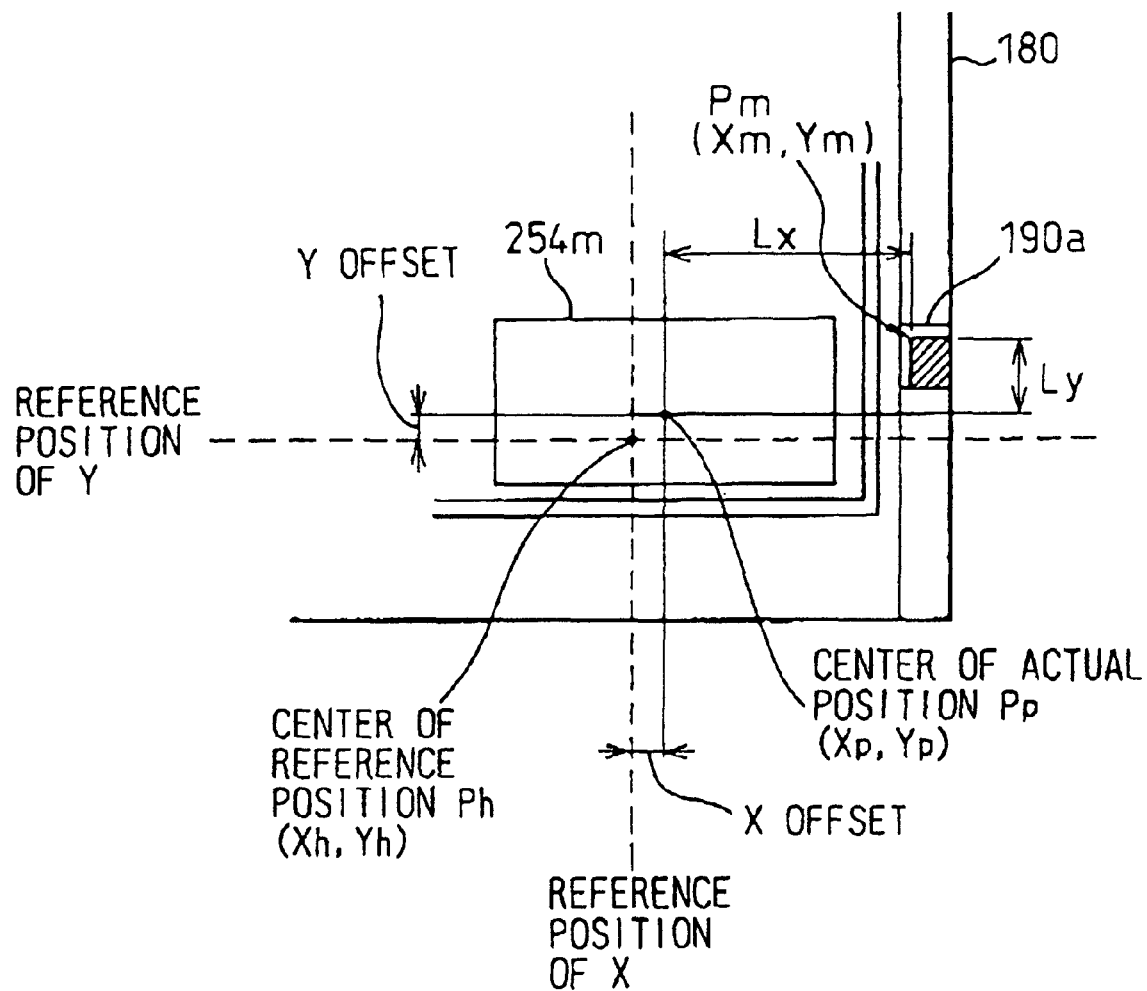
FIG. 67 is a diagram showing the relation between the real center position and the standard center position of the reference cell.
Figure 68:
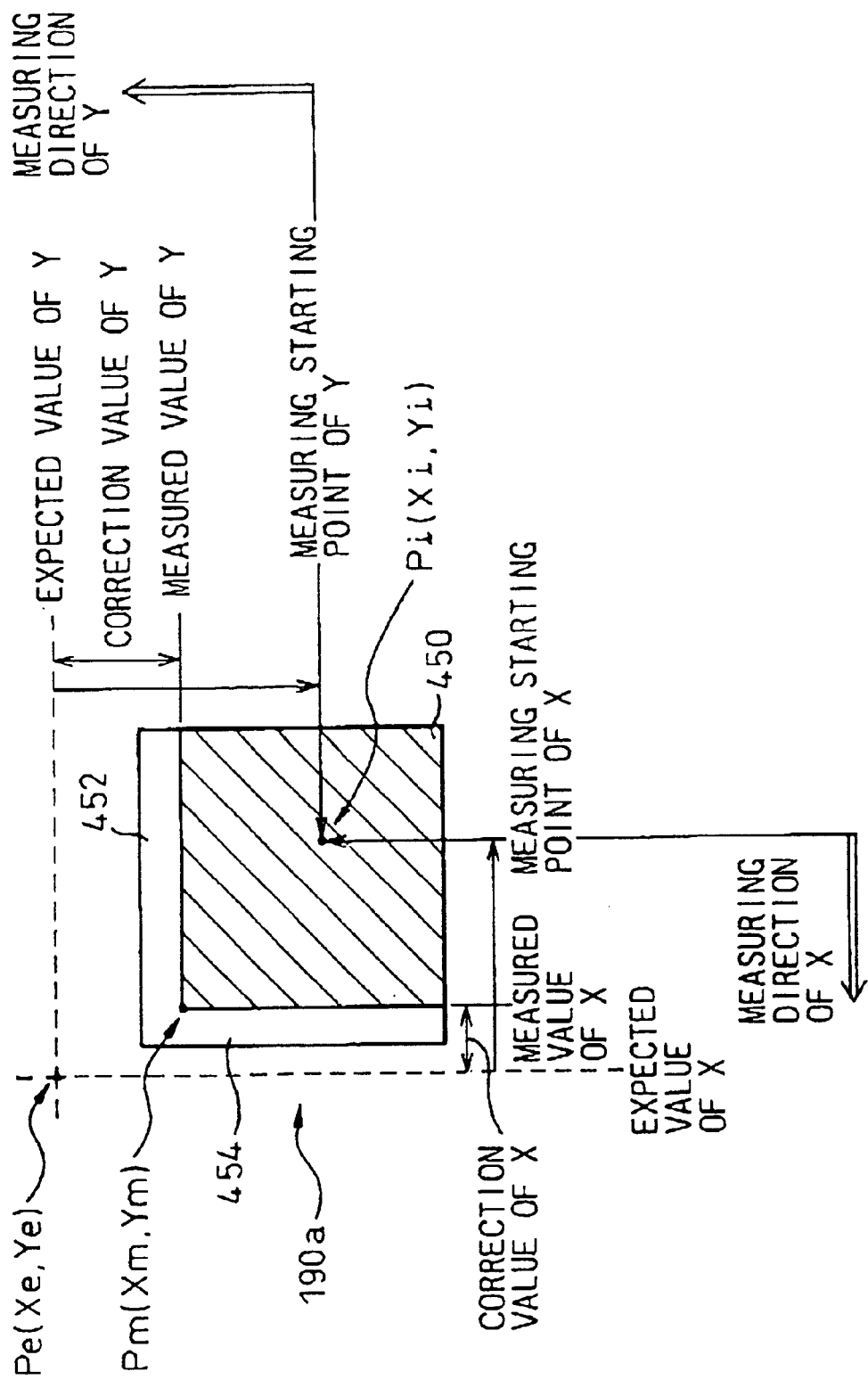
FIG. 68 is a diagram showing the relation between the position correcting mark and the measurement starting point.

FIGS. 66, 67 and 68 are diagrams for explaining the operation of measuring the position of the accessor.

FIG. 66 is a diagram for explaining the coordinate system of the reference cell of the drum unit carrying the DEE magazine.

In FIG. 66, the coordinate system of the reference cell will be explained with reference to one of the seven segments of the magazine drum 175 in the drum unit 169. The drum unit 169, as explained with reference to FIG. 29, is such that magazines 200S to 200V are mounted on magazine racks 184*a* to 184*d*, respectively, of the magazine drum 175. The cell 254*m* at the lower right portion of each of the magazines 200S to 200V provides a reference cell. The lower right end 170*a* of the drum unit 169 represents a frame reference origin Fso. The lower right end 170*a* of the drum unit 169 is used as a reference point of coupling with other units. The coordinate of the reference cell 254*m* of the drum unit 169 is expressed as an orthogonal coordinate system with the frame reference origin Fso as an origin. The coordinate value of the reference cell 254*m* is expressed as the coordinate value (Xs, Ys) of the central point of the reference cell 254*m*. The coordinate value (Xs, Ys) of the central point of the reference cell 254*m* of each of the magazines 200S to 200V is expressed as a coordinate value of the orthogonal coordinate system with the frame reference origin Fso as an origin. As described above, the magazines 200S to 200V are set in position substantially accurately with respect to the reference point 169*a* of the drum unit 169 by guide plates 186, 187, 188, 189, protrusions 210, 212, a positioning protrusion 214 and positioning holes 201*a*, 201*b* of the magazine 200.

Consequently, the coordinate value (Xs, Ys) of the real center position of the reference cell 254*m* of the magazine 200 is based on the frame reference origin Fso providing the positioning reference point 169*a*.

FIG. 67 is a diagram showing the relation between the real center position and the standard center position of the reference cell.

In FIG. 67, the coordinate value (Xp, Yp) of the real center position Pp of the reference cell 254*m* is located at a point a distance Lx away in the X direction and a distance Ly away in the Y direction from the coordinate value (Xm, Ym) of the reference point Pm of the position correcting mark 190*a*. The distances Lx, Ly are stored in a part of the cell address map 432. In other words, the position correcting mark 190*a* is mounted on the frame 180 so accurately that the coordinate value (Xm, Ym) of the reference point Pm of the position correcting mark 190*a* is given as a coordinate value based on the frame reference origin Fso. The real center position Pp of the reference cell 254*m* is offset in the X and Y directions from the standard center position Ph of the reference cell 254*m* with the frame standard origin Fso as an origin. The standard center position Ph of the reference cell 254*m* is given as the coordinate value (Xh, Yh). The standard center position Ph of the reference cell 254*m* is a point where the center point of the reference cell 254*m* should exist in the standard orthogonal coordinate system with the position flag 165 of the accessor unit 9 as an origin. The library apparatus 2 is assembled by combining a plurality of units 7, 9, 10*a*, 10*b*, and therefore an offset develops between the standard center position Ph and the real center position Ph of the reference cell 254*m*. The value of this offset is measured using the position correcting mark 190*a*.

FIG. 68 is a diagram showing the relation between the position correcting mark and the measurement starting point.

In FIG. 68, a position correcting mark 190*a* is configured of a black section 450, a Y-direction white section 452, and an X-direction white section 454. The coordinate of the reference point Pm of the position correcting mark 190*a* is given as (Xm, Ym). The reference point Pm of the position correcting mark 190*a* represents an actual measurement of the coordinate value (Xm, Ym). The starting point of position measurement of the accessor 14 (the light axis of the sensor 162) is set to the coordinate value (Xi, Yi) of the measurement starting point Pi of the position correcting mark 190*a*. The coordinate value (Xi, Yi) of the measurement starting point Pi is the one in the standard orthogonal coordinate system with the position flag 165 of the accessor unit 9 as an origin. The expected point Pe is the one where the reference point Pm of the position correcting mark should exist when the light axis of the sensor 162 is moved in the X and Y directions with reference to the measurement starting point Pi. The coordinate value (Xi, Yi) of the measurement starting point Pi is stored in the cell position standard value table 434 as a difference between the expected point Pe and the coordinate value (Xp, Yp).

This expected point Pe is given by the coordinate value (Xe, Ye). Due to the presence of an assembly error of the library apparatus 2, the coordinate value (Xm, Ym) of the actual reference point Pm of the position correcting mark 190*a* is offset from the coordinate value (Xe, Ye) of the expected point Pe. The difference between the coordinate value (Xm, Ym) of the reference point Pm and the coordinate value (Xe, Ye) of the expected point Pe constitutes a correction value. The X correction value and the Y correction value are the correction values used for correcting the offset between the standard center position Ph and the real center position Pp of the reference cell 254*m*.

Figure 69:
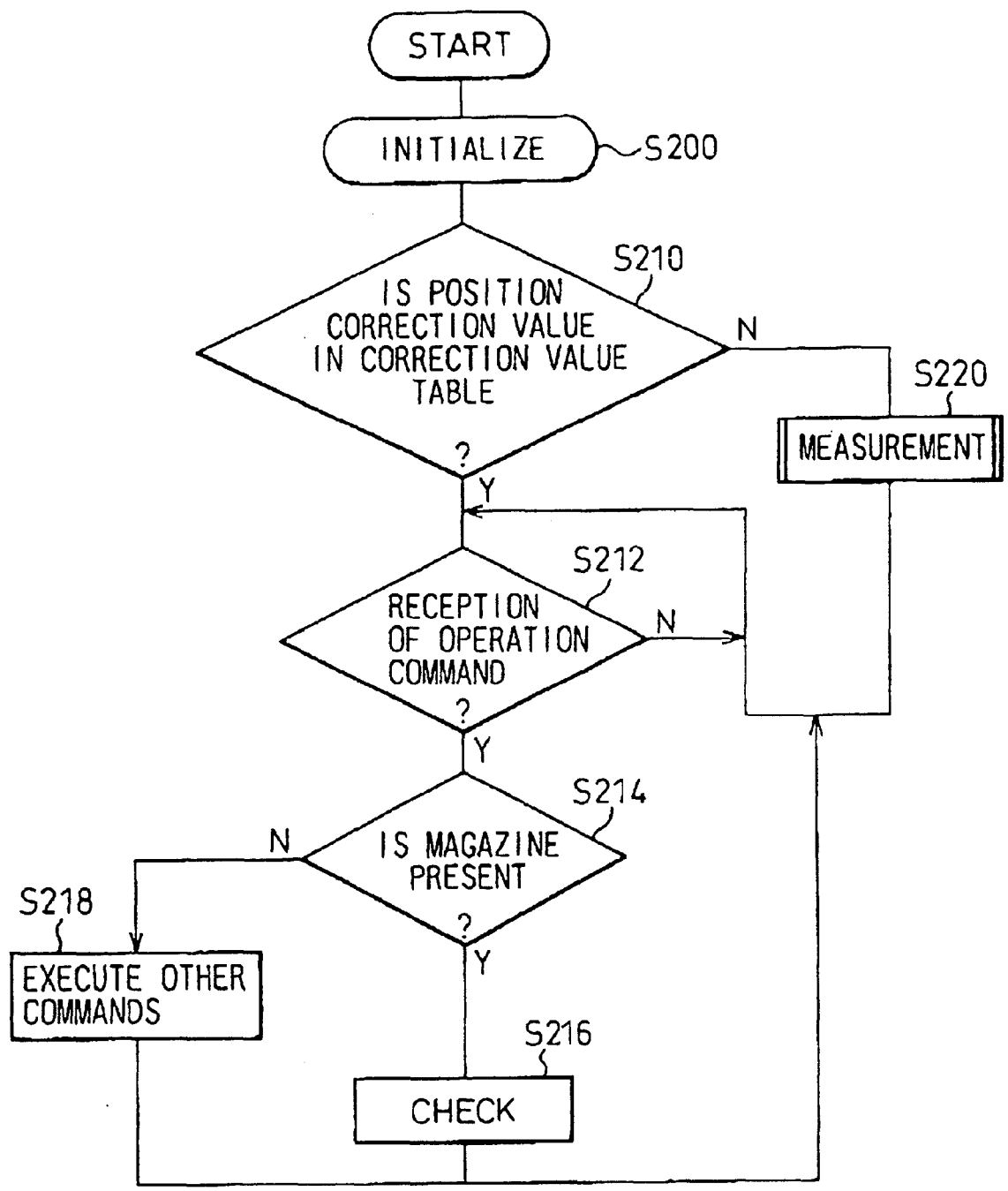
FIG. 69 is a flowchart for explaining the operation of the machine controller.

FIG. 69 is a flowchart for explaining the operation of the machine controller 351.

In FIG. 69, first, the CPU 400 executes the initialization in step S200 after power is switched on. During the initialization process, the CPU 400 drives the motors 42, 46, 25 through the drive circuits 402, 406, 414, and locates the accessor 14 at the reference position set within the accessor unit 7. The CPU 400 drives the motors 42, 46, 25 of the accessor 14 in such a position that the sensor 163 detects the position flag 165 and the sensor 162 of the hand assembly 16 detects the position flag 165.

Then, the CPU 400 checks whether the position correction value is stored in the X-Y position correction value table 448 in the nonvolatile memory 420 in step S210. In the case where the position correction value is not so stored, the CPU 400 proceeds to step S220 for executing the operation of measuring the position correction value. The CPU 400 transfers to step S212 upon complete processing of step S220.

In the case where the position correction value is stored, on the other hand, the CPU 400 transfers to step S212 for checking the presence or absence of an operation command. The CPU 400 transfers to step 214 in the case where an operation command is received through the interface 422 in step S212. The CPU 400 decides in step S214 whether or not the operation command is of a type for designating the operation of checking for the presence or absence of the magazine. In the case where the decision is that the command is the one for designating the presence or absence of the magazine, the process proceeds to step S216 to execute the operation of checking for the presence or absence of the magazine. The CPU 400 executes the processing of the command in step S218 in the case where a command other than the above-mentioned command is received in step S214. After the processing of the operation command for checking for the presence or absence of the magazine or other commands, the process returns to step S212.

Figure 70:
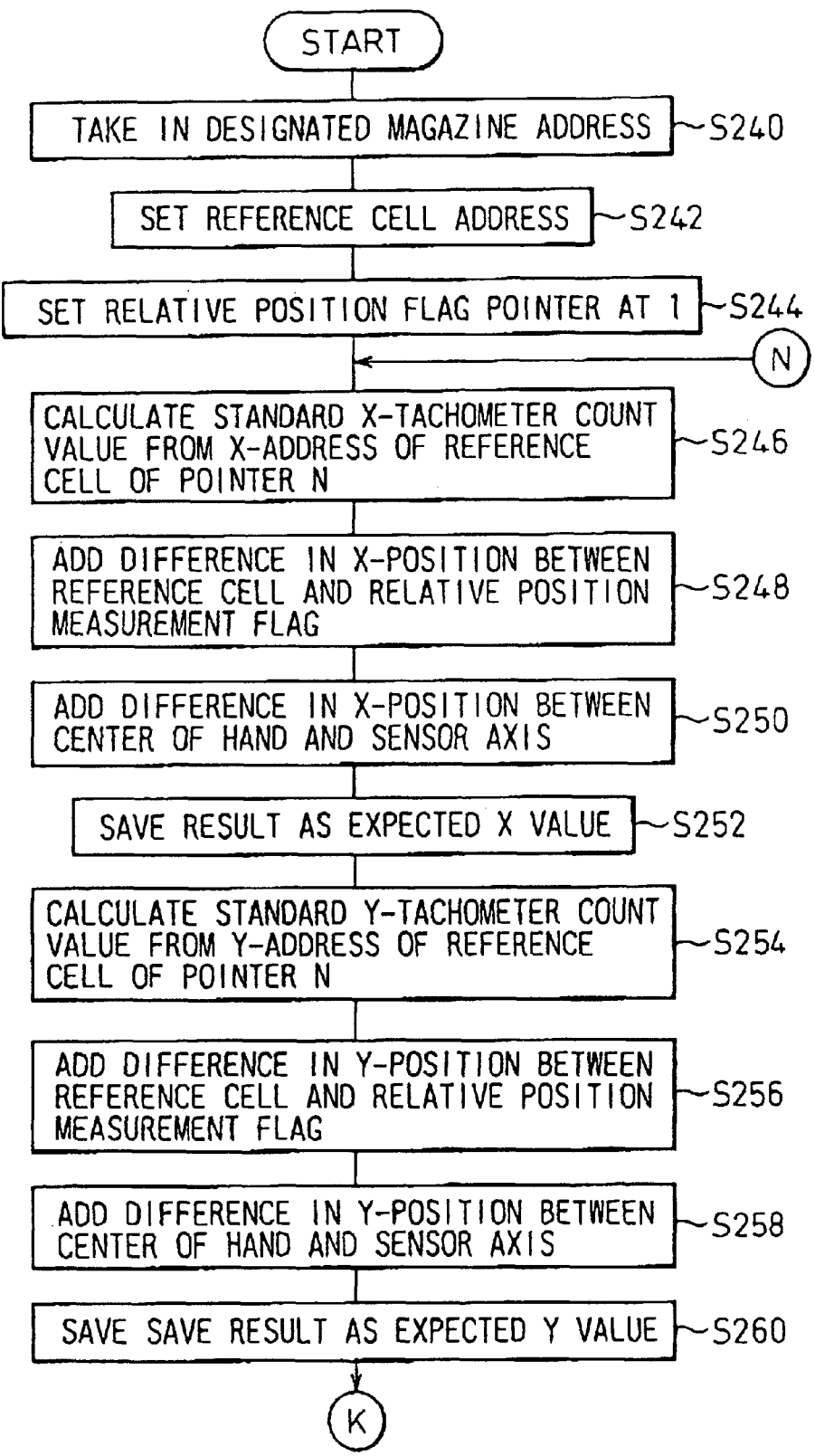
FIG. 70 is a diagram showing a part of the processing flowchart for the operation of measuring the position correction value.
Figure 71:
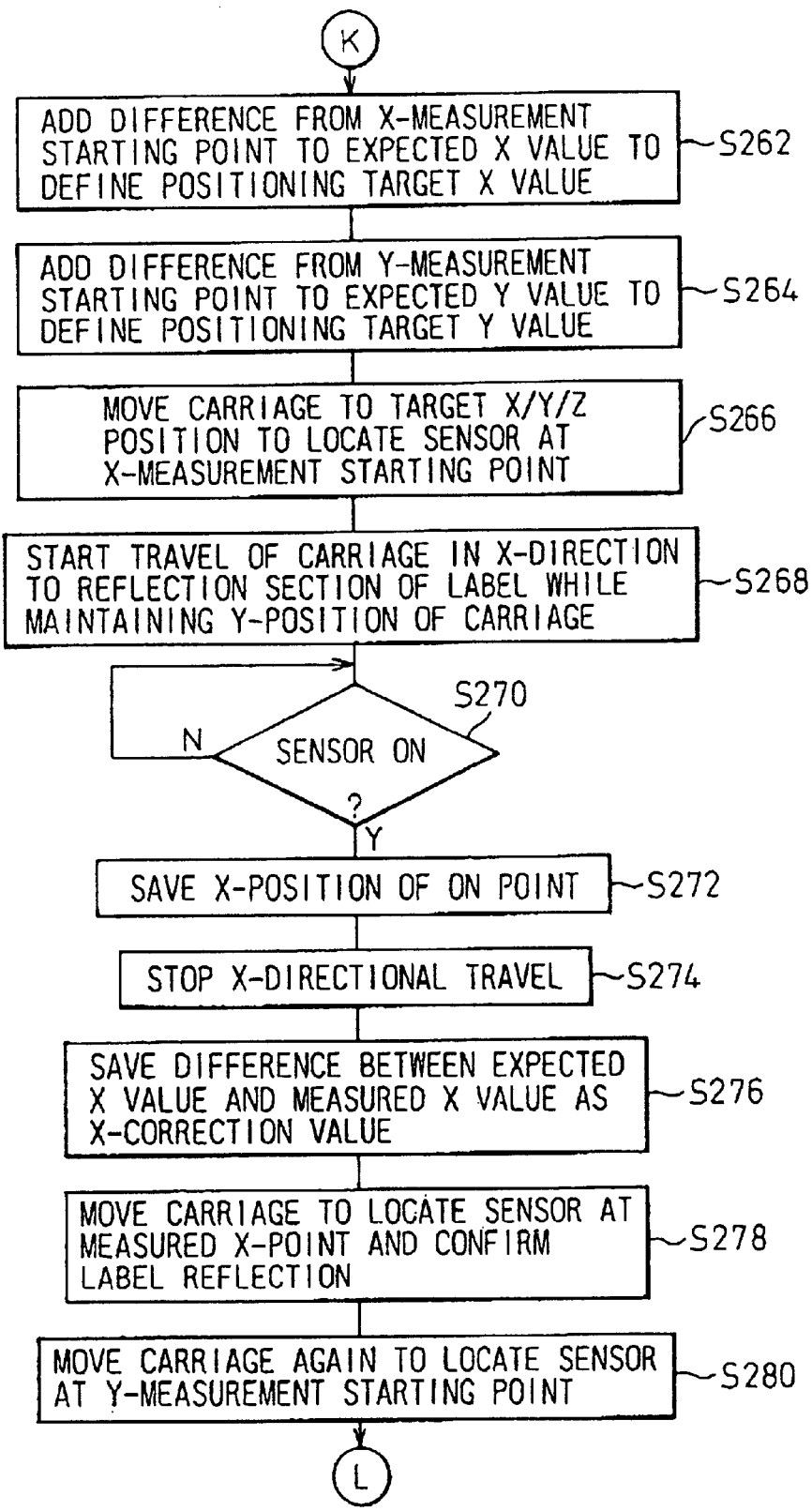
FIG. 71 is a diagram showing a part of the processing flowchart for the operation of measuring the position correction value.
Figure 72:
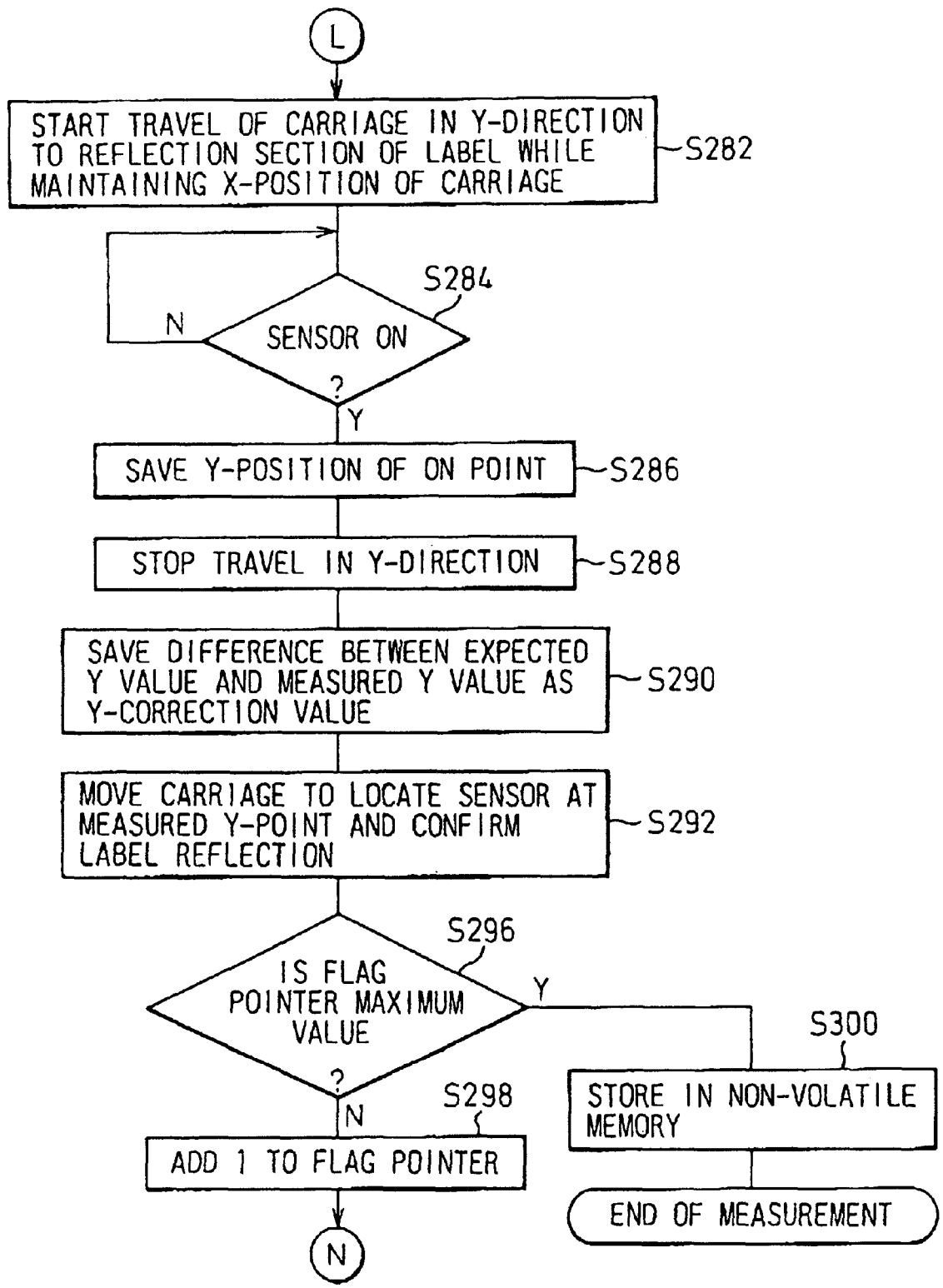
FIG. 72 is a diagram showing a part of the processing flowchart for the operation of measuring the position correction value.

FIGS. 70 to 72 are diagrams showing the processing flowchart for measuring a position correction value.

(1) Steps S240 to S244: The CPU 400 retrieves into the designation address table 436 the unit address (frame number and face number) of the drum unit 169 of which the position correction value should be measured. Assuming that the drum unit 169 is the drum unit 10b shown in FIG. 63, the address of the drum unit 169 (10b) contains the frame number of 2 and the face number Z of zero. The CPU 400 then retrieves the address of the reference cell 254m in step S242. The address of the reference cell 254m is set as the coordinate value of the cell in the drum unit shown in FIG. 66. The reference cell 254m is indicated at the lower right portion of each of the magazines 200S to 200V. The X address of the reference cell 254m of the magazine 200s is 04, and the Y address thereof is 04.

The X address of the magazines 200T to 200V is the same as the X address of the reference cell 254m. The X address, therefore, is 04. On the other hand, the Y address of the magazine 200T is 0D, the Y address of the magazine 200U is 16, and the Y address of the magazine 200V is 1F. These X and Y addresses are expressed in hexadecimal notation.

The CPU 400 then sets the relative position flag point RPF to N=1 in step S244. The magazines 200T to 200V are designated sequentially for the value of the pointer RPF.

(2) Steps S246 to S252: The CPU 400 then refers to the cell address map 432 on the basis of the X address "04" of the reference cell 254m of the magazine 200S designated by the pointer RPF. The CPU 400 acquires the X coordinate value Xh of the standard center position Ph of the reference cell 254m from the total of the X coordinate value (Xs) from the frame reference origin Fso, the width of the drum unit and the dimensional difference along the X direction from the position of the origin flag 16 to the reference point 169a of the drum unit. The CPU 400 then converts the X coordinate value Xh into the count on the encoder (tachometer) 404 and stores the result in the internal register. Further, the CPU 400 reads a size Lx corresponding to the difference between the X coordinate value of the expected point Pe and the X coordinate value of the standard center position Ph from the cell address map 432, and subtracts it from the X coordinate value Xh. Furthermore, the CPU 400 subtracts the X-direction difference between the center line of the hand unit 130 and the light axis of the sensor 162 from the X coordinate value Xh. The difference between the center line of the hand of the hand unit 130 and the light axis of the sensor 162 in X direction is stored in the cell address map 432 described above. The CPU 400 stores the result of calculation in the expected value table 440 as an X coordinate value of the expected point Pe.

(3) Steps S254 to S260: Then, the CPU 400 refers to the cell address map 432 on the basis of the Y address "04" of the reference cell 254m of the magazine 200S designated by the pointer RPF. The CPU 400 acquires the Y coordinate value Yh of the standard center position Ph of the reference cell 254m from the total of the Y coordinate value (Ys) from the frame reference origin Fso and the dimensional difference along Y direction between the position of the origin flag 165 and the reference point 169a of the drum unit. The CPU 400 then converts the Y coordinate value Yh into the count on the encoder (tachometer) 408 and stores the result in the internal register. Further, the CPU 400 reads a size Ly corresponding to the difference between the Y coordinate value of the expected point Pe and the Y coordinate value of the standard center position Ph from the cell address map 432, and subtracts it from the Y coordinate value Yh. Furthermore, the CPU 400 subtracts the difference between the center line of the hand unit 130 and the light axis of the sensor 162 in the Y direction from the Y coordinate value Yh. The difference between the center line of the hand of the hand unit 130 and the light axis of the sensor 162 in Y direction is stored in the cell address map 432 described above. The CPU 400 stores the result of calculation as a Y coordinate value of the expected point Pe in the expected value table 440.

(4) Steps S262 to S268: The CPU 400 calculates the X coordinate of a target value for locating the sensor 162 in position by adding the difference between the expected point Pe in the X direction and the measurement starting point Pi in the X direction stored in the cell position standard value table 434 to the X expected value stored in the expected value table 440. Then, the CPU 400 calculates the Y coordinate of a target value for locating the sensor 162 in position by adding the difference between the expected point Pe in the Y direction and the measurement starting point Pi in the Y direction stored in the cell position standard value table 434 to the Y expected value stored in the expected value table 440. The Z target value is a rotational angle of the motor 25 used for locating the hand assembly 16 at a position in opposed relation to the cell. This value is calculated by the CPU 400 from the Z address (Z=1 or 0) stored in the designation address table 436. The CPU 400 proceeds to determine the position of the accessor 14 providing a carriage for conveying the sensor 162 to the target position stored in the target value table 438. In other words, the CPU 400 sets the sensor 162 in position at the measurement starting point Pi by driving the motors 42, 46, 25. The CPU 400 resets the contents of the counters 410, 412 before starting to move the sensor 162.

(5) Steps S268 to S276: After the sensor 162 is set in position at the measurement starting point Pi, the CPU 400 drives only the motor 42 in order to move the rail base 32 along the X rail 20 while the motor 46 and the motor 25 remain stationary. In other words, the sensor 162 is moved toward the white section 454 of the position correcting mark 190a from the measurement starting point Pi along the X direction of measurement. The CPU 400 then detects a time point when the detection output of the sensor 162 turns on during the travel of the sensor 162. The time point when the sensor 162 reaches the white section 454 is detected. At the time point when the detection output of the sensor 162 turns on, the CPU 400 reads the value from the counter 410 for counting the output of the encoder 404. The value of the counter 410 represents an actual X measurement (Xm). The actual X measurement Xm is stored in the position storage value table 444 as an X position storage value. During the position measurement operation, the CPU 400 updates and holds the current position of the sensor 162 in the current value table 442 on the basis of the values of the counters 410, 412. After the output of the sensor 162 turns on, the CPU 400 stops the motor 42. Then, the CPU 400 determines the difference between the X expected value in the expected value table 440 and the actual X measurement stored in the position storage value table 444. This difference is stored as an X correction value in the correction value table 446. The CPU 400 drives the motor 42 in reverse direction and sets the sensor 162 at the position of the actual X measurement Xm, thus confirming the reflection from the white section 454.

(6) Steps S280 to S292: The CPU 400 sets the sensor 162 at the measurement starting point Pi. After the sensor 162 is set in position at the measurement starting point Pi, the CPU 400 drives only the motor 46 in order to move the base 27 along the rail guide 22 without driving the motor 42 and the motor 25. In other words, the sensor 162 is moved along the Y measurement direction from the measurement starting point Pi toward the white section 42 of the position correcting mark 190a.

The CPU 400 then detects a time when the detection output of the sensor 162 turns on during the travel of the sensor 162. The time when the sensor 162 reaches the white section 452 is detected. The CPU 400 reads the value of the counter 412 for counting the output of the encoder 408 at the time when the detection output of the sensor 162 turns on. The value of the counter 412 represents an actual Y measurement (Ym). The actual Y measurement Ym is stored in the position storage value table 444 as a Y position storage value. After the detection output of the sensor 162 turns on, the CPU 400 stops the driving of the motor 46.

Then, the CPU 400 determines the difference between the Y expected value in the expected value table 440 and the actual Y measurement stored in the position storage value table 444. This difference is stored in the correction value table 446 as a Y correction value. The CPU 400 drives the motor 46 in reverse direction, sets the sensor 162 at the position of actual Y measurement Ym and confirms that a reflection exists from the white section 452.

(7) Steps S296 to S300: After the processing in step S292, the CPU 400 decides whether or not the relative position flag pointer RPF assumes a maximum value. In other words, the CPU 400 decides whether or not the processing of position measurement for the position correcting mark 190d of the magazine 200V is complete.

Four racks 184a to 184d are mounted on the magazine drum 175 of the drum unit 169. The CPU 400 checks whether the value N on the pointer RPF has reached 4. Unless the value on the pointer RPF is a maximum, "1" is added to the value on the pointer RPF. The CPU 400 then returns to step S246 for executing the position measurement for the next position correcting mark.

In the case where the value on the pointer RPF coincides with a maximum value, the correction value for each of the position correcting marks 190a to 190d stored in the correction value table 446 is stored in the X-Y position correction table 448 in the nonvolatile memory.

The CPU 400 completes the position measurement and returns to the operation command wait mode of step S212 shown in FIG. 69.

This position measurement operation, which has been carried out for the drum unit having a DEE magazine in the above-mentioned case, can alternatively be performed on the drum unit having no DEE door shown in FIGS. 17 to 22. In such a case, the position correcting mark 190a is arranged on the base 654a or on the pole 686 of the drum unit 10A.

In this way, the library apparatus 2 executes the operation of position measurement between the accessor unit 9 and the drum unit 10. Any assembly error that may develop when coupling the units to each other, therefore, can be effectively absorbed. Thus the restriction on assembly accuracy of the library apparatus 2 can correspondingly be relaxed, thereby shortening the time required for assembly work.

The foregoing description refers to the use of only a magnetic tape cartridge of an I3480 type as a cartridge for containing storage media. The present invention, however, is not limited to such a cartridge, but applicable to any library apparatus having a cell containing other types of magnetic tape cartridges or optical disk cartridges with equal effect.

Further, although the accessor according to this embodiment is an X-Y travel mechanism, various modifications are possible. For example, the accessor may be a Y-θ travel mechanism. In such a case, the accessor making up the Y-θ travel mechanism is arranged inside a cylindrical cell drum.

Figure 73:
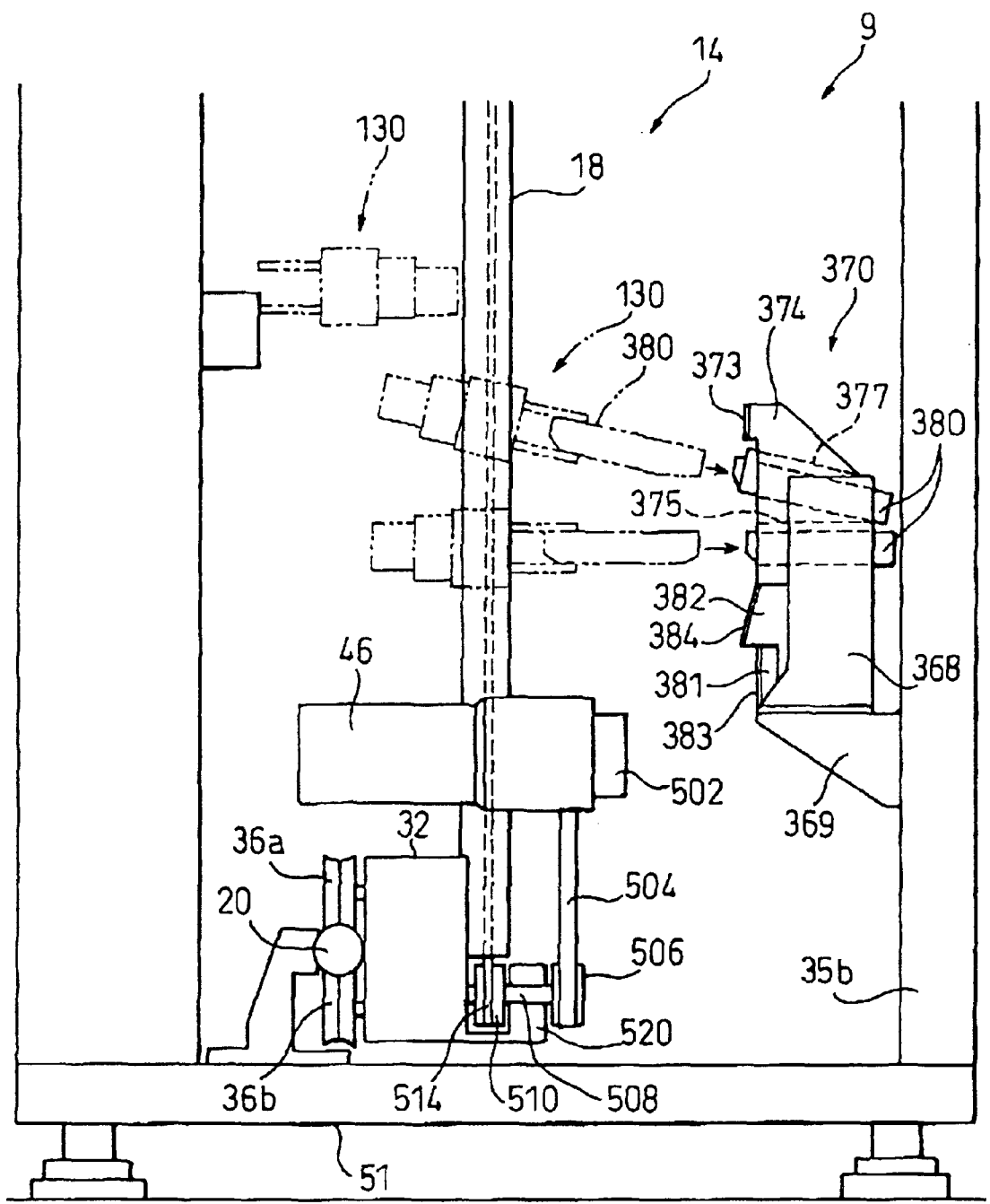
FIG. 73 is a diagram for explaining the relative positions between the accessor and a diagnostic cell.

FIG. 73 is a diagram for explaining the relative positions of the accessor 14 of the accessor unit 9 and the diagnostic cell unit 370 arranged on the accessor 9.

In FIG. 73, an X rail 20 supported on a base 51 of the accessor unit 9 is held between rollers 36a, 36b supported on a rail base 32. A vertical column 18 is mounted on the rail base 32. A hand unit 130 is mounted vertically movably on the vertical column 18 as described above. The hand unit 130 is driven by a unit including a motor 46. The motor 46 includes an electromagnetic brake 502 for holding the motor 46 stationary when power is off. The turning effort of the motor 46 is transmitted through a belt 504 to a pulley 506. The turning effort of the pulley 506 in turn is transmitted to a pulley 510 fixed on a shaft 508 shared by the pulley 506. The turning effort of the pulley 510 is transmitted to the hand unit 130 through a belt 514. Numeral 520 designates an arm.

A mount 369 protrudes from a pole 35b of the accessor unit 9. A diagnostic cell unit 370 is mounted on the mount 369 through a mounting bracket 368. The diagnostic cell unit 370 includes a label mount 374 having a master label 373 attached thereon, a first diagnostic cell 375 having a tilt angle of 0°, a second diagnostic cell 377 having a tilt angle of 12°, a first reference flag mount 381 having a reference flag 383 attached thereon, and a second reference flag mount 382 having a reference flag 384 attached thereon. A diagnostic cartridge 380 held in the hand unit 130 is adapted to be inserted into the first and second diagnostic cells 375, 377.

The diagnostic cell 370 and the diagnostic cartridge 380 inserted into the diagnostic cell 370 are fabricated with high mechanical precision.

Figure 74:
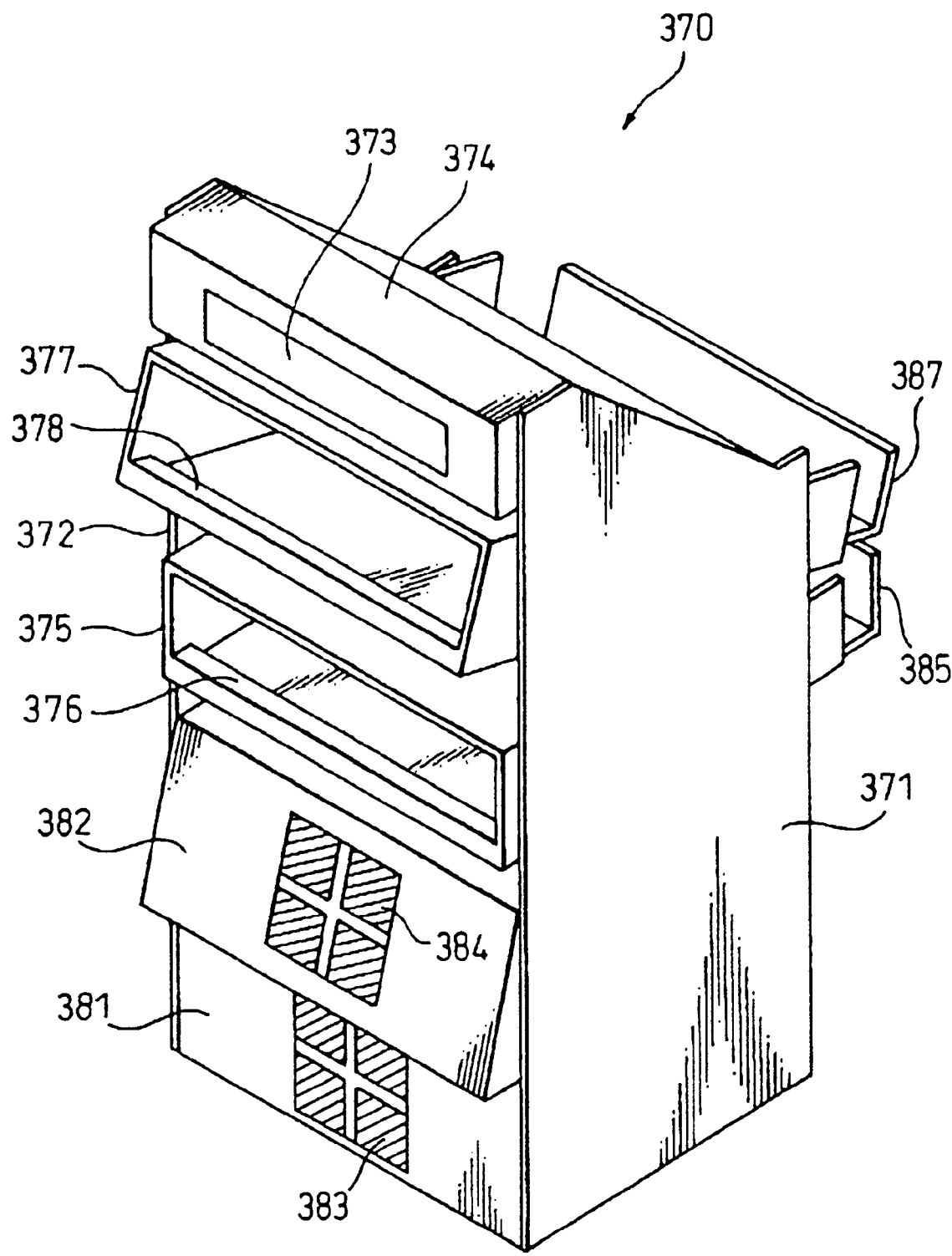
FIG. 74 is a perspective view showing a configuration of the diagnostic cell of FIG. 73.

FIG. 74 is a perspective view showing a configuration of the diagnostic cell 370 shown in FIG. 73. The mounting bracket 368 is not shown in FIG. 74.

The diagnostic cell 370 includes two side walls 371, 372, and various component parts held between the side walls 371, 372, including, from top to bottom, the label mount 374, the second diagnostic cell 377, the first diagnostic cell 375, the second reference flag mount 382 and the first reference flag mount 381, in that order. The label mount 374 has a master label 373 such as a bar code label attached thereon indicating the position of the diagnostic cell 370. The label mount 374 has a vertical surface on which to attach the master label 373.

The first diagnostic cell 375 and the second diagnostic cell 377 are machined with high accuracy. Steps 376, 378 are formed at the entrance of the cartridge of the cells. Also, stoppers 385, 387 for retaining the inserted cartridge are formed on the rear portion of the first diagnostic cell 375 and the second diagnostic cell 377, respectively. The reference flag 383 is adapted to be attached on the first reference flag mount 381, and the reference flag 384 is adapted to be attached on the second reference flag mount 382. The first reference flag mount 381 has a vertical surface on which the reference flag 383 is attached. The second reference flag mount 382 has a surface inclined by 12° from the vertical direction on which the reference flag 384 is attached.

Figure 75:
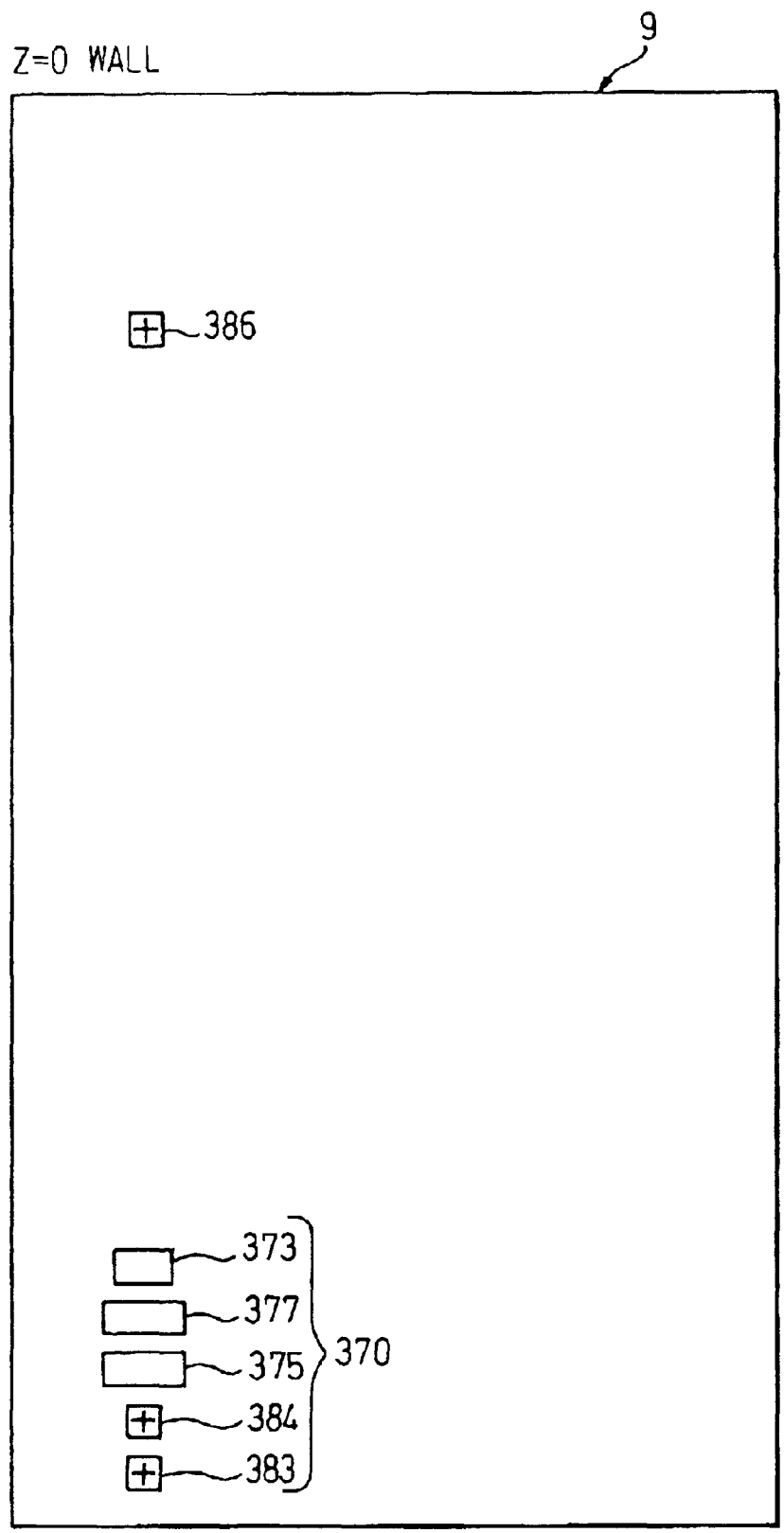
FIG. 75 is a front view of the Z0 wall with the diagnostic cell mounted thereon.
Figure 76:
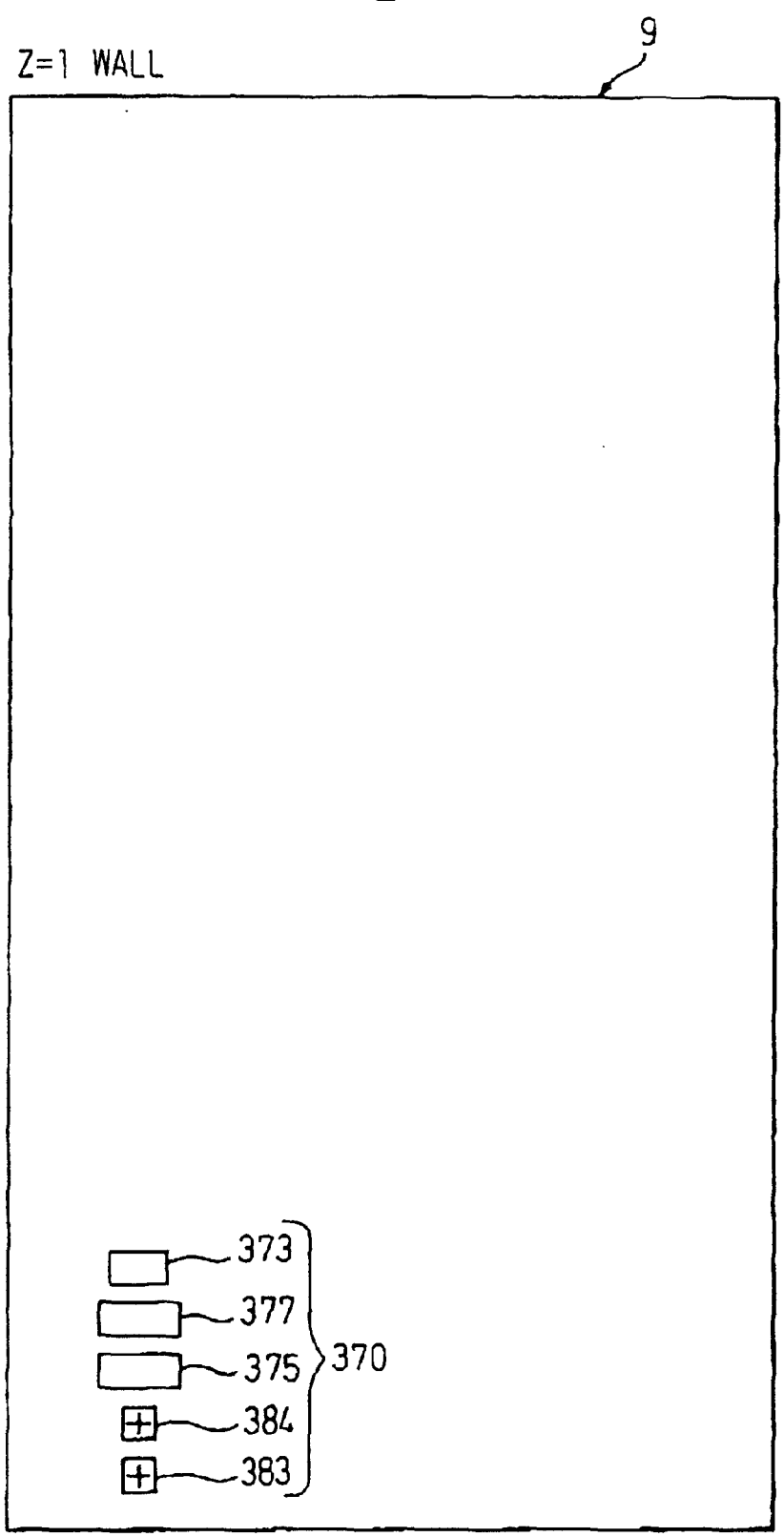
FIG. 76 is a front view of the Z1 wall with the diagnostic cell mounted thereon.

FIG. 75 is a diagram showing the surface of the Z0 wall of the accessor unit 9 shown in FIG. 73 on which the diagnostic cell 370 is mounted. FIG. 76 is a diagram viewing the Z1 wall surface on which the diagnostic cell 370 is attached. The reference flag 383 is arranged also at an upper portion of the diagnostic cell 370 on the Z0 wall side.

Figure 77A:
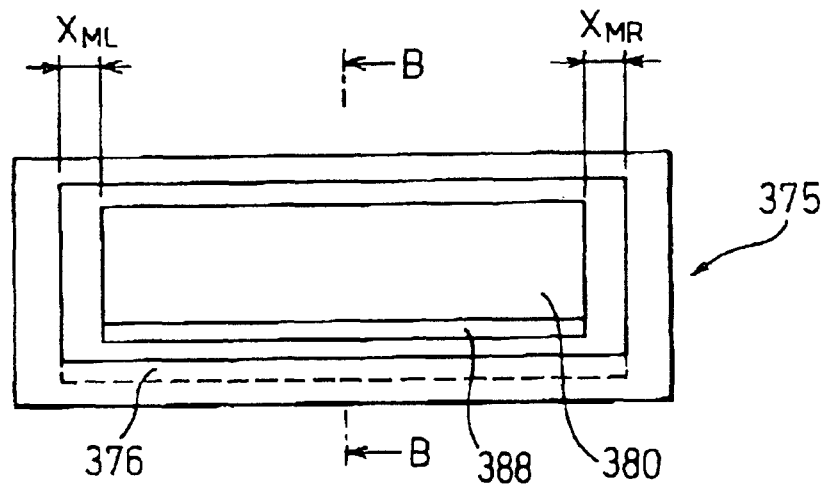
FIG. 77A is a diagram for explaining the relation between the diagnostic cell and the diagnostic cartridge.
Figure 77B:
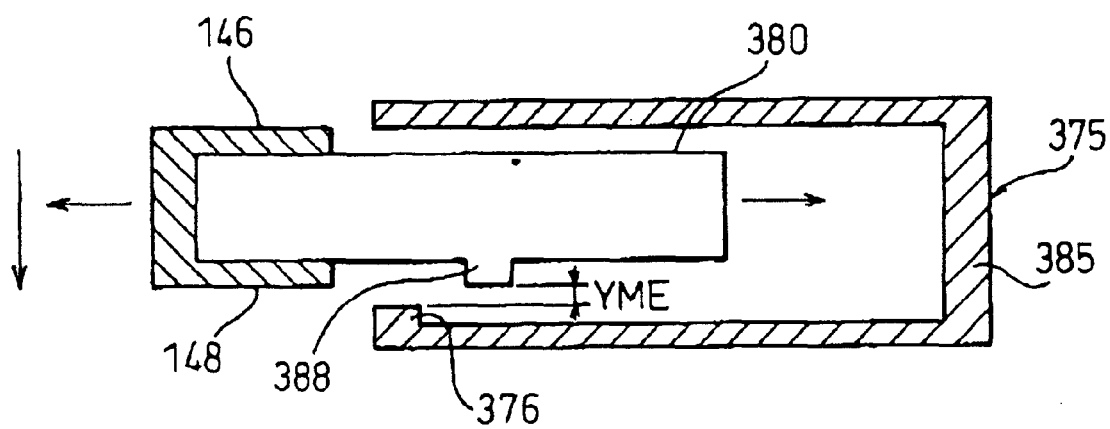
FIG. 77B is a sectional view taken in line B—B in FIG. 77A.

FIG. 77A is a diagram for explaining the relation between the first diagnostic cell 375 (with tilt angle of 0°) and the diagnostic cartridge 380. FIG. 77B is a sectional view taken in line B—B in FIG. 77A.

As seen from these diagrams, in the diagnostic cell 375, the lower end of the hole for inserting the diagnostic cartridge 380 is formed one step higher than the internal bottom surface of the diagnostic cell 375. A step 376 is formed in this way. The diagnostic cartridge 380 held by the upper hand 146 and the lower hand 148 and inserted into the diagnostic cell 375, on the other hand, is formed with a ridge 388 on the bottom surface thereof.

The diagnostic cartridge 380, after being inserted into the diagnostic cell 375, is lowered by a predetermined height, say, 1 mm, by means of the upper hand 146 and the lower hand 148, and then withdrawn out of the diagnostic cell 375. Assume that the distance YME between the bottom ridge 388 of the diagnostic cartridge 380 and the step 376 is larger than zero, so that the diagnostic cartridge 380 is withdrawn out of the diagnostic cell 370 without contacting the step 376. Then, the diagnostic cartridge 380 is inserted into the diagnostic cell 375 again, and after being lowered by the same height, say, by 1 mm, by means of the upper hand 146 and the lower hand 148, is withdrawn out of the diagnostic cell 375. The process of lowering and withdrawing the diagnostic cartridge 389 is repeated until the bottom ridge 388 of the diagnostic cartridge 380 comes to engage the step 376.

In this way, it is possible to measure the height, in the diagnostic cell 375, of the diagnostic cartridge 380 first inserted into the diagnostic cell 375. After thus measuring the height, in the diagnostic cell 375, of the diagnostic cartridge 380 first inserted in the diagnostic cell 375, the diagnostic cartridge 380 is lifted by the same height as it was lowered, and thus is held at the original height.

The diagnostic cartridge 380, after being returned to the original state in the diagnostic cell 375, is moved rightward in the diagnostic cell 375. Upon coming into contact with the right wall of the diagnostic cell 375, the output of the encoder that has thus far moved the diagnostic cartridge 380 rightward undergoes a change. The distance XMR covered rightward by the diagnostic cartridge 380 can thus be measured by the output change of the encoder.

Upon measuring the rightward coverage XMR of the diagnostic cartridge 380, the cartridge 380 is moved leftward by the distance equal to the coverage XMR and thus returned to the original position. The diagnostic cartridge 380 is then moved leftward in the diagnostic cell 375. When the diagnostic cartridge 380 comes into contact with the left wall in the diagnostic cell 375, the output of the encoder that has thus far moved the diagnostic cartridge 380 leftward undergoes a change. The leftward coverage XML of the diagnostic cartridge 380 thus can be measured from the output change of the encoder.

The rightward and leftward coverages XMR, XML of the diagnostic cartridge 380 are used to determine the horizontal position of the diagnostic cartridge 380 first inserted into the diagnostic cell 375.

Assume that the hand unit 130 is located just in front of the diagnostic cell 375 on the basis of the data of the reference flag 383 of the diagnostic cell 385 read by the photoelectric sensor 162 arranged on the hand unit 130, and that the diagnostic cartridge 380 is inserted in the diagnostic cell 375. Then, the diagnostic cartridge 380 should be located at the center of the internal space of the diagnostic cell 375. Assume, on the other hand, that the values of the rightward and leftward coverages XMR, XML of the diagnostic cartridge 380 and the height of the diagnostic cartridge 380 in the diagnostic cell 375 obtained by the above-mentioned measurement fail to indicate that the diagnostic cartridge 380 first inserted into the diagnostic cell 375 is not located at the center of the internal space of the diagnostic cell 375. It then follows that there is an error between the light axis of the photoelectric sensor 162 and the operation axis of the hand of the hand unit 130 for moving the diagnostic cartridge 380.

As a result, the error between the light axis of the photoelectric sensor 162 and the operation axis of the hand at the tilt angle of 0° can be detected from the diagnostic cell 375 and the diagnostic cartridge 380. There is only one accessor 14. By detecting the error between the light axis of the photoelectric sensor 162 and the operation axis of the hand, therefore, the accessor 14 can be placed in front of an intended cell taking the error into account, thereby making it possible to insert the cartridge 588 into each cell 568 with a higher accuracy.

According to the invention, the error between the light axis of the photoelectric sensor 162 and the operation axis of the hand is detected for the Z0 and Z1 surfaces and the tilt angles of 0° and 12° of the library apparatus 2. This operation will be explained below with reference to a flowchart.

Figure 78:
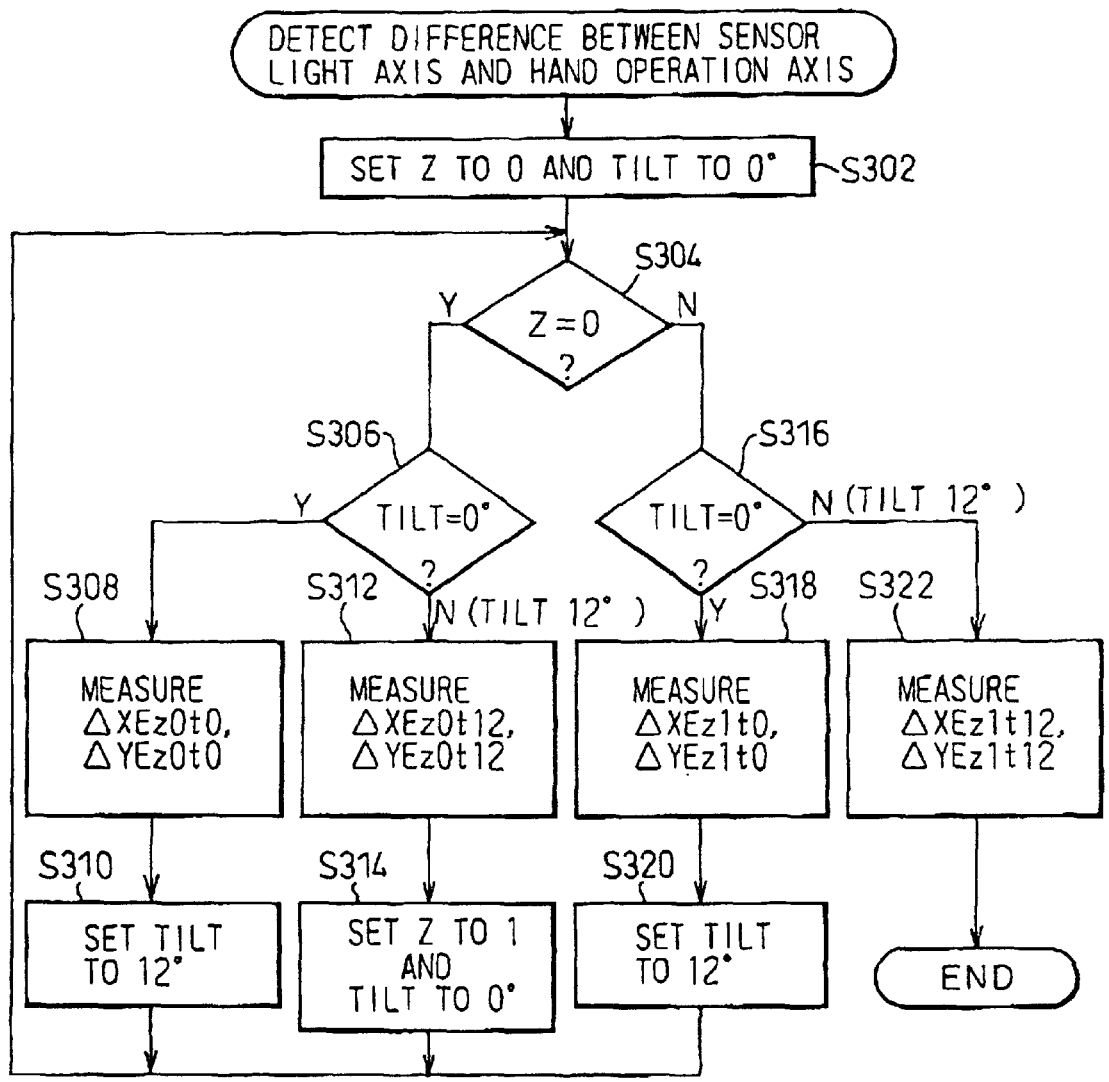
FIG. 78 is a flowchart for detecting the difference between the light axis of the sensor and the hand operation axis.

FIG. 78 is a flowchart for detecting the error between the light axis of the sensor and the operation axis of the hand according to this invention.

(1) Step S302: The value Z is set to 0 and the tilt angle is set to 0°. First, the apparatus is set up for measuring the error between the light axis of the photoelectric sensor 162 and the operation axis of the hand, first, for the tilt angle of 0° of the Z0 surface.

(2) Steps S304 to S310: Step S304 selects the Z0 surface, and step S306 selects the tilt angle of 0°. Then, step S308 executes the measurement of the error between the light axis of the photoelectric sensor 162 and the hand operation axis for the tilt angle 0° of the Z0 surface. More specifically, step S308 measures the lateral error ΔXEz0t0 of the diagnostic cartridge 380 and the vertical error ΔYEz0t0 of the diagnostic cartridge 380 for the Z0 surface tilt angle of 0°. Then step S310 sets the tile angle to 12° and the process returns to step S304.

(3) Steps S304 to S314: Step S304 selects the Z0 surface, and step S306 selects the tilt angle of 12°. Then, step S312 executes the measurement of the error between the light axis of the photoelectric sensor 162 and the hand operation axis for the tilt angle of 12° of the Z0 surface. More specifically, step S312 measures the lateral error ΔXEz0t12 and the vertical error ΔYEz0t12 of the diagnostic cartridge 380 for the tilt angle of 0° of the Z0 surface. Then, step S314 selects the Z1 surface and sets the tilt angle to 0°, followed by the process returning to step S304.

(4) Steps S304 to S320: Step S304 selects the Z1 surface, and step S316 selects the tilt angle of 0°. Then, step S318 executes the measurement of the error between the light axis of the photoelectric sensor 162 and the hand operation axis for the tilt angle of 0° of the Z1 surface. More specifically, step S318 measures the lateral error ΔXEz1t0 and the vertical error ΔYEz1t0 of the diagnostic cartridge 380 for the tilt angle of 0° of the Z1 surface. Then, step S320 sets the tilt angle to 12° and the process returns to step S304.

(5) Steps S304 to S322: Step S304 selects the Z1 surface, and step S316 selects the tilt angle of 12°. Then, step S322 executes the measurement of the error between the light axis of the photoelectric sensor 162 and the hand operation axis for the tilt angle of 12° of the Z1 surface. More specifically, step S322 measures the lateral error ΔXEz1t12 and the vertical error ΔYEz1t12 of the diagnostic cartridge 380 for the tilt angle of 0° of the Z1 surface. The routine thus is ended.

Figure 79B:
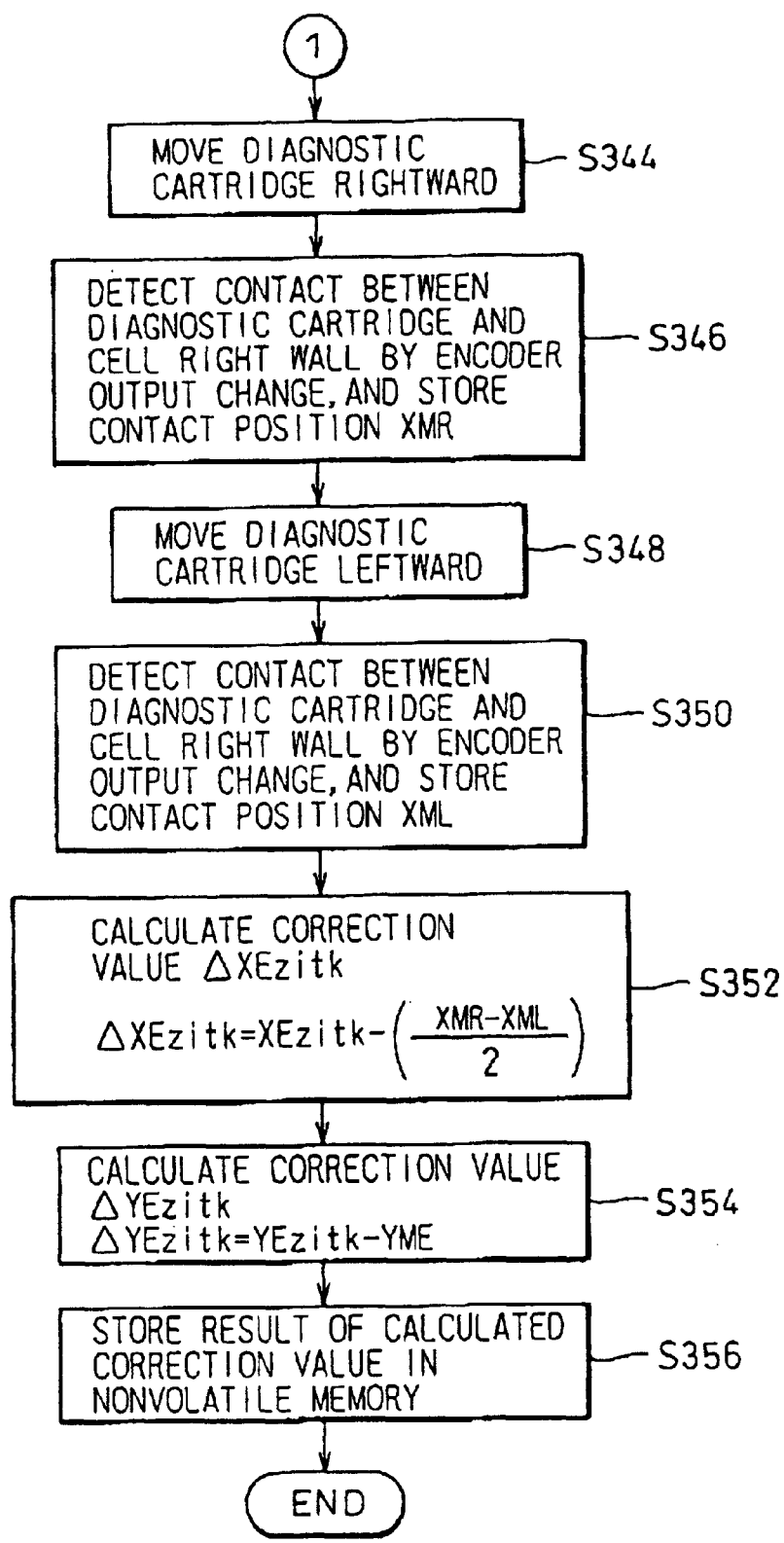

FIGS. 79A and 79B are flowcharts for explaining in detail the steps S308, S312, S318 and S322 in the flowchart of FIG. 78 for measuring the lateral error ΔXEzitk and the vertical error ΔYEzitk of the diagnostic cartridge 380 for the tilt angle k° of the Zi surface (i: 0 or 1, k: 0 or 12).

(1) Step S330: The diagnostic cartridge 380 is set in the hand unit (the upper hand 146 and the lower hand 148) of the accessor 14.

(2) Step S332: The accessor 14 is moved to the front of the diagnostic cell unit 370, and measurement is taken of the position (XEzitk, YEzitk) of a flag (the reference flag 383 of 0° or the reference flag 384 of 12°) opposed to a diagnostic cell (the first diagnostic cell 375 or the second diagnostic cell 377). When the diagnostic cartridge 380 is inserted into the second diagnostic cell 377, the hand unit is tilted downward by 12°.

(3) Steps S334 to S338: The diagnostic cartridge 380, after being inserted into the diagnostic cell 375, is lowered by 1 mm by the upper hand 146 and the lower hand 148 and then withdrawn out of the diagnostic cell 375. In the case where the diagnostic cartridge 380 is withdrawn out of the diagnostic cell 370 without being caught by the step 376, the diagnostic cartridge 380 is inserted again into the diagnostic cell 375, lowered by 1 mm by the upper hand 146 and the lower hand 148, and then withdrawn out of the diagnostic cell 375. The operation of lowering and withdrawing the diagnostic cartridge this way is repeated successively until the bottom ridge 388 of the diagnostic cartridge 380 comes to engage the step 376.

(4) Steps S340 to S342: The height YME, in the diagnostic cell 375, of the diagnostic cartridge 380 first inserted into the diagnostic cell 375 is stored, and the diagnostic cartridge 380 is lifted by the same height as it was lowered, and thus returned to the original height (center of the diagnostic cell).

(5) Steps S344 to S346: The diagnostic cartridge 380 is moved rightward in the diagnostic cell 375. The diagnostic cartridge 380 coming into contact with the right wall of the diagnostic cell 375 is detected by the output change of the encoder that has moved the diagnostic cartridge 380 rightward, and the contact position (coverage) XMR is stored.

(6) Steps S348 to S350: The diagnostic cartridge 380, after being moved leftward by the distance XMR, is moved further leftward. The diagnostic cartridge 380 coming into contact with the left wall of the diagnostic cell 375 is detected by the output change of the encoder that has thus far moved the diagnostic cartridge 380 leftward. The contact point (the distance covered after being returned by the distance XMR) XML is stored.

(7) Steps S352 to S354: The lateral correction value ΔXEzitk of the diagnostic cartridge 380 is determined by subtracting one half of the difference between the right and left coverages XMR and XML from the position XEzitk of the diagnostic cartridge 380 detected from the flag. In the case where the coverages XMR and XML are equal to each other and the diagnostic cartridge 380 is located at the horizontal center of the diagnostic cell, the correction value ΔXEzitk is zero. Then, the vertical correction value ΔYEzitk of the diagnostic cartridge 380 is determined by subtracting the downward coverage YME of the diagnostic cartridge 380 detected by the flag from the distance YEzitk from the bottom to the center of the diagnostic cell. In the case where the coverage YME is equal to the distance YEzitk from the bottom to the vertical center of the diagnostic cell and at the same time in the case where the diagnostic cartridge 380 is located at the vertical center of the diagnostic cell, then the correction value ΔYEzitk is zero.

(8) Step S356: The correction values ΔXEzitk and ΔYEzitk thus calculated are stored in a nonvolatile memory.

Now, explanation will be made about the correcting operation in the case where the cell is displaced due to deterioration with age or the like during the operation of the library apparatus 2 with the result that the it is impossible to insert cartridge 588 into the cell accurately.

Figure 80A:
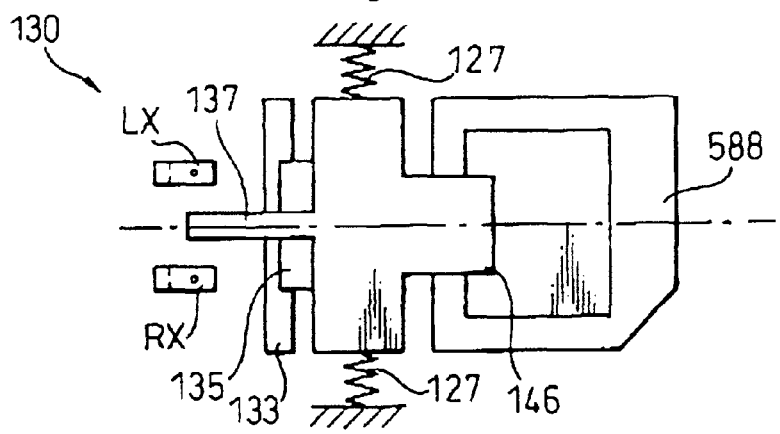
FIG. 80A is a model diagram showing the state in which the hand unit shown in FIG. 5 holds a cartridge.

FIG. 80A is a model diagram showing the state in which the hand unit 130 shown in FIG. 5 has held a cartridge 588. The hand 146 that has held a cartridge 588 is located at the center of the hand unit 130 under the force of the springs 127 arranged on the two sides of the base of the hand 146. The one-dot chain line in the diagram represents a line passing through the center of the hand unit 130. The hand unit 130, by means of a direct-acting bearing 135 arranged on the lower surface thereof, can move on the guide rail 133 with one of the springs 127 extended and the other compressed. Also, with the movement of the hand unit 130, the flag 137 protruded from the rear end of the hand unit 130 masks the sensor RX for detecting the rightward movement of the hand unit 130 or the sensor LX for detecting the leftward movement of the hand unit 130.

Figure 80B:
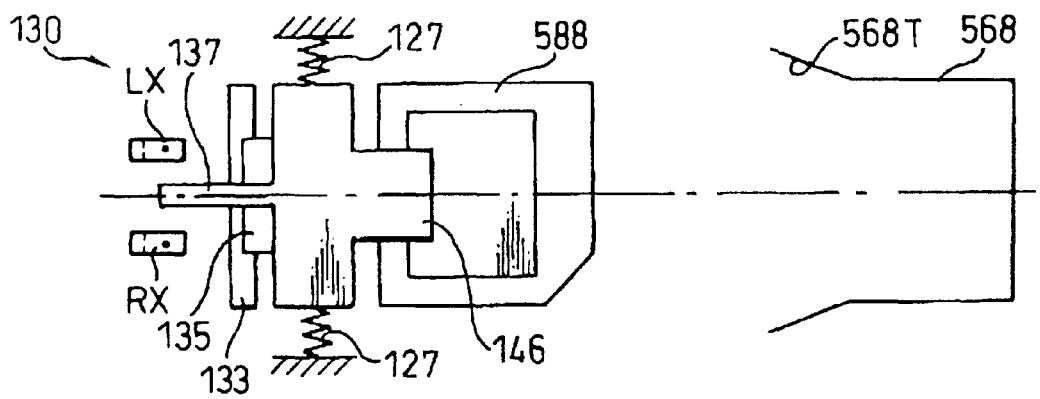
FIG. 80B is a diagram for explaining the state in which a cartridge is accommodated in a cell using the hand unit shown in FIG. 80A.
Figure 80C:
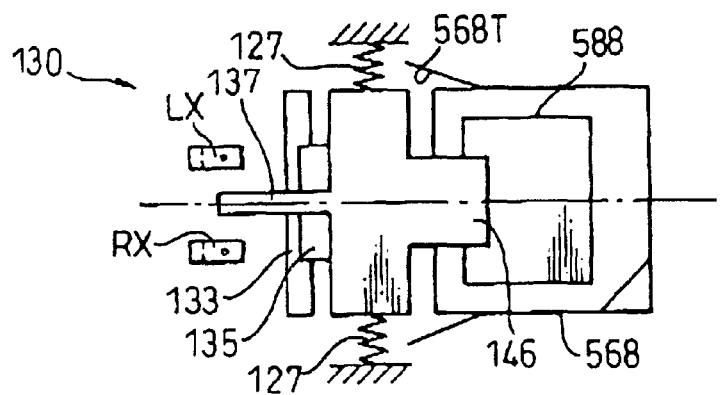
FIG. 80C is a diagram for explaining the state in which a cartridge is normally accommodated in a cell.

FIGS. 80B and 80C are diagrams for explaining the operation of accommodating the cartridge 588 into the cell 568 when the hand unit 130 is correctly located on the front of the cell 568. As long as the hand unit 130 is rightly located on the front of the cell 568, the center line of the hand unit 130 coincides with the center line of the cell 568, so that the cartridge 588 can be inserted into the cell 568 without the extension or contraction of the spring 127. In this case, no output is produced from either sensor RX or LX. Numeral 568T designates a tapered portion formed on the cell 568 which provides an insertion guide to the cartridge 588 displaced with respect to the cell 568.

Figure 81A:
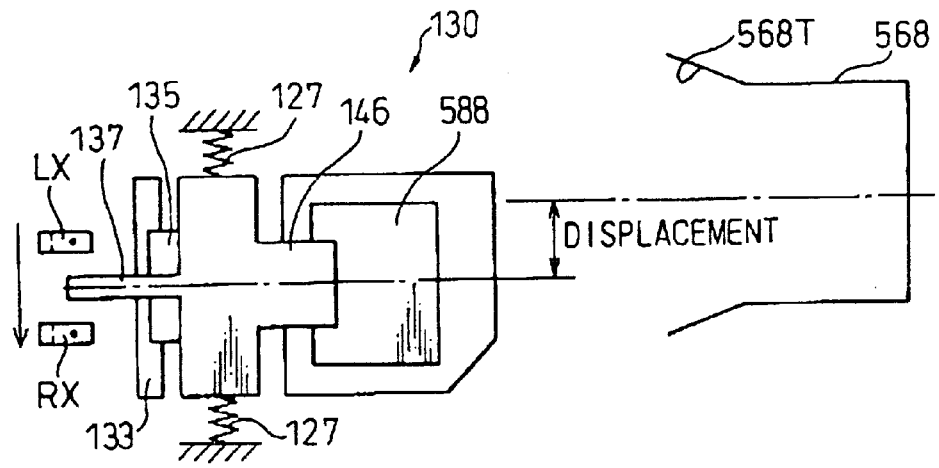
FIG. 81A is a diagram for explaining the state in which a cartridge being accommodated into a cell using the hand unit shown in FIG. 80A is displaced with respect to the cell.
Figure 81B:
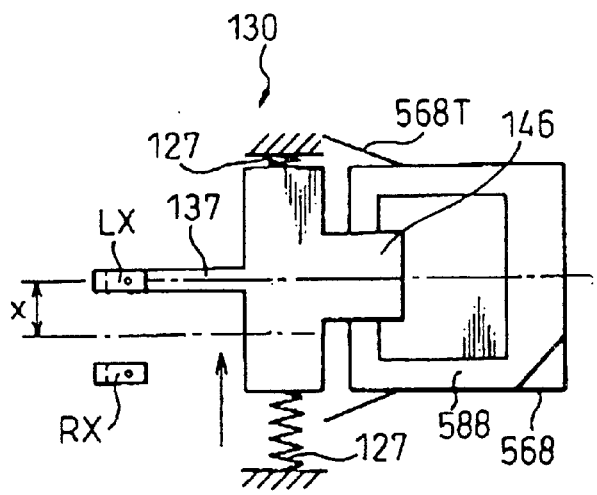
FIG. 81B is a diagram for explaining the manner in which a cartridge is accommodated into a cell using the hand unit in the state of FIG. 81A.

FIGS. 81A and 81B are diagrams showing the operation of accommodating the cartridge 588 into the cell 568 when the cartridge 588 in the process of being accommodated into the cell 568 using the hand unit 30 shown in FIG. 80A is displaced with respect to the cell 568. In the case where the hand unit 130 is not correctly located on the front of the cell 568, the center line of the hand unit 130 is displaced from the center line of the cell 568.

In that case, with the advance of the hand unit 130, the cartridge 588 comes into contact with the tapered portion 568T formed at the entrance of the cell 568, and is guided by the tapered portion 568T into the cell 568 along the guide rail 133. Once the cartridge 588 is inserted in the cell 568, one of the springs 127 is contracted while the other spring 127 is extended. Assuming that the hand unit 130 is displaced leftward, the left sensor LX is masked by the flag 137 so that the displacement of the hand unit 130 is detected by the sensor LX.

Figure 81C:
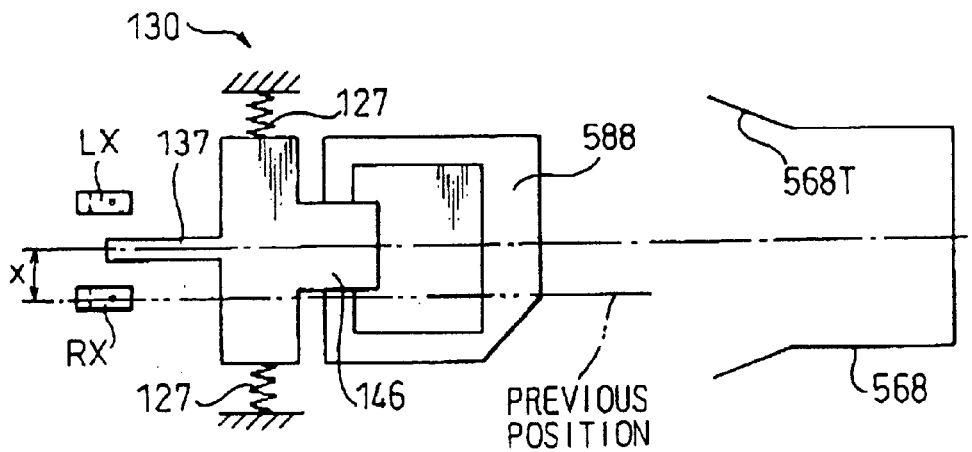
FIG. 81C is a diagram for explaining the relation between the same cell and a cartridge being accommodated in the cell using a correction table corrected by the sensor output of the hand unit shown in FIG. 81B.

The amount of displacement of the hand unit 130 is transmitted to the controller which rewrites the above-described correction table with this amount of displacement. As a result, in the subsequent process of inserting the cartridge 588 into the same cell 568, the accessor 14 is located on the front of the particular cell 568 in accordance with the rewritten correction amount stored in the correction table. As shown in FIG. 81c, therefore, the accessor 14 is accurately located on the front of the cell 568, so that the center line of the hand unit 130 coincides with the center line of the cell 568.

Figure 82A:
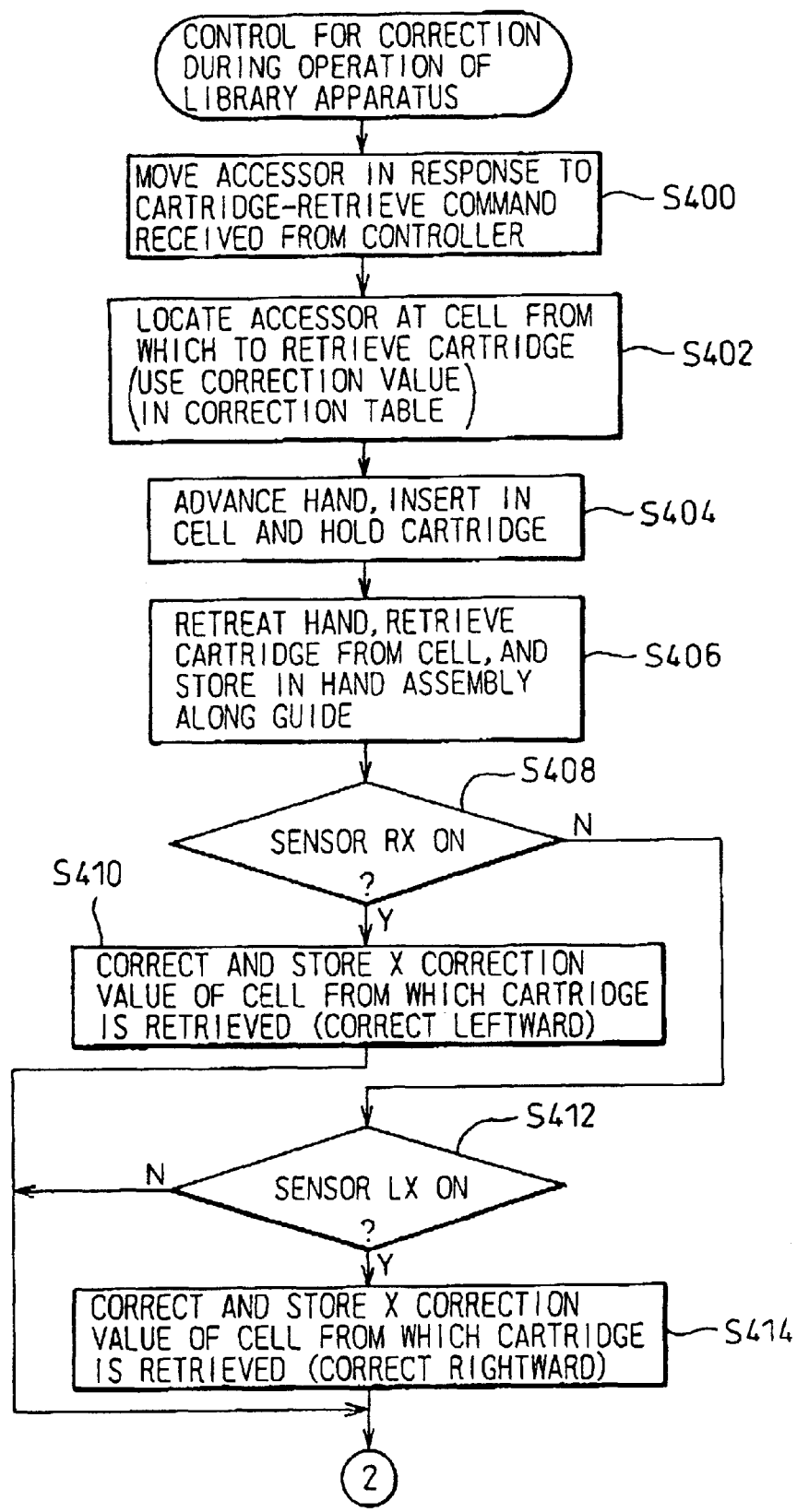

FIGS. 82A and 82B are flowcharts for explaining the correction control performed during the operation of the library apparatus as described above.

The displacement of the cartridge 588 at the time of insertion into the cell 568 described above with reference to FIGS. 80A to 81C is impossible to detect unless the hand 146 of the hand unit 130 holds the center of the cartridge 588. In view of this, the first step of the correction control during the operation of the library apparatus shown in FIG. 82 is to align the center line of the hand 146 with that of the cartridge 588 using the guide 120 arranged on the hand assembly 16 shown in FIGS. 5A, 5B when taking out the cartridge 588 from the cell. In this way, it is possible to detect the displacement of the cell from which the cartridge 588 is taken out.

(1) Detection of displacement of cell from which cartridge is taken out (steps S400 to S416)

In steps S400 and S402, the accessor 14 is moved in response to a cartridge recovery command received from the controller and located on the front of the cell from which the cartridge 588 is to be taken out. The correction value in the correction table described above is used for the movement of the accessor 14.

In steps S404 and S406, the hand unit 130 is advanced and the upper hand 146 and the lower hand 148 are inserted into the cell to grasp the cartridge 588. The hand unit 130 is retracted to recover the cartridge 588 from the cell. The cartridge 588 thus recovered is accommodated in the hand assembly 16 along the guide 120 (FIG. 5). In the process, in the case where the axis of movement of the hand unit 130 coincides with the axis of the cell from which the cartridge 588 is taken out, the cartridge 588 is accommodated into the hand assembly 16 without contacting the guide 120 without contraction or extension of the spring 127. Also, no output is produced from either sensor RX or LX.

In the case where the axis of movement of the hand unit 130 fails to coincide with the axis of the cell from which the cartridge 588 is taken out, on the other hand, the cartridge 588 is accommodated into the hand assembly 16 by being guided by the guide 120. At the same time, one of the springs 127 contracts and the other spring is extended. Also, one of the sensors RX and LX turns on and produces an output.

Step S408 is for deciding whether or not the sensor RX is on. When the sensor RX is turned on, step S410 corrects and stores the X correction value in the correction table of the cell from which the cartridge 588 has been taken out. This correction is made by correcting the X correction value leftward in view of the fact that the accessor 14 is displaced rightward with respect to the cell. In the case where the sensor RX is not on, the process proceeds to step 412 for deciding whether or not the sensor LX is on.

In the case where the sensor LX is on, step 414 corrects and stores the X correction value in the correction table for the cell from which the cartridge 588 was taken out. This correction is made by correcting the X correction value rightward in view of the leftward displacement of the accessor 14 with respect to the particular cell.

The next step S416 releases the the cartridge 588 from the upper hand 146 and the lower hand 148. Once the cartridge 588 is released in the guide 120, the hand unit 130 moves to the central portion of the hand assembly 16 under the force of the spring 127, so that the center line of the hand assembly 16 comes to coincide with the center line of the hand unit 130. Under this condition, assuming that the cartridge 588 is grasped again by the upper hand 146 and the lower hand 148, the coincidence is maintained between the center line of the cartridge 588 and that of the hand unit 130 while it is held in the hand unit 130.

(2) Detection of displacement of cell into which cartridge is accommodated (steps S418 to S434)

In steps S418 and S420, the accessor 14 is moved in response to a cartridge accommodation command received from the controller and located on the front of the cell into which the cartridge 588 is to be accommodated. This movement of the accessor 14 uses the correction value stored in the correction table described above.

In step S422, the hand unit 130 holding the cartridge 588 advances and is accommodated in the cell. In the process, in the case where the axis of movement of the hand unit 130 coincides with the axis of the cell into which the cartridge 588 is to be accommodated, the cartridge 588 is accommodated in the cell without contacting the side walls of the cell, and the spring 127 is neither contracted nor extended. Also, no output is produced from either sensor RX or LX.

In the case where the axis of movement of the hand unit 130 fails to coincide with the axis of the cell into which the cartridge 588 is to be accommodated, on the other hand, the cartridge 588 is accommodated into the cell 568 by being guided by the tapered portion 568T of the cell 568, while one of the springs 127 contracts and the other spring is extended. Also, one of the sensors RX and LX turns on and produces an output.

Step S424 is for deciding whether or not the sensor RX is on. When the sensor RX is turned on, step S426 corrects and stores the X correction value in the correction table of the cell 568 into which the cartridge 588 has been accommodated. This correction is made by correcting the X correction value rightward in view of the fact that the accessor 14 displaced leftward with respect to the cell 568 is urged rightward. In the case where the sensor RX is not on, the process proceeds to step 428 for deciding whether or not the sensor LX is on.

In the case where the sensor LX is on, step S430 corrects and stores the X correction value in the correction table for the cell 568 into which the cartridge 588 is accommodated. In view of the rightward displacement of the accessor 14 with respect to the particular cell, the correction is made by correcting the X correction value leftward.

The next step S432 releases the holding of the cartridge 588 by the upper hand 146 and the lower hand 148. The hand unit 130 is retracted and accommodated in the hand assembly 16. Step S434 waits for the next command from the controller.

What is claimed is:

1. A library apparatus having a cell unit with box-shaped housing including a plurality of cells each for storing a cartridge containing a storage medium, an accessor unit arranged on at least one longitudinal end of the library apparatus, a drive unit with box-shaped housing for recording and reproducing information into and from the storage medium in said cartridge, a guide rail arranged through each cell unit, and an accessor for transferring said cartridge between two arbitrary cells or between an arbitrary cell and said drive unit along said guide rail, said library apparatus comprising:

an origin flag arranged on a predetermined wall surface of said accessor unit for specifying an origin position of said accessor and a position correcting flag arranged on a wall surface opposed to said first wall surface for correcting the position of said accessor;

a photoelectric sensor mounted on a hand assembly of said cartridge-holding accessor for reading the information of said origin flag and said position correcting flag;

at least one diagnostic cell arranged on the same wall surface as the position correcting flag and formed with another flag having the same information as said position correcting flag;

at least one diagnostic cartridge formed to be inserted into and withdrawn from said accessor unit;

a controller arranged in said accessor unit, adapted to move said accessor to the front of a predetermined cell by producing a drive signal to said accessor for inserting and withdrawing said cartridge into and from said cell;

position error detection means arranged in said controller for calculating a value for a difference between a drive position for said accessor based on the accessor drive signal and an actual position of said accessor according to the signals read by said photoelectric sensor from said origin flag and the position correcting flag;

first position correction value storage means for storing the calculated value of said position error correcting means as a first correction value of the accessor drive signal;

an error calculation means for setting said accessor in a position in front of said diagnostic cell according to said drive signal and the value of the flags read by said photoelectric sensor, and determining the limit of insertion and withdrawal by displacing said diagnostic cartridge in four directions a plurality of times by a predetermined distance after inserting said diagnostic cartridge into said diagnostic cell thereby to determine a difference between an actual first insertion position and usual insertion position of said diagnostic cartridge; and second position correction value storage means for storing the calculation value of said error calculation means as a second correction value of the accessor drive signal;

wherein said controller corrects the drive signal by the correction value stored in said first and second position correction value storage means when said controller applies the drive signal to said accessor.

2. A library apparatus according to claim 1, wherein a step having a lower inner portion is arranged at the entrance of said diagnostic cell for said diagnostic cartridge, a ridge is formed on the bottom surface of said diagnostic cell, said ridge engaging said step when said diagnostic cartridge is withdrawn from said diagnostic cell, so that said error calculation means determines the difference between the actual first insertion position and the standard insertion position of said diagnostic cartridge.

3. A library apparatus according to claim 2, wherein when said diagnostic cartridge is displaced leftward or rightward from the insertion position thereof, said error calculation means detects the contact of said diagnostic cartridge with the side wall of said diagnostic cell by the change in the output of the encoder for moving said diagnostic cartridge.

4. A library apparatus according to claim 3, wherein said diagnostic cell constitutes a diagnostic cell unit including a first diagnostic cell for receiving said diagnostic cartridge with a tilt angle of 0°, a second diagnostic cell for receiving said diagnostic cartridge with a tilt angle of 12°, a flag for indicating the position correction information of each diagnostic cell and a master label having the position information of said diagnostic cell written therein.

5. A library apparatus according to claim 4, wherein:

said hand assembly includes a guide for placing the cartridge retrieved by said hand unit at the central portion of said hand assembly;

said hand unit includes a base which has arranged thereon a drive mechanism capable of moving said hand unit in the lateral direction perpendicular to the direction of movement of said cartridge, a spring for placing the hand unit at the central portion of said base under normal conditions, and a lateral displacement detection sensor for detecting the movement of said hand unit in lateral directions.

6. A library apparatus according to claim 5, wherein in the case where an output is produced from said lateral displacement detection sensor when said cartridge is taken out of a predetermined cell during the operation of said library apparatus, the correction value stored in said first position correction value storage means or the X-direction correction value of said predetermined cell in said relative position table is corrected by the output of said lateral displacement detection sensor.

7. A library apparatus according to claim 6, wherein in the case where an output is produced from said lateral displacement sensor, said controller releases the holding of said cartridge by said hand unit, so that when said hand unit is returned to the central portion of said base by the force of said spring, said cartridge is held by said hand unit again.

8. A library apparatus according to claim 7, wherein in the case where an output is produced from said lateral displacement detection sensor when said cartridge is inserted into a specific cell during the operation of said library apparatus, the correction value stored in said first position correction value storage means or the X-direction correction value of said specific cell in said relative position table is corrected by the output of said lateral displacement detection sensor.

9. A library apparatus according to claim 8, wherein said specific cell further defines an insertion hole for receiving said cartridge, and includes a tapered portion for guiding said cartridge to the central portion of said specific cell.

10. A library apparatus having a cell unit with box-shaped housing including a plurality of cells each for storing a cartridge containing a storage medium, an accessor unit arranged on at least one longitudinal end of the library apparatus, a drive unit with box-shaped housing for recording and reproducing information into and from the storage medium in said cartridge, a guide rail arranged through each cell unit, and an accessor for transferring said cartridge between two arbitrary cells or between an arbitrary cell and said drive unit along said guide rail, said library apparatus comprising:

an origin flag arranged on a predetermined wall surface of said accessor unit for specifying an origin position for said accessor and a position correcting flag arranged on a wall surface opposed to said first wall surface for correcting the position of said accessor;

a photoelectric sensor arranged on a hand assembly on said accessor for reading the information of said origin flag and said position correcting flag;

a diagnostic cell arranged on the same wall surface as the position correcting flag and formed to include another flag having the same information as said position correcting flag;

a diagnostic cartridge formed to be inserted into and withdrawn from said accessor unit;

a controller arranged in said accessor unit, adapted to move said accessor in front of a predetermined cell by producing a drive signal to said accessor and adapted to insert and withdraw a cartridge into and from said cell;

a sensor sensitivity measuring means arranged in said controller for measuring the sensitivity of said photoelectric sensor in accordance with the signal read by said photoelectric sensor containing information of said origin flag and said position correcting flag;

a position error detecting means arranged in said controller for calculating the difference between the drive position based on the accessor drive signal and the actual position from the signals of said origin flag and said position correcting flag read by said photoelectric sensor;

an error calculation means for setting said accessor in a position in front of said diagnostic cell from said drive signal and the value of the flags read by said photoelectric sensor, determining the limit of insertion and withdrawal of said cartridge by displacing said diagnostic cartridge in four directions by a predetermined distance a plurality of times after inserting said diagnostic cartridge into said diagnostic cell thereby to determine the difference between an actual first insertion position and a usual insertion position of said diagnostic cartridge, thereby calculating the difference between the light axis of said photoelectric sensor and the operation axis of said hand; and relative position table storage means for causing said photoelectric sensor to read the flags of all the cells in said library apparatus taking into consideration the sensitivity of said photoelectric sensor, the position error due to said accessor drive signal and the difference between the light axis of said photoelectric sensor and the operation axis of said hand, determining a correction value for setting said accessor in correct position by said drive signal with respect to each of said cells, and storing each of said correction values in the form of the relative position table for all the cells;

wherein the drive signal is corrected by the correction value stored in said relative position table storage means when the drive signal is applied by said controller to the accessor for the operation of said library apparatus.

11. A library apparatus according to claim 10, wherein a step having a lower inner portion is arranged at the entrance of said diagnostic cell for said diagnostic cartridge, a protrusion is formed on the bottom surface of said diagnostic cell, said protrusion engaging said step when said diagnostic cartridge is withdrawn from said diagnostic cell, so that said error calculation means determines the difference between the first insertion position and the regular insertion position of said diagnostic cartridge.

12. A library apparatus according to claim 11, wherein when said diagnostic cartridge is displaced leftward or rightward from the insertion position thereof, said error calculation means detects the contact of said diagnostic cartridge with the side wall of said diagnostic cell by the change in the output of the encoder for moving said diagnostic cartridge.

13. A library apparatus according to claim 12, wherein said diagnostic cell constitutes a diagnostic cell unit including a first diagnostic cell for receiving said diagnostic cartridge with a tilt angle of 0°, a second diagnostic cell for receiving said diagnostic cartridge with a tilt angle of 12°, a flag for indicating the position correction information of each diagnostic cell and a master label having the position information of said diagnostic cell written therein.

14. A library apparatus according to claim 13, wherein:
said hand assembly includes a guide for placing the cartridge retrieved by said hand unit at the central portion of said hand assembly;
said hand unit includes a base which has arranged thereon a drive mechanism capable of moving said hand unit in the lateral direction perpendicular to the direction of movement of said cartridge, a spring for placing the hand unit at the central portion of said base under normal conditions, and a lateral displacement detection sensor for detecting the movement of said hand unit in lateral directions.

15. A library apparatus according to claim 14, wherein in the case where an output is produced from said lateral displacement detection sensor when said cartridge is taken out of a predetermined cell during the operation of said library apparatus, the correction value stored in said first position correction value storage means or the X-direction correction value of said predetermined cell in said relative position table is corrected by the output of said lateral displacement detection sensor.

16. A library apparatus according to claim 15, wherein in the case where an output is produced from said lateral displacement sensor, said controller releases the holding of said cartridge by said hand unit, so that when said hand unit is returned to the central portion of said base by the force of said spring, said cartridge is held by said hand unit again.

17. A library apparatus according to claim 16, wherein in the case where an output is produced from said lateral displacement detection sensor when said cartridge is inserted into a specific cell during the operation of said library apparatus, the correction value stored in said first position correction value storage means or the X-direction correction value of said specific cell in said relative position table is corrected by the output of said lateral displacement detection sensor.

18. A library apparatus according to claim 17, wherein said specific cell further defines an insertion hole for receiving said cartridge and includes a tapered portion for guiding said cartridge to the central position of said specific cell.

19. A library apparatus comprising:

a reference cartridge;

a cell unit having a diagnostic flag and a diagnostic cell;

an accessor having a light sensor for detecting said diagnostic flag;

a position error detecting means for calculating the difference between a drive position based on an accessor drive signal and the actual position of said accessor from a signal received from said accessor relating its position relative to the diagnostic flag; and an error calculation means for setting said accessor in a position in front of said diagnostic cell from said drive signal and the value of the diagnostic flag read by said light sensor, determining the limit of insertion and withdrawal of said reference cartridge by having said accessor displace said reference cartridge in four directions by a predetermined distance a plurality of times after inserting said reference cartridge into said diagnostic cell thereby to determine the difference between an actual first insertion and position and a usual insertion position of said reference cartridge, there by calculating the difference between the light axis of said light sensor and the operation axis of said accessor.

* * * * *